(12) United States Patent
Lacapra et al.

(10) Patent No.: US 9,396,206 B2
(45) Date of Patent: Jul. 19, 2016

(54) PEER-TO-PEER REDUNDANT FILE SERVER SYSTEM AND METHODS

(75) Inventors: Francesco Lacapra, Sunnyvale, CA (US); Peter Wallace Steele, Campbell, CA (US); Bruno Sartirana, Loomis, CA (US); Ernest Ying Sue Hua, Cupertino, CA (US); I Chung Joseph Lin, San Jose, CA (US); Samuel Sui-Lun Li, Pleasanton, CA (US); Nathanael John Diller, San Francisco, CA (US); Thomas Reynold Ramsdell, Palos Verdes, CA (US); Don Nguyen, Tracy, CA (US); Kyle Dinh Tran, San Jose, CA (US)

(73) Assignee: Overland Storage, Inc., San Diego, CA (US)

( * ) Notice: Subject to any disclaimer, the term of this patent is extended or adjusted under 35 U.S.C. 154(b) by 822 days.

(21) Appl. No.: 13/619,908

(22) Filed: Sep. 14, 2012

(65) Prior Publication Data

US 2013/0013655 A1 Jan. 10, 2013

Related U.S. Application Data

(62) Division of application No. 12/431,345, filed on Apr. 28, 2009, now Pat. No. 8,296,398.

(60) Provisional application No. 61/048,781, filed on Apr. 29, 2008, provisional application No. 61/111,958, filed on Nov. 6, 2008.

(51) Int. Cl.
*G06F 15/16* (2006.01)
*G06F 17/30* (2006.01)
(Continued)

(52) U.S. Cl.
CPC .......... *G06F 17/30206* (2013.01); *G06F 3/067* (2013.01); *H04L 67/104* (2013.01); *H04L 67/1097* (2013.01)

(58) Field of Classification Search
CPC .. G06F 3/067; H04L 67/1097; H04L 67/1002
USPC .................................................. 709/219, 245
See application file for complete search history.

(56) References Cited

U.S. PATENT DOCUMENTS 5,548,724 A 8/1996 Akizawa et al.
5,555,404 A 9/1996 Torbjornsen et al.
(Continued)

OTHER PUBLICATIONS

Broekstra et al. "A Metadata Model for Semantics-Based Peer-to-Peer System." In proceedings of the WWW '03 Workshop on Semantics in Peer-to-Peer and Grid Computing, Year 2003. pp. 6-7 (May 2003).

(Continued)

*Primary Examiner* — David Lazaro
(74) *Attorney, Agent, or Firm* — Knobbe, Martens, Olson & Bear LLP

(57) ABSTRACT

Peer-to-peer redundant file server system and methods include clients that determine a target storage provider to contact for a particular storage transaction based on a pathname provided by the filesystem and a predetermined scheme such as a hash function applied to a portion of the pathname. Servers use the same scheme to determine where to store relevant file information so that the clients can locate the file information. The target storage provider may store the file itself and/or may store metadata that identifies one or more other storage providers where the file is stored. A file may be replicated in multiple storage providers, and the metadata may include a list of storage providers from which the clients can select (e.g., randomly) in order to access the file.

18 Claims, 27 Drawing Sheets

(51) Int. Cl.
*H04L 29/08* (2006.01)
*G06F 3/06* (2006.01)

(56) References Cited

U.S. PATENT DOCUMENTS

| | | | |
|---|---|---|---|
| 5,905,990 | A | 5/1999 | Inglett |
| 7,631,100 | B2 * | 12/2009 | Ben-Zvi et al. ............... 709/245 |
| 8,010,485 | B1 | 8/2011 | Chatterjee et al. |
| 2003/0070090 | A1 | 4/2003 | Hillhouse |
| 2003/0140051 | A1 | 7/2003 | Fujiwara et al. |
| 2003/0220923 | A1 | 11/2003 | Curran et al. |
| 2003/0225899 | A1 * | 12/2003 | Murphy ........................ 709/230 |
| 2004/0133731 | A1 * | 7/2004 | Sorrentino .......... G06F 12/0871 711/100 |
| 2005/0066056 | A1 | 3/2005 | Dominic |
| 2005/0080982 | A1 | 4/2005 | Vasilevsky et al. |
| 2005/0240609 | A1 | 10/2005 | Mizuno et al. |
| 2006/0015505 | A1 | 1/2006 | Henseler et al. |
| 2006/0029068 | A1 | 2/2006 | Frank et al. |
| 2006/0089936 | A1 | 4/2006 | Chalker |
| 2006/0224687 | A1 | 10/2006 | Popkin et al. |
| 2008/0077635 | A1 * | 3/2008 | Sporny .............. G06F 17/30206 |
| 2010/0228798 | A1 | 9/2010 | Kodama et al. |

OTHER PUBLICATIONS

Daswani et al. "Open Problems in Data-Sharing Peer-to-Peer Systems." ICDT. Lecture Notes in Computer Science, (2572) 1-15, Springer, Year 2003. pp. 4, 13. (Jan. 2003).

Delmastro et al. "Macro P2P multicast for pervasive ad hoc networks." In Pervasive and Mobile Computing, (4)1:62-91, available online Apr. 4, 2007. p. 68.

TIPO Search Report for ROC Patent Application No. 98113958 dated Jun. 19, 2014.

Bhattacharyya, S. et al., "An Overview of Source-Specific Multicast (SSM)," Network Working Group Request for Comments (RFC) 3569, Mar. 2002.

Butt A. R., et al., "Kosha: A Peer-to-Peer Enhancement for the Network File System," Proceedings of the ACM/IEEE SC2004 Conference, 2004, Pittsburgh, PA, USA, Nov. 2004, XP010780354 ISBN: 978-0-7695-2153-4, IEEE, Piscataway, NJ, USA.

Cain, B., "Internet Group Management Protocol, Version 3," Network Working Group Request for Comments (RFC) 3376, Oct. 2002.

Carriero, N., "Linda in Context," Communications of the ACM, Apr. 1989, pp. 444-458, vol. 82.

"Cisco IOS Profile Release 12.1(13)E7 and 12.2(12)b—System Testing for Financial Enterprise Customers," Cisco Systems, Inc., 2003. See http://www.cisco.com/en/US/prod/collateral/iosswrel/ps6537/ps6552/ps6592/prod_white_paper0900aecd80310d60.pdf.

"Cisco 7600 Router: Resilience and Availability for Video Deployments," Cisco Systems, Inc., 2005. http://www.cisco.com/en/US/prod/collateral/routers/ps368/prod_white_paper0900aecd80322ce1.pdf.

Dean, J., et al., "MapReduce: Simplified data Processing on Large Clusters," Google, 2004. See http://labs.google.com/papers/mapreduce-osdi04.pdf.

Deering, R., "Host Extensions for IP Multicasting," Network Working Group Request for Comments (RFC) 1112, Aug. 1989.

Demirci, T., "A Performance Study on Real-Time IP Multicasting," Thesis, Dept. of Electrical and Electronics Engineering, Middle East Technical University, Sep. 2002. Also in Proceedings of the Eighth IEEE International Symposium on Computers and Communications, IEEE, 2003.

Droms, R., "Dynamic Host Configuration Protocol," Network Working Group Request for Comments (RFC) 2131, Mar. 1997.

Fenner, W., "Internet Group Management Protocol, Version 2," Network Working Group Request for Comments (RFC) 2236, Nov. 1997.

Granath, D., "How to Optimize Switch Design for Next Generation Ethernet Networks," Network Systems Design Line, Jun. 14, 2006. See http://www.eetimes.com/design/industrial-control/4014391/How-to-optimize-switch-design-for-next-generation-Ethernet-networks?pageNumber=0&Ecosystem=microwave-rf-design.

International Preliminary Report on Patentability dated Nov. 2, 2010. (International Application No. PCT/US2009/041937, filed Apr. 28, 2009).

Katz, D., "IP Router Alert Option," Network Working Group Request for Comments (RFC) 2113, Feb. 1997.

Knuth, D., "The Art of Computer Programming vol. 1: Fundamental Algorithms," 2nd Edition, Reading, Massachusetts: Addison-Wesley, 1997, pp. 435-455, ISBN 0-201-89683-4.

McKusick, M. K., et al., "Soft Updates: A Technique to Eliminate Most Synchronous Writes in the Fast Filesystem," Usenix 99 Proceedings, 1999. See http://www.usenix.org/publications/library/proceedings/usenix99/mckusick.html.

"Multicast Deployment Made Easy," Cisco Systems, Inc., 1999. See http://www.cisco.com/warp/public/cc/techno/tity/ipmu/tech/ipcas_dg.pdf.

PCT International Search Report dated Nov. 24, 2009. (International Application No. PCT/US2009/041937, filed Apr. 28, 2009).

PCT Written Opinion of the International Search Authority dated Nov. 24, 2009. (International Application No. PCT/US2009/041937, filed Apr. 28, 2009).

Quinn, M. J., "Parallel Programming in C with MPI and OpenMP," McGraw-Hill Professional, 2003.

Quinn, B., et al., "IP Multicast Applications: Challenges and Solutions," Network Working Group Request for Comments (RFC) 3170, Sep. 2001.

Reynolds, J. et al., "Assigned Numbers," Network Working Group Request for Comments (RFC) 1700, Oct. 1994.

"Standard for Information Technology—Portable Operating System Interface (POSIX® )," ISO/IEC 9945, 2004, IEEE, New York, NY, USA.

* cited by examiner

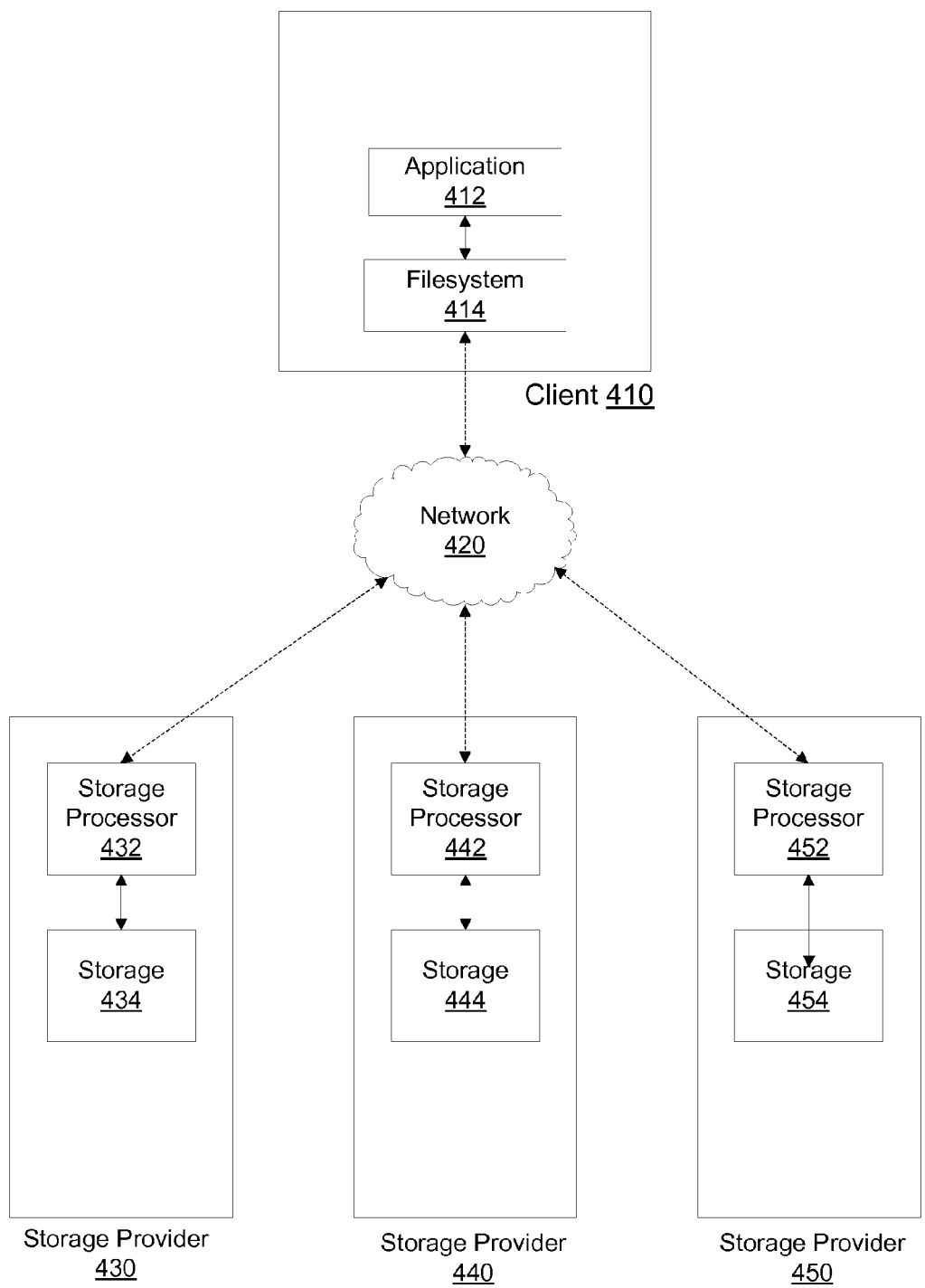

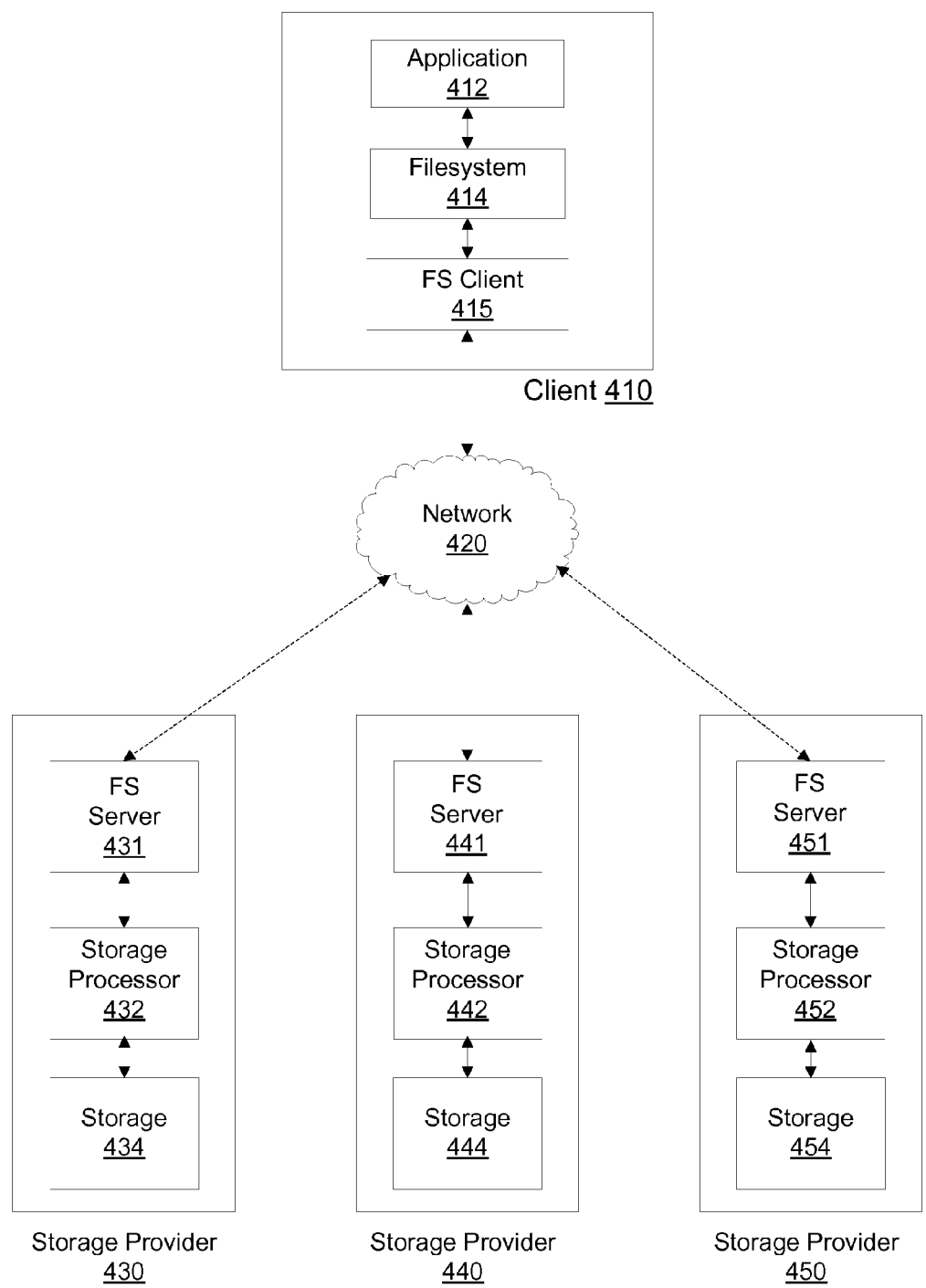

| Phase I Hash Table | | Phase II Hash Table | | Phase III Hash Table | |
|---|---|---|---|---|---|
| 0 | Server A | 0 | Server A | 0 | Server A |
| 1 | Server B | 1 | Server B | 1 | Server B |
| 2 | Server C | 2 | Server C | 2 | Server C |
| 3 | Server A | 3 | Server A | 3 | Server A |
| | | 4 | Server A | 4 | Server D |
| | | 5 | Server B | 5 | Server B |
| | | 6 | Server C | 6 | Server C |
| | | 7 | Server A | 7 | Server E |

FIG. 23

Merge

Peer set join

PEER-TO-PEER REDUNDANT FILE SERVER SYSTEM AND METHODS

CROSS-REFERENCE TO RELATED APPLICATIONS

This application is a divisional of U.S. patent application Ser. No. 12/431,345, filed on Apr. 28, 2009 which claims priority benefit from U.S. Provisional Patent Application No. 61/048,781 entitled PEER-TO-PEER REDUNDANT FILE SERVER SYSTEM AND METHODS filed Apr. 29, 2008 in the name of Francesco Lacapra and also claims priority from U.S. Provisional Patent Application No. 61/111,958 entitled PEER-TO-PEER REDUNDANT FILE SERVER SYSTEM AND METHODS filed Nov. 6, 2008 in the names of Peter W. Steele and I Chung Joseph Lin. Each of the above referenced applications are hereby incorporated herein by reference in their entirety.

TECHNICAL FIELD

The present invention relates to large-scale computer file storage, and more particularly to storage of large numbers of computer files using peer-to-peer techniques that provide scalable, reliable, and efficient disk operations on those files.

BACKGROUND ART

Internet services, such as email, web browsing, gaming, file transfer, and so on, are generally provided using a client-server model of communication. According to the client-server model, a server computer provides Internet services to other computers, called clients. Familiar examples of servers include mail servers and web servers. A server communicates with the client computer to send data and perform actions at the client's request. A computer may be both a client and a server. For example, a web server may contact another computer to synchronize its clock. In this case, the computer providing the clock data is a time server, and the requesting computer is both a time client and a web server.

Conventionally, a service provider, such as a web site, is responsible for creating and making available content for people to consume. Web sites typically following this model include, for example: news sites like CNN.com or BBC.co.uk; sites offering retail sales like Amazon.com or BestBuy.com; search engines with indexed search data like Google.com or MSN.com; and so on. However, a usage model is emerging whereby the users of a service, rather than the service provider, produce content for others to consume. In this "Web 2.0" model, a service provider operates a content creation server, and invites users to create or upload content to be hosted there. Examples of this model include blog providers such as Blogger.com; news aggregators like Digg.com and Reddit.com; and video sharing sites such as YouTube.com. Some websites are a hybrid between the two, in that the website management provides subject matter for users to comment on. An example of a hybrid site is technology news discussion site Slashdot.org, where staff selects news stories from other sites for comment. Traditional websites that originate content seem to be migrating towards becoming such hybrids. News site MSNBC.com may allow readers to comment on posted news stories, for example.

The infrastructure behind the Internet is growing to adapt to these changes from the traditional client-server model. A traditional service provider may be a business, and as such have a limited staff that can create and publish only a relatively small amount of content in any given timeframe. With user-generated content, however, the amount of data that can be created over the same timeframe increases by several orders of magnitude. Thus, a server infrastructure may suffer from problems of scalability, as the volume of data that must be processed and stored grows exponentially. Simply buying larger data storage devices can be prohibitively expensive, as technological limitations typically cause the cost-to-capacity ratio of storage devices to increase as capacity increases. Service providers may instead look for more cost-effective ways to store their data, including purchasing larger numbers of devices with smaller storage capacity. Clusters of such smaller devices are known in the art. For example, techniques have been developed to control redundant arrays of inexpensive disks (RAID). Furthermore, service providers may require a storage solution that integrates tightly with their existing computer infrastructure, rather than a system purchased off-the-shelf. Service providers may also need the ability to deal with data storage interruptions. RAID systems may provide these benefits; however, service providers may require that a storage system be cost-effective to support and maintain. RAID systems tend to be expensive, complex, and require considerable expertise and patience to manage.

Storage systems arrange their data in a filesystem. A filesystem is a system for storing and organizing computer files in a storage system to make it easy to find and access the files. A file, in turn, is a collection of data. FIG. 1 depicts a filesystem directory tree as known in the prior art, for example, as in the UNIX® model (Unix). Files within a filesystem are organized into directories. As with almost everything else in Unix, a directory is a type of file; in this case, one that contains information about other files. As a directory may refer to both (data) files and other directories, directories may nest one within the other. As a result, a filesystem has a tree-like structure, where each directory acts as a branch. Continuing the analogy, a regular data file is sometimes known as a leaf. Like a tree, each filesystem has a root—a root directory 110. The root directory 110 depicted in FIG. 1 contains two directories 120 and 122 (branches), and a file 124 (a leaf). Directory 120 has two files 130 and 132, while directory 122 has three files and a subdirectory 140.

All files in a filesystem may be accessed by specifying a path from the root directory 110 to the file. For example, the location in the filesystem of file 150 is uniquely determined by the path from root directory 110 to directory 122 to directory 140 to file 150. A path is ordinarily represented by a concatenation of the names of the intermediate files, separated by a special character. This written description follows the Unix convention of a forward-slash/as a path separator, although alternate operating systems such as Microsoft® Windows® may use a different path separator. The root directory 110 has the special name /. Thus, if the directories are named as they are labeled in FIG. 1, file 150 has the path /122/140/150. (The Windows equivalent is C:\122\140\150, where C:\ is the name of the root directory.)

FIG. 2 is a block diagram of various operations that may be performed on files located within a filesystem directory tree. There are four major types of operations performed on files: file creation, reading data, updating data, and file deletion. Together these are known as CRUD operations, and provide the core functionality required of any storage system. Operating system architects support these main operations with additional operations. For example, it may be inconvenient for a software developer to continually refer to the full path of a file for each file operation. Thus, an operating system may provide the ability to open a file (that is, to initialize certain data pertaining to the file, including the file path) before performing any of the four major operations. Similarly, an operating system may provide the ability to close the file, to free up system resources when access is no longer required. All of these CRUD and support operations define the capabilities of the filesystem. POSIX®, which is the Portable Operating System Interface, an industry standard (IEEE 1003; ISO/IEC 9945), defines these operations as well.

Different filesystem designers may wish to implement different filesystem capabilities. For example, some filesystems support very large files. Some filesystems support a log of file operations, which can be "replayed" to ensure data consistency in case of a system failure. Some filesystems store data to a network, rather than a hard drive in the local computer. Examples of filesystems with different capabilities include the Windows NT® filesystem NTFS, the Common Internet File System CIFS, the Unix File System UFS2, Sun Microsystems® ZFS and Network File System NFS, Linux filesystems EXT3 and ReiserFS, and many others. Each of these filesystems implements the various filesystem CRUD and support operations. Thus, an NTFS filesystem 210 implements an open function 212 for opening a file, a close function 214 for closing an open file, are ad function 216 for reading data from an open file, a write function 218 for writing data to an open file, and others. Similarly, a CIFS filesystem 230 implements an open function 232, a close function 234, a read function 236, and a write function 238. However, these filesystems differ in that NTFS filesystem 210 contains operations that access a local hard disk drive 220, while CIFS filesystem 230 contains operations that access a network 240, such as a local area network (LAN). In a CIFS filesystem 230, network 240 is connected to a file server 250 which may have a hard disk drive 260 that actually stores the file data. CIFS filesystem 230 creates network messages that contain instructions, such as "read one kilobyte of data from file F", and sends them to file server 250. File server 250 receives the network messages, and translates them into requests on its own filesystem, which may access hard disk drive 260. Once the requests have completed, file server 250 creates a response network message and sends it back to CIFS filesystem 230 using network 240. However, a software application running on a computer supporting CIFS may simply use re ad function 236 without concerning itself with the details of the underlying network communication. Filesystems other than NTFS and CIFS similarly differ in their implementations, but all POSIX-compliant filesystems provide at least the same minimum filesystem CRUD and support operations.

A computer may support several different filesystems simultaneously. However, this capability raises a problem. Users require a unified method to address files, regardless of the filesystem in which they are stored. The exemplary method to address files is to use a file path, as described above. However, there must be a way to distinguish between the two different root directories of the two filesystems—they cannot both be named /. A common solution to this problem is to attach one filesystem tree to the other, in a process known as mounting. The reverse process of detaching two filesystem trees is known as unmounting, or dismounting.

FIG. 3 shows the relationship between two filesystem directory trees involved in a filesystem mount operation. In a mount operation, one of the filesystems acts as the root of the tree, as before, and is called the root filesystem. Typically, the root filesystem will be one that accesses a local hard disk drive. In the example of FIG. 3, the root filesystem 310 is an NTFS filesystem 210, with associated NTFS filesystem operations that access local hard disk drive 382. The other filesystem is known as the mounted filesystem. Here, the mounted filesystem 340 is a CIFS filesystem 230, with associated CIFS filesystem operations.

As before, root filesystem 310 has several files in it: directory A 330, directory B 332, directory C 334, and so on to directory Z 336. These directories have subdirectories and contain files, as shown. One of these directories, say 336, is chosen by the filesystem user as a point of attachment (also known as a mount point). A user then mounts filesystem 340 onto this directory using an operating system command, such as the Unix mount command. Before mounting, directory path /Z refers to directory 336. After mounting, mounted directory 350 replaces directory 336 in the filesystem tree, so directory path /Z now refers to directory 350, not directory 336. Any files contained in directory 336, such as file 338, are now inaccessible, as there is no way to address them with a path. For this reason, mount points are usually chosen to be empty directories, and may be specially created for that purpose. A typical Unix example is the directory /mnt. A filesystem may simultaneously mount several filesystems. Thus, /mnt may be empty, or it may contain several empty subdirectories for use as mount points if multiple filesystems are to be mounted therein.

As an example, before the filesystem 340 is mounted, directory Z 336 is empty. After mounting, the directory /Z now contains two subdirectories, /Z/D1 and /Z/D2. Path /Z/D1 represents a path containing the root directory 320, the mount point /Z (which refers to the root directory 350 of the second filesystem), and the directory 360. As another example, files 370 and 372 are available after mounting using paths /Z/D2/F1 and /Z/D2/F2 respectively (passing through directory D2 362). When a user is finished, the umount command is available to detach the two filesystems. Once the second filesystem is unmounted, files such as file 338 are accessible to the operating system again.

Which file operations apply to a given file depends on which filesystem the file is located in. This is determined, in turn, by the path of the file. For example, file 331 has path /A/F2, which is located in an NTFS filesystem. Thus, NTFS operations are used on the file. These operations access a person's local hard disk drive 382, according to the design of NTFS. However, file 372 has path /Z/D2/F2, which crosses the mount point /Z. Thus, CIFS file operations are used on the file. These operations send a CIFS message through LAN 392 to another computer 394. Computer 394 supports CIFS, and contains the root directory 350 of filesystem 340. Computer 394 receives the request, which it then applies to filesystem 340. The process then begins again on computer 394. The path of the file on computer 394 is /D2/F2, which may be seen from looking now only at filesystem 340. Computer 394 determines the proper file operation to execute based on this path, itself looking for mount points. Computer 394 may pass along the operation to its local hard disk drive 396, or even to another device using another filesystem type if /D2 is a mount point in filesystem 340. Thus, the operating system of computer 394 provides a further level of abstraction.

Filesystem mounting can be used to increase the amount of file storage space available to a web server. Thus, mounting may be used to alleviate a service provider's needs in this respect. There are generally three paradigms for expanding storage space: adding additional local hard drives, mounting a network-attached storage (NAS), and mounting a storage area network (SAN). A NAS is one or more hardware devices used solely for storage (and not for any other applications), accessible over a network, which may be mounted on a computer using a standard network filesystem such as CIFS or NFS. Under a NAS, a computer will recognize the remote nature of the file, and convert file operations into formatted network messages. A SAN is similar, except that the remote devices are mounted using a proprietary filesystem, such that the core operating system is unaware that the file data are stored remotely.

The first paradigm, adding additional local hard drives, does not scale very well. Modern computers only have a finite number of connections to which to attach additional devices. Thus, this paradigm is not generally used for very large business operations.

The second paradigm requires mounting a NAS. A NAS scales well hardware-wise, as any number of devices may form the NAS, and they may be added easily to an existing setup. (Several versions of Microsoft Windows limit the number of mounted filesystems. Unix systems generally do not have this limitation.) A NAS is also generally less expensive than a SAN, byte-for-byte. However, because CIFS and NFS access a remote computer for each file operation, they have performance penalties. The process of traversing a file path, for example, requires locating a directory, reading its contents, locating the next directory, reading its contents, and so on until the final file is located. In NFS, each of these operations is a network access. On large networks nearing bandwidth saturation, NFS request/response pairs may be delayed enough to cause user frustration. In addition, NFS does not react well to failure conditions. For example, if a server hosting an NFS filesystem becomes unresponsive for any reason, a client that has mounted the filesystem may wait for a considerable period of time to complete an NFS transaction. In some NFS implementations, this delay may spread to other parts of the operating system, causing the client computer to also become unresponsive. As a result, NFS network administrators may be very particular about the order in which computers are restarted or failure conditions addressed.

The third paradigm requires mounting a SAN. A SAN is a proprietary product that can take several different storage devices and pool them, so that a computer sees them as a single, large, local storage unit. Thus, a SAN does not have to rely on off-the-shelf protocols such as CIFS or NFS. For this reason, SAN providers may offer better support for their products than NAS providers, including services to better integrate their product into an existing network infrastructure. A SAN is generally more expensive than a NAS. Each SAN has its own method for dealing with data storage interruptions, and different vendors offer different guarantees and service-level agreements. Of course, using a SAN generally implies the presence of an "intermediary" in the form of a device that adapts the "block" view of the world the SAN provides to the application view (e.g., in the form of software running on one or more clients of the SAN that may coordinate access among clients and implement abstractions such as files, or others, for example mail repositories, DBMSes and so on). Thus a direct comparison between a SAN and NAS devices can be misleading as the two have inherently different capabilities.

SUMMARY OF THE INVENTION

In accordance with one aspect of the invention there is provided a file storage system for handling a standard file system request including a path name. The system includes a plurality of storage providers and a client, in communication with the storage providers, that accepts the file system request and generates, for fulfillment, a corresponding reformatted request to a selected one of the storage providers, the selected one of the storage providers being initially selected by the client on the basis of a hashing algorithm applied to at least a portion of the path name, so that the client serves as an interface between the standard file system request and the storage providers.

In various alternative embodiments, each storage provider may be a virtual server including a plurality of peer-to-peer computer processes forming a set of peer nodes. A specified request directed to a specified virtual server may be delivered to all peer nodes of the virtual server but the set may be configured so that only a single one of the peer nodes responds to the specified request. Each one of the peer nodes may be implemented as a distinct physical storage medium coupled to a distinct microprocessor. The system may include a plurality of physical storage servers, each physical storage server including a plurality of physical storage media and a microprocessor, wherein each virtual server is configured with a distinct storage server being associated with each peer node of the set.

In accordance with another aspect of the invention there is provided a method for locating a given file in a file storage system having one or more storage providers, where the given file is associated with a file pathname including a sequence of directory names and a file name. The method involves (a) applying, in a computer process, a hashing algorithm to a chosen one of the directory names to obtain an index number, wherein the hashing algorithm has the property that different index numbers may be obtained for different directory names; (b) identifying a selected storage provider associated with the obtained index number; and (c) contacting the selected storage provider number in order to obtain information maintained by the selected storage provider regarding the location of the given file within the file storage system, whereby the given file may be located whether the given file is stored by the selected storage provider and/or by one or more other storage providers.

In various alternative embodiments, each storage provider may be a virtual server including a plurality of peer-to-peer computer processes forming a set of peer nodes. The chosen directory name may be a parent directory for the file name. The hashing algorithm may obtain index numbers from zero up to, but not including, a number that is an integer power of a chosen base integer, such that the number is greater than or equal to the number of file servers in the file storage system, and the number divided by the base integer is less than the number of file servers in the file storage system. The chosen base integer may be two. The method may further involve changing the location of the given file within the file storage system and updating the information maintained by the selected storage provider to reflect the changed location. Multiple instantiations of the given file may be stored in the file storage system, in which case the information maintained by the selected storage provider may identify the locations of the instantiations. Identifying the selected storage provider associated with the obtained index number may involve using the obtained index number to index a table of storage providers.

In accordance with another aspect of the invention there is provided a method of providing access by a client to a file in a storage system, where the file associated with a file pathname. The method involves (a) storing an instantiation of the file in each of a plurality of storage providers; (b) storing metadata for the file in a target storage provider selected based at least in part on the pathname using a predetermined mapping scheme, the metadata including at least a list of the storage providers; (c) sending a request by the client to the target storage provider; (d) providing the list of the storage providers by the target storage provider to the client in response to the request; (e) selecting one of the listed storage providers by the client using a predetermined selection scheme; and (f) communicating with the selected storage provider by the client in order to access the file instantiation stored in the selected storage provider.

In various alternative embodiments, the predetermined mapping scheme may include a hash algorithm applied to a portion of the pathname. The predetermined selection scheme may include random selection from among the listed storage providers. The predetermined selection scheme may include a user-configurable policy. The target storage provider may be one of the plurality of storage providers in which an instantiation of the file is stored or alternatively may be a storage provider in which an instantiation of the file is not stored. The metadata may further include the pathname, a portion of the pathname, and/or a file version number. An instantiation of the file may be stored in each of a plurality of storage providers for redundancy and/or for distributing processing load across the plurality of storage providers.

In accordance with another aspect of the invention there is provided a storage system including a client and a storage provider in communication the client over a communication network, the storage provider including a plurality of storage nodes, each storage node managed by a different storage server, wherein the plurality of storage nodes are associated with a multicast address and requests are transmitted to the storage provider using the multicast address.

In accordance with another aspect of the invention there is provided a storage system including a client and a storage provider in communication the client over a communication network, the storage provider including a plurality of storage nodes and a distributed queuing mechanism allowing tasks to be queued for processing by one or more of the storage nodes.

In various alternative embodiment, each storage node may be managed by a different storage server. The storage nodes may be associated with a multicast address and tasks are queued using the multicast address. One of the storage nodes may be designated for processing queued tasks at any given time. The storage nodes may be assigned different roles for managing the processing of queued tasks, the roles including at least a primary that manages the processing of queued tasks by default and a secondary that manages the processing of queued tasks if the primary is unable to do so. The roles may be assigned using color designations.

In accordance with another aspect of the invention there is provided a storage system including a client and a storage provider in communication the client over a communication network, the storage provider including a plurality of storage nodes, wherein one of the storage nodes is designated to act as a proxy for the plurality of nodes for managing storage of data among the plurality of storage nodes and interacting with the client on behalf of the other storage nodes.

In various alternative embodiments, each storage node may be managed by a different storage server. The storage nodes may be associated with a multicast address, in which case the client may communicate with the storage system using the multicast address. The storage nodes may be assigned different roles, the roles including at least a primary that acts as the proxy and a secondary that acts as the proxy if the primary is unable to do so. The roles may be assigned using color designations.

In accordance with another aspect of the invention there is provided a storage system including a plurality of storage providers for distributed storage of files associated with a filesystem, wherein each storage provider maintains statistics regarding the files that it stores, and wherein the statistics are collected by a designated storage provider for processing.

In various alternative embodiments, the statistics may include file access frequency.

In accordance with another aspect of the invention there is provided a method of distributing processing load across a plurality of storage providers. The method involves (a) determining that multiple clients desire access to a file stored by a given storage provider; (b) replicating the file in at least one additional storage provider such each of storage providers, including the given storage provider, stores an instantiation of the file; and (c) allowing clients to access any of the instantiations of the file so as to distribute processing load across the storage providers.

In various alternative embodiments, allowing clients to access any of the instantiations of the file may involve providing a list of the storage providers to each of the clients and allowing each client to select one of the storage providers from which to access the file. Allowing clients to access any of the instantiations of the file may involve specifying a different one of the storage providers for each of the clients.

In accordance with another aspect of the invention there is provided a method for maintaining peer set nodes of a computer file storage system. The method involves identifying waiting nodes associated with a current peer set based on a node-selection algorithm, the node-selection algorithm producing, at a root node, in a first computer process, an updated list of the current peer set nodes, and in a second computer process, conducting a dialog among the identified nodes, the dialog establishing a hierarchy and role distribution among the nodes.

In various alternative embodiments, identifying the waiting nodes associated with the current peer set of nodes may involve receiving, by a waiting node, from the root node, a message containing descriptors of waiting nodes associated with the current peer set. Conducting the dialog may involve sending invitations, by each of node-inviters, to be received by nodes-invitees, each invitation triggering a node-invitee to respond by sending an acknowledgment to a corresponding node-inviter, and receiving at least one acknowledgment by at least one node-inviter, wherein a node-inviter and a node-invitee are waiting nodes identified as being associated with the current peer set. The dialog indicator may be positive if each of node-inviters received acknowledgments from each of node-invitees and otherwise may be negative. The method may further involve, in a third computer process, allocating replacement nodes for the current peer set if the dialog success indicator is negative. Conducting the dialog may further involve passing messages received from the root node by each of node-inviters to each of node-invitees and/or passing a message by at least one of node-inviters to be received by the node-invitees, the message containing descriptors of waiting nodes associated with the current set and received by the at least one of node-inviters from the root node.

BRIEF DESCRIPTION OF THE DRAWINGS

The foregoing features of the invention will be more readily understood by reference to the following detailed description, taken with reference to the accompanying drawings, in which like reference characters refer to like parts throughout the several figures, and:

FIG. 4A is a schematic block diagram showing relevant components of an exemplary client/server system having a client and multiple storage providers in communication over a network such as a LAN or WAN (e.g. the Internet) as known in the art;

FIG. 4B is a schematic block diagram showing relevant components of a client/server system in accordance with an exemplary embodiment of the present invention;

FIG. 23 is a schematic diagram demonstrating dynamic expansion of a hash table in accordance with an exemplary embodiment of the present invention;

DETAILED DESCRIPTION OF SPECIFIC EMBODIMENTS

Definitions

Figure 1:
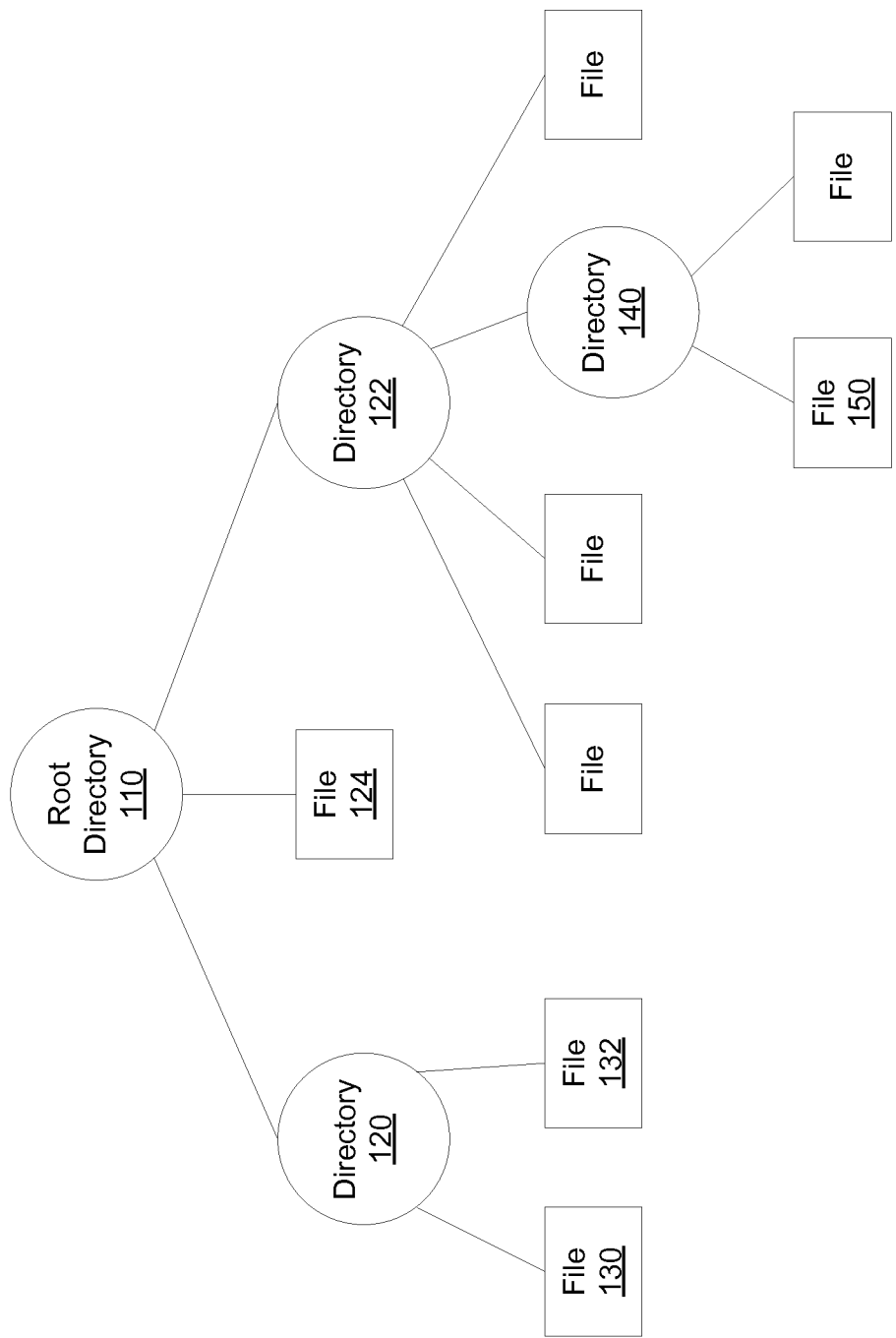
FIG. 1 depicts a filesystem directory tree as known in the prior art.
Figure 2:
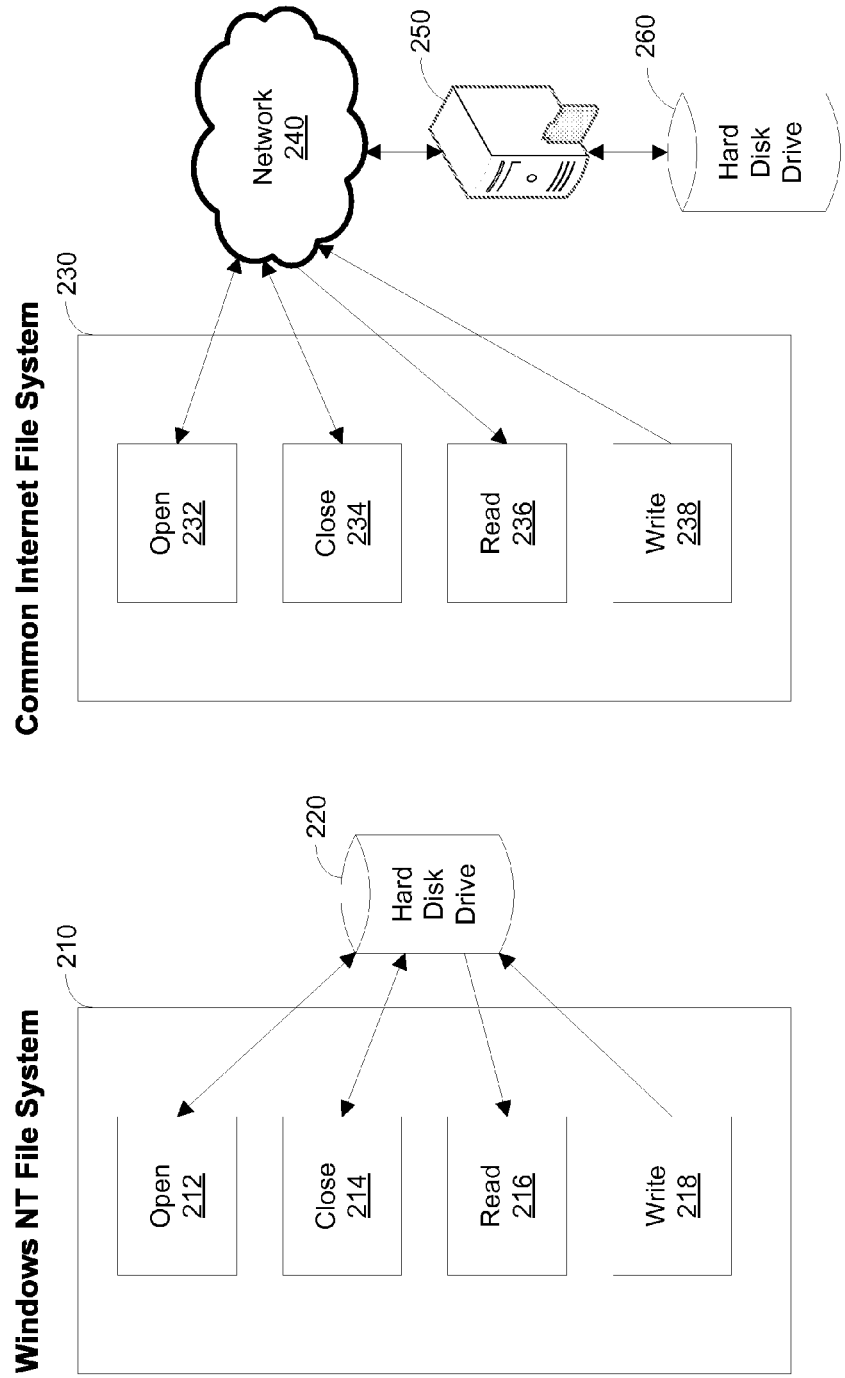
FIG. 2 is a block diagram of various operations that may be performed on files located within a filesystem directory tree.
Figure 3:
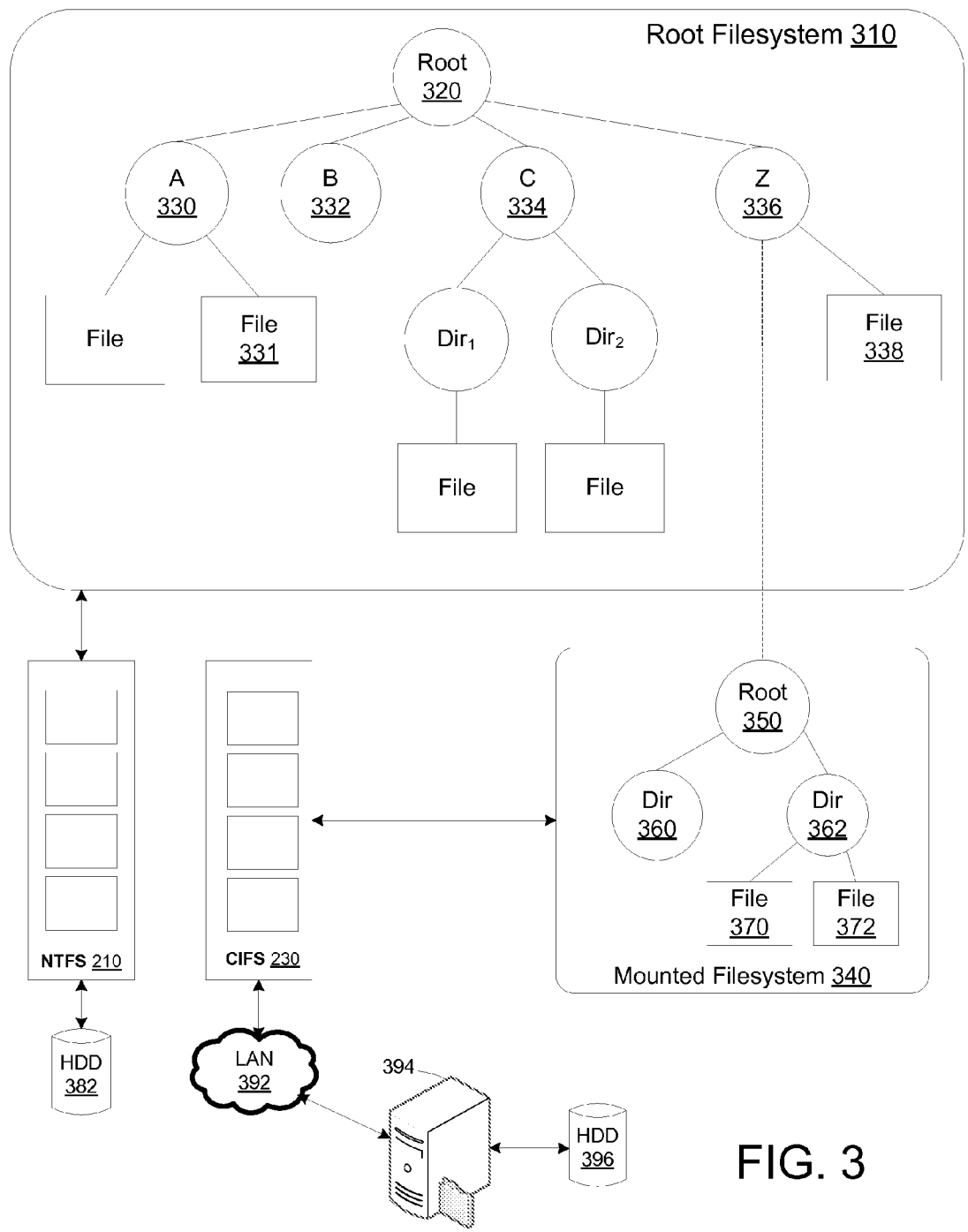
FIG. 3 shows the relationship between two filesystem directory trees involved in a filesystem mount operation.

As used in this description and the accompanying claims, the following terms shall have the meanings indicated, unless the context otherwise requires:

A file is a collection of data. According to the UNIX® model (Unix), a file may also be an interface to access a computer resource, such as a network card, hard disk drive, or computer memory. These are only some examples—a list of computer resources that may accessed as files may be found in the Portable Operating System Interface (POSIX®), an industry standard (IEEE 1003; ISO/IEC 9945) that defines the core of the Unix specification and is hereby included by reference.

A filesystem is a system for storing and organizing computer files in a storage system. A filesystem organizes files into lists called directories. Directories are themselves files, as they hold a collection of data pertaining to other files. Thus, a directory may be listed in another directory. This type of inclusion may be repeated to create a hierarchical directory structure. Filesystems have a root directory at the base of the hierarchy. A file's parent directory is the directory that contains the file (the root directory may be considered its own parent). A file or directory may be considered a child of its parent directory, and the other children of a file's parent may be considered the file's siblings. The set of directories between a file and the root directory in a hierarchy (inclusive of the root directory) may be considered the file's ancestors. The set of files in a hierarchy for which a given directory is an ancestor may be considered the given directory's descendants.

A file path (briefly, "path") is a textual representation of the location, within a filesystem hierarchy, of a target file or directory. An absolute path is formed by concatenating the names of all directories lying between the root directory and the target file or directory, inclusive. A relative path is formed between a source directory and a target file or directory by concatenating two paths: a first path from the source directory to a common ancestor directory through parent directories, and a second path from the common ancestor directory through its children to the target file or directory. Intermediate directory names are separated by a path separator, which may be represented by a forward slash "/". The root directory path may also be represented by a forward slash "/". A file's relative parent directory path may be represented by two periods ". .".

Mounting is the process of attaching the directory trees of two filesystems, a base filesystem and a mounted filesystem. First, a target directory, or mount point, is chosen in the base filesystem. Next, a command is issued to the operating system to associate the mount point with the root directory of the mounted filesystem. After mounting, the file path of the mount point represents the root directory in the mounted filesystem, and requests for this path will return data associated with the mounted filesystem. Unmounting is the process of detaching a mounted filesystem.

Storage metadata is information pertaining to the storage of a file. For example, storage metadata may include the path of a file within a filesystem and a list of servers on which copies of file data may be found.

A peer set is a set of peering services, or nodes, running on at least two storage servers, cooperating to control access and modifications to a file or its storage metadata.

A network switch (briefly, "switch") is a computer networking device that connects network segments in a local area network (LAN), and is able to direct network traffic to a specific segment based on a hardware address known by the switch to attach to that segment. Hardware addresses are assigned to network devices in the data link layer (layer 2) of the ISO Open Systems Interconnection (OSI) networking model and the TCP/IP networking model.

A storage provider is hardware, software, or a combination of hardware and software for providing storage. A storage provider may be embodied as a single server, such as that depicted in FIG. 5, or it may be any other hardware or software for providing storage, including network attached storage or a storage area network.

I. General Discussion

Hardware and Network

Figure 6:
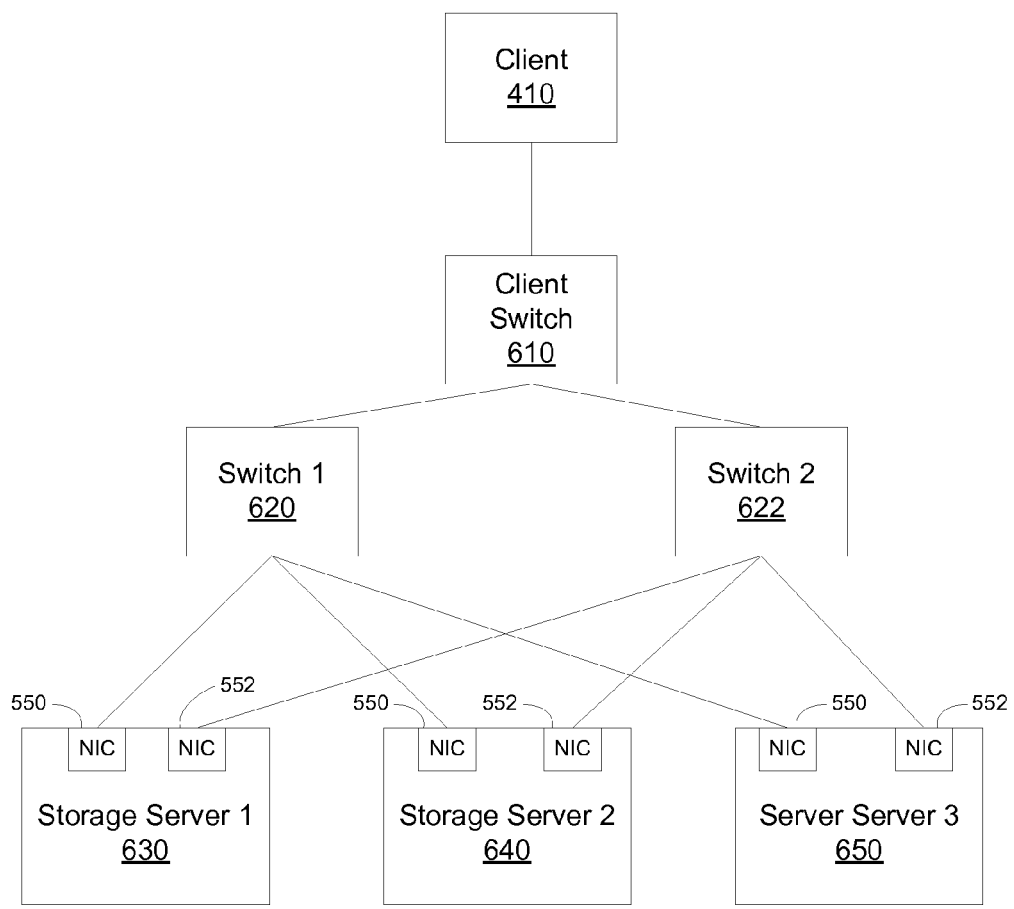
FIG. 6 shows a possible physical layout of the storage network of FIG. 4B.

FIG. 4A is a schematic block diagram showing relevant components of an exemplary client/server system as known in the art. Among other things, the client/server system includes a storage client 410 in communication with a number of storage providers 430, 440, 450 over a communication network 420 such as, for example, a LAN or a WAN (e.g., the Internet). Storage client 410 is a computer that utilizes data storage services provided by the storage providers 430, 440, 450. While the storage client 410 is a client with respect to the storage providers 430, 440, 450, it should be noted that the storage client 410 may be a server for other purposes; for example, it may be a web server. One possible physical embodiment of storage network 420 is depicted in FIG. 6 and described below.

The storage client 410 includes an application 412 and a filesystem 414. The client application 412 running on storage client 410 generates file operation requests, for example, to create a new file, write to an existing file, or read from an existing file. Filesystem 414 manages file storage and interacts with both the application 412 (e.g., via an application programming interface, or API) and the servers (e.g., via a network file protocol such as NFS or CIFS). On the application side, the filesystem 414 receives file operation requests from the application 412, processes the requests, and generates replies to the application 412. On the server side, the filesystem 414 transmits file operation requests to the storage providers 430, 440, and 450, and receives responses generated by the storage providers. The application 412 and the filesystem 414 are typically implemented in software that is stored in a memory and executed on a microprocessor, although it should be noted that such components may be implemented in hardware and/or software, and the present invention is not limited to the way in which the application 412 and filesystem 414 are implemented.

Each storage provider 430, 440, 450 includes a storage processor 432, 442, 452 respectively as well as storage 434, 444, 454 respectively. The storage processors 432, 442, 452 process storage operation requests received from the storage client 410 and send responses back to the storage client 410. The storage processors 432, 442, 452 interact respectively with the storage 434, 444, 454 to store and retrieve file-related data. In typical embodiments, each storage 434, 444, 454 includes one or more hard disk drives (e.g., four hard disk drives), although other types of storage may be used in addition to, or in lieu of, hard disk drives (e.g., solid-state or optical storage). Each storage processor 432, 442, 452 is typically implemented in software that is stored in a memory and executed on a microprocessor within its respective storage system 430, 440, 450, although it should be noted that such components may be implemented in hardware and/or software, and the present invention is not limited to the way in which the storage processors are implemented.

FIG. 4B is a schematic block diagram showing relevant components of a client/server system in accordance with an exemplary embodiment of the present invention. In this exemplary embodiment, each storage client, including the storage client 410, includes an additional component 415 (referred to hereinafter as the "FS client"), which is logically between filesystem 414 and network 420. Similarly, in this exemplary embodiment, each storage provider, including the storage providers 430, 440, 450, includes an additional component 431, 441, 451 (referred to hereinafter as the "FS server"), respectively, that is logically positioned between its respective storage processor 432, 442, 452 and the network 420. The FS client 415 and the FS servers 431, 441, 451 interact to provide an additional layer of file storage functionality (discussed in more detail below) over that provided by the filesystem 414 and the storage processors 432, 442, 452, utilizing services provided by the storage processors to manage the storage of file-related data. In essence, the FS client 415 receives file operation requests generated by the filesystem 414, which in the prior art system would have been forwarded to one of the storage processors, and instead interacts with one or more of the FS server components to satisfy the file operation requests and provide appropriate responses back to the filesystem 414. Each of the FS server components interfaces with its respective storage processor to store and retrieve data based on its interactions with the FS client. In typical embodiments, the FS client 415 and the FS servers 431, 441, 451 are implemented in software, although it should be noted that these components may be implemented in hardware and/or software, and the present invention is not limited to the way in which these components are implemented.

It should be noted that, in embodiments of the present invention, a client/server system may include multiple clients, each having a FS client component, as well as multiple storage providers, each having a FS server components. It should also be noted that, in various embodiments, a storage provider may be implemented using a single storage server or a group of storage servers (e.g., operating in a cluster) and may be implemented using any of a variety of physical or logical storage constructs. Among other things, this kind of abstraction allows the filesystem 414 to interact with different implementations of storage providers in a heterogeneous storage network. For example, a first storage provider may be a single file server, a second storage provider may be a cluster of two or more file servers, and a third storage provider may be a virtual file server running on one or more servers.

Figure 5:
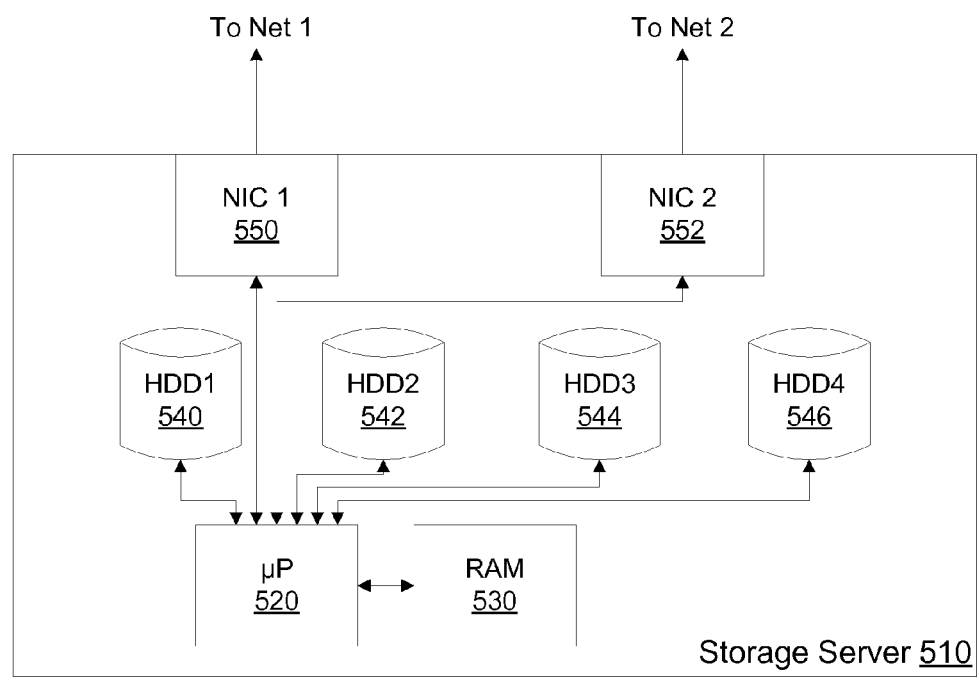
FIG. 5 is a block diagram showing relevant components of a storage server in accordance with exemplary embodiments of the invention.

FIG. 5 is a block diagram showing relevant components of a storage server in accordance with exemplary embodiments of the invention. Among other things, storage server 510 has a microprocessor 520 and memory 530. Microprocessor 520 and memory 530 may cooperate to run a storage processor and an FS server. In addition, storage server 510 contains one or more hard disk drives for storing files. In an exemplary embodiment, storage server 510 contains four such drives 540, 542, 544, and 546; however, it will be understood that any number of drives may be used. Storage server 510 may also contain one or more network interface cards (NICs) for communicating with storage network 420 (not shown here). In the embodiment shown, storage server 510 contains two such NICs 550 and 552 to provide redundancy in case of a hardware or network failure; however, it will be understood that any number of NICs may be used.

FIG. 6 shows a possible physical layout of the storage network 120 of FIG. 4B. Storage servers are represented individually in this figure, not storage providers which may be a storage processing layer added to storage servers. Storage client 410 communicates with storage servers 630, 640, and 650. The storage network consists of three switches 610, 620, and 622. Each storage server in this embodiment has two NICs, 550 and 552. Each NIC is connected to a switch. In FIG. 6 the NICs labeled 550 all connect to switch 620, while the NICs labeled 552 all connect to switch 622. The storage client 410 is directly connected to a switch 610, which in turn is connected to switches 620 and 622. Storage client 410 may communicate with storage server 440, for example, through two different data paths: the first passes through the switch 610, switch 620, and NIC 550 on storage server 440, while the second passes through the switch 610, switch 630, and NIC 552 on storage server 440.

The architecture shown in this embodiment is resistant to network failure and hardware failure. For example, if the communications link between the switch 610 and switch 620 is broken, the storage client 410 may still contact storage server 440 using switch 622. If the communications link between the switch 610 and NIC 550 on storage server 440 is broken, the storage client 410 may still contact storage server 440 using NIC 552. Similarly, if NIC 550 hardware fails, the storage client 410 may still contact a storage server using the other NIC 552. In an alternate embodiment, network 420 may include an additional switch, connected to both switches 620 and 622, while storage client 410 connects to both switches. In this way, a switch may fail and the storage servers may still be contacted. Those skilled in the art will recognize other network arrangements that preserve this type of redundancy, and it is understood that these embodiments are also within the scope of this invention. Advantageously, as the cost of disk drives decreases over time on a dollars-per-byte basis, the system becomes more cost-effective.

System Overview

From the storage client perspective, a client application 412 (for example, a web server) interacts with the storage system to manipulate files. Client filesystem 414 is the point of contact between the client application 412 and the rest of the storage system. Thus, a purpose of client filesystem 414 is to receive filesystem requests from client application 412 and respond with file data or operation results. The inner workings of client filesystem 414 are generally opaque to client application 412. Enforcing such an isolation restriction aids in software design and portability. Client application 412 may communicate with filesystem 414 using a specified interface that the latter implements. In this way, client applications such as 412 may be portable between different implementations of filesystem 414. In some embodiments, the filesystem interface is a set of POSIX application programming interfaces (APIs). Other embodiments may use other APIs defined by the storage client's operating system.

Client filesystem 414 interfaces with the FS client 415, which, in turn, interfaces with the FS servers to store and retrieve information. The FS client and the FS servers use various complementary techniques (discussed below) to determine where and how information is stored. Among other things, the complementary techniques allow the FS client to determine which storage provider (or storage providers) to contact for each storage transaction and also allow the FS servers to manipulate where and how information is stored, including, for example, balancing storage load across multiple storage providers, balancing processing load across multiple storage providers, replicating information in multiple storage providers for redundancy, and replicating information in multiple storage providers for load balancing, to name but a few. The FS servers are essentially free to store file information anywhere among one or more of the storage providers and to move the information around dynamically, but the complementary techniques employed by the FS client and FS servers ensure that the FS client can locate the file information no matter where it is stored.

In exemplary embodiments, the FS client determines a target storage provider to contact for a particular storage transaction based on a pathname provided by the filesystem and a predetermined scheme. For example, the FS client may determine the target storage provider using a predetermined hash function applied to a portion of the pathname. The FS servers use the same scheme to determine where to store relevant file information so that the FS client can locate the file information. The target storage provider may store the file itself and/or may store metadata that identifies one or more other storage providers where the file is stored. Such metadata essentially provides a level of indirection that allows the physical location of the file to be decoupled from the pathname. Since a file may be replicated in multiple storage providers, the metadata may include a list of storage providers from which the FS client can select (e.g., randomly) in order to access the file. Among other things, such a list may allow for load balancing of client accesses to a particular file (e.g., if multiple clients are watching the same movie at the same time, the movie file may be replicated and stored in multiple storage providers, and each client may randomly select one of the storage providers from which to access the movie so that, statistically, the accesses are likely to be distributed among the multiple storage providers).

Thus, in one exemplary embodiment, the FS client decides which provider(s) to contact for a particular storage transaction in a two-step process: first, the FS client may locate a list of storage providers that control the requested data; second, the FS client may determine the subset of those providers that it will contact with a file operation request. In the first step, the FS client may use a hashing algorithm, described below in connection with FIG. 8 and FIG. 9, to locate and retrieve a list of relevant storage providers. The structure of such a list is described in connection with FIG. 10. The second step may use a storage redundancy policy which is configured by a storage system administrator. The FS client may communicate with storage providers using any convenient message data format, as described in connection with FIG. 12.

A storage provider may provide enhanced service availability for requests made by the FS client. In exemplary embodiments, a storage provider is composed of a number of processes that run on various physical servers and cooperate to control a storage area spread out among those servers. These processes, or "nodes," may communicate with each other as a set of peers using a shared network protocol and message format. However, a node need not be aware of the inner workings of any of the other nodes, according to the portability principle. Thus, for example, storage servers having different operating systems may run nodes having operating system specific optimizations, while participating in a single peer set.

Each node may control one or more storage media on a given server. For example, a node may control hard disk drives 540 and 542. Alternatively, a node may control only a portion of one or more hard disk drives, or other persistent storage medium such as Flash RAM, CD, or DVD. A node may communicate with the operating system of its own physical server, in order to process filesystem requests in a manner appropriate to that operating system. For example, a node may use a POSIX API to request that the local operating system perform a filesystem transaction in response to a client request, or it may use another API. A logical layout of storage metadata and file data that a node may implement on its server is discussed in connection with FIG. 13.

A storage provider may also provide enhanced data availability for requests made by the FS client. A storage provider may access only a single physical storage server, such as that depicted in FIG. 5. However, as a storage abstraction, it may be advantageous if a storage provider can access a number of different physical storage servers, across which it may spread its storage area. A storage provider may coordinate filesystem requests across all of the physical storage servers that it monitors, so that the data contained on storage server physical media are kept synchronized. A storage provider may also detect failures in the physical hardware or software of its servers, and effect repairs to improve availability. Such repairs may include, for example, selecting another available server to take the place of a down server. Or, if a storage processor (e.g. processor 432) has failed, a storage provider may issue a network message to the affected server, requesting that the appropriate storage software or hardware be restarted. Other self-healing techniques, and alternate methods of implementing the techniques described herein, that fall within the scope of the invention should be apparent to those skilled in the art. In exemplary embodiments, repairs may be effected using a system-wide queuing mechanism. Such a mechanism allows individual storage providers to queue resource-intensive tasks, such as data replication, for later fulfillment by servers that have spare processing power. This queuing system is discussed below in connection with FIG. 14, and the process of self-healing peer sets is discussed in connection with FIG. 15 through FIG. 17.

Figure 7:
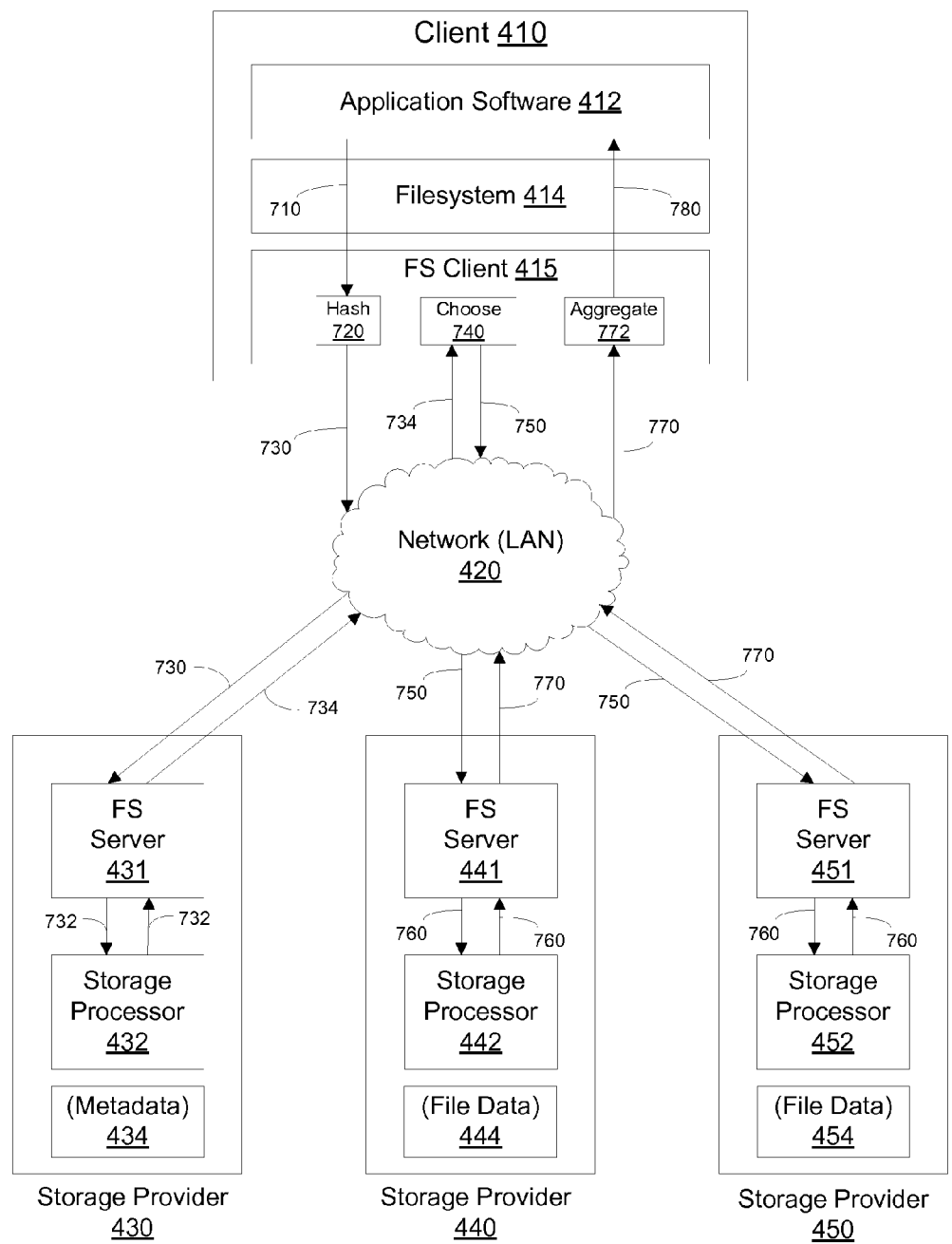
FIG. 7 is a schematic block diagram showing the relevant interaction between logical components that participate in handling a client file operation in accordance with an embodiment.

FIG. 7 is a schematic block diagram showing the relevant interaction between logical components that participate in handling a client file operation in accordance with an embodiment of the invention. Application software running on a storage client or on another computing device generates file operation requests. These file operation requests are received by the filesystem, as in step 710, using an application programming interface (API) such as POSIX. The filesystem processes the request, and returns the results of the operation to the requesting application software using the same API, as in step 780. The intervening steps are discussed below in relation to the intermediate filesystem operations, as they pertain to embodiments of this invention.

File data may be stored in several different storage areas, each of which is controlled by a different storage provider. It thus becomes necessary to track which file data are in which storage areas to ensure data consistency. For this reason, storage metadata may be created and maintained by the file storage system. Storage metadata may include the file path of file data, a list of storage providers controlling the file data, a generation (version) counter to ensure that file data is synchronized in all of the storage areas, and other convenient or necessary information pertaining to file data storage. Advantageously, storage metadata may be stored as files within a filesystem residing on the same physical media as the file data to which it pertains. Thus, storage metadata may also be controlled by a storage provider.

With these preliminary matters in mind, the method of FIG. 7 may be described. The FS client 415 receives a file operation request for a given file, in step 710. In step 720, the FS client 415 determines which storage provider (i.e., which FS server) controls access to storage metadata for the file (referred to herein as the "target" storage provider) by, e.g., calculating a hash of the path (or portion of the path) of the requested file. In step 730, the FS client 415 contacts the FS server in the target storage provider (i.e., storage provider 430 in this example), which in turn interacts with the storage processor 432 in step 732 to obtain storage metadata for the file from storage 434. In step 734, the FS server 431 returns the storage metadata to the FS client 415. In an exemplary embodiment, the storage metadata includes a list of one or more storage providers that control access to the actual file data; the list may include storage provider 430 itself. It should be noted that, using methods described below in connection with FIG. 8, steps 720 and 730 may advantageously involve only a single network access in order to resolve the path, thereby reducing both the latency and the bandwidth of the storage system.

The FS client then chooses, in step 740, one or more of the storage providers to contact in order to access the file data. The choice may be made using any of a variety of criteria (e.g., randomly or according to user-configurable policies), and such criteria may be designed to optimize the operation of the storage servers, the storage client, or both.

Once the choice of storage areas has been made, the FS client may contact 750 the FS server in one or more of the chosen storage providers to begin a filesystem transaction (in this example, the FS client 415 is shown contacting FS server 441 and FS server 451). Specifically, the FS client creates a formatted network message containing the request and sends it to the FS server (in this example, the FS client 415 may send separate messages to the FS servers 441 and 451). In step 760, the FS servers 441 and 451 interact with storage processors 442 and 452, respectively, to access file data from storages 444 and 454, respectively. In step 770, the FS servers 441 and 451 return the file data to the FS client 415. The FS client 415 may collect results from all of the relevant storage providers, and may aggregate 772 them into a result compliant with the client operating system's API (for example, a POSIX-compliant function return value). This result finally may be returned to the filesystem 414 in step 780, completing the process. The steps of this process are now described in detail.

As discussed above, the storage metadata essentially provides a level of indirection that allows files to be dynamically distributed among the storage providers while still allowing the FS client 415 to locate one or more storage providers that have file data. In lieu of, or in addition to, such storage metadata, the target storage provider may store file data. For example, the target storage provider may store the file data for a particular file, in which case the FS server may return the file data rather than storage metadata to the FS client in response to a request from the FS client. Alternatively, the target storage provider may store a portion of file data along with storage metadata and return both to the FS client in response to a request from the FS client. Since the FS servers may dynamically replicate and move file data among the storage providers, file data for a particular file initially might be stored on the target storage provider (in which case the target storage provider might return file data, rather than storage metadata, to the FS client in response to a request from the FS client) and later the file data may be replicated on and/or moved to one or more other storage providers (in which case the target storage provider might then return storage metadata, perhaps along with a portion of file data, to the FS client in response to a request from the FS client).

Hash Function Applied to Directory Names

A storage system embodiment may distribute file paths across the entirety of the available storage, according to a storage pattern. An exemplary embodiment distributes paths across the storage under the assumption that a filesystem cannot predict the paths that applications will select for file operations. This distribution allows the work that must be done by a storage system to be distributed amongst the storage providers. However, if file paths are predictable, then this distribution of workload may not be optimal. Implementations within the scope of this invention may allocate storage to providers differently, to best meet other application requirements.

An embodiment may distribute file paths across the various storage providers using a hash function. Hash functions are known in the art as a tool for evenly sorting an input data set into an output data set, usually of smaller size. Thus, an embodiment may divide the total available storage into a number of storage units of roughly equal size. The embodiment may then create a table of the storage units, and sort the file paths into the table using a hash function. To select a storage area, FS client 415 applies a hash function to part of the path of the file to yield a table index. Since hash functions tend to evenly sort their inputs into their outputs, this process advantageously evenly sorts the set of file names into the set of table indices, and thus evenly into storage units.

However, an exemplary embodiment does not use the entire file path as input to the hash function. Hashing an entire file path gives rise to certain inefficiencies. Files may move within a filesystem, and directories may be renamed. In either of these situations, portions of the file path would change, and the hash value would change correspondingly. As a result, the storage provider for one or more files may change, and the associated data may need to be moved among the storage providers. Renaming or moving a directory, especially one near the root of the filesystem, would cause the hash of all descendant files to change and would trigger significant data transfer unrelated to client data access. In order to address this problem, when associating a file path to a storage provider, embodiments of the invention may hash only a portion of the file path. An exemplary embodiment hashes only the name of the parent directory of the requested file. In this way, if a directory is renamed, the only data that must be moved is that data associated with the directory. Such data may include the storage metadata for the directory itself, and may also include storage metadata for related files, such as the directory's children, which may be stored for efficiency of certain filesystem operations (e.g. listing the contents of the directory). Files with similar paths, such as sibling files, advantageously produce the same hash value and may be stored in the same storage unit.

Consider next the portability principle. FS client 415 contacts storage providers, not storage units, to access data. It is not necessary or desirable for FS client 415 to have knowledge of storage units, which properly should be the concern of the storage providers. For this reason, an entry in the table may contain the name of the storage provider that controls the corresponding storage unit, not the name of the storage unit itself. Each entry in the table should correspond to roughly the same amount of storage, but the amount of storage controlled by a storage provider may be the same or different from the amount controlled by any other storage provider. Thus, the table may be redundant, in that a storage provider may appear in multiple table entries. In one embodiment, each storage provider has a number of entries in the table approximately proportional to the size of the storage it controls. For example, if storage provider A controls half as much storage as storage provider B, then storage provider A has half the number of entries in the table as storage provider B. In this way, each table entry is associated with approximately the same amount of storage as any other table entry, while hiding storage provider implementation details from FS client 415. In other embodiments, storage system administrators may wish to assign more table entries to storage providers with more powerful microprocessors, more available bandwidth, or for other reasons.

Figure 8:
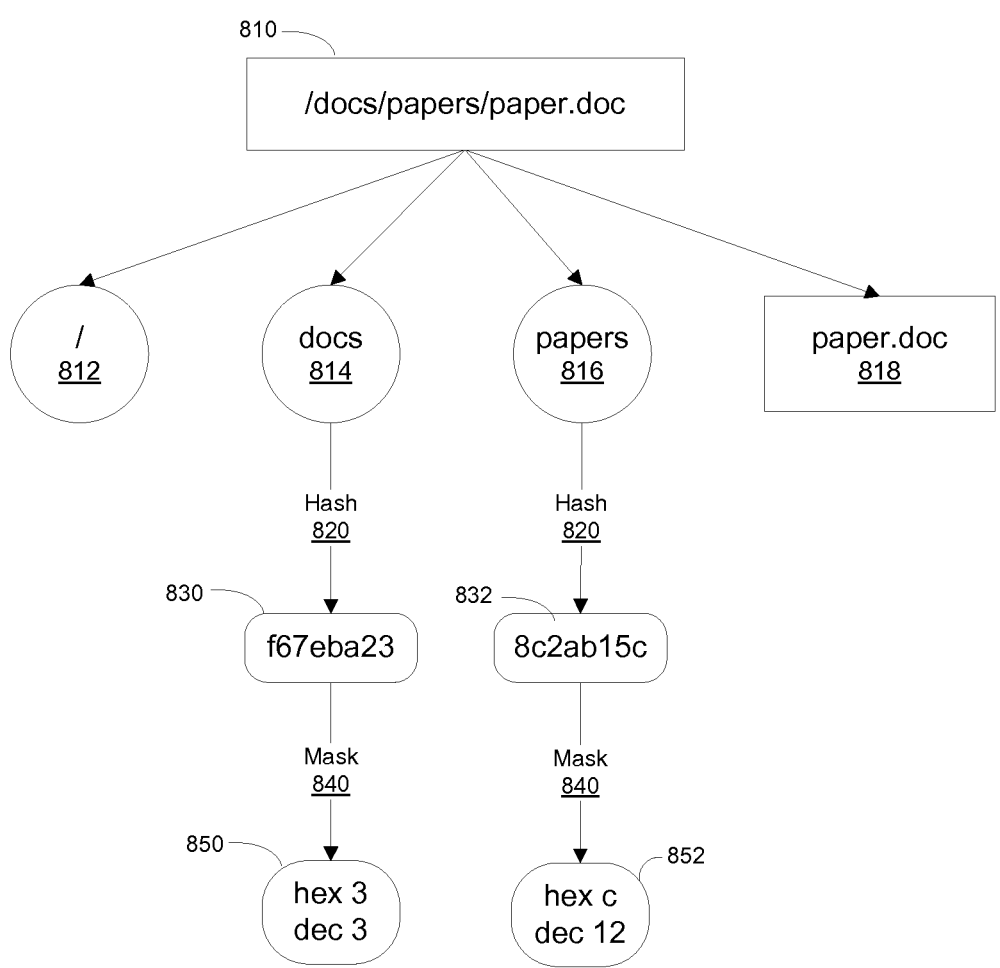
FIG. 8 is a conceptual representation of the process of converting a file path into a table index for determining a storage provider in an embodiment.

FIG. 8 is a conceptual representation of the process of converting a file path into a table index for determining a storage provider in an embodiment. An embodiment begins with a file path 810, obtained during step 710. The path in FIG. 8 is /docs/papers/paper.doc. There are three directories in this path: the root directory /818, the first-level directory docs 812, and the second-level directory papers 814. There is a file leaf in the path, paper.doc 816. These components are separated with path separators /. As there are three directories in FIG. 8, there are at least three different directory hashes that could be formed from this path.

As a first example, a client requests directory papers. Client FS client 415 hashes the parent directory docs 812 using a hash function 820 to produce a hexadecimal value 830, namely f6eba23. Next, the hexadecimal value is converted to a table index by reduction modulo the size of the storage table. For example, a table may have size 16, or $2^4$. In such a case, a bitmask 840 may be applied to discard all but the four least significant bits of the hash. Thus, the hash value f67eba23 is masked to 3 hex, labeled 850. This value corresponds to a (decimal) table index of 3.

As a second example, a client requests file paper.doc. The parent directory papers 814 is hashed using the same hash function 820 to yield a hexadecimal value 832, namely 8c2ab15c. Applying the same bitmask 840 yields c hex, labeled 852. This value corresponds to a (decimal) table index of 12. The root directory / may be similarly hashed and bitmasked to arrive at a third table index, if a client made a file operation request for directory docs 812. Thus, each directory is uniquely associated with a table index that corresponds to a particular storage provider.

The approach taken by embodiments of this invention has an advantage over prior 'file path resolution' protocols such as those found in NFS. In NFS, resolving a file path to a file consists of an iterative process. First, the NFS filesystem breaks a file path into its component parts: a root directory, intermediate directories, and a data file. The filesystem locates a directory file for the first NFS-mounted directory (the NFS root) and retrieves it from the network. NFS then locates the directory file for each subdirectory, and retrieves it from the network. NFS repeats this process until the file path is entirely resolved. This process accesses a network several times, once for each intermediate directory. In embodiments of this invention, step 720 advantageously does not require network access to locate a file. As the hashing function applies only to a portion of the file path, the system may locate the file in an amount of time that does not substantially depend on the number of directories in the file path, or even the number of storage servers in the storage system. To access the file requires a single network message to the appropriate storage provider, which may look up the particular file in its local filesystem without accessing the network.

Adding Storage Capacity: Expanding a Hash Table

From time to time, a storage system administrator may wish to add additional storage capacity to a system. She may purchase additional servers, such as the server depicted in FIG. 5, and add them to the storage system. As an embodiment may distribute file paths evenly across all storage, the system should account for the additional servers. The system may give full or partial control over the new storage areas to existing storage providers, or add additional storage providers that control the new storage areas. In the first case, the size of the area controlled by each storage provider changes. In the second case, the number of storage providers changes. In both cases, the storage table may need to be changed. For example, a storage system may begin with three storage providers. An administrator purchases additional physical servers that require two more storage providers to be added to the system (by a process described below in connection with FIG. 9). Some of the content controlled by the first three storage providers should be distributed to the two new storage providers in order to balance processing load.

A table having a number of entries equal to the number of providers would be inefficient, considering that a hash value must be reduced modulo the size of the table to produce a valid table index. If the table size were to change from three to five, as in the above example, the hash values for most files in the filesystem would change (only one in five would stay the same: those with hash values equal to 0, 1, or 2 modulo 15). Such a change typically would force 80% of the storage metadata files to be transferred from one storage unit to another. This result would cause considerable performance penalties, and is clearly disadvantageous.

Embodiments of the invention may restrict the table size equal to a power of an integer. This constraint enables the efficient expansion of the storage table, as described below. In exemplary embodiments, the table size is equal to a power of two, but other embodiments may use a different exponential base. The choice of base two allows for certain efficiencies, for example the use of a hardware bitmask primitive as in FIG. 8, which is found on most modern computer architectures.

Figure 9:
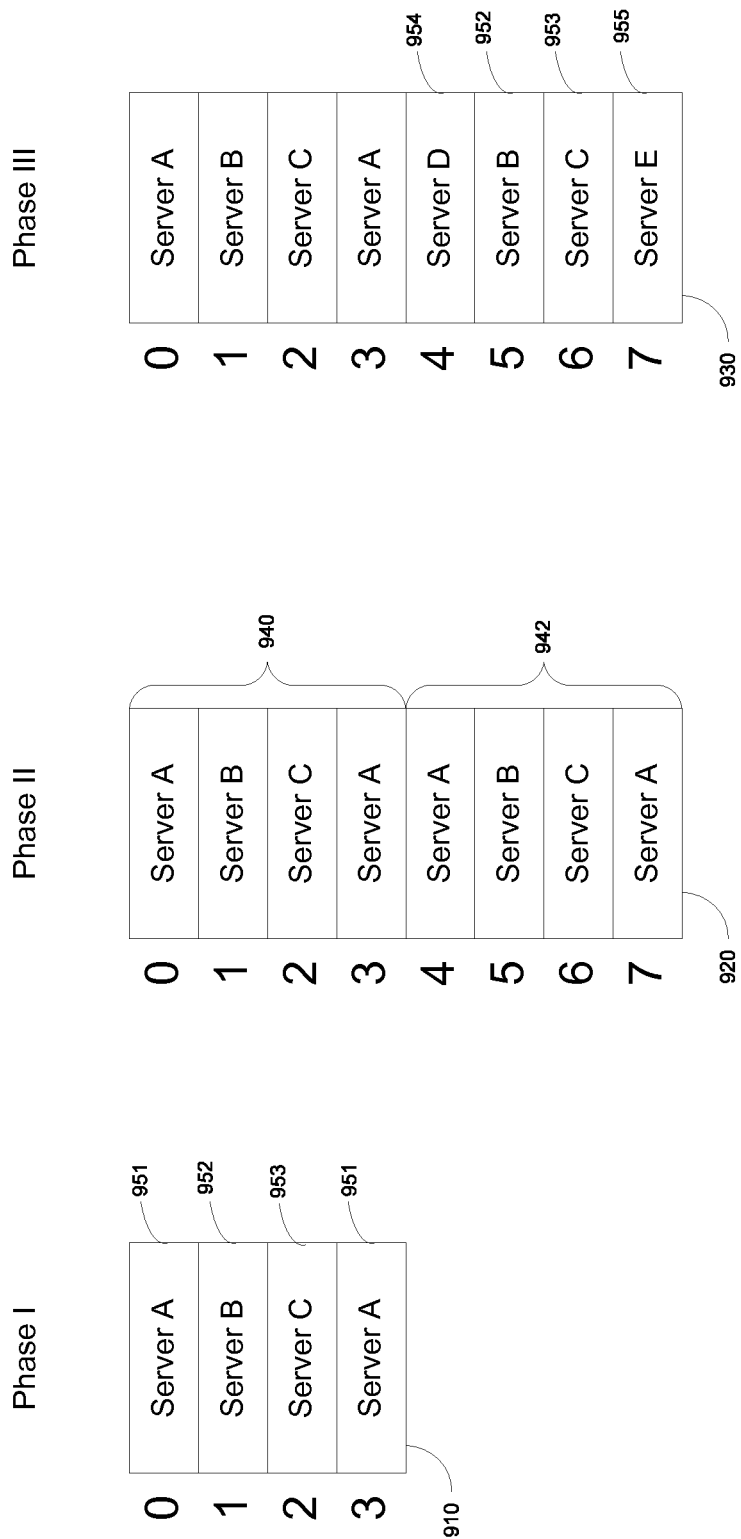
FIG. 9 shows a process for expanding a table of storage providers controlling file metadata, indexed by the table index created in the process of FIG. 8.

FIG. 9 shows a process for expanding a table of storage providers controlling file metadata, indexed by the table index created in the process of FIG. 8. Table expansion begins with the table of storage providers 910 in phase I. Here, there are three storage providers, with table entries for providers A 951, B 952, and C 953. Provider A 951 appears twice in the table—perhaps due to having the most storage capacity of the three servers. Suppose now that two more storage areas are added to the storage system, controlled by providers D 954 and E 955. The storage system may be reconfigured by a system administrator to allow the system to recognize the additional storage. The storage system may then determine that the table of storage providers has fewer indices than the number of storage providers, and expand the table.

Updating the table occurs in two phases: phase II and phase III. In phase II, the table is expanded the next-higher power (e.g., from 2 squared=4 entries to 2 cubed=8 entries in the example shown in FIG. 9) by copying the existing table entries 940, so that the table appears as 920. During this phase, it is important that the table size is constrained to be a power of an integer. If the base integer is N, the existing table entries will be copied N−1 times. In the exemplary embodiment of FIG. 9, the base integer is two, so the existing entries 940 are copied once, as entries 942. Although the number of entries of any storage provider in the table is multiplied by this process, the ratio of occurrences of one entry in the table to each other remains constant. Thus, the ratio of storage allocated to each storage provider remains fixed, as it should. Also, the size of the table at the end of phase II remains a power of the exponential base.

The process of phase II does not change which storage provider controls a given directory name. To see why this is so, let the size of the table be $N^k$ for some value of k and consider the base-N representation of the hash value of a given directory name. The operation of reducing this hash value modulo the table size as in FIG. 8 is equivalent to discarding the most significant base-N digits of the value, and retaining only the k least significant digits. After expanding the table by a factor of N, the table will have size $N^{k+1}$. The process of FIG. 8 will then yield a table index having the k+1 least significant digits of the hash value. But the existing entries of the table were duplicated, once for each possible positive value of the digit at location k+1, so this digit merely 'selects' one of N identical copies of the pre-expansion table. The remaining k least significant digits of the index have not changed. Thus, the new computed table index still corresponds to the same storage provider and storage area as before. As a result, the expansion in phase II does not require migrating any data between storage areas.

In phase III some of the duplicate entries of table 930 are replaced by entries for new storage providers. In exemplary embodiments, replacements follow the proportionality rule between table indexes and storage space. In FIG. 9, table index 4 is changed from provider A 951 to provider D 954, and table index 7 is changed from provider A 951 to provider E 955. As a result of this process, some hash values will be reassigned from one storage provider to another. Here, directory names with a hash value equal to (4 modulo 8) are reassigned from provider A 951 to provider D 954, while directory names with a hash value equal to (7 modulo 8) are reassigned from provider A 951 to provider E 955.

Additional details of dynamic table expansion are included below.

Automatic Migration of Data Between Storage Providers

After a new storage provider is added to the provider table, the storage metadata for each of the directories controlled by the original storage provider may be migrated to the new storage area. The process of migrating directories may take some time, so the storage provider may not implement it immediately, but instead may place a migration entry in an asynchronous queuing system, such as that described below in connection with FIG. 14.

While migration is ongoing, a provider table may store both a new provider and an old provider for a given index. If a filesystem operation has a file path that hashes to a directory being migrated, the new storage provider is first queried for the storage metadata for that path. If the metadata has been moved to the new storage area, it is returned. If the metadata has not been moved yet, the old storage provider is queried, and the storage metadata is returned.

The migratory table itself (with multiple providers for each migrating index) is first installed in the old storage provider. A client may request a file path that produces a hash value associated with the new storage provider, while migration is ongoing. When making the first request, the client will have an old version of the table of providers, and will request the file from the old storage provider. This storage provider may use a generation counter to detect that a client has an old version of the table, and return a newer table to the client. (The actual storage metadata may still reside on the old storage server, as discussed above. In this case, the storage provider may reduce network communication by returning the metadata immediately to the client.) The client may replay the storage metadata fetch request, if needed, using the correct storage provider. At this time, the client may detect that the 'new' provider has an older version of the table, and update the provider. In this way, the migratory table may propagate throughout the system.

After migration is complete, the migratory table may be replaced by a non-migratory table having only one storage provider per index. Again, using a generation counter, any given storage provider may determine during a filesystem operation that the client's table of storage areas is stale, and refresh it. And the client may determine that a provider has a stale (migratory) copy of the table, and refresh it. In an embodiment, several migrations may occur at once, in which case the system may contain more than one migratory table. Each table, however, may have a different generation counter, so the system may maintain consistency.

In one embodiment, migration between storage providers of the storage metadata itself is lazy. Lazy migration transfers storage metadata for a directory from one storage area to another as a client application requests filesystem operations for that directory. Migration of the storage metadata between storage areas in another embodiment is immediate. In immediate migration, as soon as a new storage provider entry is added to the table 930, all of the directories controlled by the old storage provider are immediately rehashed by the old storage area, to determine whether to migrate them. The old storage provider transfers storage metadata for each of the migrating directories to the new storage area, without waiting for a file operation request from the client.

Storage Metadata and Multiple Storage Providers

A storage client, in the process of fulfilling a filesystem operation received in step 710, may determine in step 720 a file path and which storage provider controls the storage metadata for the path. In step 730, the storage client may create a storage metadata request message containing this information, using a convenient data format, and send it to the storage provider. The provider may then retrieve 732 storage metadata for the file and return it 734. In exemplary embodiments, the storage metadata fetch request is the only network access required by the FS client to locate the storage providers controlling access to a file having a given path.

Figure 10:
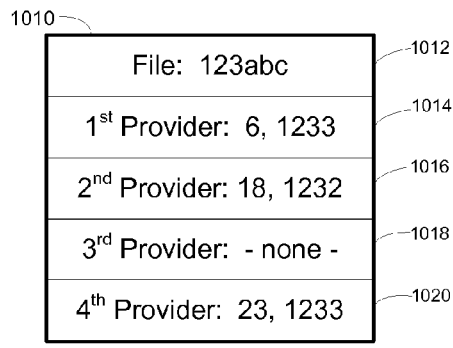
FIG. 10 is a representation of the contents of a storage metadata file.

FIG. 10 is a representation of the contents of a storage metadata file 1010. Each storage metadata file 1010 pertains to a data file. The methods by which a storage provider stores that file should be generally opaque to the FS client. Still, the client filesystem may use data used by a storage provider, so long as the client does not process that data in any way. In particular, storage providers in embodiments of the invention may store file data under a name different from the name known to a client application, and provide that name to the client filesystem. One possible naming convention is discussed below in connection with FIG. 13. Metadata file 1010 may contain such an 'opaque' filename 1012 if an appropriate naming convention is used. Alternate embodiments may simply store file data using the filename known to the client application.

In addition to the filename, storage metadata file 1010 also may contain a list of storage providers that control access to the file data. In the exemplary depiction of FIG. 10 this list has four entries 1014, 1016, 1018, and 1020. Storing this list enables the system to replicate data among up to four providers—other embodiments may have more or fewer entries in the list, depending on their data replication needs. Each entry may have at least the number of a storage provider that controls access to the file data, and a generation (version) counter, as well as other useful information. Generally, the first entry 1014 of the list will contain the storage provider that controls access to the metadata file itself. The same storage provider may advantageously control both file data and its storage metadata. Other embodiments may use a different file layout. In this example, entry 1014 represents that storage provider #6 controls access to the storage metadata for the file stored as 123abc, as well as having access to version 1233 of the file data. Entry 1016 represents that storage provider #18 has access to version 1232 of the file data. Entry 1018 is blank. Blank entries may occur, for example, if a storage provider held another version of the file data in the past, but ceased to do so (perhaps due to hardware failure). Or, a blank entry may occur if the storage system administrator changed the inter-provider replication policy to store only three copies of file data, instead of four. Those skilled in the art may recognize other reasons why an entry may be blank. Entry 1020 represents that storage provider #23 contains version 1233 of the file data for this file.

In this example, not all of the storage providers have the same version of the file data. Providers #6 and #23 contain a later version than provider #18. Thus, the file data is unsynchronized. The storage provider that controls the metadata file (in this example, provider #6) may recognize this condition, and begin repairs. Depending on whether this is the only file that needs replicating, repairs may take some time. Thus, the storage provider may queue a file data replication request in an asynchronous queuing system, such as that described in connection with FIG. 14, upon recognizing this condition. A storage provider in accordance with an embodiment may undertake periodic sweeps of the storage metadata files it controls, in order to detect such conditions before a file operation request arrives for a file that is out of sync.

In an exemplary embodiment, metadata may be stored in symbolic links. A symbolic link is a special system file that does not contain file data, but other data which refers to file data stored elsewhere. Metadata may be stored in any convenient format. Different filesystems store, and allow access to, the data in symbolic links differently. Unix systems advantageously require only a single system call readlink ( ) to read a symbolic link, instead of the three system calls open ( ), read ( ), and close ( ) required of regular files. Also, Unix systems provide greater guarantees of file integrity to symbolic links than to regular files. Exemplary embodiments take advantage of symbolic links to enhance the speed and reliability of storage metadata retrieval. Other embodiments may use other methods of physically storing metadata.

Aggregating File Data Stored in Multiple Storage Providers

In step 740 the FS client 415 may parse the storage metadata and choose storage areas having copies of the file data to interact with. Until this point, the storage system has dealt only with locating and retrieving file storage metadata. Step 740 is the first step in the process where the distribution of file data is relevant. Embodiments may distribute file data between storage areas in a number of different ways. For example, a storage system may distribute the data across the various storage providers using RAID techniques, such as striping, mirroring, and parity-keeping. Each of these techniques has different advantages and disadvantages, and in an exemplary embodiment a storage system administrator may select a technique appropriate to the storage problem at hand.

Each of these techniques also requires a storage client to access storage providers differently. For example, in mirroring, each storage area contains a complete copy of the relevant file, so the storage client may select a storage provider based on factors such as server load and available bandwidth. However, with striping, each storage area contains only part of the relevant file, and some or all storage providers may need to be accessed in any given file operation. It should be noted that a file may be replicated (mirrored) on multiple storage providers for redundancy, for load balancing, or for other purposes. For determining when a file should be replicated on multiple storage providers for redundancy, criteria that may be useful in some contexts include file type (for example, all text documents or all word processing documents), file size (for example, all files greater in size than 1 GB), and file name (for example, all files having a name including the string "account"). In the case of redundancy, for example, a file may be replicated in multiple storage providers and, using the indirection techniques described above, the client may be provided with a list of the storage providers and may contact one or more of the listed storage providers successively as needed to obtain access to the file; in this way, if the first storage provider contacted by the client is unavailable, then the client will contact another storage provider in order to obtain access to the file. In the case of load balancing, a file that is being accessed by multiple clients may be replicated in multiple storage providers and, using the indirection techniques described above, the client accesses may be distributed among the multiple storage providers by providing the clients with a list of storage providers and having the clients randomly select one of the listed storage providers to contact for access to the file. A storage system embodiment may contain logic for detecting heavy user access for a particular file or files, and dynamically, automatically replicate the file or files among storage providers to provide system-wide load balancing.

Given the configuration of file replication within the storage system, a filesystem in step 740 may decide which storage providers to contact to gain access to the actual file data. In an exemplary embodiment, file data is mirrored between storage areas. Thus, the decision may be driven by a policy engine that considers factors such as: current storage network usage; storage server load, capacity, and processing power; file data replication techniques; and any other useful and relevant information. Other embodiments may use other techniques to decide which storage provider(s) to contact for file data.

Note that, regardless of which storage provider the client chooses to contact, the storage providers themselves may coordinate with one another in order to maintain the relevant replication configuration without client direction. For example, storage providers may migrate data between themselves after an increase in storage capacity, as described above in connection with FIG. 9. So long as the client has a consistent picture of the data for access purposes, the storage providers may perform other manipulations of the physical data.

Once FS client 415 decides the proper storage providers to contact, the process continues to step 750. In step 750, FS client 415 may forward file operation request messages to the various chosen storage providers using the storage network. These messages correspond directly the originally requested file operation: open ( ), close ( ), read ( ), write ( ) or other operation specified by the filesystem API such as stat ( ). In step 760 the servers of the various storage providers process these messages, as described in more detail in the next section. In step 770 the filesystem receives the results from the storage network.

In step 772 the FS client 415 may analyze the various aggregated responses to determine a further course of action. There are four possibilities. First, if all storage providers reported that the file operation completed successfully, the filesystem 414 may return 780 a success value to the requesting application software 412. For example, if the application requested a listing of all files in a directory, each of the storage providers would execute the appropriate system calls or library functions such as opendir ( ) and readdir ( ) to obtain a directory listing, and the FS client 415 may then place all of those listings into a master list to return to the application software 412.

Second, the file operation may be asynchronous. Some filesystems support the ability to read or write data in a file in an asynchronous, non-blocking fashion, so that the requesting application may execute other instructions while waiting for the file operation to complete. This ability is important in applications where the file represents a communications channel such as a network device, file socket, or pipe. The POSIX method to accomplish non-blocking operations is to issue an open ( ) or fcntl ( ) system call with O_NONBLOCK argument. In cases such as this, the filesystem 414 may return 780 a value immediately, and communicate with the requesting application software 412 at a later time using out-of-band channels, such as signals, in accordance with the standards for asynchronous file operations.

Third, the file operation may be synchronous, but may have timed out. Some filesystems support the ability to wait for a set period of time for a communications channel, such as a network device, file socket, or pipe, to be ready to present or accept data. The POSIX method to wait for a file is to issue a select ( ) system call. In an exemplary embodiment, the FS client 415 sets a timer and issues the select ( ) command to the various storage providers, waiting for a reply. If none reply within the set time limit, the filesystem 414 is free to return 780 a timeout condition to the requesting application software. Given that embodiments may communicate using a network, a wait time less than the average storage network latency should be expected to timeout. Other embodiments may allow the individual FS servers to perform their own timeouts, but network latency must be carefully monitored to allow filesystem 414 to return a value to the requesting application software 412 in a timely fashion.

Fourth, a file operation may be properly executed on all storage providers, but an error condition arises on one or more of the storage providers. For example, a request to write data to a non-existent file may generate such a condition. Here, FS client 415 has several options. The filesystem 414 may return 780 a single error to the application software 412 that adequately summarizes the aggregate error conditions. The filesystem 414 may rank the error conditions in a priority order, and return the most serious error. Or filesystem 414 may return the error condition returned by the largest number of storage providers. A person having skill in the art may devise alternate ways to aggregate errors, while falling within the scope of the invention.

Alternatively, the FS client 415 may recognize the error or errors, and replay the file operation request on one or more storage providers returning the errors. Some errors may arise due to internal inconsistencies in file data replication, such as an out-of-sync condition. Storage servers in accordance with embodiments of the invention have mechanisms in place to deal with such conditions, as described below. Still, these conditions may occur from time to time, and FS client 415 may recognize these conditions as transient. In such cases, the FS client 415 may replay the file operation request at a later time. If a number of replay attempts fail, the filesystem 414 may return 780 an error condition to the application software 412, as described above.

Storage Providers as Peer Sets

It is convenient and advantageous for a storage provider to safeguard against hardware failure or network failure, by storing copies of file data and storage metadata on different storage servers. For this reason, a file storage system as embodied herein may create and maintain peer sets to act as storage providers. A peer set is a set of peering services, called nodes, running on several storage servers, cooperating to control access to a file or its storage metadata. A node may control one or more disk drives, or more generally a number of volumes (mountable filesystems), on the server on which it operates. A peer set may appear to client FS client 415 as a single storage provider having a single network address, in accordance with the portability design principle. It will be understood that in other embodiments, a storage provider may be a single storage server.

Figure 11:
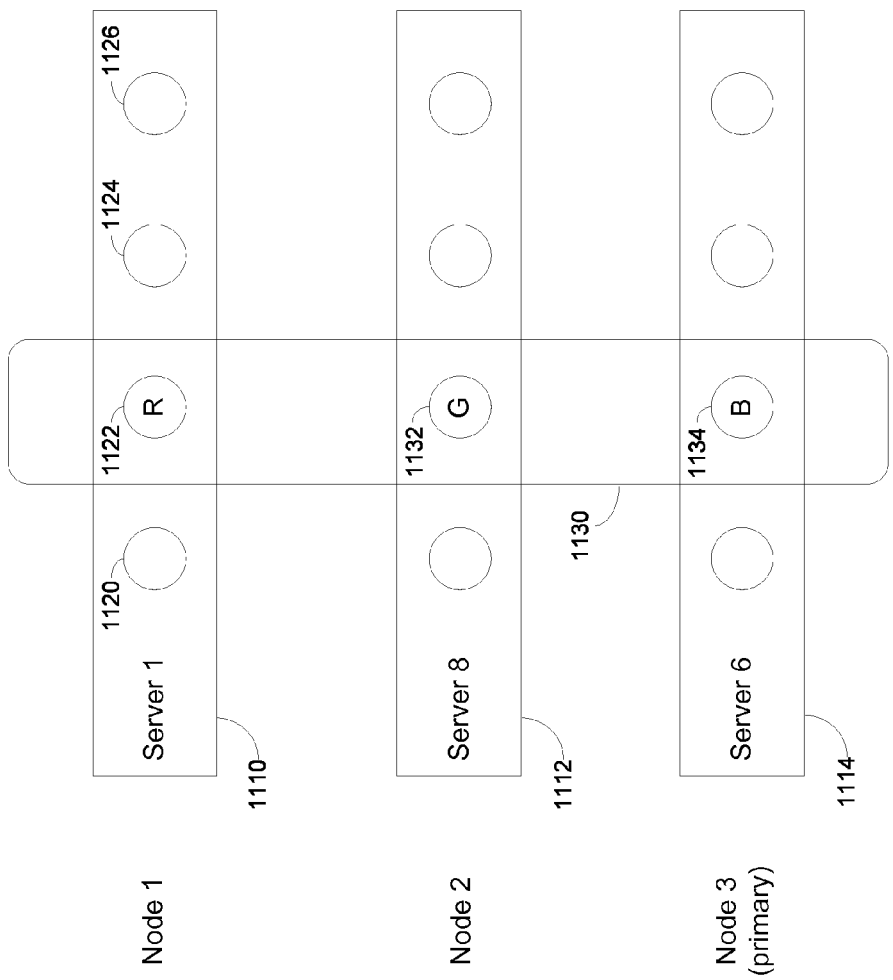
FIG. 11 depicts the logical components of a peer set in accordance with an embodiment of the invention.

FIG. 11 depicts the logical components of a peer set in accordance with an embodiment of the invention. Each storage server in the embodiment, for example server 1 (1110), has several storage devices (hard disk drives) 1120, 1122, 1124, and 1126 as in FIG. 5. A peer set may be embodied as processes, or nodes, running in a number of the storage servers. In an exemplary embodiment, the number of nodes per peer set (referred to herein as "cardinality") is fixed at three, although other embodiments may have more or fewer nodes in a peer set, and the cardinality may be fixed for a particular embodiment (e.g., some embodiments may be fixed at two nodes per peer set while other embodiments may be fixed at three nodes per peer set) or configurable, perhaps within certain constraints (e.g., cardinality may be configured for either two or three nodes per peer set). In typical embodiments, all peer sets are required to have the same cardinality, although other embodiments may be adapted to support peer sets of mixed cardinality (for example, to support different storage tiers for different types of files or file backup purposes). The examples below describe peer sets with three nodes. As discussed below, when a peer set has three nodes (or, more generally, an odd number of nodes), it is convenient to structure some processes to occur when a majority of the nodes (e.g., two nodes out of three) operate in agreement with each other. However, when a peer set has just two nodes (or, more generally, an even number of nodes), and in a process there is no prevailing agreement, an outside entity (e.g., a designated management node) may be enlisted to resolve the disagreement.

In the three node embodiment of FIG. 11, the peer set 1130 consists of node 1 running on server 1 (1110), node 2 on server 8 (1112), and node 3 on server 6 (1114). For simplicity, each node here controls a single storage device, but in other embodiments, a node may control several storage devices on a single server. The peer set 1130 thus controls storage devices 1122 using node 1, 1132 using node 2, and 1134 using node 3. Each physical server may run, simultaneously, several nodes that participate in different peer sets, but each node may only belong to one peer set. Again for simplicity, only one peer set is depicted, although typical embodiments may run four peer sets using these three servers (12 nodes for 12 storage devices).

Each peer set may designate a primary node, such as node 3 running on server 6 (1114). The non-primary nodes in a peer set are designated secondary nodes. The primary node may be responsible for coordinating a number of functions that should appear to a client as if they were performed by a single storage provider. The primary node may be the only node in the peer set that communicates with the client, as described in connection with FIG. 12. The primary node may also ensure that storage metadata and file data is properly synchronized across all of the nodes in the peer set, so that file operations are consistent. A primary node may use RAID techniques (striping, mirroring, parity-keeping) to distribute file data among the servers of the peer set, in accordance with an intra-set data replication policy. The advantages and disadvantages of using such policies are described above in connection with step 740, but it will be understood that replicating data between nodes of a peer set has certain advantages over replicating data between storage providers. One such advantage is isolation of the details of the process from the client. The primary node within a peer set may control authoritative data to which the other nodes synchronize, as described below in connection with FIG. 15.

In an exemplary embodiment, each peer node is assigned a label or other designation (referred to hereinafter as "color") that is used to distinguish that node in a peer set from all the other nodes. For example, one node may be designated red, one node may be designated blue, and the third node may be designated green, as represented by labeling storage media 1122, 1132, and 1134 as "R", "G", and "B" respectively. In an exemplary embodiment, colors are used to arbitrate the choice of the peer set member that has to fulfill a given request so that requests are distributed among the nodes of the peer set, although colors may be used for other purposes. (The choice of color may be entirely arbitrary, so long as each node in the peer set has a distinct color.) Each request sent to a peer set (e.g., using IP multicasting, as discussed below) receives initial processing by each member of the peer set to determine which member of the set will handle the processing. This determination may be performed for example, using a hashing scheme on a portion (such as the message ID or the IP address of the client or some combination of these items) of the request. Thus each member of the peer set can determine what "color" peer will be doing the processing of each request without any need for communication among the members of the peer set. If a request is determined by a peer to be one to be processed by the peer based on its color, then the peer performs the processing; and otherwise, the peer can ignore the remainder of the request. It should be noted that, in an exemplary embodiment, the color designation is separate from the primary/secondary role designation. A node can switch roles from primary to secondary or vice versa, but the node would not change color. Similarly, a node that replaces a crashed node in a peer set inherits the color of the crashed node but does not necessarily inherit the role of the node it replaces.

Using IP Multicasting to Communicate with a Peer Set

The exemplary peer set above controls three nodes. To provide enhanced availability, embodiments may place only one node belonging to a peer set on any given storage server. In this way, if a physical server fails for any reason, or if the node on that server fails, the peer set may still contain other nodes for processing file operation requests. According to the principles of portability and isolation, it is advantageous that the filesystem 414 on a storage client be unaware of the number of physical storage servers. Yet in order to provide service efficiency, a storage client may contact all of the physical storage servers controlled by a storage provider with a single network message.

Thus, in an exemplary embodiment, the storage system may assign each storage provider a multicast IP address, and the client may send file operation requests to this address. IP multicasting is known in the art—it is described in Internet Society, *RFC* 1112: *Host Extensions for IP Multicasting* (August 1989), and Internet Society, *RFC 3170: IP Multicast Applications Challenges and Solutions* (September 2001), which documents are hereby incorporated by reference. IP multicast addresses use the same format as, but a different address range than, unicast addresses. Other embodiments may contact a storage provider using a unicast (single-host) IP address, contact each physical server controlled by the provider using a unicast address, or have another communication model.

As additional servers are added to the storage system, perhaps to increase storage or processing capacity, more peer sets may be added to the system. In one embodiment, a system administrator may reconfigure the storage system to recognize the additional servers and to add peer sets. In another embodiment, the storage system may automatically detect new servers, and reconfigure the list of peer sets automatically. For example, a system may employ Dynamic Host Configuration Protocol (DHCP). DHCP is described in Internet Society, *Request for Comments (RFC) 2131: Dynamic Host Configuration Protocol* (March 1997), which is hereby incorporated by reference. In such an embodiment, storage servers may request configuration parameters, such as a host IP address, from a DHCP server automatically, with no additional configuration by a system administrator. A peer set IP (multicast) address is assigned to the members of the peer set using a membership protocol described below.

Figure 12:
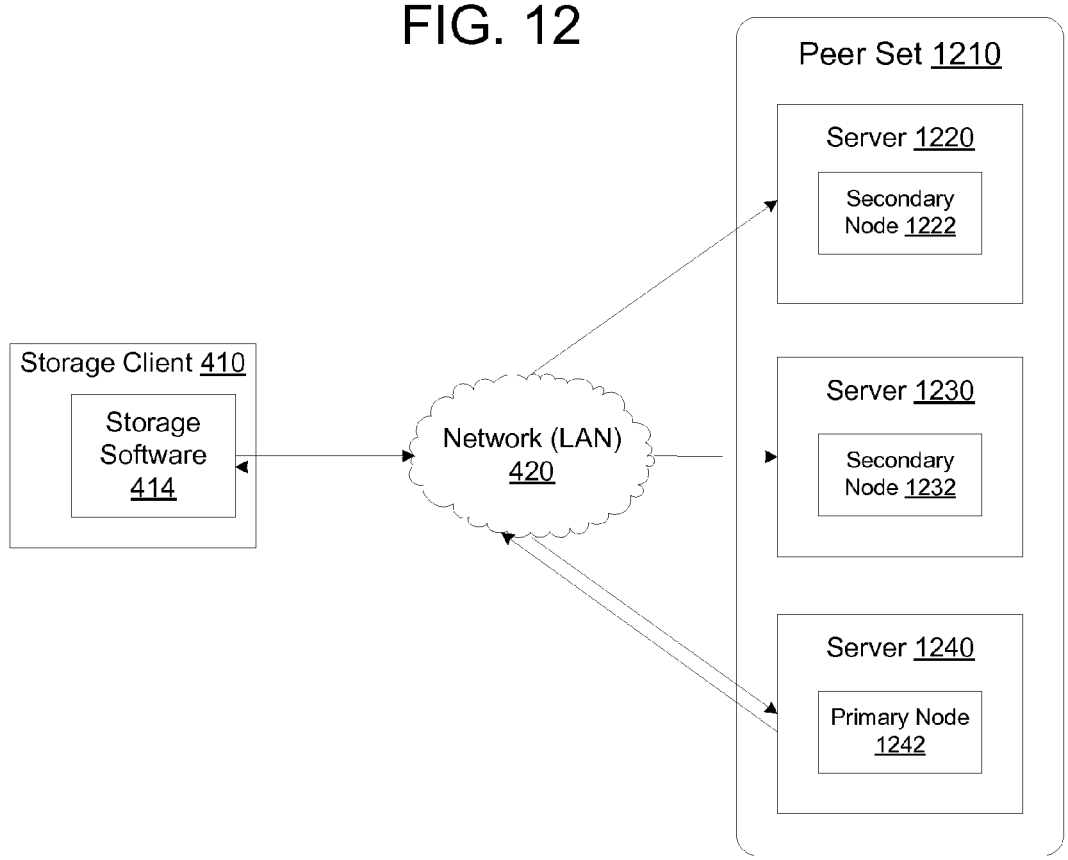
FIG. 12 depicts communications in an exemplary embodiment between a client and a peer set using the computer network of FIG. 4.

FIG. 12 depicts communications in an exemplary embodiment between a client and a peer set using the computer network of FIG. 4. Storage client 410 may access FS client 415, which communicates with a peer set 1210 via network 420. In particular, a storage system administrator may assign an IP multicast address, such as 227.0.0.1, to the peer set 1210. Each of the nodes 1222, 1232, and 1242 in the peer set may be configured to listen for client storage messages sent to this multicast address. However, the primary node 1242 may be the only node configured to respond to such a message. Thus, each message sent by FS client 415 may be answered by a single message sent by a primary node 1242, simplifying network communications between FS client 415 and the peer set.

The distributed processing arrangement of this embodiment is both efficient and simple. In terms of efficiency, the client need send only a single message for handling of a request. Multicasting of the request permits handling of each class of request with great efficiency, since all members of the group are sent the request simultaneously, yet there is only a single reply. The switch configuration of FIG. 6 handles traffic on the client network efficiently, because packets are replicated only when the switch closest to the nodes is reached. The arrangement of this embodiment is simple because it avoids the need for pinpointing failures that would be required by a centrally supervised system; the distributed embodiment herein avoids the need for centralized failure detection.

The following are some additional references relating to multicasting:

[CISCO-99] Cisco Systems, Inc., "Multicast Deployment Made Easy", 1999. http://www.cisco.com/warp/public/cc/techno/tity/ipmu/tech/ipcas_dg.pdf

[CISCO-02] Cisco Systems, Inc., "Cisco IOS Profile Release 12.1(13)E7 and 12.2(12)b—System Testing for Financial Enterprise Customers," 2003. http://www.cisco.com/application/pdf/en/us/guest/products/ps6592/c1244/cdccont_0900aecd80310d60.pdf

[CISCO-05] Cisco Systems, Inc., "Cisco 7600 Router: Resilience and Availability for Video Deployments", Whitepaper, 2005. http://www.cisco.com/application/pdf/en/us/guest/netsol/ns610/c654/cdccont_0900aecd8032 2cel.pdf

[QUINN-03] Michael Jay Quinn, "Parallel Programming in C with MPI and OpenMP", McGraw-Hill Professional, 2003.

[DEMIRCI-02] Turan Demirci, "A Performance Study on Real-Time IP Multicasting", Thesis, Dept. of Electrical and Electronics Engineering, Middle East Technical University, September 2002. Also in Proceedings of the Eighth IEEE International Symposium on Computers and Communications. IEEE, 2003.

[GRANATH-06] Derek Granath, "How to Optimize Switch Design for Next Generation Ethernet Networks", Network Systems Design Line, Jun. 14, 2006. http://www.networksystemsdesignline.com/showArticle.jhtml;jsessionid=2GUIWZFYBGDIOQSNDLRSKH0CJUNN2JVN?articleID=189401062

[RFC-1112] S. Deering, "Host Extensions for IP Multicasting", STD 5, RFC 1112, August 1989.

[RFC-1700] J. Reynolds, J. Postel, "Assigned Numbers", ISI, October 1994.

[RFC-2113] D. Katz, "IP Router Alert Option", Standards Track, February 1997.

[RFC-2236] W. Fenner, "Internet Group Management Protocol, Version 2", RFC 2236, November 1997.

[RFC-3376] B. Cain, "Internet Group Management Protocol, Version 3", RFC 3376, October 2002.

[SSM-02] Bhattacharyya, S., et. al., "An Overview of Source—Specific Multicast (SSM)", Internet Draft, March 2002.

Layout of Data within a Node of a Peer Set

The first issue to address is that of the namespace of storage metadata files within a storage area. Two different directories may store their metadata in the same storage area if they have identical names. As an example, given the path /docs/joe/pdf/file.pdf, an embodiment may hash the parent directory name pdf to determine a table index and a peer set. Given a path /apps/adobe/pdf/pdfviewer, the client may hash the parent directory name pdf to find the same table index and peer set. Although the last two directories differ in their file paths, an embodiment may determine the same peer set for both, if it used the same input to the hash function: the parent directory name pdf. Thus, the directory name pdf is not enough information to assign a location to /docs/joe/pdf and /apps/adobe/pdf in the same storage area. To avoid collisions, embodiments may save the storage metadata using entire path names. Thus, while the two directories ending in pdf may be controlled by the same peer set, they may be stored within the peer set's storage area based on their full, absolute paths.

There are several advantages to this scheme. First, if a directory is renamed, only it and its immediate children may need to be rehashed and possibly moved to another storage area. As only storage metadata must be transferred, and not file data, such service disruptions use a minimal amount of bandwidth. Next, each node may use its native filesystems to look up paths, and to guarantee that path name collisions cannot happen. Also, renaming a directory may be done in parallel on each of the nodes in a peer set. However, other embodiments may store metadata in other ways more appropriate to different applications, and a person of skill in the art should recognize how to make changes to the implementation of the redundant namespace as required.

The next issue to address is that of the namespace of data files within a storage area. File data need not be stored using the name requested by a client. Flat directory structures require fewer directory lookups than deep structures. However, lookups within a directory become slower as the directory stores more files, due to the mechanics of accessing the relevant data structures. Thus, the most rapid file lookups occur in directory trees wherein each directory contains a fixed, finite number of enumerated subdirectories, where the fixed number may be adjusted based on hardware and software capabilities to adjust response time. A common scheme, and that of an exemplary embodiment, assigns a unique file ID to each file (irrespective of its possible renames or moves through the global file system hierarchy). The file may be stored in a directory path based on the unique ID.

Figure 13:
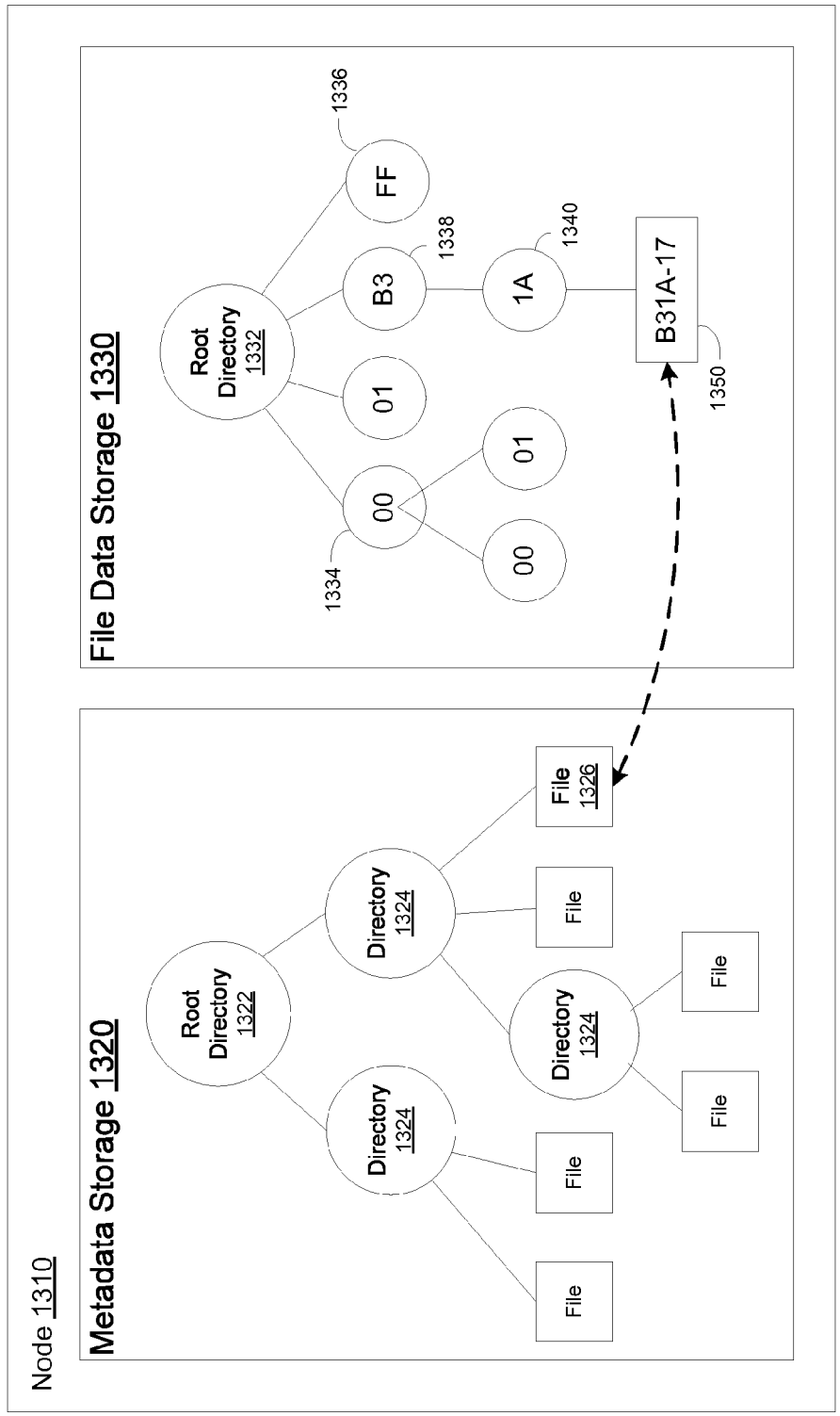
FIG. 13 shows a data storage area and a metadata storage area in a node within a storage server in an embodiment.

FIG. 13 shows a data storage area and a metadata storage area in a node within a storage server in an embodiment. Each storage server runs one or more nodes, such as node 1310. Each node may control one or more storage volumes. Node 1310 controls two directory trees 1320 and 1330 for storing metadata and file data, respectively. In some embodiments, the directory trees 1320 and 1330 are independently mountable filesystems, while in others they are not. One tree may be a root filesystem, and the other tree may be located within a directory of the root filesystem, or both trees may be mounted in a third filesystem.

Directory tree 1320 contains a storage metadata repository (MDR). In a storage system in accordance with an exemplary embodiment of the invention, storage metadata may be placed in a filesystem and given the same absolute path as the file requested by the client filesystem 414. Storage metadata is stored in this manner to facilitate its rapid retrieval. Thus, when a client makes a file operation request for a file having a given path, a storage server may retrieve the storage metadata for that file by applying that path to its metadata filesystem. As with any filesystem, the metadata filesystem contains a root directory 1322, several directories 1324 arranged in a hierarchy, and several files such as file 1326. In some embodiments, the storage metadata repository is not the root filesystem, but is contained within a directory such as /MDR in the root filesystem. In this way, a storage server may segregate the storage metadata repository from other files, such as operating system files and a file data repository.

Directory tree 1330 contains a file data repository, and has a simple structure. The base of the tree is a root directory 1332. Up to 256 directories, enumerated in hex from 00 1334 through FF 1336, may be contained in each directory in the tree. For example, directory 1338, named B3, contains a subdirectory 1340, named 1A. The name of each leaf file, such as file 1350, may contain the complete hash value, in this case B31A.

In some embodiments, a generation counter may be stored as part of the file name. This counter can be used by a peer set to ensure that each file controlled by the peer set is properly synchronized in each file data storage hierarchy. Thus, a data file's full path from the root directory of the repository may be, for example, /B3 /1A/B31A-17, the path of file 1350. The counter may be incremented any time the data in the file is written or rewritten. This counter enables data files to move between peer sets coherently—when a file is copied to the new peer set, its counter is incremented, so the copy does not overwrite any older file data already stored in the new peer set. In some embodiments, the file data repository is not the root filesystem, but is contained within a directory such as /DR in the root filesystem. In this way, a storage server may segregate the file data repository from other files, such as operating system files and the storage metadata repository.

The generation counter may also be used to simplify the operation of another embodiment. For example, file read-write locking has certain implementation challenges that can be entirely avoided by using a generation counter. One embodiment may permit only creates, reads, overwrites, and deletes, but not updates. These file operations in practice may be easier to implement than the full set including updates, due to the avoidance of race conditions. Such an embodiment may implement this functionality as follows. Create operations may check for the existence of a file of the appropriate name having any version, creating version 1 or returning an error if the file is already present. Read operations may locate the latest version of a file and return its data. Delete operations may mark the metadata for deletion, without disturbing ongoing read operations. Overwrite operations may locate the latest version of a file, create a new version, write the new version, and update the metadata (if it still exists), also without disturbing ongoing read operations. Such an embodiment may run a 'garbage collector' process on a regular basis to compare files in the filesystem against their metadata, and permanently delete files and their metadata if there are no ongoing read/write operations.

Storage metadata in directory tree 1320 may be associated with file data in directory tree 1330 as follows. In an exemplary embodiment, each time a file is created by the client, the controlling peer set assigns the file a unique file identifier. For example, the unique identifier may be formed by combining the ID of the peer set that created (and will initially control) the file, with a counter of files created within the peer set. This algorithm may be used to create the opaque file data storage name discussed in connection with FIG. 10.

Once a peer set creates a storage name, it may create the data file 1350 itself, and create a storage metadata file 1326 which is associated with the data file 1350, as indicated in FIG. 13. The peer set may then replicate the storage metadata and data file throughout the storage servers in its own peer set according to the storage metadata replication policy (in exemplary embodiments, mirroring) and the intra-set file data replication policy. As replication may be resource-intensive, the primary node may queue a request to do so in an asynchronous queue, as described below.

Small File Optimizations

In some applications, a storage system may provide very fast access to small files. For example, a web bulletin board system may allow users to select small images to represent their on-line personas, called "avatars." These avatars are typically no larger than a few kilobytes, with some bulletin boards having a maximum size restriction. In addition, posts made in web bulletin boards and blogs are typically textual, and of a few kilobytes in size. For these applications, a storage system that provides rapid access to the small files representing a post or avatar, has clear advantages in system response time and may have improved user satisfaction.

An embodiment may provide rapid access to small files by employing flat storage. In a flat storage embodiment, a storage medium (such as a hard disk drive or an area of a hard disk drive) is partitioned into equally-sized storage areas, or "extents." Each extent may be, for example, 1 kilobyte, 4 kilobytes, or another appropriate size. For example, an extent may be equal in size to a physical disk block. A "small file" is then any file whose data occupies a limited number of extents, up to a maximum file size. In such an embodiment, a particular extent's number may be mapped onto a physical location by a simple multiplication. Thus, if an extent is 4 kilobytes (0x1000 in hexadecimal), then the first extent begins at byte 0x0000 of the storage medium, the second extent begins at byte 0x1000 of the storage medium, and so on. In another embodiment, one or more of the extents may be used as a bitmap for the storage system, so that it may determine which of the remaining extents contain small file data. In this embodiment, the physical location may be found from a multiplication followed by an addition (to offset the size of the bitmap). Thus, if the first two extents are used as a bitmap, then the second file data may be located at, for example, byte 0x1000 (second file)+0x2000 (offset)=0x3000. Such multiplications followed by additions exist in some modern computer architectures as low-level hardware primitives, the use of which may increase the speed of the storage system in locating files on disk. An embodiment may create a small file storage area upon the request of a system administrator, or under direction from system configuration data.

It is advantageous to use a naming scheme for small files that does not directly related to the physical location at which the file is stored for several reasons. If the number of an extent were used directly, an application could directly access physical storage, regardless of whether data is stored there or not. This type of access may lead to data corruption. Also, if a file is modified in-place using the same name, there is no historical data regarding prior versions of the file data. And if a file name is tied to a physical storage offset, it may be difficult to identify which server manages the small file repository where this particular file is kept. Thus, each small file should have a globally unique ID within a storage system embodiment.

Thus, small files within a storage system may be named according to the following exemplary scheme. A file name may contain the ID of the peer set that created the file. In one embodiment, other peer sets may take over management of the file, although this ID will not change for the life of the file. In another embodiment, only the peer set that created the file may manage it. A file name may also contain the number of the extent on disk at which it starts. In embodiments including this name component, the file must reside at a fixed location on disk, and cannot be moved (for example, to defragment the disk). A file name may contain the number of consecutive extents that it occupies on disk. In embodiments including this name component, the size of the file cannot grow beyond this number of extents. Such embodiments may store the actual number of bytes consumed by the file in a special portion of the physical disk, or in a storage metadata file. Also, a file name may include a generation number for the file, to ensure that two files using the same extent at different times can be distinguished from each other. A complete file name may incorporate any or all of this information, for example by concatenating it together. A complete file name may be embedded in a URL to allow direct access by a web browser or other application for retrieving small files.

An embodiment may deal with a large number of such small files, and may name them for convenience using an alphanumeric string, a hexadecimal string, or use another naming convention. Small files in an embodiment may be accessed using artificial paths. For example, a fictitious directory may be designated as an access point for small files. Such a directory may be named, e.g., /smallfiles. Thus, a request for a small file named XYZ, on a storage filesystem mounted on a storage client as /storage, might be accessed by a client application as /storage/smallfiles/XYZ. However, this file path may not correspond to an actual directory structure in the storage system; instead, an embodiment may interpret the path /smallfiles/CD3A to mean 'access the 4 kilobytes of data starting at byte 0x0CD3A000 from the flat storage medium'. Alternatively, the embodiment could treat CD3A as an index into a table containing the beginning physical offsets of small files on the storage medium.

These small file optimizations may be combined in an embodiment with further optimizations. Any given disk drive has a maximum number of I/O operations per second it can accomplish. This number is basically independent of the amount of data being read or written to the drive. Since individual seeks to reposition the drive head count as independent operation and take up the most relevant portion of a drive's access time, having contiguous files is advantageous as they can be read with a single operation rather than via multiple seeks. Generally, most file system require first a seek to access the directory that references a file, then another one to access the file metadata, that tells where the file data can be found and finally a seek to access the data. This entails 3 operations for a single read. If the file metadata is contiguous to the data and the location of the file is embedded within the file name, the first two operations are unneeded and the metadata+data can be read in with a single I/O op. This reduces the I/O count per drive by at least a factor of 3 and therefore allows drives to serve more requests. This is very important for very randomly accessed small files which, because of the randomness, cannot be cached. For such files (i.e., thumbnails, etc.) reducing the number of I/O operation reduces the number of drives a storage infrastructure needs to achieve a certain throughput. For example, a node may receive a request for metadata for a certain file. The storage metadata for that file could contain an indicator that this file is a small file, and also contain the small file's path, such as /smallfiles/CD3A. The node may then retrieve the file using this path from its local storage media, and return it with the storage metadata, or instead of the storage metadata. Referring to FIG. 7, steps 740 through 772 may be avoided by this optimization, decreasing response time and network bandwidth, and increasing performance. In another embodiment, the node may have logic for deciding whether to immediately return the small file or the storage metadata for the file. Such logic could be useful, for example, where small files change rapidly, and any given node may not be able to determine whether it contains the most recent version of a particular file.

In another embodiment, the small file optimization may be combined with the read-write lock avoidance functionality. Rather than creating a new generation number each time a given small file is written, as described above in connection with FIG. 13, an embodiment may simply assign a new name to the file. In this case, a node may update a bitmap of small files with the new extents to use, and mark the old extents for deletion.

An exemplary small file repository is described below.

Asynchronous Queuing

Embodiments of a storage system may include a highly scalable, system-wide, asynchronous, atomic queuing mechanism backed by a persistent store. From time to time, a storage system may execute resource-intensive operations. These operations include, for example, replicating file data, replicating storage metadata, and resolving file data differences to ensure data consistency. Executing such operations should not significantly reduce the performance of the storage system, by reducing either processing power, bandwidth, or storage available to a client. By placing such resource-intensive operations in a persistent queue, storage servers may advantageously fulfill these operations when sufficient processing capabilities become available. Thus, system performance will not be significantly degraded.

Figure 14:
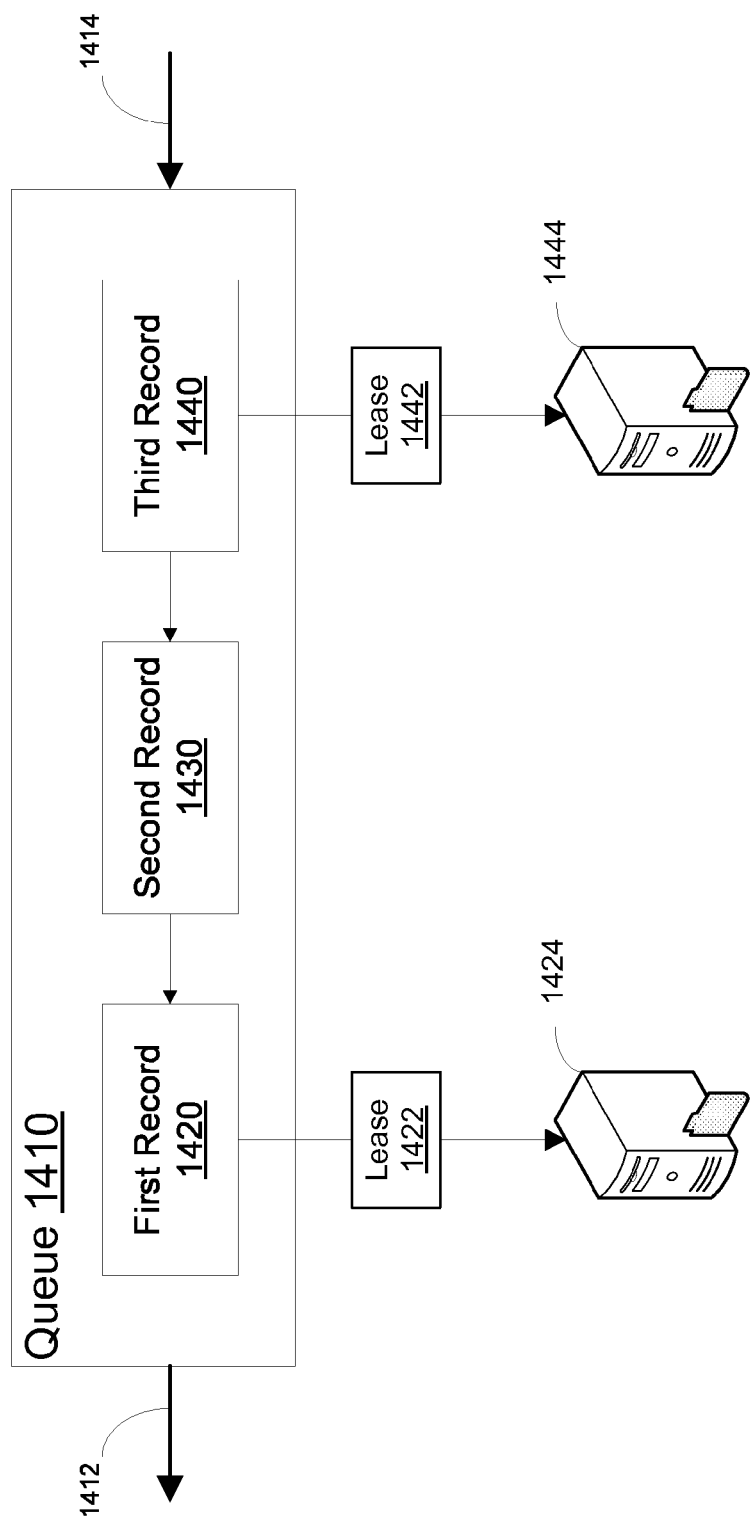
FIG. 14 is a schematic block diagram of the components comprising, and those communicating with, a queue in accordance with an embodiment of the invention.

FIG. 14 is a schematic block diagram of the components comprising, and those communicating with, a queue in accordance with an embodiment of the invention. A queue is known in the prior art as a mechanism for processing data records in a First In, First Out (FIFO) manner. Exemplary queue 1410 contains a first record 1420, a second record 1430, and a third record 1440. A queue may contain no records, or any number of records, and the number of records in the queue may change over time as a storage system requires. Records may be taken from the head of the queue for processing, as indicated by arrow 1412, and added to the tail of the queue, as indicated by arrow 1414. Thus, first record 1420 was added to the queue before second record 1430, and second record 1430 was added to the queue before third record 1440.

A queue in accordance with an embodiment may allow any system component to enqueue a record, and may allow any system component to dequeue a record. In this way, the producer of a record may be decoupled from the record's consumer. In one embodiment, one node of a peer set manages queue operations for the peer set. This node could be the primary, or it could be the member of a particular color. This allocation is advantageous in that there may be several queue requests in a queue at any given time, and processing those requests may consume considerable system resources. Other embodiments may allow each node in a peer set to interact with the queue.

A queuing system may support the creation, maintenance, and deletion of more than one queue 1410. Each queue in a queuing system may have a name. In one embodiment, a name may be composed of file path name components. Such a naming scheme is advantageous in a storage system having tasks that are associated with paths, such as copying storage metadata or file data in a directory from one node to another node in a peer set. Other queuing system embodiments may use any consistent naming scheme for uniquely identifying queues, such as the POSIX ftok ( ) function.

A queuing system may employ a system of leases. Data inconsistencies could result if a node took a task from a queue, such as a data migration task, and crashed before completion. Thus, queuing leases may be used to guarantee that tasks are completed before they are dequeued. In FIG. 14 the first record 1420 is leased 1422 to a first node running on server 1424, while third record 1440 is leased 1442 to a second node running on server 1444. As records in a queue are processed in FIFO order, this diagram is consistent with a third node (not shown) taking a lease on the second record 1430 before lease 1442 was granted, but failing to complete its task. Record 1430 thus remains in the queue for another node to process at a later time. A queuing lease may contain information such as an identification of the record and the leasing node, the time of the lease, and the lease duration.

A queuing system may have several capabilities. The system may allow a user to create a new queue having a given name. The system may also allow a user to flush, or empty, a queue of all of its old entries. Or, the system may allow a user to delete a queue entirely. Once an appropriate queue has been located, the system may allow a user to read a record in the queue non-destructively, optionally waiting for a period of time for a record to become available if the queue is empty. Or, the system may allow a user to make a queue record invisible to other users by taking out a lease, optionally waiting for a period of time for a record to become available. A record may become visible again for processing by other nodes if, for example, the lease expires. The system may also allow a user to adjust the length of a lease already taken. Such a function may be useful if processing the record is taking longer than the user expected. The system may allow a user to append a record to the end of a queue, optionally waiting until the record has been transferred to persistent storage.

Advantageously, queue records may be stored using the persistent storage providers of the storage system itself. In this way, records may be preserved in case some of the physical storage servers fail for any reason. Should this situation occur, the storage system may treat a queue record as any other type of data file, and schedule it to be copied to another node, as described below in connection with FIG. 15. In an embodiment, queue records pertaining to a particular peer set should not be stored by that peer set, in order to avoid the system losing queuing tasks related to that peer set in case of server failure. Queue records may be stored in a filesystem hierarchy separate from that of storage metadata and file data. Records may be named in any convenient fashion.

In one embodiment, records for a particular path are stored in append-only files. As records for that path are enqueued, the data for the records is appended to the file. A record file may include an index entry, containing information about the records located in that file. An index entry may include, for example, each record's name, offset within the file, time of creation, start time of lease, and length of lease. Records may be updated or deleted from a queue by appending a new index entry with updated information. Further, each directory may contain an index entry that keeps track of the offset of the index entries in the record files of the directory's children. When a new index is stored at the end of a record file, a new index entry may be added to the end of the parent directory's record file with this new information. As the offset of the parent file's index record has now changed, its own parent may be updated, and so on to the root of the hierarchy. In this manner, records may be removed from a queue without deleting any files or any data within any files. At some point, as a record file becomes large and filled with a proportion of stale data that exceeds a given percentage, the queuing system may create a new record file and update the parent record file to reflect the new record file's name.

An exemplary queuing system is described below.

Node Failures and Self-Healing

A storage node may fail to fully function for a number of reasons, including hardware failure, software failure, network outages, or power failure. When a failure occurs, peer sets may replace the failed nodes automatically, without the need for administrator intervention, if appropriate hardware is available. A storage system in accordance with embodiments of the invention may take four steps to recover from a storage node failure: detection, selection, replication, and replacement. As replication may be resource intensive, the asynchronous queue may be used to distribute load.

Figure 15:
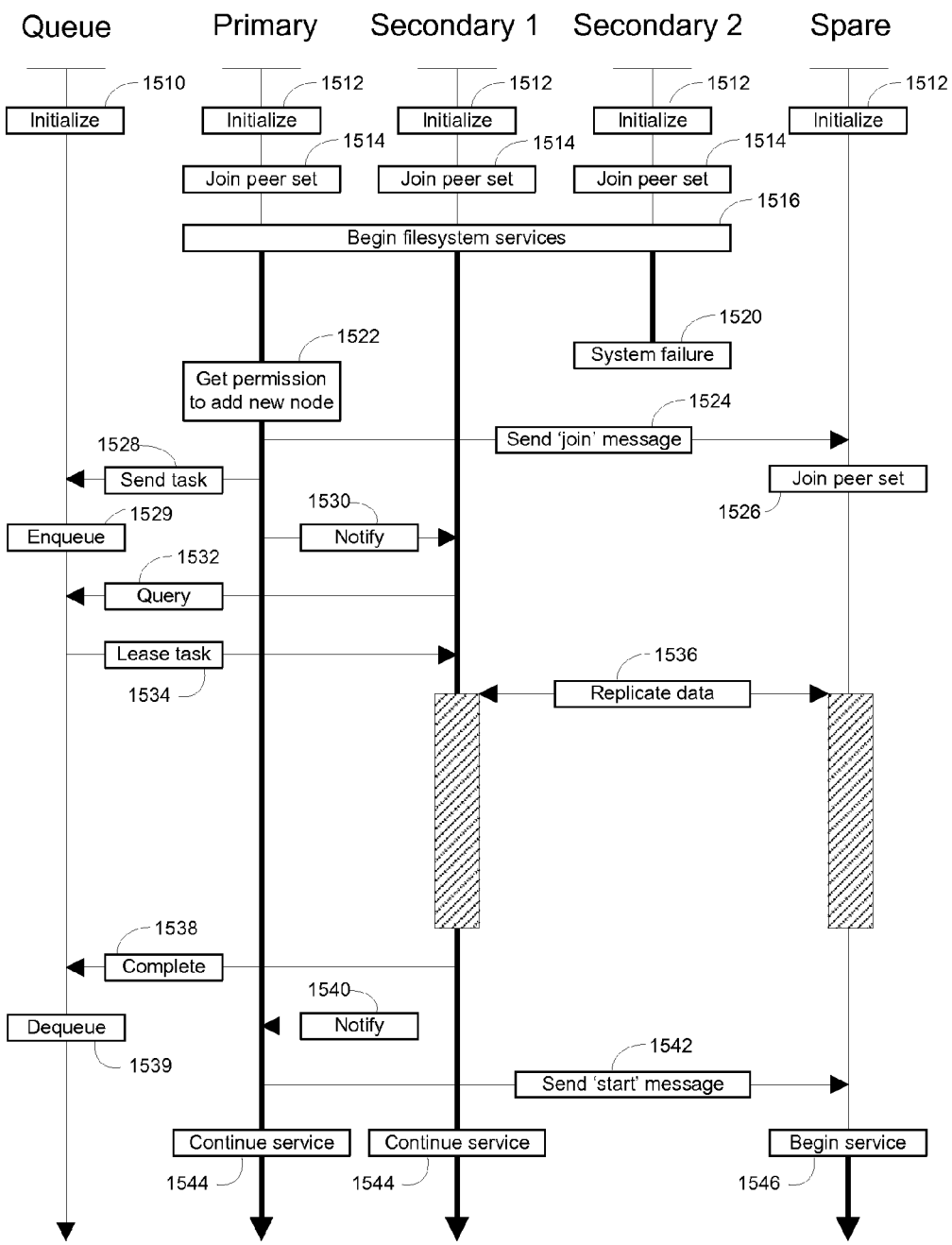
FIG. 15 is a schematic timing diagram showing relevant actions taken by, and messages passed between, peer set nodes and an asynchronous queue in accordance with an exemplary embodiment of the invention during repair of the loss of a secondary node.

FIG. 15 is a schematic timing diagram showing relevant actions taken by, and messages passed between, peer set nodes and an asynchronous queue in accordance with an exemplary embodiment of the invention during repair of the loss of a secondary node. Before a failure can occur, the storage system must be stable. A storage system administrator starts the system at the top of the timing diagram. The queuing system first initializes 1510, which may include verifying the consistency of the queue data stored throughout the storage system. Each of the servers initializes 1512, a process which may include booting an operating system, verifying network connectivity, initializing storage software or hardware, and other routine tasks. The storage system forms peer sets, and three of the nodes join 1514 the same peer set. Joining a peer set may involve sending synchronization messages and health messages between the various peers. In particular, each peer may take a lease from one or more other peers, as described below. Once the nodes have established a stable peer set, they may begin 1516 servicing filesystem requests from a storage client, as represented by the timelines of heavier weight.

At some time later, one of the secondary nodes experiences 1520 a system failure. Detection of a node failure is a critical first step in the recovery process. A storage system incurs a substantial penalty for restructuring peer sets by adding and removing nodes. Any data stored only on that node's server is lost. All storage metadata and file data that was controlled by the node must eventually be replaced, using the configured file replication policy. Selection of a replacement node, data replication, and restoration of service can be expensive operations in terms of disk I/O, network traffic, and latency.

A storage system may distinguish transient failures from permanent failures using a system of health leases, similar to the system of queue leases. The lease period may be adjusted by a storage administrator to optimize the performance of the system, based on such criteria as the mean time between server failures, the number of servers in the system, average network latency, the required system response time, and other relevant factors. Or, the lease period may be determined automatically by the storage system, using information about the dynamic performance of the system such as current system load, actual network latency, and other relevant factors.

Each primary node of a peer set may request a lease of each of the secondary nodes for a period of time. In an exemplary embodiment, each secondary node requests a lease only of the primary node. In other embodiments, each node in a peer set may request a lease of all other nodes. When the lease time is one-half expired, each node may attempt to renew its lease or leases. If all is well, the lease will be renewed will before it expires. If a lease expires before it is renewed, a lease-holder may attempt to directly contact the lease-grantor, using standard network query tools, such as ping or traceroute, or software written specially for this purpose may be employed. Such software may be of simple design, and its implementation should be clear to one having skill in the art. If a number of connection retries are unsuccessful, the lease-holder may conclude that the lease-grantor is unreachable or inoperative, and complete the first step of healing, detection. The node may then proceed to the second step: selection of a replacement node.

A replacement node is selected in process 1522. This second of four steps aims to determine a suitable replacement for a lost node. A principal concern in this step is avoiding a particular race condition. Suppose that a primary node and a secondary node are unable to contact each other due to a network outage, but both nodes are otherwise fully operational. Each node will assume that the other node has failed, and wish to select a new node to replace it. If each node succeeds, the storage system will have two peer sets that each lay claim to a third operational node. However, this situation is unacceptable, as a node may participate in only one peer set. Thus, an arbitration system may be used.

In an exemplary embodiment, each peer set has a supervising peer set, assigned in a round-robin fashion, which acts as an arbitrator during node replacement. Peer set #0 supervises peer set #1, which in turn supervises peer set #2, and so on. The last peer set added to the system supervises peer set #0. When a node determines that another node is unresponsive, it may contact a supervising peer set for permission to replace the other node, as in 1522. The primary node of the supervising peer may determine a replacement node and respond, but it may respond only to the first request it receives. Thus, a supervising peer may respond to only one of the remaining nodes in the broken peer set. This node may then become the primary for the peer set.

In the exemplary embodiment above, if the requesting node is a secondary, then the other node was a primary, and a new primary is needed. In this case, the first node to contact the supervising peer set becomes the new primary node. (All secondary nodes should make the request, as they each hold an expired lease from the primary.) If the node making the request is a primary node, then the other node was a secondary, so the new node will be a secondary. (In the exemplary embodiment, only the primary node makes the request. In other embodiments, all nodes may make the request, and a secondary may beat the primary. In this case, the primary becomes secondary to the requestor.)

In this example a secondary node failed, so the original primary remains primary. Once permission is granted, the primary node may send 1524 the new node a join message. The spare node may then join 1526 the peer set. The spare node is not yet a fully functioning member of the peer set, as it contains none of the peer set data. Thus, the primary node may send 1528 a replication task to the queue, which is then enqueued 1529. The primary node of the peer set may also increment a generation counter to alert any client or server that its membership has changed. The node may now proceed to the third step: replication.

Replication proper begins when the primary node notifies 1530 a remaining secondary node to begin replication. Although the exemplary peer set contains three nodes, other embodiments may contain more nodes, and in such embodiments the primary may select a secondary to control replication by any appropriate criteria, such as computational load. The selected secondary node may then query 1532 the queue for an appropriate task to perform. There it will find the task enqueued by the primary, and may find other tasks as well. The secondary node may then lease 1534 the synchronization task from the queue, as described in connection with FIG. 14. A lease which is not long enough may expire before synchronization completes. Thus, the node may determine the length of the lease from the size of the task. Or, the node may take only a relatively short initial lease, and renew the lease each time renewal is required to avoid lapse.

Once the node has leased the task from the queue, it may begin to synchronize 1536 the storage metadata and file data on the joining node. Replication of storage metadata and replication of file data may proceed with slight differences. Each node in an exemplary embodiment may contain a complete, mirrored, metadata repository for files controlled by its peer set. This policy requires more space than would a less redundant policy, but is better for two reasons: first, storage metadata files are small, so the difference in storage requirements is minimal; and second, this policy enables faster rebuilding of the storage metadata on a new node. When building a joining node, the primary may thus direct a secondary to copy its own metadata repository (which should be complete and up-to-date) onto the new node. This kind of delegation advantageously balances load between the primary and secondary, reducing overall system response time. In an exemplary embodiment, migration of storage metadata between nodes in a peer set is immediate, not lazy, because the joining node should have a complete metadata repository.

Requests to update storage metadata, such as a file rename operation, may be received by a node while metadata migration is ongoing. Migration may be accomplished by traversing a metadata repository recursively. The traversal may be performed depth-first or breadth-first—the only requirement is that the copying node keeps track of which metadata it has processed and which it has not. If a request for a metadata change arrives, the copying node may check to see whether it has already copied this metadata to the joining node. If not, it may simply make the change to its own metadata—it will copy the updated metadata to the joining node eventually. If it has already copied the metadata, the copying node may send the change to the joining node so the latter node may update itself.

File data, by contrast, tends to be much larger than storage metadata—kilobytes or megabytes instead of bytes. For storage efficiency, file data may be stored on less than the full complement of servers participating in a peer set. File data replication is similar to storage metadata replication, but the copying node need not always copy the file data. Only file data that was stored on the unresponsive node may need to be duplicated onto the joining node. Thus, as the active node traverses its metadata tree, it may also check whether the storage metadata indicates that the file was stored on the lost node. If so, the copying node also copies the file data to the passive node. If the copying node does not have the file data, it may make a request to another node that does. If no other node has the file data, the data may be marked lost and further client storage requests for the data will fail. Thus, to ensure availability of file data in an exemplary embodiment, the data is stored on at least two nodes, or replicated across peer sets using redundancy techniques such as RAID.

If replication fails for any reason, the queue lease for the task will expire and the task may become visible again in the queue for later retrial. Also, if the failure occurs in the secondary node, the primary node may detect this condition through its system of health leases and join another node to the peer set. Assuming no failures, after some period of time replication will be complete, and the secondary node may send 1538 a completion message to the queue. This message may instruct the queue data structures to dequeue 1539 the completed task.

Once storage metadata and file data have been copied to the joining node, the peer set enters the final stage: replacement. Until this point, the joining node has not been responding to metadata change requests or file data access requests to avoid race conditions. Instead, the other nodes have been responding to such requests. When the joining node's metadata and file data are current, the secondary node may notify 1540 the primary that it has finished replication. The primary is then free to issue 1542 a start-up message to the joining node, which then may begin 1546 to provide filesystem services. Once activated, the joining node is a full member of the peer set, and replaces the lost node in all functions. In particular, the new node may take out one or more health leases with the primary node or any of the other nodes. The two original nodes may thus continue 1544 providing filesystem services, joined now by the third node to make a complete peer set.

To facilitate replacement, nodes within the system may keep track of a generation counter for their peer set. If a client requests a peer set using an out-of-date counter, the primary node in the peer set can send a current copy of the peer set membership information to the client. Alternatively, if a client receives a file operation response from a peer set with a newer counter, the client may request a new copy of the peer set membership.

Figure 16A:
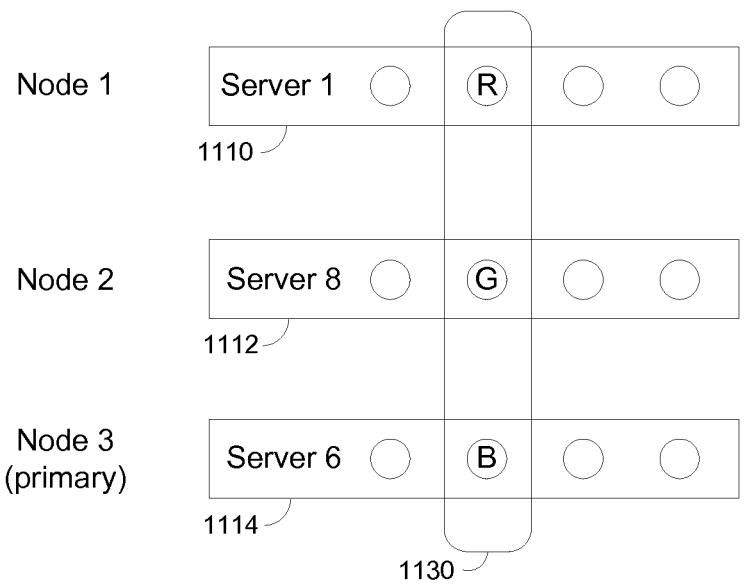
FIG. 16A and FIG. 16B show the peer set of FIG. 11 during the failure of a secondary storage node and after the peer set has been healed by the process of FIG. 15, respectively.
Figure 16B:
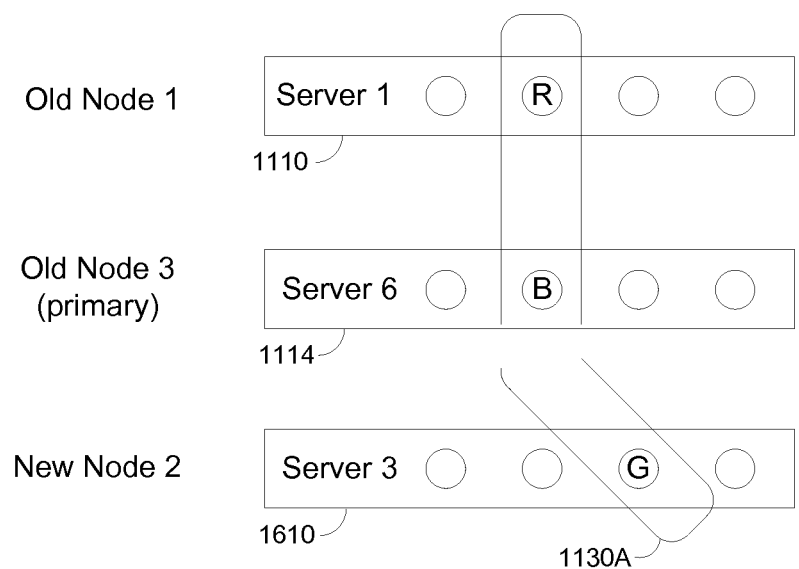

FIG. 16A and FIG. 16B show the peer set of FIG. 11 during the failure of a secondary storage node and after the peer set has been healed by the process of FIG. 15, respectively. FIG. 16A shows the same servers 1110, 1112, and 1114 and peer set 1130 as in FIG. 11. However, node 2 (server 8) has suffered an outage, indicated by shading. Once the peer set detects a failure condition, a replacement server 1610, server number 3 in FIG. 16B, is selected. This 'joining' server runs the new node 2. Any unused hard disk drive or storage volume in the new server may be controlled by the peer set. One of the old nodes copies storage metadata and file data to the new node. In an exemplary embodiment, a secondary node performs this process, to efficiently balance load between the nodes in the peer set. Once all of the data has been copied, the new node may begin responding to client file operation requests as a full member of the peer set 1130A. The new node takes the color of the node that was lost. In FIG. 16A a "green" node was lost, so in FIG. 16B the new node is colored "green."

Figure 17A:
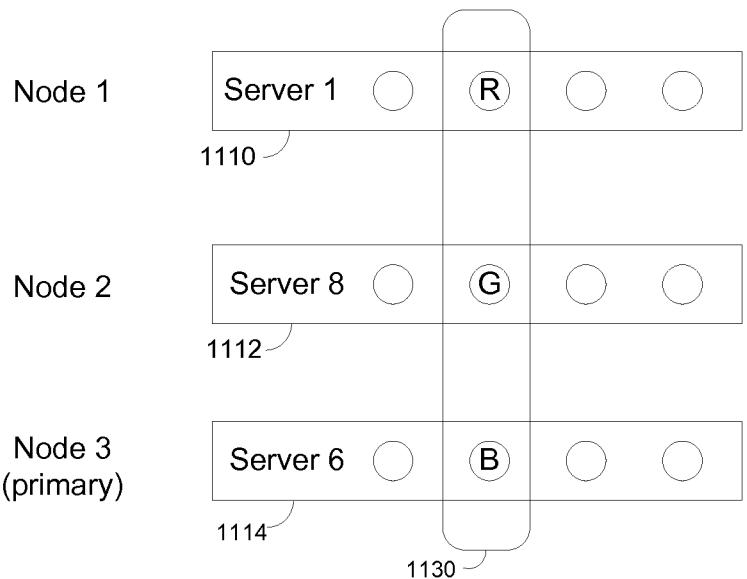
FIG. 17A and FIG. 17B show the peer set of FIG. 11 during the failure of a primary storage node and after the peer set has been healed, respectively.
Figure 17B:
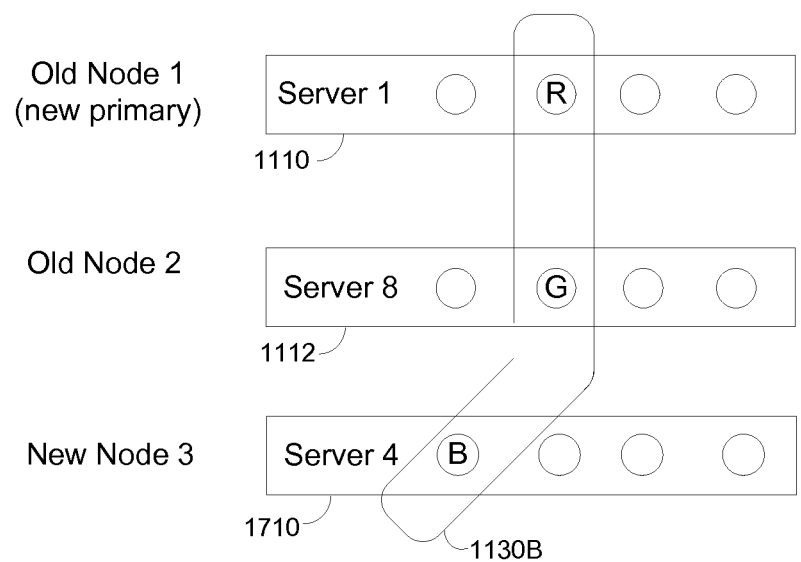

FIG. 17A and FIG. 17B show the peer set of FIG. 11 during the failure of a primary storage node and after the peer set has been healed, respectively. FIG. 17A is similar to FIG. 16A except that now the primary node on server 6 (1114) is unresponsive, as indicated by shading. The process for replacing a primary node is similar to that in FIG. 16B, except that one of the other nodes may become the new primary using the selection process described above in connection with step 1522. In FIG. 17B, the old node 1, running on server 1110, has become the new primary. A new server 1710, server number 4 of the storage system, has been added. A "blue" node was lost in this example, so the node running on new server 1410 is designated a "blue" node, as indicated. This node joins newly constituted peer set 1130B.

Exemplary Storage Scenarios

Various operations that can be performed by the above-described storage systems are now described with reference to various exemplary storage scenarios based on the exemplary storage system shown in FIG. 4B. In these scenarios, storage provider 430 is the target storage provider for the file.

FILE DATA STORED IN TARGET STORAGE PROVIDER. In this scenario, file data for the file is stored in the target storage provider. Upon receipt of a request from the FS client, the FS server 431 may return the file data or may return storage metadata listing the storage provider 430 as the storage provider that is responsible for the file data.

FILE DATA MOVED FROM TARGET TO PROVIDER 440. In this scenario, file data for the file is moved from the target storage provider to the storage provider 440. The FS server 431 maintains storage metadata indicating that the file data is stored in storage provider 440. Upon receipt of a request from the FS client, the FS server 431 returns storage metadata indicating that the storage provider 440 stores the file data. The FS client then contacts FS server 441 in storage provider 440 to access the file data.

FILE DATA MOVED FROM PROVIDER 440 TO PROVIDER 450. In this scenario, file data for the file is moved from storage provider 440 to storage provider 450, specifically by making a copy of the file data in storage provider 450. The storage metadata maintained by FS server 431 is then updated to reflect that storage provider 450 is responsible for the file data. Upon receipt of a request from the FS client, the FS server 431 returns storage metadata indicating that storage provider 450 stores the file data. The FS client then contacts FS server 451 in storage provider 450 to access the file data. The copy of file data stored in storage provider 440 may be marked for deletion.

FILE DATA REPLICATED IN MULTIPLE STORAGE PROVIDERS. In this scenario, file data is replicated in multiple storage providers (e.g., in storage providers 430 and 440; in storage providers 440 and 450; in storage providers 430 and 450; or in storage providers 430, 440, and 450, e.g., for redundancy or load balancing). The storage metadata maintained by FS server 431 includes a list of all storage providers in which the file data is stored. Upon receipt of a request from the FS client, the FS server 431 may return storage metadata that lists one or more of the storage providers in which the file data is stored. If only one storage provider is listed, then the FS client contacts the listed storage provider to access the file data; if multiple storage providers are listed, then the FS client selects one of the storage providers (e.g., randomly or according to a predefined policy) and contacts the selected storage provider to access the file data.

MODIFYING FILE DATA BY REPLACEMENT. In this scenario, file data for file version 1 is stored in storage provider 440. FS client 431 maintains storage metadata that lists storage provider 440 as the storage provider that is responsible for the file data. Upon receipt of a request from the FS client 415, the FS server 431 returns storage metadata to the FS client 415, and the FS client 415 contacts FS server 441 to access the file data with write access. While the FS client 415 holds the file data with write access, the FS server 441 permits other FS clients to access the file data, but only version 1 and only read access. In such an embodiment, the storage system does not require a complex distributed file locking scheme. The FS client 415 modifies the file data and sends modified file data to the FS server 441. The FS server 441 stores the modified file data as a separate file marked as version 2. For subsequent requests, the FS server 441 provides access to file data version 2. The file data version 1 may be marked for deletion.

MODIFYING FILE DATA BY APPENDING. In this scenario, file data for file version 1 is stored in storage provider 440. FS client 431 maintains storage metadata that lists storage provider 440 as the storage provider that is responsible for the file data. Upon receipt of a request from the FS client 415, the FS server 431 returns storage metadata to the FS client 415, and the FS client 415 contacts FS server 441 to access the file data with write access. While the FS client 415 holds the file data with write access, the FS server 441 permits other FS clients to access the file data, but only version 1 and only read access. In such an embodiment, the storage system does not require a complex distributed file locking scheme. The FS client 415 modifies the file data and sends modified file data to the FS server 441. The FS server 441 appends file data to the existing file data and marks the file data as version 2. For subsequent requests, the FS server 441 provides access to file data version 2.

ADDING STORAGE PROVIDERS. As discussed above, storage providers may be added as desired or needed. The hashing scheme described above is expandable without requiring rehashing and re-storing data across the entire namespace.

II. Description of a Specific Embodiment

The following is a description of a specific embodiment that is referred to hereinafter as MaxiFS.

1 Introduction

MaxiFS is the name of a file storage infrastructure targeted to Web 2.0 companies. MaxiFS is designed for implementing a high performance, highly resilient, indefinitely scalable File System as a pure software solution on top of a single storage pool built out of commodity 1U servers, each containing its own storage devices. The characteristics of the 1U servers in an envisioned embodiment are as follows:

1. Dual-core CPU.
2. 4 GB of RAM.
3. 4 SATA drives with the capacity of 750 GB each.
4. Dual 1 Gb/s Ethernet NICs built into the motherboard.

Systems of this nature can be purchased with a cost of goods of about $3,000.

In an exemplary embodiment, each such server node runs FreeBSD 6.2 or later (e.g., FreeBSD 7.0) and deploys an UFS2 file system. The latter has very desirable characteristics, as it supports Soft Updates [1] that give the speed of asynchronous writes for system data structures, guaranteeing at the same time that the file system transitions occur from consistent state to consistent state. Therefore, in case of a crash, access to the file system can occur almost immediately after the system reboots and it should only be necessary to garbage collect orphan disk blocks in the background. All the communications between clients of the infrastructure and the server nodes, as well as those among server nodes, occur in terms of IP networking, whether they are simple storage-oriented requests or administrative queries or commands. The following discussion often uses the terms "client" and "sever." For this discussion, the term Server (Or Server Node) identifies any of the 1U servers that are part of the file storage array while the term Client refers to a client of the file storage infrastructure. In the target market where the systems are expected to be deployed, the clients are not web clients but rather the web servers or the application servers that the customer uses. The following attributes of the MaxiFS system are among those that allow for scalability:

1. The servers that implement the infrastructure are loosely coupled, instead of being part of a clustered file system built around a Distributed Lock Manager.
2. Each server added to the system expands it in three directions: amount of storage, processing power and aggregated network bandwidth.
3. The MaxiFS software running on each of the infrastructure's clients interfaces with the infrastructure itself and interacts directly with the servers. This client component can aggregate as much bandwidth as it needs, by directly interacting with as many server nodes as is appropriate, and without additional devices in band between client and server.

Some key driving principles in the MaxiFS architecture are the following:

The system must be lightweight and the consistency scheme it supports is that of eventual consistency. This implies that it is not guaranteed that all the redundant versions of a given file are all identical, as long as: 1. All the copies will converge to an identical version in a finite and limited amount of time. 2. MaxiFS can always discriminate more up-to-date versions of a file from previous incarnations. 3. A client process will never be given access to inconsistent copies of the same file at the same time. 4. A file that is being accessed by a client in read mode, will always be available to the client until the client closes the file, even if that version of the file is replaced by a newer version.

As a result of server failures and crashes, inconsistencies may develop over time. However, the system is expected to be self-healing, by treating such inconsistencies gracefully (i.e., avoiding panics or crashes) and by logging and repairing them, as soon as it detects them.

MaxiFS implements the POSIX file system interface. Some APIs may be optimized with respect to others, in order to guarantee the best performance for applications targeting the market segment MaxiFS addresses, whereas other APIs are allowed to be inefficient, if deemed rarely used in the market segment of interest. It is also possible for APIs that are of extremely limited use to be implemented only partially, if at all when their implementation would cause a negative performance impact on the parts of the system that need to be optimized. In addition to that, the system must be self-healing. This implies that any inconsistencies detected as the system is running, should be promptly corrected by the system, without affecting the clients. The files clients create and access are stored in the file system of the individual server nodes and are replicated according to policies the customer sets up.

2 The Network Infrastructure

Although MaxiFS is designed to provide scalability and availability, proper network wiring is a prerequisite to fully achieve these capabilities. Ideally, MaxiFS would be built within its own subnet. In this subnet the two NIC interfaces available within each of the server nodes should be connected to separate switches. This increases the redundancy for each node, regardless of whether a switch or some cabling might be disrupted.

Clearly, when the switch structure is hierarchical, it would always be desirable to make sure that the NICs in the same node are attached to independent branches of the tree. The existence of two NICs in the server nodes should possibly lead to trunking them up for maximum availability. This may be in conflict with having the NICs attached to different switches. However, since the network structure for MaxiFS is part of the MaxiFS setup, appropriate detailed instructions should be provided to make sure the highest achievable levels of availability compatible with the network infrastructure are achieved.

3 The Structure of the MaxiFS Name Space

This section of the document describes the structure of the namespace MaxiFS offers to its clients, as well as the way this abstraction is implemented across multiple server nodes. The MaxiFS infrastructure creates a global namespace distributed across all the servers that compose the infrastructure. This namespace has a global root. The MaxiFS clients use the MaxiFS software to "mount" the root directory (or directories) of the trees of interest in the MaxiFS namespace.

The mount operation is a key operation in that it accomplishes the following: It establishes the connection between a client and the MaxiFS infrastructure. Note that this is done by using the name assigned to the infrastructure, so that it is possible for the same client to access multiple MaxiFS infrastructures and the associated namespaces. It also fetches all the relevant information the client needs to operate within the infrastructure. This way the client learns where to address the requests for files stored within the infrastructure.

Users of the infrastructure need not be restricted to exporting only the global root. They should have the flexibility to export whatever subtree of the name space they want to export. Essentially the only constraint MaxiFS imposes in this regard is that any MaxiFS client should not mount locally any two exported directories, when one of them is an ancestor of the other (i.e., if the intersection of the two trees is not null).

Figure 18:
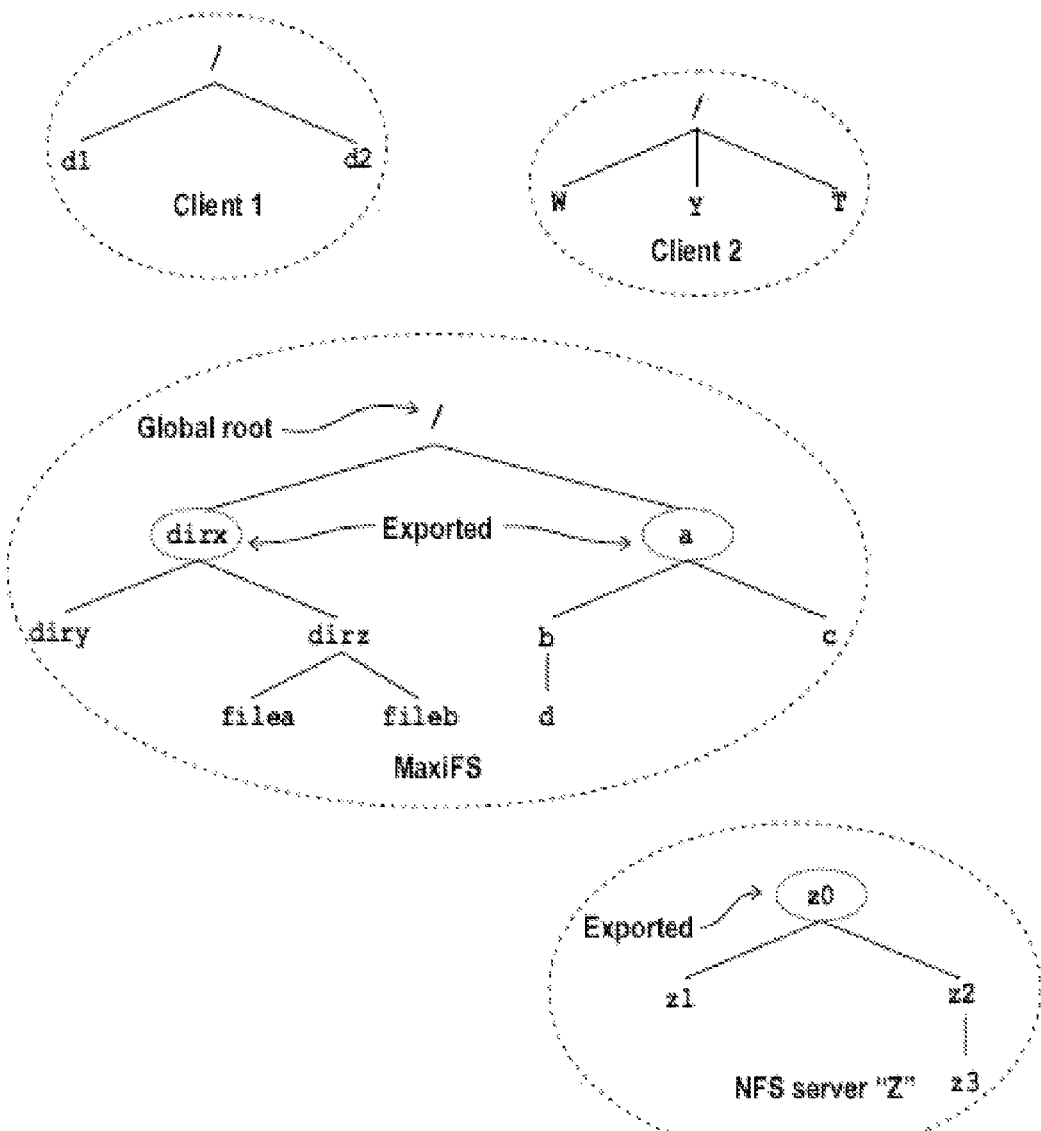
FIG. 18 is a schematic diagram showing a representation of an exemplary namespace of two clients and two servers in accordance with an exemplary embodiment of the present invention.

FIG. 18 shows an example in which there are two clients, a MaxiFS infrastructure and an NFS server. The MaxiFS infrastructure exports directories "dirx" and "a" to its clients. NFS server "Z" exports directory "z0" to its clients.

Figure 19:
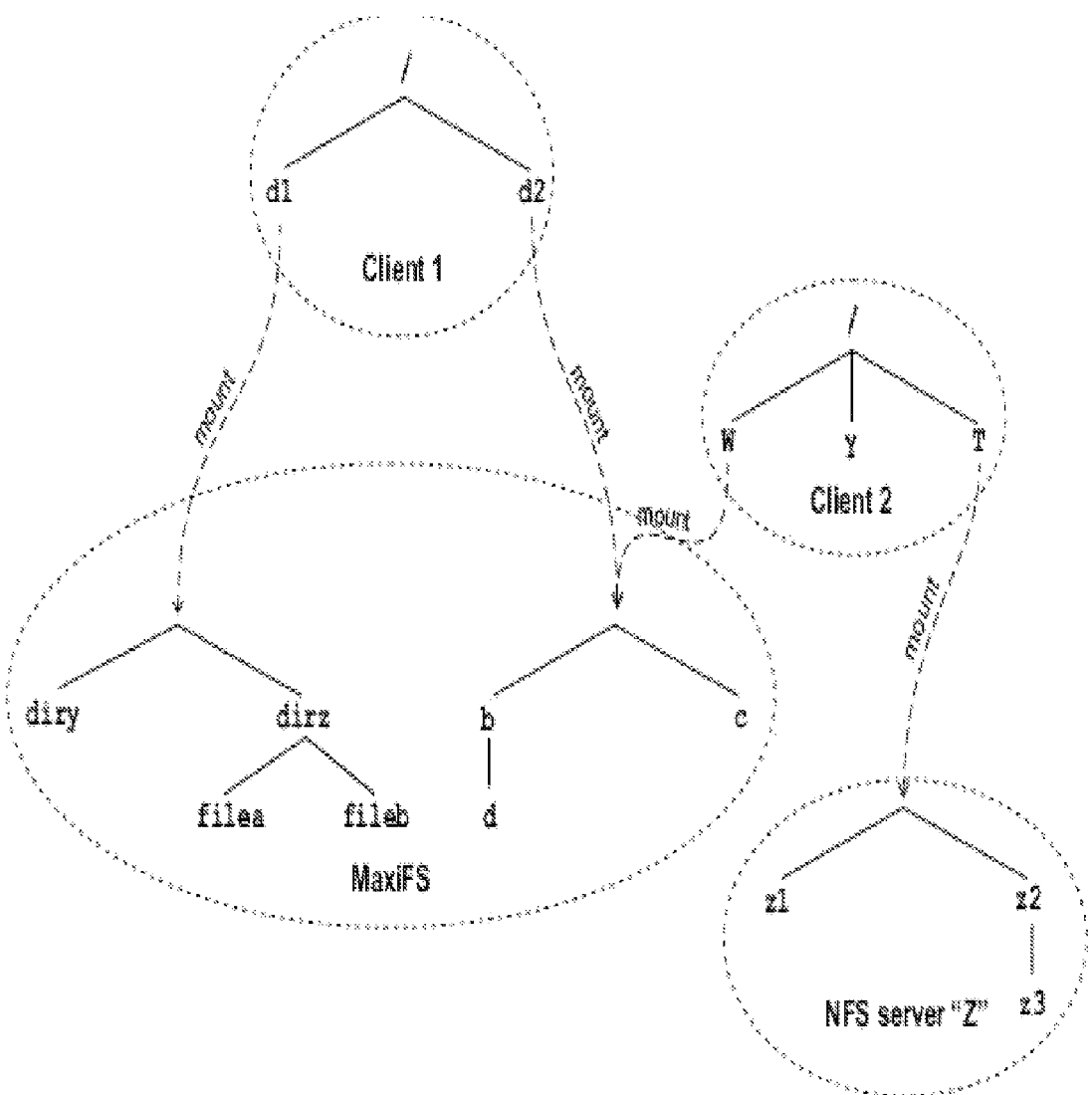
FIG. 19 is a schematic diagram showing a representation of clients mounting exported directories in to their respective namespaces in accordance with an exemplary embodiment of the present invention.

FIG. 19 shows what happens when Client 1 "mounts" directory "dirx" and directory "a" exported by the MaxiFS infrastructure to its own directories "/d1" and "/d2", respectively. The directories "/d1" and "/d2" are known as "client mount points". After the mount operation, Client 1 sees the entire original file system hierarchy under the exported "dirx" logically accessible as the content of directory "/d1". Likewise, the hierarchy underneath exported directory "a" appears beneath "/d2". Therefore, the pathname "/d1/dirz/fileb" refers to the "fileb" in the MaxiFS infrastructure, in a totally transparent fashion. Similar considerations hold for file "/d2/b/d".

In FIG. 19, Client 2 mounts the exported "a" directory from the MaxiScale infrastructure, along with exported directory "z0" from the NFS server "Z", under its own directories "/W" and "IT", respectively. The result of the mounts in this case is that "/W/b/d" within Client 2's file system refers to the same file as "/d2/b/d" for Client 1, while "/T/z2/z3" refers to file "z3" on the NFS server.

Note the following: Clients can selectively mount only the directories they want to access, as long as they do not overlap in the global name space. The ability to mount directories exported by MaxiFS does not preclude access to other file servers installed before MaxiFS, such as the NFS server "Z", in this example. The mount operations performed with respect to MaxiFS and the NFS server are carried out through different software modules the clients run.

From the point of view of an application running on one of the clients, once the appropriate mounts have been performed, access to files in the MaxiFS infrastructure, rather than on an NFS server, is absolutely transparent. In other words, the application need not be written in a special way, nor does it require the invocation of special APIs. It continues to access the remote files through the file system, as it would in NFS. The appropriate MaxiFS software layers to be used to access MaxiFS are automatically involved every time the pathname the application specifies is beyond the client mount point associated with a directory exported by MaxiFS, much as this happens for NFS exported directories.

Whereas in the case of an NFS server, clients know how to interact with the server to mount its exported directories, in the case of a distributed infrastructure like MaxiFS, it is harder to see how a client would go about requesting exported directories to be mounted. To simplify the picture, assume for the time being that all the servers in the MaxiFS pool have 100% availability. This is clearly untrue, but the constraint will be removed in the further discussion.

Figure 20:
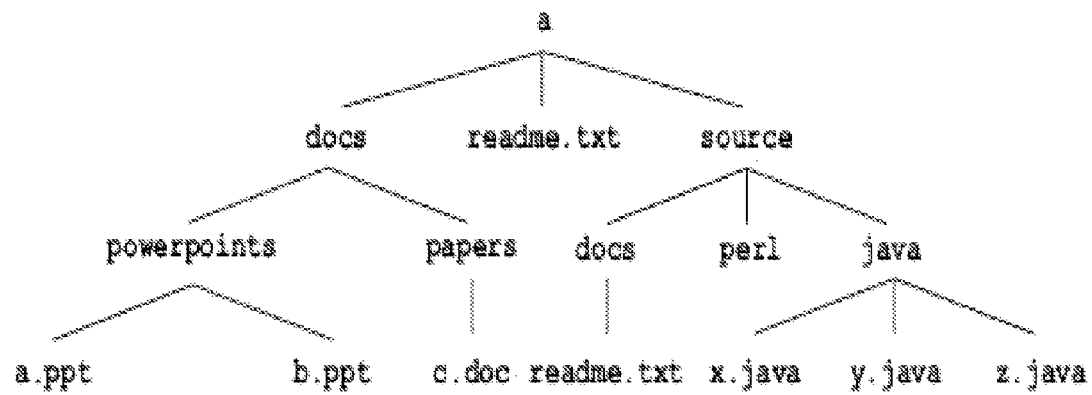
FIG. 20 is a schematic diagram showing a representation of an exemplary hierarchical namespace in accordance with an exemplary embodiment of the present invention.

The following describes a solution chosen to distribute the namespace across the server nodes, using the name space in FIG. 20 to illustrate the proposed scheme. MaxiFS distributes the file system hierarchy across the server nodes by hashing directory pathnames. This could be done by hashing pathnames below a client's mount point to a particular server, which would store the corresponding file system object. Such a scheme has the benefit that the resolution of a pathname to a server name can occur in constant time regardless of the number of servers that implement the namespace and of the depth of the pathname. A disadvantage is that any rename of an intermediate directory in a pathname would produce a different hash value, would imply the need to rehash all the children (direct or indirect) and to move them to the locations associated with the new hash codes. Thus it would be an extremely disruptive operation, involving a large amount of network traffic.

It is interesting to consider the fact that in Amazon S3 (Amazon S3 targets a market segment similar to the one addressed by MaxiFS, although its functionality is available in the form of a service, rather than as a product), objects are completely immutable (even in terms of name) and their hierarchy is constrained to two levels. This completely circumvents the problem for a hashing scheme. Something similar occurs for GoogleFS, where files are identified by immutable numeric IDs for the same reasons. It is a fact that in the particular market sector MaxiFS targets, efficient handling of rename operations is not a requirement. Nevertheless, even if this is the case, given that MaxiFS supports the POSIX semantics, it is at least desirable that a rename operation be non-disruptive for the entire system. Therefore, a hashing scheme should have the following characteristics:

1. It should distribute files and directories uniformly across all the servers.

2. When a directory is renamed, it should avoid the need for all files and directories that are direct or indirect children of the directory being renamed to be moved to new locations, on the basis of rehashed pathnames, as this would suddenly cause major bursts of system activity and would totally disrupt the system performance clients perceive.

3. It should avoid rehashing and moving entire file system trees when the number of servers in the system changes.

Item 1 above can be dealt with by relying on a suitable choice of a hashing algorithm and should be fairly straightforward. Item 2 is harder to fix, when the pathname of a file or directory is used to generate a hash. Item 3 is also hard to tackle in the context of a hashing scheme. Given a hash table in which each hash bucket is mapped to a peer set, once hashes are computed, the server node to be used for each file or directory is fixed. If the number of nodes changes (and the size of the hash table changes accordingly) the mappings between files/directories and nodes change as well. As for item 2 above, this would require files and directories to be all moved to implement the new mappings. The two subsections that follow tackle the latter two problems.

3.1 Hashing and Renames

This section deals with item 2 above. The problem to solve consists of finding a way to avoid the redistribution of files and directories mapped to server nodes when their pathnames change. A few issues to be considered are:

a) The first concern is that of avoiding the need to relocate lots of files, because this would absorb most of the bandwidth and computing resources of the server nodes for a purpose that strictly relates to internal MaxiFS bookkeeping and would be perceived by the customer as having little to do with performing useful work. Therefore, all this work preferably should be eliminated. The most destructive case to be considered is the one in which a top level directory name changes. This would affect the entire file system hierarchy beneath it. This means that lower parts of the hierarchy should, as much as possible, not depend on the pathname of their parent directory.

b) It is desirable that whatever scheme is used, the enumeration of a directory should not be an extremely expensive operation. A pure hashing scheme based on pathnames would make directory enumeration extremely inefficient.

c) Having to move a file just because its name changes is, once again, very undesirable. Although renaming files and directories is not going to be an extremely common activity, it is necessary to make sure that relatively more common actions should have less impact than more unlikely ones. So, since the rename of a file is more likely than a directory rename, this case should be optimized with respect to a directory rename.

If the hashing, instead of being performed on the entire pathname, is performed just on the name of the file or directory, the hash value obtained would be independent of the rest of the pathname. This makes file system objects distributed across the server nodes insensitive to what happens as a consequence of renames of their parent or ancestor directories and would eliminate the main concern (item a above).

However, this would create problems with item b. Files that would be otherwise contained in a single directory would be scattered all over the distributed system. This would make a directory enumeration an extremely inefficient operation.

It would also create problems with item c because renaming a file would likely cause it to be moved elsewhere. A better alternative relies on hashing only the names (not the entire pathnames) of directories. This would mean that all the files that clients see as children of the same directory, would also be stored within a single directory on the same server where the directory resides.

The implications are the following: The enumeration of a directory would still be efficient because each directory would still contain all of its children. This solves any issues with item b. Since any time the name of a file is changed, this only amount to a name change within the same directory, this also solves any problem with item c.

A consequence of this approach is that since directories are always placed on the basis of their hash code, a subdirectory is generally not stored with the directory that is its parent in the global name space: it is normally allocated elsewhere (even when it is stored on the same server node). Yet, in order to continue to satisfy item b, at least a placeholder for the directory within its parent would have to exist. This placeholder (that would have the name of the directory it represents) would point to the location where the actual directory is placed.

For the time being, we ignore the hash function to be used and the way the hashing produces a mapping to a server. This will be discussed in more detail in the following subsection. We then examine this scheme in more detail.

A further consideration has to do with how the directories whose hash code is mapped to a given server should be stored within that server. It is certainly neither convenient, nor possible to simply store all the hashed directories within the same parent directory. The reason for this is two-fold: this would create humongous directories, with an extremely high number of subdirectories and this would have an impact on the speed of access to any child directory, and the likelihood of name collisions would increase.

Because of the above, one could think to proceed in a different way: each directory hashed to a given server would be stored within a subdirectory whose name is based on the hashing of the entire pathname of the parent (In reality the hashing would generate a number that can be represented as a hexadecimal string. The latter, instead of being used as a directory name, could be broken down into fixed length segments that would constitute the actual directory hierarchy to go through to reach the target directory. This approach, if implemented on two or more levels, significantly reduces the number of items in the parent directory.). This allows better partitioning of the namespace. This has the implication that the hashed directory is not completely free from the hierarchy it belongs to and therefore renames of intermediate directories in a pathname still have some impact. However, in this case, when the rename of an intermediate directory occurs, directories need not be moved from one server to another one because the server where they reside is only determined by the directory's name.

However, all the (direct or indirect) children of the directory being renamed must end up in a different directory on the same server, on the basis of hash code for the new pathname. This requires a recursive scan of all the children of the directory being renamed. Special care must be used to make sure that the overall client view of the directory being renamed and of all its children remains consistent while this operation is in progress.

The renaming of the directories proposed above is clearly not as disruptive as a relocation of entire directories across the distributed system. Nevertheless, it may cause a couple of negative side effects. Depending on the structure of the namespace, the necessary readjustments might still require a significant amount of time, as they entail recursively scanning the entire subtree of the directory being renamed so that the hashes of the directory pathnames can be updated. This adjustment is local to each server, in other words, it only involves the renaming of directories within the same server, but not the moving of files. Nevertheless the activity potentially affects all of the servers and may have to be performed sequentially. And while the rehashing and renaming takes place, client requests involving pathnames that contain the directory being renamed have to be deferred until the adjustment is complete.

In this scheme one problem has been properly addressed so far: two directories with the same name and different pathnames hash to the same value and therefore to the same server. Hence both directories should appear in the same parent directory on the server. This is impossible to do because the directory names are identical. A strategy to handle such name collisions needs to be devised.

Possible collision handling strategies could consist of creating a single directory with the colliding name, prefixed by a character that would be unlikely as the first character in the name of a directory, such as a blank (This "special" character should be properly handled, by allowing an escape sequence to be used in the unlikely case that a user names a directory using the special character in its first position.). At this point this "collision directory" would contain the colliding directories that would be stored with a different name and with additional information that allows discriminating between them (for example, storing the number of components and the string length of the pathname). However, as discussed below, even this scheme does not fully solve the problem. The real issue depends on the fact that the name collision strategy chosen needs to cope with the following constraints:

1. As stated earlier, when a client tries to access a file or a directory, the only piece of information it provides to the system is the pathname of the object it intends to act upon.

2. To disambiguate between two file system objects within the namespace on the basis of information coming from the client, the only possibility is using the absolute pathnames of the file system objects.

3. It is desirable for the hashing scheme to hash as little as the pathname as possible, because this restricts the scope of a readjustment of hashes after a directory rename.

Since the hashing entails just a directory name, the name collisions would potentially increase with respect to the case in which the hash applies to larger portions of a pathname. Therefore, each directory should store somewhere its absolute pathname to handle name collisions. This makes the hashing of just a portion of the pathname not very advantageous because, even if the readjustment would involve only the direct children of the directory being renamed, the pathnames stored with all the direct and indirect children of the directory being renamed would have to be updated. So, we would back to the initial hashing strategy and to its drawbacks.

Because the only effective way to disambiguate file system objects through client-provided information is through absolute pathnames, it is possible to envision a variant of the scheme described so far in which directories are still hashed to server nodes on the basis of their name and in which the actual pathname within the server node where the directory is stored is the absolute pathname of the directory.

The scheme still retains the property that a directory rename only causes the renamed directory and the files in it (as it will be explained, the move of the files is not as disruptive as it may sound, because the files to be moved are metadata files, generally much smaller than regular files) to be moved around, without affecting its child directories. Therefore a directory rename is not disruptive for the whole system.

There are no longer name collisions because within each server, the directories are reachable through their absolute pathnames in the hierarchy. So there is no need for a separate repository for pathnames for each directory to deal with name collisions.

A directory rename requires at most a single directory on each server to be renamed, to reflect the new hierarchy and this can be done locally within each server and in parallel across all the servers, thus minimizing the time interval over which operations under that directory need to be deferred.

However, all servers must be informed of a directory rename and many of them may have to perform the rename, depending on the relative position of the directory in namespace.

A significant part of the namespace is replicated in all the servers. Although files are stored only in the node where the directory is hashed, directories have replicas.

When a pathname branch that does not exist in a server needs to be created, this may entail the creation of a number of intermediate placeholder directories.

The access to a directory within a server node may no longer be an operation that involves a very short local hierarchy, depending on the position of the directory in the hierarchy.

Nevertheless, this last scheme satisfies all the requirements. Its most negative aspects are the first two in the list above. However, since the rename to all the servers can be performed in parallel across all of them, the time disruption can be kept to a minimum. This has to be coordinated by a single entity (the most likely candidate for this is the node where the directory is hashed).

The propagation of a directory rename needs be neither instantaneous, nor atomic across all the peer sets. In practice, if a file needs to be accessed within the directory that is the object of the rename, only the owner peer set needs to deal with such a request. That peer set is aware of the rename and can operate consistently. Any other pathname operation in the subtree below the directory being renamed and hosted on other peer sets can be safely performed whether the directory had the old or the new name. If an operation is requested to a peer set that has not received the change, everything behaves as the latter request had been performed before the rename was issued, otherwise, the requested operation would occur as if the rename had been received before the new request. The propagation of the change to the other peer sets is handled as follows:

1. The peer set to which the original rename is requested performs the rename.

2. When the rename is completed, the peer set that is now hosting the directory sends a rename request to all the peer sets that host the directories immediately below the directory originally being renamed.

3. This is performed recursively for all the directories below.

This has some positive attributes. The change propagates with the parallelism implied by the average fan-out of the directory being originally renamed and would insure a fairly rapid propagation because this would happen with a speed proportional to the logarithm of the average number of sub-directories per directory. Also, this would also insure that a directory would be notified only if its parent is already aware of the change.

Another aspect (the partial replication of the namespace) has one main implication in the storage space that would be "wasted" in doing this. However, replicating a directory means using one i-node per directory and a variable number of disk block that depends on the size of the directory. Since the "placeholder" directories do not have to store files, but only other directory names, the amount of storage used is likely to be a small portion of the storage available. Moreover, each node shares its storage space in a volume between user data files and the structure of the namespace. The former can be reduced by migrating user data files. The latter can be reduced by increasing the number of nodes that are part of the system and by migrating directories according to new hashes. To clarify the mechanism, it is worthwhile to go through an example.

Figure 21:
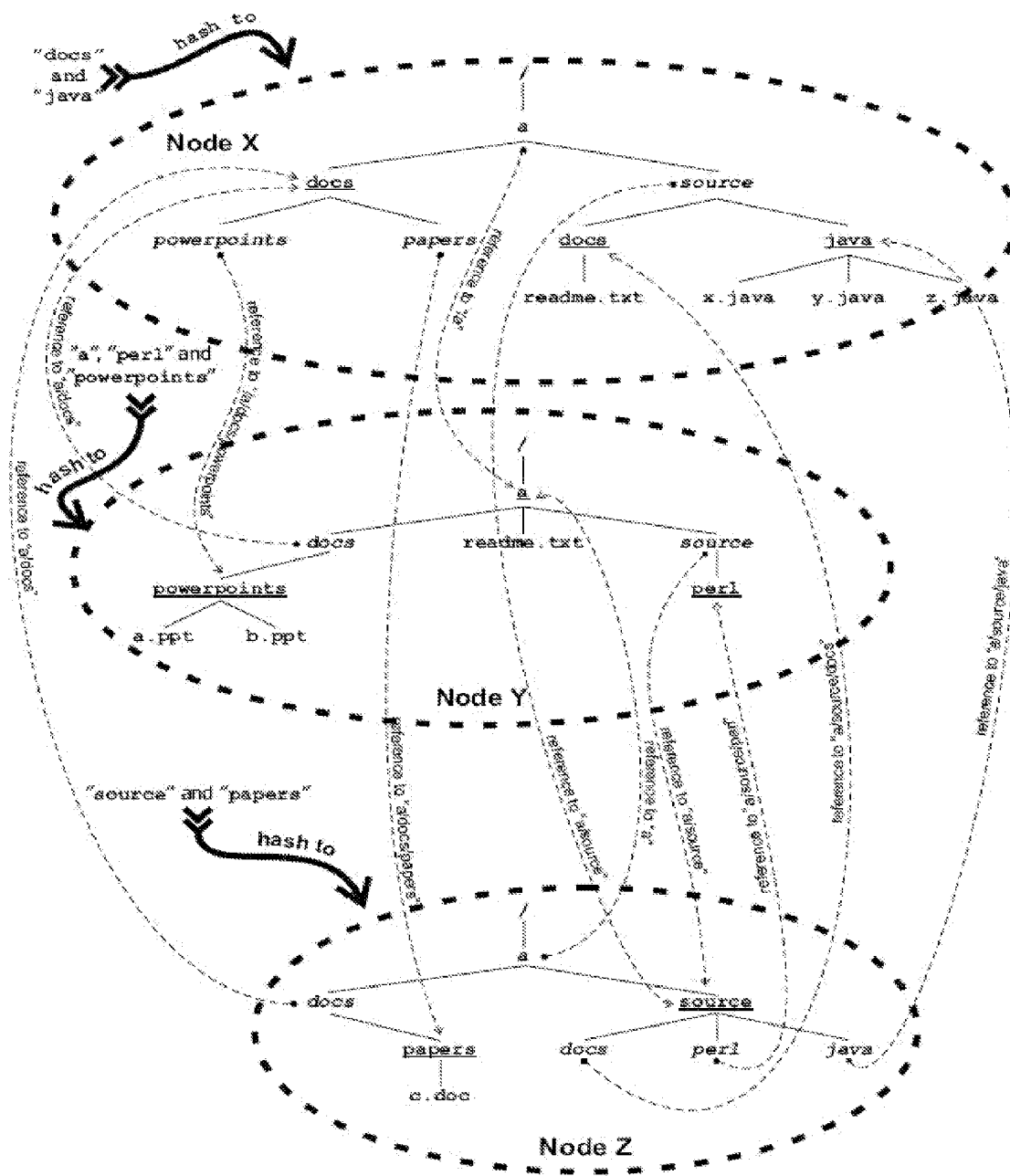
FIG. 21 is a schematic diagram showing a representation of the namespace of FIG. 20 implemented using a hashing approach in accordance with an exemplary embodiment of the present invention.

FIG. 21 shows how the hierarchy in FIG. 20 can be distributed across three server nodes ("X", "Y" and "Z") using the latest scheme described. In order to understand the figure, the following should be kept in mind: The thick arrows labeled "hash to" indicate that a hash function is applied to the names of the directories listed above them and that this maps the names to the specified servers. The thick, broken ellipses include the hierarchy each server implements. Note that this hierarchy is similar to the hierarchy clients see (FIG. 20), although some items in it are missing. The underlined names (i.e., in Node X, "docs," "docs," and "java" are underlined; in Node Y, "a," "powerpoints" and "perl" are underlined; in Node Z, "papers" and "source" are underlined) are those of the directories stored within their host servers. The names shown with an italic font (i.e., in Node X, "a," "powerpoints," "papers," and "source" are in italic font; in Node Y, "docs" and "source" are in italic font; in Node Z, "a," "docs," "docs," "perl," and "java" are in italic font) are directory placeholders (these are real directories in each server, but their role is that of placeholders for the actual directories, to allow the underlying portions of the file system to be stored with their pathnames.). They never contain files because the files are stored in the copy of the directory kept on the node the directory hashes to. As such, they can be seen as references to the real directories they represent. These references are shown as broken arrows that are labeled with the name of and point to their target directories.

Assume a client has mounted MaxiFS at the mount point "/mnt/shared" and requests the opening of file "/mnt/shared/a/source/java/y.java". The sequence of steps to be performed is the following:

1. First of all, the MaxiFS module running in the client performing the request would be requested to perform an open with the pathname beyond the mount point, in this case: "a/source/java/y.java".

2. The first thing the client module should do is hashing the name of the parent directory for the leaf node in the pathname. This would be: h("java"). Assume that (according to the figure), this produces a mapping to server node X.

3. The next step for the client module is to talk to node X, asking for access to "/a/source/java/y.java". The server node would then perform the local file system tree traversal to get to "/a/source/java" and the subsequent lookup and open of "y.java".

This exemplifies how the scheme shown here allows fast access to files by avoiding multiple network hops or lookups.

Also look at a case in which a client requests a directory to be renamed. Assume that the client requests the rename of "a/docs/powerpoints" into "a/docs/presentations" and that whereas "powerpoints" hashes to Node Y, "presentations" hashes to Node Z. The sequence of steps to be performed would be the following:

1. The MaxiFS module running in the client performing the request would issue the request: "rename("a/docs/powerpoints", "a/docs/presentations")".

2. The client would then hash the source directory to its target node Y.

3. The client then would request Node Y to perform the rename (and relocation) to Node Z.

4. Node Y would relocate the directory and the underlying files to Z and would issue a parallel request for all the nodes to update the name of the directory.

5. At the end of this, the client request would be acknowledged.

Figure 22:
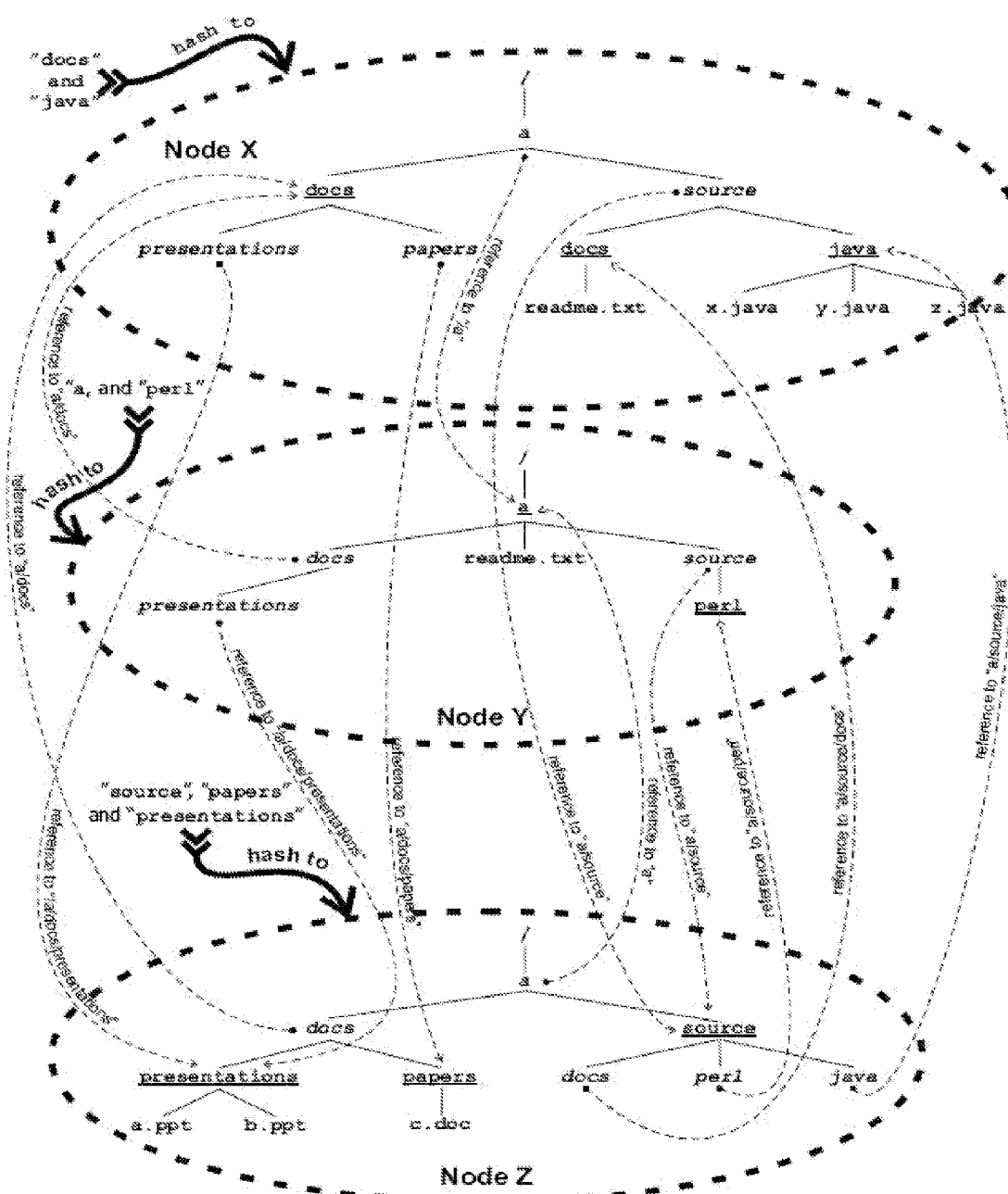
FIG. 22 is a schematic diagram showing a representation of the namespace of FIG. 21 after renaming of a directory in accordance with an exemplary embodiment of the present invention.

The resulting state of the file system is then the one shown in FIG. 22 (in Node X, "docs," "docs," and "java" are underlined while "a," "presentations," "papers," and "source" are in italic font; in Node Y, "a" and "perl" are underlined while "docs," "presentations," and "source" are in italic font; in Node Z, "presentations," "papers," and "source" are underlined while "a," "docs," "docs," "perl," and "java" are in italic font). In principle the directory placeholders "docs" and "presentations" are no longer needed. However, since they are already in place, they do no harm and can simplify the creation of additional branches under them if that is needed sometime later. Also note that the files previously under "powerpoints" are now under "presentations" on node Z.

One thing that needs to be emphasized is the fact that the relocation of a directory and of the underlying files per se should not require a large amount of bandwidth because, as will be seen in the following, the files are not the real data files but small metadata files that point to them.

Note that in case a client requested that a given directory be opened, as in the case of a directory enumeration, the client should hash the directory name, rather than that of its parent. For example when "a/source/java" is opened, "java", rather than "source" should be hashed. However, for a directory like "java" that appears as the leaf of the requested pathname, this would be a two-step process. In this case, the parent directory would be hashed and the client would access the appropriate server node to open it. The server, knowing that the item being opened is a directory, would know that the server to be used would be the one where "java" resides and would return an error indication to the client that would cause the latter to repeat the previous step using the proper node. The extra access is undesirable. Yet, compared to an NFS access that requires a round-trip interaction for every component of the pathname, this way of operating is by far more streamlined and efficient.

3.2 Hashing and Dynamic Scaling

This section deals with item 3 above and is meant to add more details on the hashing scheme to be used. The scheme is straightforward and can be described as follows: Given M server nodes, a hash table is constructed with a number of entries T, M<=T. Each of the table entries stores a pointer to the server node associated with that entry. A suitable function is chosen to provide a uniform distribution of hash values over the file names. If such function is f( ), then the hash value for string s will be computed as: h(s)=f(s)mod T. The computed value h(s) will be used as the index of the hash table entry that points to the server to be used for string s.

The difficulty with this approach is that, in a system like MaxiFS, the number of servers can and should grow dynamically. So, if the number of servers grows beyond T, a new, larger table must be created and its entries must be initialized again to point to server nodes. However, in general, this might require all the directories to be moved on the basis of their new hash values, which is considered to be unacceptable for MaxiFS.

Thus, in MaxiFS, a dynamically scalable hashing scheme is used to get around this limitation. Assume that T is constrained to be a power of 2. Also assume that h is the hash value obtained for a given file or directory name. In general, any such number can be expressed as: $h=q \cdot 2^n+r$. Hence:

$$h \bmod 2^n = (q \cdot 2^n + r) \bmod 2^n = r$$

It can be shown that there is a consistent relationship between the value of $h \bmod 2^n$ and the value of $h \bmod 2^{n+1}$. There are two cases to be considered: one for an even value of q and another one for an odd value. For q even:

$$h \bmod 2^{n+1} = (q \cdot 2^n + r) \bmod 2^{n+1}$$
$$= (q/2 \cdot 2^{n+1} + r) \bmod 2^{n+1} =$$
$$= (q/2 \cdot 2^{n+1}) \bmod 2^{n+1} + r \bmod 2^{n+1}$$
$$= r \bmod 2^{n+1}$$
$$= r$$

$h \bmod 2^{n+1} = r$, for $q$ even

For q odd:

$$h \bmod 2^{n+1} = (q \cdot 2^n + r) \bmod 2^{n+1}$$
$$= ((q-1) \cdot 2^n + 2^n + r) \bmod 2^{n+1} =$$
$$= ((q-1)/2 \cdot 2^{n+1} + 2^n + r) \bmod 2^{n+1}$$
$$= ((q-1)/2 \cdot 2^{n+1}) \bmod 2^{n+1} + (2^n + r) \bmod 2^{n+1} =$$
$$= (2^n + r) \bmod 2^{n+1} = 2^n + r$$

$h \bmod 2^{n+1} = 2^n + r$, for $q$ odd

Therefore:

$h \bmod 2^{n+1} = h \bmod 2^n$ (for $q$ even)

$h \bmod 2^{n+1} + 2^n$ (for $q$ odd)

Using these relationships, the hash table can be dynamically expanded by doubling the size of the hash table and copying the first half of the hash table to the newly created second half of the table (assuming the size of the hash table is a power of 2 and that the hash table is expanded by doubling its size).

Therefore, assuming that one starts out with 3 servers and a hash table with 4 entries, the situation could be depicted as in FIG. 23 (Phase I). Note that since there are 3 servers and 4 slots, the last slot points to Server A, just as the first slot.

If we imagine that we need to increase the number of servers to 5, the original hash table would no longer be adequate. So, the next possible size for the hash table is 8. To create a situation that does not change anything with respect to the original mapping, the second half of the expanded table should have the same content as the first half (see Phase II in FIG. 23). Note that Server A now appears in 4 of the table slots, whereas the other servers appear only twice.

The following step is that of including the new servers (D and E) into the picture. This can happen by replacing them in slots 4 and 7 with these new servers (see Phase III in FIG. 23). However, this cannot stop at this point, otherwise all the names that were hashed to slots 4 and 7 would no longer be found.

So, whereas Phase II is totally benign, in that it has no unwanted side effects, Phase III must be completed by other actions to still map the same namespace.

The additional actions to be performed include migrating all the directories previously on Server A that were mapped to entry number 4 of the table to server D. Likewise, all the directories on Server A whose names were mapped to entry 7, would have to be moved to Server E. The algorithm to be followed would amount to processing each of the directories on Server A, checking their hash value, so as to verify which slot of the hash table it would point to. Whenever slots 4 or 7 would be the target entries, the corresponding directory would have to migrate to the proper server. Since it would be highly impractical to suspend operations while all the directories are being migrated, both the old and the new server are stored in the slot being affected. This way, during the migration any access would look at the new server first and would then resort to the old one in the cases when the target is not found.

The updates to the hash tables would have to be propagated across the entire infrastructure because each client of the infrastructure needs one such table. By allowing the table entry to co-host both the old and the new server within the table slot being changed, clients would have the option to look up the item in which they are interested in both locations before concluding that the item does not exist. This reduces the time it takes to replace a table entry with respect to the case in which case one had to wait for an update of the entire infrastructure before allowing new requests to go through. When such an update is needed, the infrastructure should be aware of it. However, the nodes that must be aware first are the node being replaced and the replacing node. This way, the first time a client tries to access the old node, as the migration is occurring, or after it has occurred, the client is told to replace its table with the new one that co-hosts the old and the new node in the affected slot. For this reason it is useful to add a generation number for the table being used. The client will store the generation number of the table in all of its requests, so when one of the two servers involved in the update is accessed, it will notice that the table is not up to date and will tell the client to use the new table. A further increase in the generation number is needed when the migration is complete. This will replace the two co-hosted entries in the slot being modified with the ID of the new server. The system will take care of serializing such changes so that only a change at a time will be allowed. This does not mean that a change should only involve a single slot. However, independent changes will be serialized by blocking a new one, until the previous one is complete. In any case, there is no need to update the table of a client until the time when it tries to access one of the servers corresponding to slots that have been changed. Moreover, it is not necessary for all the clients to receive all of the updates since it is sufficient for them to be updated with the latest version in a lazy fashion, even skipping intermediate ones, as long as they have no need to access entries that have been changed. To optimize the table sharing by minimizing the amount of information exchanged, it may even be desirable to have all the servers and all the clients share a common algorithm and to push only the minimal information necessary to the clients to locally update their table.

If the number of hash buckets in a table is much larger than the number of servers in the system, this data structure lends itself to a very elegant way to balance the computational/network load and capacity across servers. As shown in FIG. 23, several hash buckets within the same table may reference the same server. If the number of such buckets is much larger than the number of servers, each server will appear in many buckets and only a relatively small subset of directories a given server owns will be hashed to a given bucket. This allows the system to monitor the number of references to each such bucket. The total count per server can also be computed as the sum of the counts of the buckets that are associated to each server, so that the servers that are referenced most often can be spotted very easily. Once this is done, it is possible to look at the individual buckets for the servers that are heavily loaded and it is possible to decide to move directories associated to a given bucket to servers less loaded, having the bucket point to a less loaded server. This achieves the purpose.

Note the following: The use of the "MapReduce" distributed algorithm [6] that can compute the most heavily used servers is beneficial, as it performs the computation in a distributed fashion. The system should make sure that the move of directories has some hysteresis, so that MaxiFS does not waste cycles continuously moving directories back and forth. The actual move of directories should never affect the count of the most used servers, otherwise all the statistics would be inaccurate.

So far hash tables are assumed to have a number of entries that is a power of 2. Constraining a hash table's size to powers of 2 is considered to be suboptimal. It is a well known fact that when a hash table contains a number of buckets that is a prime number and the hash value is computed modulo that number, this produces the best distribution among the slots. Nevertheless, it must be kept in mind that unlike normal hash tables, the hash tables used to implement the distributed namespace do not contain pointers to a linked list of colliding items. They contain references to servers. As explained, it is convenient for the number of servers in use to be much smaller than the size of a table; therefore, as in the case of FIG. 23, some servers would appear in the table more than once. By replacing items in the table, when necessary, through some appropriate algorithm, the suboptimal distribution of items through the table induced by the table size would be counterbalanced.

The scheme described so far is quite flexible. However, in its present form, it does not allow directories mapping to the same hash bucket to be distributed across server nodes. Also, cases in which the storage space in a given server node is exhausted can only be dealt with by trying to change the content of individual table entries, so that they can map different servers. However, since a mechanism already exists to handle transitions from a server to another one as directories are migrated and this consists of allowing clients to access both the server a directory is being moved away from and the server that is the target of the move, the same mechanism could be used in case of storage overflow. In other words, if directory X currently on server A cannot host any more files, a backup server B can be designated so that one or more directories can be moved to B without having to move all the directories that would hash to a given table entry. In any case, directories are never allowed to be split across different servers. They are entirely on one server or on another one.

This way, if a client is unable to access a directory that should be on A through the hash bucket to which the directory hashes (such hash bucket would now list both the primary server A and the backup server B), it could always look up the directory not found on server B. This works well only if the backup servers are used for extreme cases in which little else is available until the infrastructure is expanded by adding more server nodes. Otherwise, the impact on performance could become noticeable. Nevertheless, even an impact on performance resulting in graceful degradation is much more desirable than outright outages.

3.3 Servers and Volumes

Server nodes in MaxiFS have 4 physical drives available (see above). It would be possible to aggregate them together into a single logical volume via RAID-5. This has a couple of positive aspects: The boundary between physical volumes is removed, which allows using the logical volume obtained this way as a single storage pool. The logical volume has built-in redundancy and is resilient to the loss of one disk drive.

On the other hand, it also has some disadvantages: The redundancy needed for the RAID-5 set effectively removes ¼ of the total storage available. The loss of two drives would make the entire server unavailable, whereas if the volumes were managed individually, only the loss of four drives would make the server completely unavailable.

Note that the redundancy internal to one server obtained via RAID-5 would not eliminate the need for redundancy across servers because if the CPU, the power supply or any other single point of failure ceases functioning, the data stored on the redundant logical drive is not accessible anyhow. Therefore it is more convenient for MaxiFS to make use of the individual drives, rather than of a single RAID-5 drive.

3.4 Redundancy in MaxiFS

The previous sections only describe how the MaxiFS namespace is structured, and provide a logical view of how the data can be accessed.

One important fact about the expected access patterns to MaxiFS is that all files are handled as essentially immutable (the single exception is that of files used as logs that cannot be modified, except by appending new records). In other words, a file can be created and written to. However, when a file exists, it will never be partially updated. It will be either deleted or replaced completely. This is the way Web 2.0 applications work and the limitation greatly simplifies the complexity of MaxiFS. The previous sections rest on the idea that the server nodes are 100% available. This is clearly not the case. The following explains how redundancy is factored into the picture. MaxiFS is a distributed file system built by aggregating the local file systems of multiple servers. In principle, once it is possible to distribute the namespace across multiple nodes the way that has been described in the previous section, it could be possible to have the file themselves contain the user data. However, the problem MaxiFS solves is that of building availability and scalability through redundancy and of doing so with a level of redundancy that can be set depending on the nature of the file, of the frequency with which it is accessed, and so on. This makes it impossible for a file to exist in a single location and MaxiFS has to make sure that the loss of even multiple nodes would not bring the system to a grinding halt. This is even more important as the individual MaxiFS nodes are low cost, commodity servers, with no intrinsic hardware redundancy.

So, MaxiFS must necessarily rely on additional data structures that describe where redundant copies of a file are kept. In normal file systems the data structures needed to support the file abstraction are file system metadata. In MaxiFS, it is necessary to store MaxiFS metadata in addition to the metadata of the native file system (the latter is the responsibility of the file system local to each node). Because MaxiFS is built on top of the local file system, this metadata can only be kept in a file (There is actually a slightly better approach that will be described ahead. However, this does not change the essence of the present discussion).

This means that two options arise: The metadata could be stored with the file itself, in a special MaxiFS area adjacent to the user data. The metadata could be stored in a file that points to the actual file(s) where the user data is stored. Therefore, the client view of a file stored within MaxiFS is different from reality, in that the file containing the data, when multiple mirrors exist, must also contain "pointers" to the locations where the additional mirrors are kept.

All this is realized by means of the Remote File Access Service, active on each server node. Its purpose is two-fold: It supports the ability to read or write the user data. It also identifies where, in the distributed infrastructure, a file or directory resides, allowing a client to access it. The service makes use of the local file system hierarchy on each server, in order to implement the MaxiFS hierarchy (as explained in "The Structure of the MaxiFS Name Space"). This means that any directory visible to clients is a directory that exists as such in the hierarchy of a local file system on at least one server. Any user-visible file is represented by a metadata file with the same name that contains metadata of use to MaxiFS (this includes the locations of the data files the metadata file is associated with and other relevant attributes) along with (in most cases) file data.

So, in MaxiFS the individual client-perceived directories contain files with the client-perceived names. These files certainly contain MaxiFS metadata (pointers to where the copy or copies of the user data is stored and more). To achieve the appropriate levels of availability, the file system hierarchy, the MaxiFS metadata and the user data need to be replicated. The file system hierarchy and the metadata are replicated by making sure that a fixed and predefined number of copies exist. However, the level of redundancy of the user data is supposed to be chosen by the end users of the system.

This allows the following possibilities: Some files may not be replicated at all. This makes sense for files that can be easily rebuilt, such as temporary files. Some files may have a fixed degree of replication, for example, mirroring by 3. Some files may have a minimum level of replication and a dynamic replication scheme so that the number of copies is increased or decreased on the basis of demand. This is useful especially for streaming media files that, by being replicated multiple times can be more readily accessible by more users, taking advantage of the additional processing power and network bandwidth that each server keeping a copy can add.

Therefore, whereas the number of replicas for the file system hierarchy and the metadata files is fixed, individual files may have a number of replicas that is below the replication factor used for the MaxiFS metadata, equal to it and even higher than it. In principle, metadata files could be allowed to include user data, the consequences would be that: In the case in which the replication factor for a file is lower than the standard number of replicas for the metadata, some of the metadata files will only contain the metadata, but not the user data. When the replication factor for metadata files and user files is the same, all metadata file may contain user data. And when the replication factor for user data is higher than that for the metadata files, there will be additional files that store the user data. This implies that in addition to the portions of the local file systems where the file system hierarchy and the MaxiFS metadata are kept, other areas need to exist, where copies of files beyond the replication factor of the metadata can be stored.

If, however, metadata files are not allowed to contain user data, then the metadata portion of the name space is completely decoupled from the handling of the copies of the user data. The latter is the model that is followed in MaxiFS. This suggests that any server should have its local file system structured in terms of a hierarchy/MetaData Repository and of a Data Repository that are independent of each other. In the following they will be identified as MDR and DR, respectively.

3.4.1 Server Nodes and Peer Sets

The requests MaxiFS clients send to the MaxiFS servers have the following purposes:
1. Lookup of file and directory names.
2. Directory enumeration.
3. Setting and retrieval of file and directory attributes and protections.
4. Creation and deletion of files, directories and symbolic links.
5. File reads and writes.

All such requests start out with the identification of the file system object of interest and this is done through a pathname. So, all such requests stem from some pathname request. Pathname requests are mapped to operations performed on the MDR of some server node. The discussion on the structure of the namespace has been conducted in the previous sections, assuming individual servers implementing portions of the namespace. This is fine to illustrate the overall architecture and the concepts it is based on. However, in order for MaxiFS to be highly available, its services must remain available in the presence of server crashes and failures. Therefore, the functionality must be made redundant through the use of mirror nodes. This is particularly important for the MDR, as it constitutes the repository that implements the file system hierarchy. Therefore the loss of a portion of the MDR implies that some portions of the namespace would be no longer accessible and is not acceptable.

In MaxiFS, servers that replicate the same MDR are said to be members of the peer set that implements that MDR. Thus the basic building blocks of MaxiFS become peer sets, rather than individual server nodes and all the considerations related to the implementation of the distributed namespace (see above) need now be reinterpreted by replacing the notion of a server node with that of a peer set. The number of nodes that are members of a peer set ("cardinality of the peer set") is a key attribute of such sets. The trade-off is between having fewer members (that simplifies the management of the set and reduces the interactions among the members) and having more members (that increases the redundancy of the metadata peer sets support). Even if one assumes the very low reliability figure of 0.99 for an individual node, using 2-way redundancy, the resulting reliability for a peer set would be 0.9999. For 3-way redundancy, the reliability goes up to 0.999999. This is enough to satisfy the most demanding enterprise-level requirements. So, replicating the MDR (and the associated peer set membership) by 3 is certainly desirable and, although this need not be a strict requirement, MaxiFS uses 3 as the cardinality of peer sets for the distributed file system namespace and the associated metadata.

3.4.1.1 Nature of a Peer Set

One important decision taken has to do with whether peer sets members should be individual servers or <server, volume> pairs or <server, subtree> pairs, such that each subtree is a subset of an entire volume. Whichever of the previous choices is made, the three members of given peer sets must manage independent storage resources, otherwise the high redundancy peer sets need to accomplish would be lost. We now examine the above alternatives.

If members of a peer set are entire servers, there is a significant reduction in complexity and bookkeeping and all the resources on the member are dedicated to the peer set the server belongs to. The number of peers sets would be lower and with it the number of multicast addresses (or virtual IP addresses) to be assigned to them. However, peer set members in this case could simultaneously belong to one and only one set. This is clearly a disadvantage in that it makes it more difficult to make use of some servers, unless the number of servers is appropriate.

In case a finer granularity is chosen for peer set members (<server, volume>, or even <server, directory subtree>), then the same server, as long as it is associated with different volumes or subtrees, could simultaneously belong to more than one peer set. This requires more bookkeeping, but has the advantage that a smaller number of servers can constitute a useful redundant configuration and that if a drive should become unavailable the situation would be easier to manage with respect to one in which a peer set should transition to a form of degraded behavior.

To explain how the two cases above have implications on the efficacy of additional servers, assume that each server has four drives and that there are 3 servers available in total. With the first scheme, only a single peer set can be constructed. In the same situation, using to the second scheme, with <server, volume> pairs as peer set members, it is possible to create 4 peer sets, across which the namespace can be distributed. So, despite a bit of additional complexity, the second scheme allows the construction of a more flexible framework and a better distribution of the namespace across all the servers. It could be argued that a possible choice could be that of adopting the second mode as long as the system is made of few servers, whereas the first mode could be used when a certain threshold in node count is passed. However this would lead to further complexity and therefore is not a convenient path to take.

In general, given the nature of the servers used in MaxiFS (see above) that have M disk drives each and given the choice of having 3 members in each peer set, using set members defined as server/volume pairs, the number of peer sets p that can be generated out of N servers is:

$$\left\lfloor \frac{N \cdot M}{3} \right\rfloor$$

With respect to the case of 2 members per peer set, having 3 members has the slight drawback that for all the server/volume pairs to be used, the product of the number of servers by the number of drives per server should be divisible by 3. When this is not the case, one or even two server/volume combinations that could be potential peer set members cannot carry out this role.

However, this does not mean that such "spares" would be unused because they can always host user data, even if they do not store metadata. Moreover, they can be kept in stand-by, ready to replace server/volume pairs that go offline. Volumes peer set members associate with the peer sets to which they belong are very similar in structure and contain an MDR whose structure essentially identical for all set members.

This concept could be generalized by allowing multiple MDRs to coexist within the same physical volume. This could be useful because without it, if a node could only be associated to a peer set on the basis of a volume, essentially each node could at most be member of 4 peer sets (the number of disk drives). Allowing multiple "logical volumes" to co-exist within the same drive (the system takes care of avoiding that members of the same peer set are implemented on the same node), even if each node already has 4 memberships and in case another node fails, it is still possible to reassign the role of the failed node to one of the healthy nodes.

3.4.1.2 Member Recovery and Replacement in Peer Sets

The possibility that a member of a peer set may crash or become unreachable is far from remote, especially considering that the servers MaxiFS runs on are inexpensive. As such they do not provide hardware redundancy of any sort. The idea is that when a server node dies or some of its vital components fail, the server must be replaced, but this must not affect the operation of MaxiFS. There could be various reasons why the member of a peer set may cease to function properly. These include hardware breakage, software faults and network outages. MaxiFS must be able to deal with such events making sure the reductions in data redundancy may only last for a very limited time, to prevent resources from becoming inaccessible. So, the steps necessary to properly deal with such issues are the following:

Detection.

MaxiFS must be able to realize that a system is no longer available, so that appropriate actions can be taken. The difficulty here is in reliably detecting that a node is down, because premature replacement of a node impacts the costs caused by the amount of load and network traffic needed to reconstruct the missing redundancy (when it had no need to be reconstructed in the first place, because the diagnosis was premature and inaccurate). This implies that the choice of the time period after which a node is considered lost must minimize the likelihood of having performed useless work and the temporal window over which the data redundancy is reduced.

Selection.

Once a system is no longer a member of a peer set, it is necessary to select a new node that will take over the role of the lost member. The node should not be overloaded already and, possibly, very similar to the remaining peer set member, in terms of performance and capabilities. The remaining peer set member should perform the selection as soon as it is authorized to do so by the peer set supervisor.

Replication.

This phase entails the selected node to synchronize the metadata with the surviving member of the peer set. This phase is complex and critical. The entire MDR managed by the peer set must be replicated on the candidate member. Since the MDR is limited to containing only the MaxiFS metadata (no user data), the quantity of information to be copied would not be massive. On the other hand, this is very much a metadata driven activity and therefore it will involve a fair amount of I/O operations.

Replacement.

Once the data replication is complete, the new member of the peer set should start operating as a full member of the set.

The above sequence is necessary once it is clear that a member of a peer set is unavailable. However, before reaching that conclusion, it is possible to attempt simpler recovery strategies, such as a restart of the MaxiFS subsystem running on the server. If this is unsuccessful, the server could be rebooted. Nevertheless, it would be worthwhile to proceed with the sequence previously described, as soon as possible, to avoid reducing the redundancy for a significant amount of time.

3.4.1.3 Peer Set Identity

Each server node that joins the infrastructure is assigned a unique and permanent ID. Also, each peer set, when created, is assigned an ID that is unique for that peer set and is not changed even if the members of the set change (This peer set ID could be associated with a multi-cast address for the peer set (if multi-casting is used), or it might be a virtual IP address that is assigned to the primary set member and migrates with the primary role. The unique peer set ID could also be used as the least significant portion of the multi-cast (or virtual) IP address). The namespaces of node IDs and peer set IDs are disjoint. Also, for each set another peer set is designated as its supervisor. Its role will be clarified below. The algorithm used to choose a supervisor peer set is simple. If there are N peer sets in the system, the supervisor of set i is set i−1. Set 0 has set N−1 as its supervisor. This implies that a single peer set is not admissible for a MaxiFS system to function: at least two are needed. When a peer set is established, a counter is initialized to zero. This number is called the peer set generation counter. Members of the same set always have to have the same generation counter and embed it within any message they send to clients or to other server nodes. This way, clients are capable of detecting whether the information they have on the peer set is stale and can request updates. One out of the 3 members of a peer set is identified as the primary member. The others are secondary members. The primary member is the authoritative node, meaning that its state and MDR are always the reference point for the entire peer set. Members of a set perform a sort of heartbeating, so that it is always known whether they are all reachable. Rather than pure heartbeating, as in traditional clusters, the mechanism in place is lease-based. This is only marginally different from many traditional heartbeat implementations, except for the fact that cluster heartbeating is normally performed over redundant connections some of which are dedicated to this function. The primary member of the set requests a lease of the secondary members. The secondary members only request a lease to the primary, but not to each other. After half of the lease time has expired, any member has to renew its lease. If this does not happen within the lease period, the member that does not receive the lease requests tries to query its peer directly. If a number of retries are unsuccessful, the member concludes that its peer is down or unreachable.

When the latter occurs, the peer set is in a degraded state and its original cardinality must be reestablished, by adding a new member. Typically a situation of this nature, if due to hardware failure of a node or to loss of connectivity, may cause the same problem to occur in all the peer sets to which the node belongs.

In case connectivity issues (if a hardware fault is involved that takes down a node, there would be just one or two subsets of the original peer set), it may well happen that a peer set breaks into two or even three subsets (in the first case one subset would contain two members and the other only one, whereas in the second case, each subset would contain just one member). Any subset may then try to add new members to the peer set. To avoid races, a member that has detected the loss of a peer requests its supervisor peer set for permission to delete the unavailable member of the set and to add another one. The supervisor peer set will authorize only one of the subsets to delete its peer node from the peer set and to replace it with another one. The fastest subset to reach the supervisor (the slower node may in fact have crashed and restarted) wins. The act of authorizing the winning member to elect a new peer, also allows it to bump the peer set's generation counter. From that point on any packets the other former members of the peer set send to servers or to clients are labeled with an old generation counter and this allows the detection of stale servers. The new primary is aware of the existence of another secondary member and updates it with the new status (including its new role and the new generation number). At this point the peer set enjoys full membership, but needs to reconstruct the set cardinality by updating the new set member with the MDR associated with the peer set. When this is completed, heartbeating fully resumes and the set is no longer degraded. A server that could no longer communicate with the peer may have crashed or disconnected. Whether it could communicate with the supervisor set and saw its request to be the new primary denied, or whether it was totally unable to communicate with its supervisor, it should consider itself free and available to join another peer set needing a new member. In any case, it should not delete its prior MDR until the time when it joins another set. In case the member authorized to become the primary, used to be a secondary member, it may be true that the previous primary became unavailable. The other possibility is that the other secondary disappeared. In the former case, the ex-primary node now changes its role to that of secondary member.

3.4.1.4 The "Color" Property of Peer Set Members

Independently of the primary and secondary roles in a peer set, each member of a peer set is also assigned a color property. It can assume three values: Red, Green or Blue. The color is totally unrelated with the primary or secondary role in the peer set. Its value is assigned when a member joins a peer set and never changes, even if for members that transition from the primary role to a secondary one, or vice-versa. The color property loses its value when a node leaves a peer set. Also, when a new member replaces a previous peer set member, it receives the color of the member it replaces.

The purpose of the color attribute is that of allowing the partitioning of tasks to be carried out only by one or two of the members of the peer set, in such a way that the tasks can be assigned by hashing to a color. For example, when a file needs to be created in a single copy, depending on the file name, the file might be stored only within the peer set member that has the color to which the file name is hashed. Likewise, in reading there would be no need to have the members of the peer set interact to verify which member should serve the file because this would be determined by the hashing of the name to the appropriate color. Likewise, specific node management tasks could always be carried out by the node with a given color.

3.4.1.5 Interactions between Clients and Peer Sets

Interactions between the clients and the peer sets can be implemented in one of two ways: A) By relying on multi-casting and assigning a permanent multi-cast address to each peer set. B) By assigning a virtual IP address to the primary node of a peer set. This IP address would have to migrate with the role of peer set primary member. The first option is attractive in that it simplifies the protocol and greatly simplifies the process of having one IP address tied to a peer set. For multi-casting, new members of the set should merely join the multi-cast group associated to the peer set and members leaving the group should disassociate themselves. Whereas, if the second option is adopted, making sure that the virtual IP address for the set is bound to the new primary member must rely on the clear indication that the old primary is definitely out of business.

Also, multi-casting greatly reduces the message traffic between clients and servers by leaving the replication of the packets to the appropriate nodes in the network infrastructure. On the other hand, multi-casting may have impact on the customer's network or may be perceived as a potential source of additional and unwanted traffic. The MaxiFS design relies on the multi-casting based scheme. In addition to the advantages outlined above, the negative aspect of multi-casting (the reliance on packet replication by network switches) is not very limiting as the replication would only occur within the MaxiFS infrastructure and not between clients and the infrastructure. The range of multi-cast addresses can be chosen, so as to avoid unwanted interactions with the customer's network infrastructure. Effectively each peer set will be associated to a multi-cast address and members of the peer set will join or leave the multi-cast group associated to a peer set at the time they join or leave the peer set. Given the one-to-one mapping of peer sets onto multi-cast addresses, effectively clients only need to interact with the infrastructure in terms of multi-cast addresses. So, client requests will never be addressed to one server, but rather to a peer set. Note that within a peer set, the members need to have a closer level of integration and must be aware of each other's identity and IP address, in order to properly coordinate the activities peer sets are asked to carry out.

Non-destructive operations (the expression destructive operation is used to identify any operation that alters the state of the namespace or the content of a file) requested to a peer set can be distributed among all the members. This allows the members to share the load. In order to allow the distribution of such requests in a way that is fair among all the peer set members, either the primary member of the set needs to pre-allocate tokens to set members so that each member knows which requests it should deal with, or an appropriate algorithm should be defined that obtains the same effect. This is much more effective than having the set members negotiate to decide who should handle each request. When destructive operations come into play, they need to make sure the evolution of the state of the members of the peer set occurs in lockstep, so that it would be impossible to obtain different outcomes as the result of a request, depending on the node the client is interacting with. Very often applications tend to use files as semaphores. This reliance on the atomicity of pathname operations emphasizes the need for all the destructive pathname operations to always operate consistently across all the members of a set.

One possible option to allow destructive operations to be performed in lockstep among all the members of a peer sets is explicitly managing the redundancy, by creating a service layer that insures that the servers mirroring one another are always in sync. This entails a "logical" form of mirroring, in that it is necessary and sufficient to replicate only what is needed to make sure that the client view is consistent between members of groups of servers that work together.

A disadvantage of this approach is in the fact that this scheme is very much dependent on the MaxiFS architecture, so it is an ad hoc design that has to be implemented from scratch. The fact that the scheme is specific for the MaxiFS architecture is also an advantage because this provides a logical view of the world, rather than a physical one. Therefore it can minimize the amount of information that has to be transferred and streamlines the server interactions. Since it is based on a logical view, it better accommodates physical differences in the servers (such differences would undoubtedly develop in any system, due to the gradual replacement of servers over time).

Another option is using mechanisms of automatic block replication in which the actual disk writes to a node can be forwarded automatically to other nodes to keep them in sync. This scheme operates on a physical level and is available in standard packages for Linux and other Operating Systems (for example, see NBD (http://nbd.sourceforge.net/), DR:BD (http://www.drbd.org/start.html) and DoubleTake (http://www.doubletake.com/)).

Here a major advantage consists of the fact that this software is available off-the-shelf and needs no special adaptation. This approach requires the configurations of the servers involved to be very well matched, if not identical. Sector-by-sector replication may have to replicate data structures inessential with respect to the client view. This may require more bandwidth and processing than in the other case. Packages based on this type of scheme require a traditional clustering infrastructure, in which it is possible to detect the state of the other members of the cluster via redundant network connections, at least one of which needs to be dedicated to this function.

The second scheme may in fact be overkill, because it would probably require the transfer of much more information than it is strictly needed, thus causing waste of network bandwidth. Therefore, MaxiFS uses the first scheme. As a general criterion, it is desirable to let the MaxiFS clients perform as much work as possible, with respect to the server nodes, for all matters in which they have direct knowledge. This has two positive effects. It allows the entity that is most knowledgeable about a given issue to exercise the appropriate decisions in cases in which the server nodes might have to resort to generic behavior. And it reduces the amount of load on the server nodes.

When a client requests a peer set to perform a destructive operation, the primary member of the set coordinates the actions to be performed with its peers by receiving their acknowledgments for any operation the client requests. It also manages the retries and the error recovery, in case one or both secondary members of the set are unable to successfully complete. Finally, the primary is only member of the set that sends an acknowledgement packet back to the client. There are other cases in which the server nodes are the ones that should perform the necessary actions because they might be the best informed entities. All the actions that relate to resynchronization of a peer set and the like fall into this class.

An appropriate System Management service exists to perform the resynchronization of the file systems of the secondary members (or of their subsets) with the primary (see below). Since the system cannot be expected to remain idle while the resynchronization is in progress, it should still be possible to perform destructive operations in the peer set being regenerated, at least within the portion of the hierarchy that has been resynchronized. This is relatively easy to do if the active peer keeps track of where in the tree the resynchronization is occurring.

The algorithm works as follows: the peer set member (active member, which can be any member of the set that is in charge of the reconstruction and it need not be the primary member) that is replicating its MDR to another joining member (passive member) performs a recursive traversal of the MDR tree to be replicated and copies the items it scans one at a time. As it processes files and directories, it keeps track of where it is in the tree. Whenever a it receives a client request to change any portion of the MDR, the active member checks whether the request relates to an item that is part of the portion of the tree already processed. If it is, the request is forwarded to the member being updated. If it is not, the update is only performed to the member's MDR because the updated version will be replicated when the scan reaches that item. The active member need not be the primary. In fact, it is convenient that this is avoided, to avoid overburdening the primary.

3.4.2 The MDR and the Structure of Metadata Files

An MDR is always associated to a peer set, in the sense that all the members of a peer set are expected to have identical MDRs at all times that should always evolve in lockstep. When this is not the case, it is an inconsistency that must be repaired immediately.

An MDR only exists in those server/volume pairs that are members of a peer set. However, it is conceivable to have multiple MDRs to coexist within the same volume. This could be useful because without it, if a node could only be associated to a peer set on the basis of a volume, each node could at most be member of 4 peer sets (the number of disk drives). Allowing multiple peer sets to co-exist within the same volume (the system takes care of avoiding that members of the same peer set are implemented on the same node), even if each node already has 4 memberships, in case another node fails, it is still possible to reassign the role to one of the healthy nodes. Metadata files hosted within MDRs are used to describe where the data associated to a file is stored within an infrastructure. Such files could just contain metadata or could contain user data, as well. However, since MaxiFS can have a variable number of mirrors per file across the entire infrastructure, even if user data is stored in the metadata files, there is the need for separate mirrors when their number exceeds the cardinality of the peer set.

Therefore two options exist: to store user data in metadata files, until the peer set cardinality is exceeded, and to always store files separately from the metadata. An advantage of the first option is that, especially for small files, once the metadata file is opened, the client could read the user data, instead of having to open a separate data file. On the other hand, two aspects suffer: more complexity needs to be built into the product, to cope with two separate cases and the process of copying a portion of the file system hierarchy to another node is more expensive in time and complexity. The second alternative seems far more attractive for the reasons discussed. Thus, metadata files will merely be descriptors of where the actual user data is stored.

When a file is created, its metadata file is hosted by the peer set that also hosts the parent directory. If the file has multiple mirrors, the mirrors can be hosted on other peer sets as well. The latter peer sets, however only store the file, but not its metadata. In a sense, the first peer set is the one that owns the file.

A second aspect to be discussed is whether it should be possible to stripe files across multiple nodes. The advantage here would be that of allowing the most effective use of space. The disadvantage is the resulting complexity. Because of the latter, at least in the first release of the product the striping of files across nodes will not be supported, although the architecture is open to this evolution.

Metadata files contain two kinds of information. First is a generation number for the metadata file. This starts at 0 when the file is created and is increased by 1 for every time the content of the metadata file is changed. The reason for this is that of allowing the verification of the consistency of the metadata files across the members of a peer set. Second is a list of <peer set ID, file name> pairs that identify where copies of the file are kept. The file name identifies the way to reference the file in the DR of each of the peer sets where a copy of the data file is stored.

The first peer set listed in the metadata file is always the one that owns the file, in the sense described above. The actual name of the data file need not be correlated to the name of the metadata file. The latter is the name by which clients of the infrastructure know the file. The former is the name used to access the file within the appropriate member(s) of the specified peer set. A consistent naming scheme throughout the infrastructure is necessary to make sure that file names are unique, so that moving a file from one peer set to another does not entail the risk of name collisions.

Thus the name can be made of two components: First is a unique per-file ID expressed as a hexadecimal string. This ID could be made of a portion that relates to the peer set where the file is created initially and by a counter incremented each time a new file is created within the peer set. The peer set ID component of the name is only to partition the unique ID space to avoid that the same name may be generated at the same time on different peer sets. However, once the file is created, it can migrate to any peer set, if need be, without having to change that portion of its name. The second component is a generation number that starts at 0 when the file is initially created and is bumped every time the file is rewritten. The generation number must be returned to the client for any transaction that involves the file (see below for details).

The full pathname of the directory where each such file resides need not be listed explicitly in the metadata file, because it can be chosen to be that of the root of the DR, followed by the names of subdirectories obtained by breaking the hexadecimal string representing the unique ID for the file into a number of segments, to limit the number of data files in each directory (for example, given that the ID is a hexadecimal string, if each segment is 8-bit long, then each directory corresponding to a segment can contain no more than 256 children) in the DR. As an example, assume that we are looking at a certain file, whose metadata file contains the following information:

| File ID: | 12ab34cd56ef |
| 1st peer set: | 6, 1233 |
| 2nd peer set: | 18, 1232 |
| 3rd peer set: | — |
| 4th peer set: | 23, 1233 |

This means that the file whose name is "12ab34cd56ef" in the Data Repository is stored on three out of 4 possible peer sets (the list need not be limited to 4 peer sets).

Peer sets 6, 18 and 23 host copies of the file. For each peer set that contains the file, the ID of the peer set is listed, along with generation number of the copy it stores. The first Peer Set in the list is also the owner of the file (note that to make room on a peer set that is approaching full capacity and "owns" a certain file, it might be necessary to migrate the data file away from its owner peer set. In this case, an appropriate marker in the table would indicate the situation), i.e., the peer set that stores the file metadata. The other peer sets host only additional copies of the data file (not of the metadata). In this example, given the name of the file ("12ab34cd56ef"), the copies on peer sets 6 and 23 are up to date, as they contain the latest generation number (1233), whereas those on peer set 18 are behind by one generation and need to be updated. Assuming that the DR for the peer sets has the pathname "/DR" and that the intermediate directories are chosen by dividing the ID string so that each directory covers one byte of the unique ID, the actual pathname for the file would be: "/DR/12/ab/34/cd/56/ef/12ab34cd56ef-1233" for peer sets 3 and 23 and "/DR/12/ab/34/cd/56/ef/12ab34cd56ef-1232", for peer set 18.

When a file needs to be created, the identity under which it will be created will be that of the client process requesting it. This implies that the ownership of the metadata files will be associated with the identity used by the client process performing each request (this allows the client to rely on each local system's protection subsystem to validate the operations requested, rather than forcing to a reimplementation of the protection mechanisms in the MaxiFS layers). The way open file requests should be handled is the following. Every time the peer set is asked to open a file, it opens the corresponding metadata file. It then checks the consistency among the generation numbers in the <peer set ID, file name> pairs. In other words, it makes sure that the generation numbers for all the mirrors are the same. Should this not be the case, the peer set is responsible for the resynchronization of the copies. In this case, the peer set should only return the subset of the members of the mirror list that is in sync and start offline operations to resynchronize the stale copies. The peer set returns the list of <peer set ID, file name> pairs to the client. The latter then decides which peer set should be accessed and how.

The hypothesis of using regular files as metadata files is certainly acceptable. On the other hand, there is another possibility that can have some advantages: the information that would be stored within a metadata file could be encoded and stored within symbolic links. Symbolic links are simply implemented as files whose special type is recognized by the file system. They contain pathnames that point to nodes in the local file system hierarchy. Being symbolic, they do not have the same restrictions that hard links have. Specifically, they are not constrained to be interpreted only within the file system volume to which they belong and can point to directories, not just to files. They also have the characteristic that, unlike hard links they are not reference counted and may become dangling references whenever the target object they point to is deleted.

Because of the fact that dangling symbolic links are normal, it is certainly possible to think of encoding the metadata information into them. As any other pathnames, the pathnames stored in a symbolic link must be made of components that do not contain the slash character, nor the null character (C language string terminator), are no longer than 255 bytes and are separated by slashes. There is also a limit to the length of a symbolic link that is system dependent.

The pathname stored in a symbolic link can certainly be used to encode whatever information MaxiFS needs to keep in a metadata file. The length limit, however, could be a problem, especially for files that have many mirrors. In any case, the length limitation can be extended with a minimum of programming. So, assuming symbolic links are used as metadata files, a peer set member would set the content by creating the file through the "symlink( )" system call and would read the content via the "readlink( )" system call.

It is attractive to think of symbolic links as repositories of metadata information. A symbolic link uses as little room as needed. If the string it stores is short, it is entirely contained within the i-node that represents it on disk. Otherwise, it can expand to direct data blocks associated to the symbolic link. This means that for files that have a limited amount of metadata, it is possible to limit the amount of storage used to the size of one i-node, that is generally much smaller than the size of a data block. Since a symbolic link is a system file, the guarantees the system offers on the integrity of its content are higher than for any user data file. And the number of system calls needed to create and write and to read the content of a symbolic link is limited to one. The "symlink( )" call creates the link with the specified content. The "readlink( )" call retrieves the content. Both of them do not require prior "open( )" and subsequent "close( )" calls.

For all the above reasons, the MaxiFS metadata is stored within symbolic links. The next section describes the how files in the DR are managed.

3.4.3 The DR and the Structure of User Data Files

The concept of a DR is logically disjoint from that of the MDR and from that of a peer set. It is certainly possible to associate the DRs to individual server/volume pairs. However, this tends to make DRs less robust with respect to MDRs. The reason is that MDRs are associated to peer sets. This is an abstraction that is independent of the physical nodes that are members of a peer set at any one time. Therefore, when the MDR within a given peer set is referenced, this reference is always accurate over time regardless of how the peer membership may evolve. Moreover the peer set concept makes the MDR more available because the likelihood of all peer set members crashing before new members are added to the set is very small. In the case of DRs attached to individual servers, this would not be the case. In addition to this, interactions at the MDR level could always be managed abstractly via peer sets, whereas for DRs, clients would have to talk to individual nodes. However, if some minor restrictions are introduced, most of the advantages of peer sets can be made available to DRs. To avoid introducing entirely new abstractions, it is possible to tie DRs to peer sets. In other words, each peer set would then manage one MDR and one DR. In principle, this becomes even easier when one constrains the cardinality of mirrors to multiples of the size of a peer set (i.e., when a file is stored in a particular peer set, then a copy of the file is stored in each node of the peer set). Given that a peer set is made of 3 members, this would mean that a file could exist in 3, 6, 9 . . . , 3×N copies, where N is the number of peer sets in which the file is stored, and N can be selected based on various rules or policies and may be different for different types of files. With this limitation, we can have better conceptual economy and simplify the system. The clear drawback of this scheme is that this systematically multiples the amount of storage used by at least a factor of 3, which may be undesirable, especially when the MaxiFS infrastructure must also store files that require no mirrors or files for which mirroring by 2 is more than adequate.

A way out to allow only the peer set that owns a file to store not only a number of mirrors equal to the cardinality of the peer set, but also a single or just 2 copies (this is an optional optimization that is not required to be implemented). This breaks a bit the full symmetry of DRs with respect to peer sets, nevertheless, in case a peer set member is lost, the remaining members would get a new member and would make sure both the MDR and the DR are updated on the new member. There is always the case of files that existed as the only copy on a member that died. However, if they existed in a single copy, the customer must have decided that those files were in fact disposable. The decision on how many mirrors a file should have (if any) is a configuration decision that depends on the file suffix, the file size, the directory where it resides and so on. Large files are decoupled from their metadata counterparts and can have as few or as many mirrors as needed. In any case, these files will be managed in the DR.

When a server/volume fails, one of the first responsibilities of MaxiFS is that of restoring the redundancy of the files that were in the server/volume that failed. At that point scanning the entire global name space hierarchy would be time-consuming and would generate additional load, at a time when considerable load may be induced by the failure. However, on the basis of the fact that peer sets manage both MDRs and DRs, after a member leaves a peer set and a new one is elected to replace it, it is sufficient that as the MDR replication proceeds, the active member replicating the MDR should trigger a file replication every time a metadata file is encountered that had a mirror on the crashed node. Clearly this is impossible for files that only existed on the crashed node, but this would be the case of a file not replicated because it was not deemed important. Each data file has itself a header at the beginning of the file. The header contains the following:

The offset at which the actual user data is stored, following the header. Client-level read and write operations can only be performed starting at that offset. File offsets specified by the client should always be incremented by the data offset before a read, write or truncation is performed.

The ID of the peer set and the pathname that clients use to reference the file (this would be problematic if MaxiFS had to support hard links, which it does not). This allows the system to find out which metadata files point to the data file and to access other copies of the file if needed. Note however, that this pathname is to be considered as a hint, rather than as an absolutely accurate reference. The reason is that if this reference were to be accurate, any rename of a directory in the pathname of the file should cause all the pathnames in all data files below the renamed directory to be updated. This is far from desirable. On the other hand, since renames are not frequent, the pathname can be updated the first time the file itself is updated.

As mentioned earlier, data files are immutable (the only exception are data files used as logs, which will be discussed in more detail later). Therefore, a file with the new generation number replaces the previous version atomically at the time the new file is closed, after being modified. The generation number for a file is chosen by the peer set that owns the file at the time the file is opened for writing. Secondary members of the set will use the same number and this will be true of any other mirrors. One question that needs to be addressed is how writes should be handled. In a way, having clients directly writing to all the servers that are supposed to store the mirror copies of a file appears the best way to go, since it allows the creation of parallelism and redundancy right away and again it concentrates the "intelligence" within the component that is most knowledgeable about the file: the client.

On the other hand, this might not be the best policy when the number of mirrors a file needs is higher than 3. In this case, the writes would not only affect the peer set, but also external members and the coordination of the writes might become problematic. Whereas, if the writes only go to the members of the peer set that "owns" the file (in the sense that the file is part of a directory hashed to that peer set (see above)), the peer set has internal mechanisms that allow the writes to proceed in lockstep. The compromise chosen in MaxiFS is that, since DRs are tied to peer sets, when a file is to be updated, the client directly interacts with the members of the peer set where the parent directory for the file is stored, including up to three members. If the number of mirrors goes beyond three, the peer set will schedule the creation (or the update) of additional copies in an asynchronous fashion, when the client closes the file.

Note that writes behave pretty much like metadata operations. In both cases, clients send their requests only to the primary member of the set. This is appropriate despite the fact that metadata operations normally carry a minimal data payload, whereas data write packets may carry much larger payloads. In the case of metadata operations all members of the peer set need to receive the request. In the case of writes, even if the payload is large and just one copy of the file exists (which means that just one server would need to perform the write), the packet is replicated by the last switch and therefore, the impact should be contained. Moreover, the general case will be that of a file that has more than one copy, in which case more than a single server must process the write. The case of reads is a bit different. Multicasted read requests have a minimal payload. So, even the replication of the packet has minimal impact. In any case, by having a read request reach all of the server in a peer set, mechanisms internal to the peer set may properly distribute the read accesses among the servers that have a copy of the file (the others would ignore it). Clients that want to operate by performing striped reads from multiple files would do so for files that have mirrors on at least two peer sets and would split the multi-cast read requests appropriately.

3.5 Special Handling of Small Files

In the kind of application environments MaxiFS targets, there are many situations in which the ability to provide extremely fast access to files that are very small is mandatory. This is typically the case for files that contain thumbnails or small pictures. In such cases the overhead implied in the access of such files is excessive. To open one such a file, even discounting the time it takes for NFS to lookup the intermediate components of a pathname, it would be necessary to lookup the file i-node from the directory, to read in the i-node for the file and finally to read the data block for the file. This entails at least 3 I/O operations. In many systems, most accesses are of this nature and the files to be accessed are very random, so that no advantage can be obtained by using front-end caches. Therefore, special facilities to minimize the number of I/O operations to access such small files are desirable.

Figure 24:
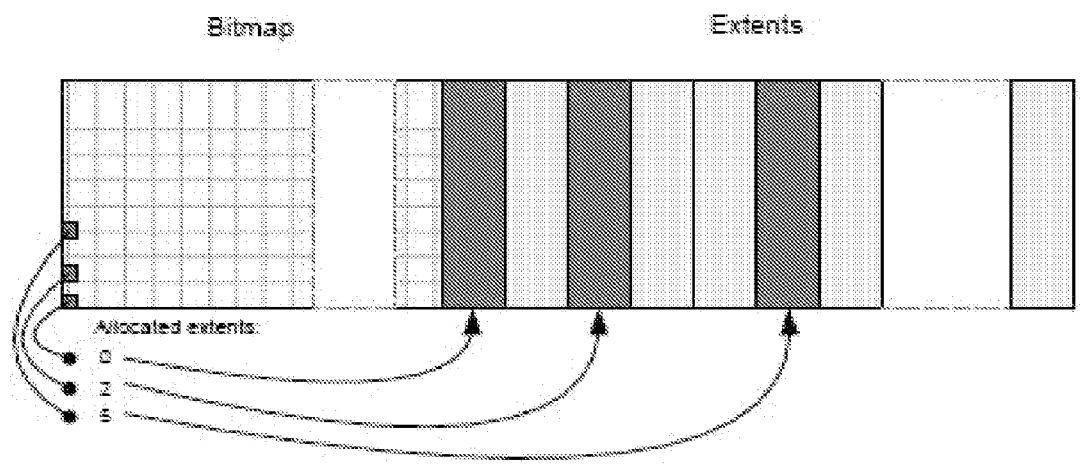
FIG. 24 is a schematic diagram showing a representation of a small file repository in accordance with an exemplary embodiment of the present invention.

A way to do this is to keep files in this class within file systems implemented on the server nodes as an array of extents all of the same size (in an actual implementation, this restriction might be relaxed by allowing files to span multiple fixed size extents in a volume, up to a pre-established maximum) (see FIG. 24). Access to the individual extents would occur by simple indexing into the array. A bitmap could keep track of the extents that have been allocated.

To understand how this could be used in practice, assume that a special top level directory in the namespace of MaxiFS could be dedicated to this functionality. Assume that this directory does not really exist on any local file system but is interpreted by the client software in such a way that all accesses to names that encode an index under that directory are managed as special accesses to a short file via its index. For example, assume "/sfr" is such a directory. Then opening "/sfr/CD3A" would in fact request access to a small file on an optimized repository that has 0xCD3A as its hexadecimal index. This would be implemented within dedicated volumes that would have to be allocated upfront. The reason for the dedicated volumes is that either a very simple file system could be implemented to deal with such volumes or the volumes themselves could be used through a specialized service that accesses these volumes as raw devices.

A possible layout of the volumes dedicated to this function is shown in FIG. 24, where the bitmap (alternative structures without a bitmap could be devised as well) is stored in the initial portion of the volume and the array of extents follows. The color red in FIG. 24 is used to mark the allocated extents (and the corresponding bits in the bitmap). The other extents are free.

Giving clients direct access to the small files via their index would be impractical. An index by itself would always provide access to an extent, without regard to whether it is still allocated or has been freed. There would be no way to discriminate among successive incarnations of small files stored in the same location. It would be difficult to identify which server manages the specific small file repository where the small file of interest is kept.

For these reasons, each such file should have a globally unique ID within MaxiFS, instead of just an index. The Unique Small File ID ("USFID") could be structured as the concatenation of four components, as in: USFID=<ps><s><b><g>. Each component of the unique ID is within angle brackets. Their meanings are as follows: <ps> This field is the ID of the peer set where the small file resides. Note that by embedding the peer set ID in the USFID, the file is permanently tied to the peer set and cannot be freely relocated from a peer set to another one. <s> This is the slot ID or, in other words, the index of the logical volume block where the file is stored. By making this piece of information part of a USFID, the file can only reside at a specified logical offset within a volume. <b> This is the number of logical blocks that the file uses. By embedding this piece of information into the USFID, the file cannot change length. Note that the actual length of the file in bytes is stored in the file metadata region that precedes the actual user data on disk. <g> This is the generation number for the file. It is used to make sure that two different files occupying the same slot at different times cannot be confused with each other. With a large enough number of bytes devoted to this function, the recycling is practically impossible to achieve, within a given time frame.

So, with respect to FIG. 24, assuming <ps> is 0xABCD ("0000ABCD", 4 bytes), <s> is 5 ("00000000005", 6 bytes), <b> is 16 ("10", 1 byte) and the generation number is 0xB87F81692 ("B87F81692", 5 bytes), the USFID for the file, expressed in hexadecimal, would be:

0000ABCD 00000000 000510B8 7F181692

This information could be made available to applications through system calls of the stat( ) family, broken down into two components: the device number and the i-node number (The length of the individual fields in the unique ID is purely indicative. It could be reduced, increased or split otherwise among the fields, to satisfy the constraints of the client OS targeted and the maximum values expected for the individual fields. In any case, once chosen the boundaries among the fields should not change).

Information such as the generation number should also be stored as file metadata, along with other information, such as the actual file length (amount of storage space used for the filer can be smaller than the entire extent), ownership data, access permissions, creation time and more. This metadata would be stored in the first portion of the extent, followed by the actual data. The POSIX file interface does not have a way to create anonymous files, to later assign names to them. However, MaxiFS allows the same to be accomplished through a sequence of POSIX calls similar to the following:

```
1.    fd = creat("/MaxiFS_mp/sfr/smallfile", 0777);
2.    n = write(fd, buff, bytes);
3.    ...
4.    sfn.buffer = name, sfn.length = sizeof(name);
5.    fcntl(fd, MAXIFS_GETUSFID, &sfn);
6.    close(fd);
```

In statement 1, the name supplied is purely conventional. It is made of a stem that is the mount point of MaxiFS on the client where the creation of the file is requested (in this case: "/MaxiFS_mp") and by a pathname relative to the mount point ("sfr/smallfile"). The latter identifies the MaxiFS-wide small file directory ("sfr") and a conventional name ("smallfile"). Use of the directory (the special directory "sfr" is the directory under which all small files are accessible. It has no subdirectories, nor any subdirectory can be created) informs the client component of MaxiFS that we are dealing with small files and that what follows should be dealt with in a special way. The conventional name informs the client component of MaxiFS that this is a request to create a new small file, whose USFID is unknown at the time.

From statement 2 onward, the caller writes data to the new small file. In statement 5 the client invokes a fcntl( ) operation ("MAXIFS_GETUSFID") specific to MaxiFS. The execution of this call entails the following:

1. The client informs MaxiFS that the small file has now been copied completely.
2. The client requests the USFID the system generated for the file. The name of the file will be returned as a string that is stored in the data structure fcntl( ) takes as an argument ('sfn'). For this reason the caller sets the buffer where the name will be stored and the buffer's length in statement 4.
3. The client informs MaxiFS that no more writes to the file will occur after the fcntl( ) invocation and MaxiFS will enforce this. Note that this is important because the USFID will embed the length of the file and its volume offset. Therefore, if the file were allowed to grow at this point, its length and the location where the file is stored might have to change.

Finally (statement 6), the client closes the file. From now on, the file can be accessed in reading via its name. Assuming that the fcntl( ) invocation returned the USFID "0000ABCD00000000000510B87F181692", the new small file would be opened as: "/MaxiFS_mp/sfr /0000ABCD00000000000510B87F181692" (in order to support this functionality at the application level, it may be necessary to develop packages, libraries and so on for the prevalent programming languages used for Web 2.0 applications (Java, Perl, Python, etc.)).

Typically, such files are opened for reading. However, there is an important case when such a file may have been opened for writing. If the file is to be recreated from a backup, the backup application should be able to create the file through its USFID and write to it. The same is needed in case of remote replication. Note however, that this can only happen if the location in the small file volume and the peer set implied by the USFID are available. If they are in use, the attempt to create such a file would be rejected. Also note that the number of logical blocks needed to store the file is embedded within the USFID, so at the time the file is created MaxiFS can make sure that the extent needed is available.

In any case, after a small file is created, MaxiFS supports read access to it via a single I/O operation. Therefore such USFIDs can become part of URLs, so that access to such files, even if extremely random, need not cause the servers to perform lots of I/O operations.

The enumeration of the small files contained in the special namespace directory merely requires identifying the allocated extents (from the bitmap, in this example) and reconstructing their unique IDs. To enumerate all such files across the entire MaxiFS infrastructure one such enumeration should be performed within the small file volume in each of the peer sets in the system.

Deletion of small files would be possible through their USFIDs.

Such files would have to have redundancy. For simplicity, this would be done make sure any such files exists in three copies: one on each of the small file volumes in each member of the peer set the files belong to.

A departure between replications across file systems of this nature and the ones that have been discussed previously is that the previous discussions focused on a logical replication, in which the actual layout of files across replicas is totally immaterial. The only thing that matters is for the copies to be synchronized.

In this case, instead, not only must the files be replicated, but it is also necessary to store each file exactly at the same location in each replica of the small file volumes. Were this not the case, the same ID could not apply to different copies of the same file.

The small file volumes are allocated as subpartitions of each drive on every node that is a member of a peer set. These partitions would be created when a server is configured. The difficulty with this is that the partitioning limits the flexibility with which the storage on the drives can be used. Once the partition is allocated, whether it is unused, empty, lightly used or completely full makes no difference with respect to the rest of the storage on the same drive. So even if one area is basically empty and the other is overflowing, there is no way to change things on the fly. This depends on the fact that to guarantee access in a single operation, the access must be to the physical volume rather than to a logical volume that could require additional I/O operations to lookup where a given logical block of the partition really is (Some of the limitations due to this form of partitioning could be easily circumvented if the file system running on the server nodes were ZFS. In this case it could be possible to always allocate such partitions and to include them within the ZFS file system whenever they are unused and extra space is needed, since ZFS would allow such partitions to be seamlessly and dynamically added to a running ZFS file system).

3.6 System, Node and Client Initialization

Since multiple MaxiFS infrastructures could potentially coexist within the same network, it is necessary to assume that each such infrastructure would have its own name and identifier. They would be used by clients when they mount exported MaxiFS directories to a local file system directory. The name of the infrastructure and its ID are stored within all the servers that are members of the infrastructure.

3.6.1 Initial Setup of a MaxiFS Infrastructure

The initial setup of a MaxiFS infrastructure with multiple nodes is an iterative process. This is a task that is essentially handled by System Management after a System Administrator has identified the servers that should be part of the infrastructure. This involves the creation of the initial peer sets. The first peer set to be created should be peer set 0. This is a special peer set, in that the procedure followed for its initial set up is not the standard one. This is so because the standard automatic procedure requires a supervisor set to be present and there is no supervisor set available for set 0 initially. After this is done, other node/volume combinations can be assembled together into peer sets using the standard procedure.

3.6.2 Addition of a Node to a MaxiFS Infrastructure

When a server node initially joins an infrastructure there are the following possibilities, which must each be handled differently:

1. The node may be rejoining the infrastructure after a crash.
2. The node may be rejoining after an orderly shutdown of the infrastructure and the subsequent reboot.
3. The node may be joining the infrastructure for the first time.

In case 1, when the node is rejoining the infrastructure after a crash, on reboot it should be able to identify the infrastructure it belongs to. Assuming this is the case (if it is not, the situation is handled in case 3), then for each of its volumes, the node should first identify whether it was a member of a peer set before crashing.

If it was a member of a peer set, it should send a message to the peer set primary, asking them to rejoin the set as a secondary member. If the primary member refuses the request, the node should delete the information regarding its previous peer set, it should delete the MDR relative to the set and should simply make itself known to System Management as a node that can operate as a DR server (a mechanism should be included to reclaim storage for stale DR data that is no longer usable) and peer set member. If it was not a member of a peer set, it should simply advertise its presence to System management and wait for peering requests or for DR requests to come in.

In case 2, when the node is rebooting after an orderly shutdown, it should have stored this piece of information and the time of the shutdown. Thus on the reboot it should have all the information it needs, including which peer sets, if any, the node was a member of.

If the node was a member of a peer set, it should try and rebuild the peer set or should try to rejoin it. In normal conditions this should possible and everything should be pretty smooth. Note however that, in case the entire infrastructure is restarting, there are some critical issues to be managed. For example, rebuilding a peer set requires the permission of a peer set that is the supervisor of the peer set being rebuilt and the latter may not be available yet. Therefore, the node should be aware of the situation and should be periodically polling its supervisor until the latter is able to grant the permission or until another member of the set being reassembled gets in touch with the node and invites it to join the peer set. As before, if the node was not a member of a peer set, it should only make itself known to System Management as a potential DR server and peer set member.

In case 3, there are two possible subcases. However, in both cases, an operator must explicitly request a standalone node to become part of the infrastructure. This could be done through a GUI interface that would identify server nodes (this means: "server nodes that are running MaxiFS software") that are accessible in the network and do not belong to a MaxiFS infrastructure yet and would show them in a standalone pool. The operator should be able to select one or more of such nodes and request them to join an existing MaxiFS infrastructure.

If the node never belonged to a MaxiFS infrastructure, it should just make itself known to system management, update the version of software it is running from the infrastructure code repository, if needed, and make itself available to System Management as a potential DR server and peer set member. In case the node never belonged to the MaxiFS infrastructure it is going to join, yet was a member of another infrastructure, before falling back into the previous subcase, an explicit acknowledgement to do so should be provided by a system administrator. In other words, the migration of a node from a MaxiFS infrastructure to another one should only be allowed by explicit operator request.

3.6.3 Initial Setup of a MaxiFS Client

The other part of the initialization of a MaxiFS infrastructure is the initialization of clients. To obtain this, the following steps should be followed:

1. First of all, the MaxiFS infrastructure a client is going to join should be up and running
2. The system administrator should then be able to use the MaxiFS node administration GUI and point to the client node it wants to make part of the infrastructure. It would then upload a software package to such client.
3. The setup function of the package would then be executed on the client and would be given the ID of the MaxiFS infrastructure to be used. This would allow a number of things, including the mount point(s) for exported MaxiFS directories, to be configured.
4. At this point the client should be able to take the MaxiFS client loadable module, to install it, and load it. This might involve the reboot of the client.
5. Finally, the client should be able to mount the exported directories of interest and to start operations.

4 Details on the Implementation of File Operations

This section of the document provides more details on the file operations performed on the basis of client requests.

4.1 Details on Non-Destructive Operations

4.1.1 File Lookup, Stat, Open, Read and Write Operations

File lookup operations are not directly invoked by applications. In general applications either operate on a file descriptor returned by a successful open call, or perform pathname-based system calls. Traditional network file system designs rely on a lookup operation that is used to translate a pathname into some kind of an opaque handle. Most such file systems need to convert a pathname one component at the time, i.e., translating step-wise the entire pathnames into the handle that identifies the leaf of the pathname. Generally, each such translation requires a network roundtrip between client and server.

In order to make MaxiFS very efficient and to avoid unwanted network round trips, the resolution of a relative pathname (The expression "relative pathname" is used to emphasize that it is not an absolute pathname that needs to be looked up, but that the lookup operation only needs to be performed for the portion of a pathname that refers to file system objects in the MaxiFS namespace, i.e., below a MaxiFS "mount point") is performed a single network interaction. This is at the core of the hashed approach to pathname resolution.

This is possible according to the scheme described in "The Structure of the MaxiFS Name Space" because the MaxiFS name space is self-contained and because MaxiFS operates on homogeneous servers, in terms of hardware and software, MaxiFS can make stronger assumptions than those other types of distributed file systems can make. For example, it can assume that the volumes each server exports do not contain mount points for other file systems and that the file system type in use does not change across directory boundaries. The result of a lookup operation is that, in case of success, the requesting client is given a handle to the file system object of interest that can be subsequently used to access the file. The client also receives a list of the peer sets where the corresponding data file resides.

However, the internal behavior of MaxiFS is different from what the application patterns might suggest. MaxiFS implements some file system operations by first retrieving a file handle and then operating on the handle via other primitives, or it directly requests pathname-based operations to be performed by servers. From the point of view of MaxiFS, the functionality needed to open a file is similar to what is needed to gather file system metadata with regard to a file (this is generally done via the stat( ) family of system calls). This is so because a MaxiFS client needs to fetch the file system metadata for the file of interest at open time, just as it does for stat. So, a single type of request performs both activities. The only difference is that open requires that a reference to a file be made available to the client so that subsequent read or write calls may operate on that file, whereas stat does not.

In case the request is performed in order to open a file, a stateful session between a client and a peer set is established. This session has a time-out associated with it and effectively behaves as a lease. The peer set that "owns" the directory where the file metadata resides opens the metadata file for the file of interest and returns a handle that characterizes the session. The handle is valid until the client relinquishes it by closing the file. However, it is possible that a client may crash after opening a file. In this case, after a suitable time-out, the peer set pings the client to check whether the latter is still alive. If it is no longer alive, it closes the handle. The client also receives a list of up to four peer sets that contain copies of the data file that is associated to the metadata file. Then the client is allowed to use the handle on any of the peer sets that have a copy of the file available. The handle is sufficient to let the server access the data file, if available. The client may also decide to stripe the reads from multiple peer sets in order to increase the available bandwidth, as needed. It can also make use of the data file redundancy to continue reading from a different peer set in case the server from which it was originally reading the data file becomes overloaded or crashes. An open in read-only mode clearly identifies a non-destructive operation. Should the client go away or crash, the peer set can simply reclaim the file handle. When a file is opened in write-only or read-write mode, MaxiFS introduces some restrictions. The lookup process for the file is still identical to the one performed for an open in read-only mode. However, the client is granted the access in write only if no other client is accessing the same file in write mode. This effectively enforces a form of locking such that changes to a file can only be performed via serialized open-(read)-write-close sessions. The file being modified is effectively a private copy only the writer sees. This allows other read requests to be still satisfied by the current file copies. Only when the session terminates, the modified file replaces the original one. However, clients that had the older file open will continue to access the same file until they close the file. This differs from the semantics of typical file systems. Nevertheless, it is fully acceptable in the market segment MaxiFS targets where the likelihood of multiple processes writing to the same file is extremely remote. MaxiFS also supports another mode of operation that is very useful especially in the handling of log files, where there can be multiple readers and multiple writers, yet data is only appended to the end of the file. This behavior is different from that of the previous case because it is necessary that the file be shared among readers and append-mode writers.

In order to make use of such a behavior, opens in read-only mode are always allowed. However, if a process opens a file in append mode (Using the POSIX open flag O_APPEND), then no other process is allowed to open the file in write mode, unless it also sets the append mode flag. Conversely, if a file is already opened in write mode, it cannot be opened in append mode.

In any case, the clients (in this context what is meant by "client" is not the physical machine that is requesting the open, but the actual process on any machine requesting the file to be opened) that open a file in append mode have the guarantee that each individual write up to a system-defined length (the maximum length of an append mode write is anticipated to be 1 Mbyte) will be atomically appended to the file. This means that parts of this write will not be interleaved with those coming from other clients and that such append-mode writes will be serialized, although the order of serialization is not predefined. In any case, when a file open is open in append mode and it has mirrors, all the mirrors are guaranteed to be identical, i.e., the order in which the individual records appended appear in the file is always identical. Files are not intrinsically usable in append mode or write mode. Any file can be opened in write mode or append mode. However, if it is open in append mode, nobody can open it in write mode and if it is open in write mode, it cannot be opened in append mode. Unlike files open in write mode, each append mode writer appends its records to the same physical file.

4.1.2 File Close Operations

Close operations have minimal semantics for files open in read-only or in append mode. Basically, the close goes to the peer set that "owns" the directory where the file resides and the latter makes the associated handle invalid. However, in the case of files open in write or read-write mode, the close operation has also the effect of increasing the generation number of the file and replacing the previous generations with the new one. In any case, the client closing a file has no need to perform a close of the data file, since the close sent to the owner peer set will take care of the metadata file and this is all that is needed. The server that was serving the data file will perform an automatic close of the data file.

4.1.3 Write-back Mode, Write-through Mode and Fsync

A standard POSIX flag for the open call (O_SYNC) allows clients to choose to perform writes in write-through mode, rather than in the default write-back mode. Write-through mode allows applications to have better control over what is really on disk in that the client receives control back only after the data written out is committed to disk. The negative aspect of this is that the client perceives a write latency that is much higher than in write-back mode. Nevertheless, for specialized applications that need to implement checkpointing and similar mechanisms, this is highly desirable. POSIX also supports a file system primitive called fsync( ). This is useful for files that normally operate in write-back mode. Whenever the latter primitive is invoked, passing the file descriptor of the open file of interest as an argument, the caller is blocked until the system acknowledges that all the file writes buffered in the system have been committed to disk. Besides write-back mode, MaxiFS also implements write-through mode and fsync( ), when a file is open for writing (either in regular write mode or in append mode).

4.1.4 File Locking

MaxiFS supports the implicit locking of entire files, when open for writing. This has been discussed above. Effectively files open also for writing are implicitly opened with the O_EXCL POSIX flag. Explicit file or byte-range locking primitives are not supported in MaxiFS, as they have no use because the only files shared across multiple clients are files open in read-only mode and files open in append mode. The files that are open in append mode provide implicit locking in the sense that the individual writes of clients are serially appended.

4.1.5 Attribute Setting

There is no special behavior to be associated with the explicit setting of file attributes, file ownership, access bits, etc. etc.

4.1.6 File Extension and Truncation

File extension and truncation are fundamental operations that need to implement the appropriate semantics. It is very important to always satisfy the requirement that garbage data should never be returned to the user. This means that when a file is extended, first the additional blocks for the file should be allocated (generally using blocks that have been zeroed) and then the length of the file should be updated accordingly. The reverse is true for truncation: first the length of a file should be reduced and then the blocks of the data file(s) should be released. Since these operations alter a file, they implicitly operate on a private copy of a file. At the end of such modifications, on close, the updated file replaces the original version and increments the generation number.

4.1.7 File Renames

File renames are in principle trivial. Unlike directory renames (see below), they entail no name rehashing or file relocation and are completely local to the file system of the peer set that owns the parent directory. As for all pathname-related operations, the only complication is in the fact that the primary member of the peer set must coordinate the update across the peer set, to prevent discrepancies among the members.

4.1.8 Directory Creation and Deletion

The creation and deletion of directories has fairly straightforward semantics. However, some caveats apply, especially when the namespace is distributed according to the hashing scheme because in this case these operations always span two peer sets.

Such operations are coordinated by the primary member of the peer set across all members because any inconsistency, even temporary, might result in incorrect application behavior.

The process of creating a directory affects both the parent directory (and the peer set where it resides) and the MDR where the directory would be stored. The primary member of the peer set that owns the directory to be created is in charge of the coordination of the peer set that owns the new directory's parent. Should the request fail, the system should implement the appropriate semantics, by returning an error to the client. In case the system detects any inconsistency, it should try and repair it right away.

In case all the checks succeed, the operation would occur in two steps: first a reference to the new directory would have to be created within the parent directory and then the directory should be created within the target MDR. Because of the fact that in the creation phase the checks are performed in the same order, it would not be possible to have collisions between requests, even though the operation spans two peer sets.

In case of the deletion of a directory, the order of the checks should be reversed with respect to the creation, and the target directory must be removed before the reference in the parent directory is deleted.

4.1.9 Hard Link Creation and Deletion

Hard links are not supported in MaxiFS but could be added if necessary or desirable for a particular implementation.

4.1.10 Symbolic Link Creation and Deletion

Unlike hard links, depending on the evolution of product requirements, MaxiFS may support symbolic links. In any case, the client platforms that support symbolic links can always create symbolic links to files or directories stored in MaxiFS.

4.1.11 Directory Renames

Directory renames are in principle complicated because in the general case they involve four objects: the old and new parent directory and the old and new name. There are three classes of directory renames.

If a directory rename does not change the name of the directory, but simply moves the directory to another area of the file system name space, the directory has to move but only within the same local file system. This entails no other peer sets and can be handled internally to the peer set by invoking the rename primitive of the underlying file system. However, since a portion of the name space changes shape, these changes need to be reflected across all the peer sets that contain that portion of the name space (see above). This can be done in parallel to the rename, for the reasons previously explained (see above).

If a rename changes the name of a directory so that its new hash value still maps the new name to the same peer set, the operation is once again local to the file system and peer set. It is trivially implemented by using the underlying file system rename. In any case, as in the case of directory creation or deletion a change in the reference from the parent directory is needed and this can be handled in a way that is similar to the one discussed for directory creation and deletion.

If a rename causes the directory to hash to a different peer set, then the operation is much more complicated, because it entails the coordination across two peer sets. In this case, a coordinator for the rename need be chosen and it would be the peer set that owns the old directory names. As the rename progresses, all the files in the directory need to be physically moved to the new peer set, along with their parent. However, the coordinator must be able to intercept all operations that relate to the directory being moved, to make sure that directories entries are managed consistently (an example of this could be the case in which a request to delete a file is received in a directory being moved and the file itself has already been relocated to the new peer set. If the file were looked up only in the old directory, the delete would fail. Conversely, a client could be capable of creating a directory entry that already exist but has been moved to the new peer set. Clearly all such checks need to be managed atomically and therefore the need for a single reference point (i.e., the rename coordinator) is needed). In any case, it should be kept in mind that even the rename of a large directory in such circumstances should not take an inordinate amount of time because in reality it is not the data file, but only the much smaller metadata files need to be moved and this is far less expensive. As the rename is completed, as for the first case examined above, the coordinator also needs to inform all the peer sets that contain a name space subtree in which the directory renamed is included of the change so that the peer sets may take the change into account and correct the shape of the subtree. As in the first case of directory renames, this need not be completed before the rename returns success, as explained in a preceding section of this document.

With respect to a traditional rename, greater complexity stems from the need to update the peer sets that know about the directory. Nevertheless, directory renames are not expected to be frequent operations in the target market MaxiFS is addressing. So this is an acceptable cost.

5 Issues in Crash Recovery

This section briefly explores some general criteria MaxiFS employs in managing node and system failures. The common underlying criteria are the following:

1. The system must be as self-healing as possible.
2. Each node and each peer set must be as autonomous as possible.
3. Decisions must never be centralized within a single entity.
4. There must never be a need for a complete consistency check/repair of the entire name space, except for the case of disaster recovery.
5. In case of inconsistencies within a peer set, the primary member is the authoritative entity.

5.1 Peer Set Member Resynchronization Revisited

Whenever a peer set member goes offline, the state of its MDR, DR and small file repository may no longer faithfully reflect that of the other set members. However, such outages are characterized as belonging to different classes:

1. Intermittent outages: these are outages that last no more than S seconds and repeat more than N times within a time window W.
2. Transient outages: these are outages that occur occasionally and last no more than S seconds.
3. Permanent outages: these are outages that occur and take down a node for more than S seconds.

On the basis of the above classifications, MaxiFS implements the following policies. If a peer set member experiences outages that can be classified as intermittent, the other members of the set expel the faulty member from the set and have another join in. In such cases, it is likely that the responsibility for these outages is that of the network connections or of the node hardware itself. If a peer set experiences a transient outage, then the other members log the operations they carried out during the outage and play them back to the member when its functionality is restored. If a peer set member experiences a permanent outage, that member is removed from the set and replaced.

This means that operational members of a peer set must log the operations that occur in case one of the members has an outage. The operations to be logged should span no more than S seconds, because above that limit an outage is considered persistent.

When a peer set member is to be replaced, if it was the primary set member, a new primary must be elected. After which a new member is selected and it receives the color property of the member that left the set. At that point, the MDR of the peer set is replicated from the remaining secondary member to the new member. When the MDR replication is completed (this should take a relatively brief amount of time as it only entails creating directories and copying small metadata files), the files in the DR are replicated. In parallel the small file repository can be replicated, via a volume to volume copy. As an optimization, the replication of the MDR can occur in such a way that whenever a client requests a destructive operation, the new member receives the request and operates on it if the object of the operation is in a portion of the MDR that has been replicated already. Otherwise, the request is ignored and the change will occur when the area of the MDR where the object resides is updated.

5.2 Reinitialization after a Complete System Crash or Reboot

A catastrophic system crash should never occur. Nevertheless, MaxiFS must be ready to cope with such an unlikely event. This can be treated in a way that is similar to a complete system reboot. MaxiFS implements a federation protocol that is able to reconstruct the configuration of the entire system (including peer set membership) to the last valid state for the system. This occurs gradually with the reconstruction of peer set 0, and then with the reassembly of all the peer sets. In case, a member of a peer set is no longer available, the remaining member will elect a new member.

5.3 MaxiFS Integrity and Checking

It is always possible that as a consequence of some unexpected event the MDR of one peer set member may become inaccurate. The same is possible for the DR. The MaxiFS implementation is such that as discrepancies are detected at runtime, one of the following alternatives is taken. If the entity that detected the inconsistency has enough redundant information to restore what is missing in a very limited amount of time, it does so right away. But if the information available at the time of the detection is insufficient to restore the integrity, or if this is known to be an expensive operation, in terms of time, the entity that detected the problems marks the file system object as partially inconsistent and queues up a request to repair the object via a queuing mechanism as discussed below. This will trigger a system daemon to intervene to restore the consistency.

5.4 Power Loss and Disk Sector Corruption

The root file system on any MaxiFS node is essentially immutable, in that the areas that get modified are transient in nature, as in the case of the swap device. The system also forces periodic snapshots of the file system volumes. In case a volume becomes corrupted because of a bad sector in an area where a file system data structure is stored, the volume is recreated with the image of the last valid snapshot. The use of ZFS would make this issue a moot point.

REFERENCES

[1] McKusick, M., K., Ganger, G. "Soft Updates: A Technique to Eliminate Most Synchronous Writes in the Fast Filesystem", Usenix 99 Proceedings, http://www.usenix.org/publications/library/proceedings/usenix99/mckusick.html.

[3] Knuth, D. "The Art of Computer Programming Volume 1: Fundamental Algorithms", 2nd Edition (Reading, Mass.: Addison-Wesley, 1997), pp. 435-455. ISBN 0-201-89683-4.

[6] Dean, J., Ghemawat, S., "MapReduce: Simplified data Processing on Large Clusters", Google, 2004 (http://209.85.163.132/papers/mapreduce-osdi04.pdf).

III. Queuing Service for Maxifs

1 Introduction

This section describes an exemplary robust queuing service for MaxiFS referred to hereinafter as MaxiQ. MaxiQ is resilient to individual server failures and allows the decoupling of consumers from producers. The need for a queuing facility in MaxiFS stems from the fact that services such as those that asynchronously replicate files and manage the infrastructure must be able to work asynchronously with the components requesting such services. The queuing service must also be robust, so as not to lose records that have been enqueued, even across system crashes, and must be scalable with the infrastructure itself. The queuing facility described here is a real queuing facility, i.e., it should not be confused with a data repository or a data base management system. It is targeted to allowing producers to queue records so that consumers can later dequeue them, to act on them. The terms consumer and producer are used in a loose sense in this document. The producer or the consumer can be any thread or process executing within any server node in the MaxiFS environment that has access to the queuing facility to enqueue or dequeue records to/from it. The following sections highlight the requirements for this facility, a proposed high level semantics and a brief description of a possible implementation.

2 Requirements

The requirements for MaxiQ are the following:

1. The queue is a global data structure accessible from any server node part of MaxiFS, regardless of where the queued records are physically stored.
2. Records to be put into the queue facility should be persistently stored until they are explicitly extracted or removed, or until their life span expires, even in the presence of server failures.
3. Each record appended to the queue is to be appended to the end of the queue.
4. Records are not guaranteed to be extracted from the queue in a FIFO order.
5. Records are associated with a specification (a description of what a specification amounts to is provided ahead) that identifies their nature. The extraction of records from the queue is done on the basis of the specification the consumer provides.
6. Each record appended to the queue should preserve its identity, i.e., it should always be possible to treat separate records independently and without crossing boundaries between one record and the next.
7. The action of appending or removing a record to/from the queue should be atomic, i.e., the addition of partial records, removal of partial records and/or interleaving of portions of separate records must not be possible.
8. Atomicity in the addition or removal of individual records to/from the queue should be guaranteed in the presence of multiple producers and multiple consumers, without any need for explicit locking by producers and consumers.
9. A consumer should delete a record from the queue if and only if it has been acted upon. Node failures should not allow records queued up to be lost.
10. The queue implementation should be highly scalable.

3 Theory of Operation

Before proposing possible primitives to operate on the queue, it is necessary to give at least a high level picture of how the facility should operate. This is the purpose of this section. The MaxiQ facility should allow any system components to enqueue records, so that whenever a consumer of the record is available it can remove it from the queue and process it. The typical operations to be expected on such a queue facility should then be the following:

1. Enqueuing a record.
2. Reading a record without removing it from the queue, i.e., copying a record from the queue.
3. Retrieving a record and deleting it from the queue.

A difficulty with this has to do with the fact that in case a consumer thread takes a record out of a queue and then the server where the thread is executing dies or hangs, the record would be effectively lost. Therefore, the facility and its primitives should be structured in such a way that the crash of a node cannot cause the loss of any records in the queue. In addition to this, to achieve the ability to distribute the queue facility across multiple nodes and to achieve scalability, it should be possible to identify subsets of the queue facilities where certain records are kept. The "specification" associated with each enqueued record has this purpose.

4 Primitive Queue Operations

To operate on the queue in the way just described, appropriate primitive operations must be available. These are loosely modeled on the facilities the Linda kernel [1] makes available. A first attempt to meet the requirements could be that of providing the following primitives:

mq_put(record)—this primitive enqueues the record passed as an argument into the queue. Note that records do not have to be all of the same size, nor do they have to share some abstract type definition. The invocation of this primitive never blocks the caller.

mq_read(spec, record)—this primitive reads one record that matches the specification (spec) from the queue, without extracting it. This primitive can be blocking or not. If the time-out the client specifies is 0, the primitive returns immediately either fetching an available record or none if the hive is empty. If the time-out is positive, the caller waits until either one such record becomes available, or the time-out the caller sets expires. The time-out cannot be infinite and has a maximum value (see the appendix).

mq_take(spec, record)—this primitive reads one record that matches the specification (spec) from the queue and removes it from the queue. As in the previous case, this primitive can be blocking or not. If the time-out the client specifies is 0, the primitive returns immediately either fetching an available record or none if the hive is empty. If the time-out is positive, the caller waits until either one such record becomes available, or the time-out the caller sets expires. The time-out cannot be infinite and has a maximum value (see the appendix).

The primitives just listed, in theory, allow proper management of the queue records. However, in the case where a consumer uses the mq_take( ) primitive to extract and read one record from the queue and subsequently dies before it is able to post a result of the operation performed, the record is effectively lost. A way to solve this problem is through the following enhancements to the previously described set of primitives:

Each record in the queue is assigned a unique ID. This ID is automatically assigned by the queue infrastructure and returned on a successful mq_read( ) or mq_take( ) call.

The mq_take( ) primitive takes one additional mandatory parameter that specifies the time the caller expects is needed to process the record. This time should be in excess of the actual time needed, in order to cope with possible delays. This is effectively a lease. If the lease expires without a renewal, the record becomes visible again to every other consumer.

An additional primitive (mq_reset(ID, lease)) operates on the record in the queue whose ID is ID and has different behaviors depending on the value of lease. There are three cases:

1. If lease is set to the constant MQ_TMINFINITE, the "taker" informs the queuing system that the record whose ID is specified was fully processed. So, it can be deleted.
2. If lease is set to the value 0, the "taker" informs the queuing system that the record whose ID is specified was not processed and that the caller has no more need for it, so the record should become visible to everybody again.
3. If lease is positive, the "taker" informs the queuing system that it needs to extend the lease for the record whose ID is specified. So the record remains invisible for the time of the requested extension.

With the above changes, the possible loss of a consumer would be avoided, as follows:

1. The consumer would invoke mq_take( ) to extract a record from the queue, specifying the time needed to process the record. This time would be converted into a lease by the system.
2. At this point the consumer would have access to the record that would be leased and therefore only logically deleted from the queue. This way no other consumer would be able to take it or read it, until its lease expires.

3. If the lease expires, the record is resurrected and becomes available again for any other consumer. This would be the case if a previous consumer died or hung as it was processing the record.

4. In the case where the consumer decides it cannot or does not want to complete the processing, it should invoke mq_reset(ID, 0). This would make the record available in the queue once again, for processing by other consumers.

5. In the case where the consumer completes its processing, it should indicate the completion of its processing by invoking mq_reset(ID, MQ_TMINFINITE). This would permanently remove the processed record from the queue.

6. In the case where the consumer needs additional time to process the record, before its lease expires, it would invoke mq_reset(ID, extension), so that the lease would be extended for an additional time equal to extension and the record the lease relates to would continue to remain hidden for the requested amount of time.

What remains to be addressed is what the specifications of enqueued records should be like. A specification is represented using a name, expressed as a variable length, null-terminated string made of individual substrings, each of which is separated by slashes ('/') from the next. Each such substring can only contain any 8-bit character (with the exception of '/' and of the null character that is used to terminate C language strings) and cannot be longer than 255 characters.

A specification identifies a "hive": the portion of the queuing system repository that contains homogeneous records (this does not imply that all the records within a hive have the same size) that can be described by the specification itself. Specifications obey some rules:

1. They are names of hives, not templates and they live in the same name space.

2. A specification cannot exceed 1024 characters in length.

3. A specification cannot be incomplete and the prefix of a hive's specification cannot be another usable specification. For example, if "a/b/c" specifies a hive, "a/b" cannot specify a hive, whereas "a/b/d" and "/a/b/e/f" can.

4. No form of pattern matching or use of wild cards is supported in a specification.

5. A specification is to be taken literally, meaning that the case of any alphabetic character is significant and that hive names can differ just in the case of the specification. Moreover, blanks embedded in a specification are significant and are not stripped by MaxiQ.

6. Optionally, the hive specification can be of the form:
N:a/b/c . . .

where the N prefix that precedes the ':' character is a decimal string that represents the ID of a peer set and tells MaxiQ that the hive stores information of importance to peer set N. When this is the case, the hive itself will not be stored on peer set "N" (see below). The "N:" prefix is an integral part of the hive name. The only difference with respect to names that do not include such a prefix is that the MaxiQ system associates semantics to the "N:" prefix. For example:

729: marketing/inquiries/log specifies that the hive named "729: marketing/inquiries/log" (note the trailing blank after the colon) is of relevance to peer set 729. One or more such blanks are effectively part of the name. Thus: "729: marketing/inquiries/log" is a different hive from: "729:marketing/inquiries/log". However non-decimal strings or blank characters preceding the colon would not adhere to the previous syntax. So: "729:marketing/inquiries/log" would specify a hive name, but the blank character before the colon prevents this hive to be considered of relevance for peer set 729.

One additional issue to be addressed relates to the fact that in the case where a consumer just wants to go through records in the queue, since an mq_read( ) would not cause any changes to the queue, subsequent reads would return the same record over and over, until a mq_take( ) operation is performed. To be able to enumerate the queue records, a small change to the mq_read( ) call is necessary. This consists of adding one argument to mq_read( ) that is the ID of the queue record that should be skipped. Effectively, by setting the ID to MQ_NULLID, the primitive would read the first record available. By setting it to the ID of the last record read, it would return the next record. If the record with the specified ID does not exist any longer within the queue, the behavior would be identical to that of invoking the primitive, by setting the ID argument to 0. Finally, two more primitives are needed:

1. The mq_create(spec) primitive takes a hive specification as an argument and creates such a hive, if it does not exist.

2. The mq_delete(spec) primitive takes a hive specification as an argument and deletes such a hive, if it exists.

5 Design

MaxiQ is implemented as a facility available to MaxiFS services. The logical model of this is that the basic distributed file system functionality would be available as an infrastructure on which to implement MaxiQ, however, MaxiQ would be available to the higher level distributed file system services that take care of replication, reconstruction of redundancy and so on. Therefore, the MaxiQ functionality can be easily superimposed to the file system name space MaxiFS supports. Thus a hive could be mapped to a file. This would clearly offer MaxiQ the redundancy and scalability MaxiFS offers. The MaxiFS name space is implemented through a hashing technique that distributes directories across multiple servers so that a sufficiently homogeneous distribution of the name space across all the nodes allows for the distribution of the workload across nodes (scalability) and for keeping redundant repositories for data (availability). Therefore, the availability and scalability attributes of MaxiFS can be easily inherited by MaxiQ.

The design of MaxiFS already supports the notion of an append-only write mode for files (without need for explicit synchronization). This is the basic facility needed to implement the mq_put( ) primitive. The additional functionality to be supported is the ability to retrieve records from a file (conditionally deleting them, when necessary through the lease and life span mechanisms described earlier).

The design of MaxiQ thus builds on the strengths of MaxiFS and supports the replication and exception management needs of MaxiFS. This may appear to be somewhat conflictual in the sense that MaxiQ uses MaxiFS while MaxiFS uses MaxiQ. However, the reality is that MaxiQ uses the MaxiFS data path components, while the MaxiFS management uses MaxiQ. So a real problem would only occur if the MaxiFS Management System were to use a certain hive on a peer set to which the hive information pertains. The solution is that of identifying along with the hive also the peer set a hive relates to. This peer set ID becomes part of the hive specification, as explained above. This way the system will insure that the hive will be stored within a peer set that has no relationship to the hive content. The individual MaxiQ hives are implemented as files in a special branch of the global MaxiFS name space. This branch is invisible through the file system name space and can only be accessed indirectly via the MaxiQ primitives. Such files are 3-way redundant (one copy on each member of the peer set where they reside) and access to them is in reading or in writing. The latter however only occurs in append mode. In other words, such hives only change because of new records appended at the end. Otherwise, their content is unchanged.

One member of the peer set at a time manages the hive. Clients send their requests to the hive manager via a specialized protocol that is used by the MaxiQ primitives. The peer set member that runs the manager is the primary member of the peer set. It provides a thread pool used to carry out user requests. These are appropriately synchronized so as to guarantee consistency of the hive. In case the peer set member that is managing a hive goes offline, the member of the set that takes the role of the new primary also takes over the management of the hive, to guarantee the continued availability of the hive. The hives themselves are structured as balanced trees that keep reference to all the records and allow prompt access to each of them. Index records contain pointers in memory for subordinate index pages, along with their file offset on disk. They also contain references for data records in the form of file offsets. Each data record is stored on disk as it is received and its offset is recorded within the balanced tree. The tree allows the deletion of records from anywhere in the hive and the addition of new records to the end of the hive.

Attributes of individual data records, such as their ID, their lease time and their size are stored with the index pages that reference the data records themselves. This allows changes to the lease time of a record (These are caused by the invocation of primitives such as mq_take( ) and mq_reset( )) to be performed by only updating the referencing index page. The scheme relies on a deleting existing data records in purely logical fashion. In other words, a record is deleted by removing the reference to it from the tree page that points to it, rather than through a physical deletion of the record. As an index pages is modified, it is appended to the end of the file that is the backing store for the hive. This causes the file offset for the last incarnation of the modified index page to be updated in the parent index page, which then is appended to the file and so on all the way to the root page of the tree. When the new root is appended, the hive file contains the entire updated tree. When the hive manager opens the hive file, it reads in memory the entire index hierarchy starting from the last incarnation of the root page at the end of the file and working its way through the rest. In case a tree update was incomplete (in the sense that the root or an intermediate page is missing), the hive manager automatically recovers the previous version of the tree. This is not critical because the MaxiQ primitives that modify the hive file update it synchronously, before returning control to the caller. Therefore, the only items that can be lost are those for which the execution of a primitive did not complete normally. The caller would be aware of this and would be unable to assume that the update reached stable storage. The fact that hive files are redundant makes the probability of an unrecoverable bad sector read very small. Over time hive files may end up containing a fair amount of stale records and stale index pages, along with current ones. When the ratio of active records to stale records passes a given threshold, the hive manager restructures the hive, by creating a new file that is purged of the stale data.

6 Conclusions

MaxiQ implements a robust facility that can be used to store information for off-line processing. It supports the following functionality:

1. Ability to append records within a replicated hive that survives the failure of up to two members of the peer set that implements the hive.

2. Transparent failover among peer set managers to properly handle the failover of the service.

3. Ability to traverse the entire list of records.

4. Lease-based extraction of records from the head of the hive for a predefined amount of time. This supports the survival of the record if the leaser crashes.

As such, MaxiQ is expected to be the foundation for many System management services in MaxiFS. The Appendix details exemplary C language syntax of the primitives available to clients of the MaxiQ facility.

APPENDIX

Specifications of the MaxiQ Primitives

This section of the document provides details on the APIs the MaxiQ facility supports in the form of a C language library in an exemplary embodiment of the invention.

The C language header file that contains the constants, type definitions and function prototypes for MaxiQ is mq.h and needs to be included by the C programs that use the facility. At link time these applications need to link in the MaxiQ library.

Constants

MQ_TMINFINITE This constant is used to specify a lease of infinite length for mq_reset( ) (effectively equivalent to permanently removing a record leased via mq_take( ) from the queue) and to set an infinite lifespan for a record via mq_put( ).

MQ_MAXTMO This constant specifies the maximum length of a time-out expressed in seconds.

MQ_MAXBUF This constant specifies the maximum number of bytes for an individual data record appended to a hive.

MQ_NULLID This is the null value for a variable of type rid_t (see below).

Types

A number of data structures are defined here. They are used with the primitives in the MaxiQ library.

uint8_t Unsigned byte.

uint64_t Unsigned 64-bit long.

rid_t This type is used to define a variable that is to contain the unique identifier for a queue item. Note that IDs are unique only across records associated with a given specification.

rdmode_t This enumeration type is used in mq_read( ) to choose whether the mode of operation is that of retrieving a record whose ID matches the ID in input to the primitive or whether, the primitive should retrieve the first record after the one whose ID is specified. The values of the type are: RDM_EXACT (to be used when an exact ID match is being sought) and RDM_NEXT (to be used when the record that follows the one whose ID is provided is expected).

mqr_t This type is used to define a variable length structure that contains a pointer to a component of a record specification and one to its actual value once it is retrieved via mq_read( ) or mq_take( ). The data structure contains the following fields:

rid_t mqr_id;
int mqr_lease;
int mqr_bufsize;
int mqr_size;
uint8_t mqr_buffer[ ];

The field mqr_id is always set to MQ_NULLID, by the caller of any primitive that takes a pointer to an mqr_t structure in input. It is set by the called primitive.

The field mqr_lease is the duration of the lease for the record; it can be set to MQ_TMINFINITE, or it can be a positive number of seconds.

The field mqr_bufsize specifies the size in bytes for the mqr_buffer[ ] array and is always set by the caller.

The field mqr_size specifies the number of bytes for the mqr_buffer[ ] array that are in use. For a mq_put( ) call, the caller sets both mqr_bufsize and mqr_size to the bytes in use in the buffer. For a mq_read( ) or mq_take( ) call, the caller sets mqr_bufsize to the size of the buffer and mqr_size to 0. The primitive sets mqr_size to the number of bytes actually in use in the buffer.

The field mqr_buffer[ ] is a variable length buffer in which the actual record is stored. Its length cannot exceed MQ_MAXBUF bytes.

Utilities

The MaxiQ infrastructure makes available a utility macro that can be used to allocate a variable length mqr_t structure capable of storing 'b' bytes:

MQR_ALLOC(p, b)

The macro takes a first argument (p) that is of type mqr_t* and a second argument (b) that is a length in bytes. The first argument is the name of a pointer variable to a new record. the second argument is the size in bytes of the buffer for the record to be allocated. If successful, the macro assigns a pointer to the newly allocated structure to p. Otherwise, the assigned value is a null pointer. The structure allocated this way can be freed via the standard library routine free( ).

Return Codes

The codes returned by the primitives to indicate success or failure are defined here. They are:

MQ_OK The primitive was successfully executed.
MQ_INIT MaxiQ not initialized.
MQ_BADID No such record exists.
MQ_SIZE The size of the buffer was insufficient to retrieve the record.
MQ_BADSIZE Invalid buffer size of record length.
MQ_TMO No record found. This can happen when the primitive was invoked specifying a time-out and at the expiration of the time-out no record matching the specification existed.
MQ_BADREC Invalid or null record pointer.
MQ_BADSPEC Invalid record specification.
MQ_BADREQ Invalid or unimplemented request.
MQ_NOSPEC No such specification exists.
MQ_BADLEASE Invalid lease value.
MQ_BADTMO Invalid time-out value.
MQ_OPEN Hive already open.
MQ_NOTFOUND Item not found.
MQ_NOMORE No more items to look at.
MQ_SYSERROR Internal system error.
MQ_BADARG Invalid argument.
MQ_EXISTS The hive already exists.
MQ_ALLOC Unable to allocate memory.
MQ_BADIO I/O operation failed.
MQ_NOHIVE Inexistent hive.
MQ_NOFLUSH Unable to flush out hive.
MQ_NODEL Unable to delete hive.
MQ_ENET Network error.
MQ_SHUTDOWN System undergoing shutdown.
MQ_ECONN Connection error.
MQ_NETDOWN Network access error.
MQ_EMSG Invalid message received.

mq_create( )

Name mq_create—create a new hive

Synopsis include <mq.h> int mq_create(const uint8_t*spec);

Arguments

Spec

This argument is the pointer to a string that contains the specification for the hive of interest. The string is not allowed to start with a slash character ('/').

Description

The purpose of this primitive is that of creating a new hive within MaxiQ.

The only argument to this call (spec) is used to identify the specification for the hive to be created (as described above).

The new hive will be initially empty, until data records are appended via mg put( )

Return Values

MQ_OK The primitive was successfully executed.
MQ_INIT MaxiQ not initialized.
MQ_NOSPEC Null hive specification.
MQ_BADARG Hive specification starts with a '/' character.
MQ_ALLOC Unable to allocate memory.
MQ_EXISTS The specified hive already exists.
MQ_SYSERROR Unable to create hive.
MQ_ENET Network error.
MQ_SHUTDOWN System undergoing shutdown.
MQ_ECONN Connection error.
MQ_NETDOWN Network access error.
MQ_EMSG Invalid message received.

mq_delete( )

Name mq_delete—create an existing hive

Synopsis include <mq.h> int mq_delete(const uint8_t*spec);

Arguments

Spec

This argument is the pointer to a string that contains the specification for the hive of interest. The string is not allowed to start with a slash character ('/').

Description

The purpose of this primitive is that of deleting an existing hive from MaxiQ.

The only argument to this call (spec) is used to identify the specification for the hive to be deleted (as described above). Deletion of a hive implies permanent deletion of the data records it contains.

Return Values

MQ_OK The primitive was successfully executed.
MQ_INIT MaxiQ not initialized.
MQ_NOSPEC Null hive specification.
MQ_BADSPEC Invalid hive specification.
MQ_ALLOC Unable to allocate memory.
MQ_SYSERROR Unable to delete the hive.
MQ_ENET Network error.
MQ_SHUTDOWN System undergoing shutdown.
MQ_ECONN Connection error.
MQ_NETDOWN Network access error.
MQ_EMSG Invalid message received.

mq_read( )

Name mq_read—read the next available record in the queue that matches the specification Synopsis
include <mq.h>
int mq_read(const uint8_t*spec, rid_t id, rdmode_t rdm, mqr_t*precord, int tmo);

Arguments

Spec

This argument is the pointer to a string that contains the specification for the hive of interest. The string is not allowed to start with a slash character ('/').

Id

This argument specifies the ID of a record previously read. It can also be set to MQ_NULLID.

Rdm

This argument specifies whether an exact match of the record ID with the ID provided in id is sought for the record to be read in (in this case, this argument should be set to RDM_EXACT) or whether the record that follows the one whose ID is specified as id should be read in (in this latter case, this argument should be set to RDM_NEXT).

Precord

This is a pointer to the data structure that contains the record specification and will be filled with the record content on return.

Tmo

This argument specifies the maximum number of seconds the primitive should wait if no record is available, before returning with an error message. The argument can be set to 0, if immediate return is requested when no record matching the specification exists, or to a number of seconds that cannot exceed MQ_MAXTMO, if the call must suspend until one such record becomes available.

Description

The purpose of this primitive is that of reading a record from the queue, without removing it.

The first argument to this call (spec) is used to identify the hive whence the record should be retrieved (as described above).

The second argument to this call (id) is used to identify a record that has been already processed, so that, depending on the value in the third argument (rdm) the invocation returns the record with the specified ID or the first record following that record. When id is set to MQ_NULLID, the rdm argument should be set to RDM_NEXT and the first available record in the hive is returned. When id is set to a non-null record ID, the rdm argument should be set to RDM_EXACT if the record with the specified ID is to be retrieved, or to RDM_NEXT if the record to be retrieved is the one that follows the one whose ID was specified. When the rdm argument is set to RDM_EXACT and the record with the specified ID no longer exists in the hive, the error MQ_NOTFOUND is returned. This could happen if the record was "taken" (see mq_take( )), while the caller was scanning all the records.

The fourth argument (precord) points to the data structure into which a record is to be retrieved. Such a data structure can be allocated via the MQR_ALLOC( ) utility. In case the buffer that is part of the mqr_t structure is not large enough, the primitive will partially fill the buffer up to its capacity and an error indication will be returned to the caller. The members of this structure are used as follows: The caller of the function always sets the field id to MQ_NULLID. The called primitive updates this field to the ID of the record retrieved. The field mqr_lease is the duration of the lease for the record and is always 0 when a record is read in. The field mqr_bufsize is set by the caller to specify the size in bytes for the mqr_buffer[ ] array. The caller also sets mqr_size to 0. The primitive sets mqr_size to the number of bytes actually in use for the record. In case the size of the record buffer is not large enough to contain the entire record, the fields of the data structure precord points to are properly set, but the data is not returned within mqr_buffer[ ] and the MQ_SIZE error is returned. In this case, the mqr_id field of the structure precord points to is set to the ID of the record and the field mqr_size is set to the actual length of the record. By checking the return code, the caller can identify the situation, allocate a large enough buffer and reissue the request with the ID of the record that could not be read in, specifying the read mode as RDM_EXACT. The field mqr_buffer[ ] is the buffer into which the actual record is retrieved.

The fourth argument (tmo) specifies whether the caller should be suspended for tmo seconds in case a record matching the specification is unavailable. This argument can be set to 0, in case immediate return is requested, or to a positive value not exceeding MQ_MAXTMO for calls that should be suspended until either a record meeting the specifications becomes available or the specified time-out expires.

A typical invocation of this primitive, to retrieve and process all the records associated with a hive is along the lines of the following code fragment:

```
rid_t id;
mqr_t *pr;
/* 1024 is just a randomly chosen size for the buffer */
MQR_ALLOC(pr, 1024);
if (!pr)
    exit(1);
id = MQ_NULLID;
while ((ret = mq_read("a/b/c", id, RDM_NEXT, pr, 0)) == MQ_OK) {
    id = pr->mqr_id;
    processrecord(pr); }
```

An invocation like the one above reads all the existing records stored in hive "a/b/c", but leaves them in the hive for other processes. In a case like this, a null time-out is specified in order to go through all the items in the list. Had an infinite time-out been used, the caller would have blocked after the last item in the queue, waiting for another one to be appended. This code snippet does not highlight the fact that the return code should be looked at in more detail because the invocation may have not been successful for other reasons. For example, in case one of the invocations returns the error MQ_NOTFOUND, it means that the item that was previously retrieved is now no longer available and that the loop should be re-executed. This may entail that the application may have to skip the items it already processed.

Return Values

MQ_OK The primitive was successfully executed and one record was retrieved.

MQ_NOHIVE Null hive specification.

MQ_BADARG Null record buffer pointer. MQ_BADIO Unable to read the record.

MQ_BADREC Invalid record.

MQ_SIZE Buffer too small for the record. In this case, the "mqr_size" field of the record buffer contains the actual length of the record that could not be retrieved. However, the data buffer ("mqr_size") is returned empty and should not be accessed.

MQ_BADSIZE Invalid buffer size.

MQ_TMO Time-out expired before a suitable record could be retrieved.

MQ_BADTMO Invalid time-out value.

MQ_ENET Network error.

MQ_SHUTDOWN System undergoing shutdown.

MQ_ECONN Connection error.

MQ_NETDOWN Network access error.

MQ_EMSG Invalid message received.

mq_take( )

Name mq_take—read and remove the next available record that matches the specification, from the queue Synopsis include <mq.h> int mq_take(const uint8_t*spec, mqr_t*precord, int lease, int tmo);

Arguments

Spec

This argument is the pointer to a string that contains the specification for the hive of interest. The string is not allowed to start with a slash character ('/').

Precord

This is a pointer to the data structure that contains the record specification and will be filled with the record content on return.

Lease

This argument specifies the duration of the lease for the record being sought. The lease duration is expressed in seconds. The requested lease time must be a positive value and is not allowed to be set to MQ_TMINFINITE.

Tmo

This argument specifies the maximum number of seconds the caller should wait if no record is available, before returning with an error message. The argument can be set to 0, if immediate return is requested for the case when no record matching the specification exists, or to a number of seconds that cannot exceed MQ_MAXTMO, if the call must suspend until one such record becomes available.

Description

The purpose of this primitive is that of extracting a record from a specified hive in the queue.

The first argument to this call (spec) is used to identify the hive whence the record should be retrieved (as described above).

The second argument (precord) points to the data structure that will store the record being retrieved. Such a data structure can be allocated via the MQR_ALLOC( ) utility. In case the buffer that is part of the mqr_t structure is not large enough, the primitive will partially fill the buffer up to its capacity and an error indication will be returned to the caller. In this case, the call operates like an mq_read( ) operation in that the record is not removed from the queue. The members of the mqr_t structure are used as follows: The caller always sets the field id to MQ_NULLID, before invoking this function. The called primitive updates this field to the ID of the record retrieved. The field mqr_lease is the duration of the lease for the record in seconds; it is not allowed to be set to a non-positive value, nor to MQ_TMINFINITE. The field mqr_bufsize is set by the caller to specify the size in bytes for the mqr_buffer[ ] array. The caller also sets mqr_size to 0. The primitive sets mqr_size to the number of bytes actually used to copy the data record into the buffer. In case the size of the record buffer is not large enough to contain the entire record, the fields of the data structure precord points to are properly set, but the data is not returned within mqr_buffer[ ] and the MQ_SIZE error is returned. In this case, the mqr_id field is set to the ID of the record and the field mqr_size is set to the actual length of the record. By checking the return code, the caller can identify the situation, allocate a large enough buffer and reissue a request (which may not yield the same record, if, in the meanwhile, the latter had been extracted by another client). The field mqr_buffer[ ] is the variable-length buffer into which the actual record is retrieved. The third argument (lease) specifies the number of seconds the caller expects to use to process the record. For the specified time duration the record will be unavailable in the queue. The caller has then the following options:

If it lets the lease expire (this could be due to the death of the thread that performed the call), the record reappears in the queue.

It may invoke mq_reset(ID, MQ_TMINFINITE) to permanently erase the record from the queue.

It may invoke mq_reset(ID, 0) to make the record available in the queue, before the lease obtained when mq_take( ) was invoked expires.

The fourth argument (tmo) specifies whether the caller should be suspended for tmo seconds in case a record matching the specification is unavailable. This argument can be set to 0, in case immediate return is requested, or to MQ_TMINFINITE for calls that should be suspended until either a record meeting the specifications becomes available or the specified time-out expires.

Return Values

MQ_OK The primitive was successfully executed and one record was retrieved.

MQ_NOHIVE Null hive specification.

MQ_BADARG Null record buffer pointer.

MQ_BADLEASE Bad lease value.

MQ_NOMORE No more records available.

MQ_BADIO Unable to read the record.

MQ_BADREC Invalid record.

MQ_SIZE Buffer too small for the record.

MQ_BADSIZE Invalid buffer size.

MQ_TMO Time-out expired before a suitable record could be retrieved. MQ_ENET Network error.

MQ_SHUTDOWN System undergoing shutdown.

MQ_ECONN Connection error.

MQ_NETDOWN Network access error.

MQ_EMSG Invalid message received.

mq_put( )

Name mq_put—append a record to the end of the queue

Synopsis include <mq.h> int mq_put(const uint8_t*spec, mqr_t*precord, int wait);

Arguments

Spec

This argument is the pointer to a string that contains the specification for the hive of interest. The string is not allowed to start with a slash character ('/').

Precord

This is a pointer to the data structure that contains the record specification and will be filled with the record content on return.

Wait

This argument is set to 0 if the caller does not want to wait until the new record is on stable storage before receiving control back from the call.

Description

The purpose of this primitive is that of appending a record to the end of the queue within the specified hive.

The first argument to this call (spec) is used to identify the hive to which the record should be appended (as described above).

The second argument (precord) points to the data structure containing the record to be appended. Such a data structure can be allocated via the MQR_ALLOC( ) utility. The members of the mqr_t structure precord points to are used as follows: The caller always sets the field id to MQ_NULLID, before invoking this function. After the successful execution of the call, the primitive will set it to the ID assigned by the system. The field mqr_lease is the duration of the lease for the record in seconds, it should be set to 0 and is ignored by this primitive. The field mqr_bufsize is set by the caller to specify the size in bytes for the mqr_buffer[ ] array. The caller also sets mqr_size equal to mqr_bufsize.

The field mqr_buffer[ ] is the buffer into which the caller stores the record to be appended. If the last argument (sync) is set to 0, i.e., it is a null argument, this call is non-suspensive for the caller and the caller gets control back as soon as the record is cached. Otherwise, the caller is given back control only when the record is on stable storage.

Return Values
MQ_OK The primitive was successfully executed and one record was appended to the queue.
MQ_NOHIVE Null hive specification.
MQ_BADARG Null record pointer or invalid record size.
MQ_BADSIZE Invalid record length.
MQ_BADIO Unable to write the record.
MQ_ENET Network error.
MQ_SHUTDOWN System undergoing shutdown.
MQ_ECONN Connection error.
MQ_NETDOWN Network access error.
MQ_EMSG Invalid message received.
mq_reset( )
Name
mq_reset—reset the lease for a specified record in the queue
Synopsis
include <mq.h>
int mq_reset(const uint8_t*spec, rid_t id, int lease);
Arguments
Spec
This argument is the pointer to a string that contains the specification for the hive of interest. The string is not allowed to start with a slash character ('/').
Id
This argument specifies the ID of an existing record previously "taken".
Lease
This argument specifies the number of seconds after which the record lease expires, with respect to the time when this call is performed. Admissible values are 0 (the record becomes visible instantaneously), a positive value (the lease will expire in that many seconds from the time of this call) or MQ_T-MINFINITE (the record is permanently removed from the queue).
Description
The purpose of this primitive is that of resetting either the lease time or the lifespan of an existing record.

The first argument to this call (spec) is used to identify the hive to which the record should be appended (as described above). The second argument to this call (id) is used to identify the record that will be affected by the execution of the primitive. The third argument (lease) is the new number of seconds the record lease should last from the time this primitive was last invoked. Admissible values are 0, a positive value or MQ_TMINFINITE. The following cases occur:
  If the new value of lease is 0, the record affected will become immediately visible in the queue.
  If the new value is a positive value, the record will remain invisible for the specified additional time interval from the time this primitive is invoked.
  If the new value is MQ_TMINFINITE, the record is permanently erased from the queue.
Return Values
MQ_OK The primitive was successfully executed.
MQ_NOHIVE Null hive specification.
MQ_BADID Invalid record ID.
MQ_BADLEASE Invalid lease value.
MQ_NOTFOUND Record not found.
MQ_BADIO Unable to write out modified record.
MQ_ENET Network error.
MQ_SHUTDOWN System undergoing shutdown.
MQ_ECONN Connection error.
MQ_NETDOWN Network access error.
MQ_EMSG Invalid message received.

REFERENCES

[1] Carriero, N., Gelertner, "Linda in Context", Communications of the ACM, Vol. 82, No. 4, April 1989, pages 444-458.

IV. Exemplary Membership Protocols

1 Introduction

MaxiFS infrastructure consisted of an aggregation of storage nodes. There are two logical memberships of the storage nodes in the infrastructure. One is the Management Server Federation (MSF). The MSF is to facilitate system management activities in the MaxiFS infrastructure. The other logical membership is the peer set. A peer set is used to facilitate file system related operations.

This document describes the membership protocol used to construct the MSF and peer sets. We also present a simulation framework serving as a development and validation framework for the protocol.

2 Persisted States

Figure 25:
FIG. 25 is a state transition diagram for node initialization, in accordance with an exemplary embodiment of the present invention.

A storage node exercises the membership protocol for MSF and peer set joining During the process, the node persists milestone states for crash recovery or normal restart. In additional to the states, the following information is also persisted:
  The MSF group view. There can be 0 or 1 view.
  0 or more peer set views.
2.1 The MSF Group View
  The MSF group view consists of the following:
  The ID of the MaxiFS infrastructure.
  The version of the MSF group view last known to the node.
  The timestamp of view (used to make a heuristic decision, as discussed below).
  The MSF group vector containing the ID of the nodes in the view.
  The IP address of the root of the MSF.
2.2 The Peer Set View
  The Peer Set view consists of the following:
  The ID of the peer set.
  The version of the peer set view.
  The timestamp of the view.
  The ID of the nodes belonging to the peer set.
  The IP address of the primary of the peer set.
3 Node Membership State Transition When a node joins the MaxiFS infrastructure, it always joins the MSF before the attempt to join a peer set is made. Therefore, as shown in FIG. 25, the membership state of a node transits as follows:
  INIT: The initialization state, no membership is obtained.
  MSF-JOINED: The node has joined the MSF.
  PEER_SET-JOINED: The node has joined one or more peer sets.
The membership protocol, therefore, consists of a protocol for MSF and a protocol for peer set formation. Exemplary protocols are described below

4 MSF Membership Protocol

The MSF membership protocol consists of the following sub-protocols:

Discovery /Join: The protocol for a node to discover and join the MSF.

Merge: The protocol that allows a MSF root to synchronize the group view to the rest of the members and allow several MSF trees to merge after a network partition.

Failure Detection (FD): The protocol to ensure the integrity of the MSF group view.

Figure 26:
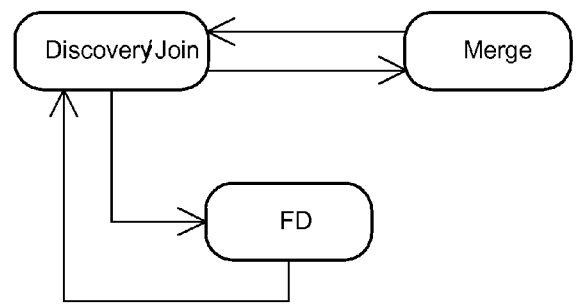
FIG. 26 is a state transition diagram for membership in a management server federation, in accordance with an exemplary embodiment of the present invention.

FIG. 26 shows the state transition of a node during MSF joining Details of the sub-protocols are discussed in the following sections.

4.1.1.1 Discovery /Join Protocol

Figure 27:
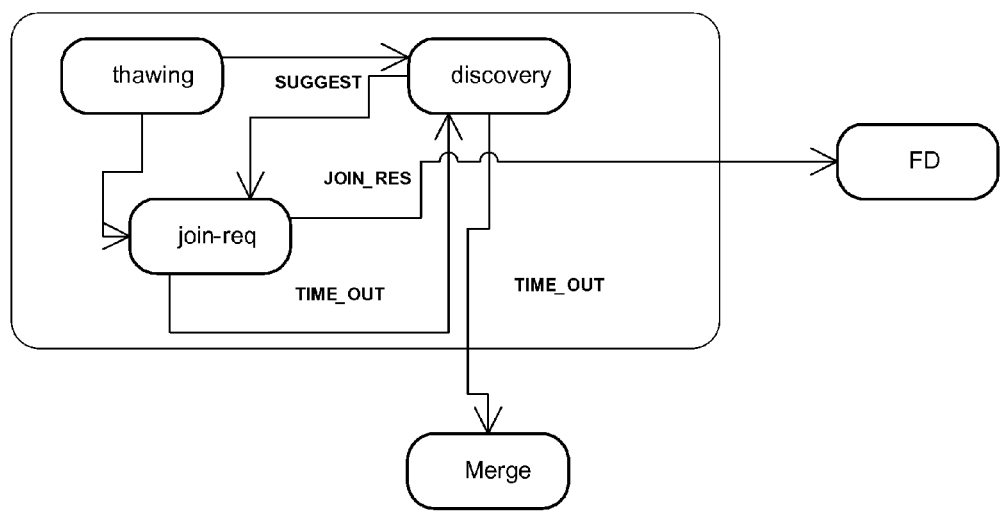
FIG. 27 is a state transition diagram for discovering and joining a management server federation, in accordance with an exemplary embodiment of the present invention.

FIG. 27 shows the state transition of the discovery/join protocol.

When a node initializes, it remains in the "thawing" state for a time ranging from $t_{min}$, to $t_{max}$. Setting the node in a dormant state initially prevents a "packet storm" condition when the entire storage infrastructure is restarting (maybe after a power failure). The time it takes for it to time out from the state is a function of the ID of the node. The ID is a persistent identification for the node (the ID could be, for example, a number based on the MAC address of the first network interface of the node). The fact that the time is a deterministic function of the node's ID helps in resolving contention for the MSF root during this state and helps in achieving fast convergence.

The node enters the "join-req" state after it wakes up from the "thawing" state if there is any persisted MSF view stored. It sends request to the root of the MSF. If the request is granted it is considered a member of the MSF and starts the FD sub-protocol. If there is no previously persisted MSF view or the node times out from the "join-req" state, it enters the discovery state and starts IP multicasting discovery packets (e.g., using TTL, local link multicast addresses 224.0.0.0/25, or limited scoped addresses 239.0.0.0-239.255.255.255 to confine multicast packet within the MaxiFS system).

In the discovery state, the node listens for incoming and determines a candidate root to join. The information of a candidate root can come in one of the two forms: 1) suggestion packets sent by other nodes addressed to the node or 2) group synchronization packets sent by the root on the group multicast address.

If the node reaches timeout in the discovery state, the node assumes the root responsibility and starts the merge protocol.

4.1.1.2 Merge Protocol

When a node assumes the responsibility of the root, it enters the merge state and starts the merge protocol. It periodically performs limit scoped IP multicast of the group synchronization packet that contains the following:

The MaxiFS ID (an ID assigned to the entire infrastructure upon creation time)

The version of the view.

The time elapse in milliseconds a receiver should expect for the next synchronization packet.

A list of the node IDs in the MSF.

The hash table indicating peer set allocation to facilitate namespace resolution.

The version of the view should be embedded in all calls involving intra-node communication, especially calls performed via EJB. Any version mismatch can be detected and can help in view synchronization. To avoid modifying the EJB interface, this can be implemented using the Interceptor provided in EJB 3.0.

The information contained in the synchronization packet serves the following purpose:

It provides a synchronized view for all nodes. A node should consider itself shunned from the MSF and be required to re-join if its version is out-of-sync.

It serves as a lease of the root to the hierarchy.

It provides a mechanism to accelerate convergence of the hierarchy during system startup.

It provides a mechanism to merge MSF trees (and peer sets) after a network partition.

Figure 28:
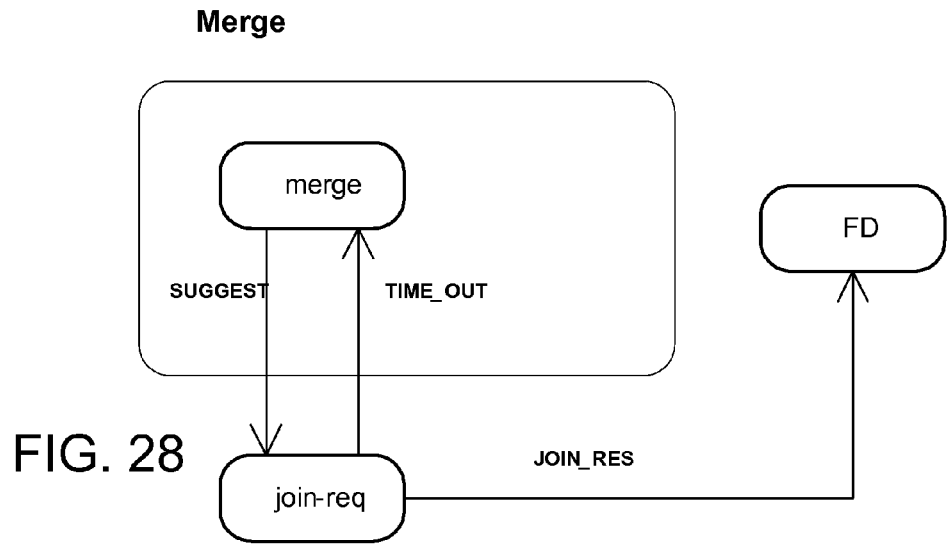
FIG. 28 is a state transition diagram for merging a management server federation by a root node, in accordance with an exemplary embodiment of the present invention.

FIG. 28 illustrates the state transition of the merge protocol.

A node can transit from the merge state to the "join-req" state in which it exercises the joining protocol to merge its federation with another federation. This event can occur when the root of a MSF receives a suggestion or a group view from other nodes that contains information indicating the existing root with lower ID.

Another important aspect of the merge protocol is to merge peer sets. A peer set can be broken up into two degraded peer sets due to network partition. We will define the process in the following section.

4.1.1.3 Leased Based FD protocol

A node enters the FD state and starts the FD protocol once it joins the MSF. In additional to a possible FD protocol that runs within a peer set after the node has joined one or more peer sets, an FD protocol that runs at the MSF level is included, since it is possible for a node to not be a member of any peer set.

Figure 29:
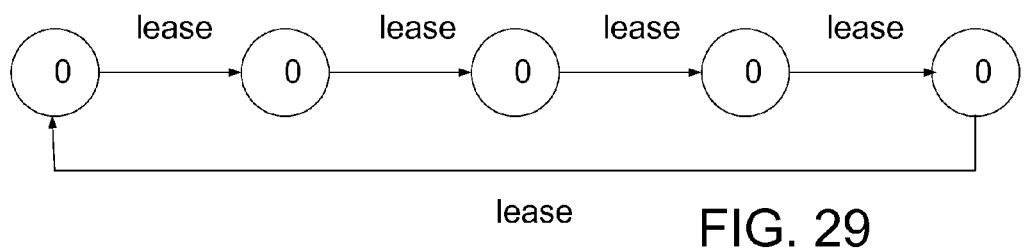
FIG. 29 is a schematic diagram showing a representation of lease-based failure detection in a management server federation, in accordance with an exemplary embodiment of the present invention.

As shown in FIG. 29, to perform MSF level failure detection, the MSF is typically organized as a circular link list, sorted by node ID. The smaller ID node establishes a lease with its adjacent node. With each lease renewal, the requestor supplies the duration to extend the lease, and it is the requestor's responsibility to renew the lease in due time. A node is suspected if it fails to renew the lease.

It should be noted that if any node is suspected, an event will need to be generated to notify the MSF root to keep in-sync the peer set hash table and MSF group view.

However, it is not impossible for the root of the MSF to experience failure. This should be dealt with in the following fashion:

The node with the lowest ID is always the root of the MSF.

The root periodically propagates the group view throughout the infrastructure. The data contains the elapse time a node should expect for the next view propagation. If a node does not receive the message within the specified time for n times, the root should be suspected.

If the root is suspected, a node should try to elect the next root by going through all the nodes in the MSF in ascending ID order, one at a time. It stops at the first node that accepts the election.

The new root responds to the election request and includes the requesting node to the MSF. Noted when a node sends an election request it includes its peer set information, therefore, the new root learns about peer set composition during the election process.

5 Peer Set Joining Protocol

After a node joins the MSF, it should proceed for peer set joining. There are essentially two possibilities:

The node was not a member of any peer set.

The node was a member of one or more peer sets.

In the first case, the node is a candidate for joining any peer set or it can simply become a data repository node. The MSF should determine proper action based on the state of the infrastructure. If there are degraded peer sets in the system, the node will be instructed to join a degraded peer set at a later time.

In the second case, the node should resume its previous peer set membership with the primary nodes of all the peer sets to which it belongs, one at a time. The primary node of a peer set chooses to either grant or deny the request. The protocol outcomes will be sent to the root of the MSF such that the current peer set view is informed to the root. The primary of the peer set does the following:

If the request is denied.
  Notify the joining member about the decision.
If the request is granted:
  Notify peer set secondary about the new view.
  Collect acknowledgements from the members.
  Persists the outcome and update the root of the MSF about the new peer set view.

Figure 30:
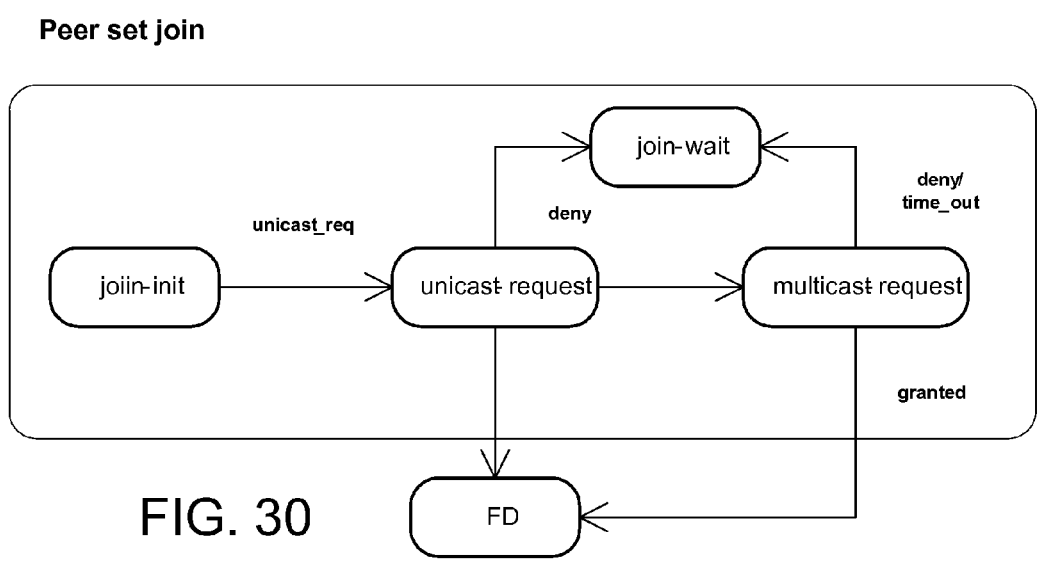
FIG. 30 is a state transition diagram for joining a peer set, in accordance with an exemplary embodiment of the present invention.

As shown in FIG. 30, in terms of the joining node, the protocol proceeds as follows:

Sends unicast requests to the primary IP address (not necessary if the node was the primary). The IP address of the primary is given by the MSF root when the node is joining the MSF. If the address is not given, then the address would be the one that is persisted previously by the joining node.

If time out occurs, sends the request to the multicast address own by the peer set.

If time out occurs in this state, there are two possible actions:
  If the node was a peer set primary, it sends request to the root of the MSF to become the primary (This task potentially could be coordinated by the supervisor set, although it is not guaranteed that the supervisor set is available especially during system startup. Therefore, it may be more reliable to have the root of the MSF coordinate the process). There are several outcomes:
    The request is granted and the node becomes the primary. The reply contains the information of any existing secondary nodes in "join-wait" state.
    The request is denied and the node remains in a "join-wait" state.
    The root replies with a peer set primary information. The node then resumes the joining process.
  If the node was not a peer set primary, it will enter the "join-wait" state.

When a node is in a "join-wait" state for a peer set, it will wait for events to resume joining process. It is possible that the primary of the peer set has failed. The peer set is in a faulty where all secondary nodes are just waiting for the primary to come up.

One heuristic decision that the MSF root can make is that if the peer set is in this state for up to a limit it may go ahead and instruct the secondary nodes to form the peer set. With this, the peer set will be at least back to a degraded state. The protocol proceeds as follows:

The MSF root instruct one of the node (with the smaller ID of the two) to become the primary giving the information of the secondary node.
The primary bumps the version of the view and invites the other node to join the peer set.
The primary receives the acknowledgement from the secondary.
The primary saves the protocol outcome.
The primary updates the MSF root about the new peer set information.

The peer set is now still in a degraded state in that it has only two members. The MSF will recover the peer set back to normal state as the system evolves and volumes become available.

6 Peer Set Protocols 6.1 Peer Set Protocol 1

The management system (MS) persists the set of nodes that are part of the federation in each local database, along with all required information describing the allocated peer sets. One key structure that the system maintains is the nodes table, which the system shares with the federation protocol engine (FPE). When the FPE on a given node (which may be referred to hereinafter as a "tuple") starts, it retrieves a copy of the nodes table from the system and operates on this copy as the protocol logic progresses, synchronizing changes to the table with the system at each merge cycle. The description in this section focuses mainly on a peer set protocol, and the federation protocol, and describes how the peer set protocol engine (PPE) interfaces with the FPE.

The peer set protocol (i.e., a dialog among the members of a given peer set) is used to confirm that individual members of the set are able to communicate with each other. The selection of the members into a peer set is done by the MS, and neither the FPE nor PPE have any direct control over that process. (The member selection algorithm of the MS considers various criteria, such as volume size and health of the peers as well as other business rules, and this information is not available at a level of the protocol engine.)

Whenever the MS runs its selection algorithm and allocates new potential peer sets, the FPE uses the member changes, produced by the MS, at the next merge cycle and reflects these changes in its own copy of the nodes table. The updated nodes table is then distributed to the other members of the federation as part of the Merge messages sent out by the root node. If the nodes table indicates that a peer set member has changed since the last Merge message was sent, then the arrival of a new Merge message reflecting the changes in the nodes table signals to the PPE to initiate its peer set dialog and confirm whether the members of a given peer set can or cannot communicate with each other. Next, after the PPE completes the dialog among the members of a peer set (whether successfully or not), the PPE passes on the results of the dialog to the MS, with indication of success or failure of the dialog. If the results of the dialog convey failure in member communication, then the MS uses the passed on information and runs through its selection algorithm yet again, allocating replacements of the members that failed to communicate, as necessary.

The FPE also informs the MS when new nodes have joined the federation or existing nodes have left (for example, due to a node failure). Such information also triggers the MS to run its member selection logic. A detailed description of the inner workings of the peer set protocol follows.

Figure 31:
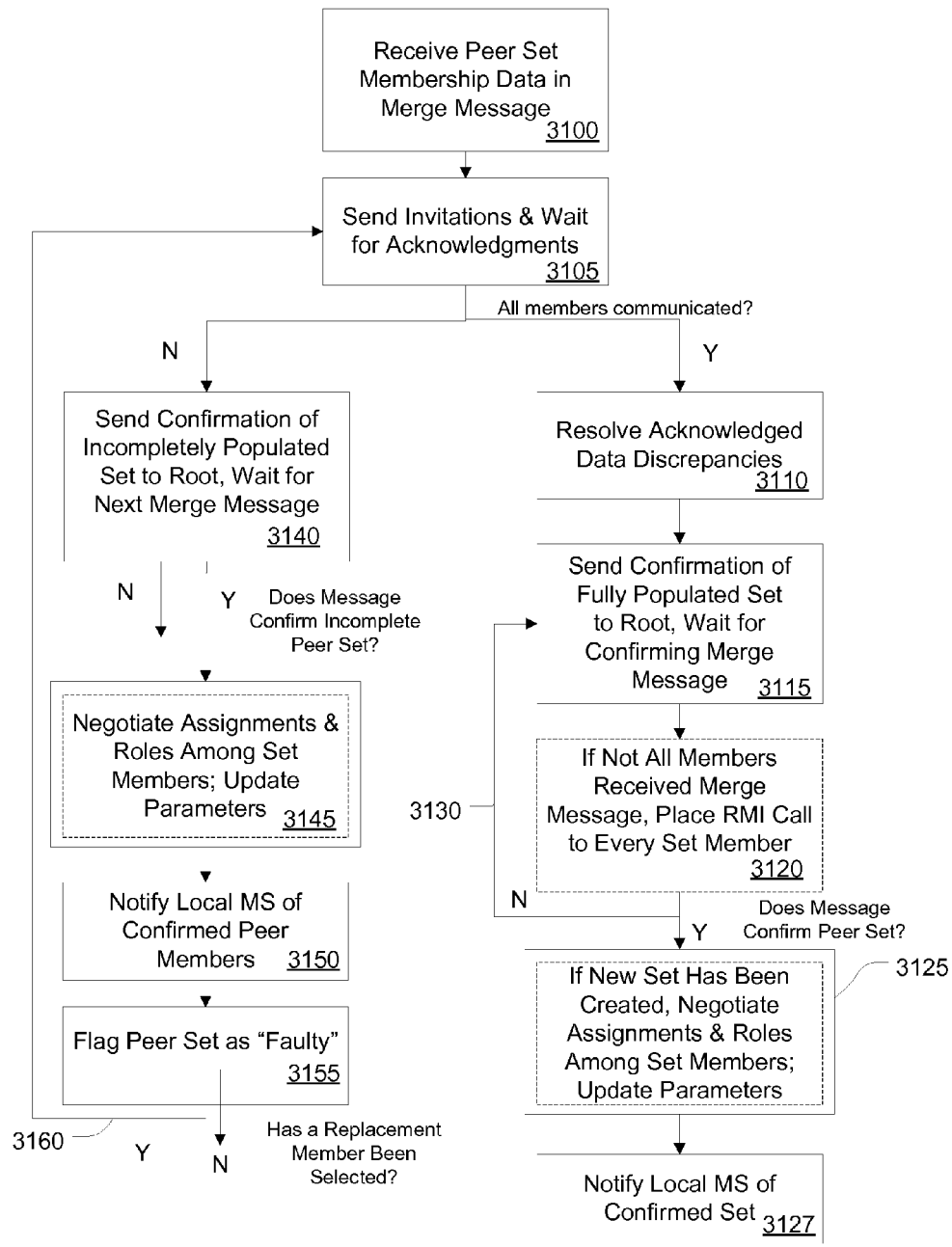
FIG. 31 is a logic flow diagram showing the relevant components of a peer set protocol in accordance with an exemplary embodiment of the present invention.

The processing flow discussed below is schematically illustrated in FIG. 31. When a node first starts up, multiple threads are spawned to handle each of the peer set tuples represented by the node/volume pairs of a node. Each tuple thread enters a "wait" state, waiting for a Merge message to arrive. When such a Merge message arrives, a tuple first examines, 3100, the peer set membership data contained in the Merge message to determine if this particular tuple has been assigned to a peer set. If, based on the contents of the Merge message, a given tuple does not belong to a peer set, such tuple goes back into a "wait" state in which it continues to examine each arrived Merge message to determine if it has been assigned to a peer set.

However, when a Merge message indicates that a given tuple does belong to a peer set, the tuple determines which other tuples are in the same peer set and starts a conversation with them, sending Invite messages to each member and waiting for InviteAck acknowledging messages to be returned, 3105. According to the peer set protocol, the tuple will try initiating a conversation with other tuples, associated with the same peer set, several times before giving up. An InviteAck message contains a member's current color, role, checkpoint number, and a peer set generation number (if the member belongs to an existing peer set) or "unassigned" indicator (if the peer set is new). Each of the tuples retrieves this information from the MS, which has persisted it in its local database. The overall result of such communication among the tuples is that, when the Invite /InviteAck exchange is complete, each member should know the other members' color, role, checkpoint number and peer set generation.

Generally, any discrepancy in the data exchanged by the tuples indicates some kind of system failure, which has to be resolved at step 3110. An example of such situation may be a case when each of two or more tuples, associated with the same peer set, indicates that it is primary. In general, disagreements should be resolved by the tuples, for example, by choosing the information associated with the highest peer set generation. If there is a discrepancy and the generation numbers are the same, the tie is resolved, for example, by using the peer set member with the highest checkpoint number. In a case of discrepancy when both the generation number and the highest checkpoint number are the same, a tie-breaking mechanism may be provided, for example, by selecting the peer set member with the lowest node id.

Assuming each of the three members of the peer set receives replies from the other members, the peer set protocol engine (PPE) proceeds on to the confirmation state. In this state, a designated tuple (e.g., the tuple with the lowest id) sends a ConfirmPeerSet message, 3115, to the root node indicating that all three members have successfully exchanged Invite /InviteAck messages, and then each of the tuples enters a "wait" state for the next Merge message. (On receiving a ConfirmPeerSet message from a peer set tuple, the root, in turn, sends a PEER_SET_CREATED event to the primary MS including in this event the list of tuples that have successfully exchanged invite messages. The MS updates its nodes table accordingly, indicating which peer set members have been confirmed. The root node, then, synchronizes these changes with its own nodes table at the next merge cycle, updating the federation view id in the process, and distributes these changes to the other nodes.) When a new Merge message arrives, the waiting tuple threads check if their peer set entries have been updated.

One practical failure scenario may include an inadvertent loss of a Merge message during the transfer of the message (for example, due to a UDP transmission error). In a case when all three tuples of a given peer set lose the Merge packet, each of theses tuples simply continues to wait further and no harm will be done. However, if at least one member does not receive the packet and the other tuples do receive it, the tuples will be coerced to become out-of-sync with each other. To prevent this from happening, when a tuple in the confirm wait state receives a Merge message, such tuple makes a remote method invocation (RMI) call, 3120 to every other node in its peer set, redundantly passing to these nodes the Merge message it has just received. The handler for the RMI call receives the Merge message and injects it into the message queue for a target tuple, thus guaranteeing that each tuple will receive the Merge message. (If a given tuple has already received the Merge message through the normal process, it simply rejects any duplicate packets.) The overall result, therefore, is that utilizing an RMI call warrants that all tuples will receive a Merge message even if only one of the tuples receives it. Consequently, all tuples proceed to the next state in unison.

If such update has occurred, the tuples send a PEER_SET_CONFIRMED event to the local MS announcing the confirmed peer set. Prior to sending such event, however, the tuples may perform additional activities, 3125. In particular, in the specific case when a new peer set has been created, before sending the event, the tuples negotiate color assignments, for example, based on their relative node id ordering. In particular, red may be assigned to the member having the lowest id, green to the member having the second lowest id, and blue to the third, remaining member. Furthermore, the roles of the members would also be selected, for example, based on the relative node id ordering and on the modulus of the peer set id by 3. For example, if the modulus of the peer set id is 0, the member with the lowest node id is selected as primary; if the modulus is 1, the member with the second lowest id is selected to be the primary member, and so on. Moreover, each of the non-primary members would be assigned the role of a secondary member. Finally, the generation number of the new peer set would be set to 0. All this information is then passed to the local MS as part of the PEER_SET_CONFIRMED event, 3127. It should be noted that color assignments and primary/secondary roles can be determined for the peer set nodes in other ways.

On occasion, however, the peer set information, which is distributed according to the FPE to the tuples in a Merge message based on the nodes table of the MS, may be not updated. Possible reasons for not having the nodes table updated include: (i) a loss of the initial ConfirmPeerSet message on its way to the root node, (ii) a decision, by the MS, not to confirm the peer set members, or (ii) a timing issue, and the tuples will have to wait for the next Merge message before proceeding with their operations. If the peer set information in the Merge message has not been updated when the Merge messages arrives, the tuple with the lowest node id will again send, 3130, a CreatePeerSet message to the root and enter into another "wait" state. As currently envisioned, the peer set tuples will wait indefinitely for a Merge message with their entries updated as "confirmed." However, such timing interval may be adjusted as required, and a different timing interval, precisely defined for this purpose, is also within the scope of the invention.

Another possible failure scenario may arise during the Invite /InviteAck exchange in that, after several Invite attempts, a given tuple has not received InviteAck replies from at least one of its peers, 3135. (It can be said that the "inviting" tuple does not receive replies from "missing" members, in which such case the "inviting" tuple enters a recovery state.) The reasons that a member could fail to reply falls into two major categories: there is either a physical failure of a node or volume, or there is a network partition. Although the "inviting" tuple does not differentiate between these two kinds of failures, the responses to these failures by the system are quite different. In the following description, the case involving an actual member failure is addressed first, and then the matter of how the protocol engine handles a network partition is elaborated on.

A case of a failure of an isolated member presents several possibilities. First, a peer set may lose either one or two members. Second, a "missing" member of the set may be a currently designated primary. Neither of these situations can be immediately resolved. The first action taken in either case is to proceed with sending, 3140, the usual ConfirmPeerSet message to the root node, in the exact same way as it would in the case of a peer set without missing members. This message is sent by a designated tuple from among the tuples that have responded to the Invite message, for example, the tuple that has the smallest node id. The sent message indicates which of the peer set members responded to the Invite messages. After sending the message, the sending tuple enters a "wait" state, waiting for the next Merge message. On receiving the ConfirmPeerSet message, the root node will perform actions similar to those it would perform having received a ConfirmPeerSet message about a fully populated peer set. As described above, these actions include: sending a PEER_SET_CREATED event to the MS and, in response to the changes introduced by the MS into a node table, adjusting its own node table accordingly. In the particular case of "missing" members, the MS will recognize, based on the PEER_SET_CREATED event, that some members have not responded to the peer set invitations. In response to receiving such a PEER_SET_CREATED event, the MS will flag as "confirmed" only the responding members. With respect to the other, "missing" members, the MS will either leave these "missing" members as is for the time being (thus allowing for the case of late arrivals), or, perhaps, will select replacement members if it decides that the members are missing because they are indeed faulty. In either case, the root node will synchronize any changes, made by the MS to the MS nodes table, with its own nodes table at the next merge cycle.

The tuple threads that wait for a Merge message from the root node will examine the message to confirm that their own entries have been confirmed, and will also check if any replacement members have been selected by the MS. Since one or more members are missing, some additional operations will be performed, 3145: the generation number of the peer set in the message will be increased by 1, and if one of the missing members was previously the primary, a new tuple will be selected to assume the role of primary, using the same modulus based selection mechanism discussed above. However, the color designation of the new primary will not change but will remain the same. Regardless of whether or not new members have been selected at this Merge cycle, if the nodes table passed to the tuples by the root node indicates that the existing members have been flagged as "confirmed", each tuple will send a PEER_SET_CONFIRMED event to the local MS, 3150. When a local MS receives the message, it will flag, 3155, the peer set as a "degraded" or "faulty" peer set and take appropriate actions. In the case of a faulty peer set, for example, the MS typically will start the fast path service (i.e., the file system service implemented by individual file server processes running on each member of the peer set) in "read only" mode (i.e., the MS will start the file system service on a member of the peer set in such a way that it will not be allowed to update the partition of the distributed file system residing on the local disk until the MS switches the mode to read-write).

If new replacement members have been selected, after sending a PEER_SET_CONFIRMED event to the local MS (and having an generation number increased), the tuple threads will start, 3160, a new Invite /InviteAck exchange similar to their original boot-up exchange. If all members respond as expected, the now fully populated peer set is ready to be confirmed and each tuple sends another ConfirmPeerSet message to the root node, where the root node performs the exact same actions as described above, i.e. it notifies the MS of the now fully populated peer set, retrieves the updated table from the MS, and sends out the updated nodes table in its next Merge cycle. Again, when the waiting tuples receive the new Merge message, they will renegotiate color/role assignments as needed (e.g., each existing member retains its current color and each new member is assigned an unused color, and a new member is typically assigned a secondary role) and increase the peer set generation by 1. The new peer set members will then, again, send PEER_SET_CONFIRMED events to the local MS while the original peer set members will send PEER_SET_UPDATED events to the MS. The PEER_SET_CONFIRMED event will include an additional flag to tell the local MS to start the volume synchronization workflow before it brings up the fast path service, and the PEER_SET_UPDATED event will include a flag to instruct the MS not to publish the member information to the fast path service until after the volume synchronization is done.

After a tuple has sent a PEER_SET_CONFIRMED or PEER_SET_UPDATED event to the local MS, it goes back into a wait state. Each time a new Merge message arrives, it checks if there has been any change to its last known peer set membership. If any change has occurred, it repeats the Invite /InviteAck exchange with the newly identified members and goes through the same process as described above. There is a possibility that, when a tuple receives a Merge message, it will discover that it is itself no longer a member of a peer set. If this happens, the local MS will have to be notified and then the tuple will enter a "wait" state.

As a result of a network partition, there is a possibility that each of two different root nodes owns some subset of the full set of nodes. Each partition will see complementary versions of the existing peer sets. For example, a partition could leave two peer set members on one side and a single peer set member on the other. The peer set protocol sees only the smaller picture and each side will report a corresponding complimentary picture to the root node of a respective partition, which, in turn, will pass it on to the root MS of that partition. In a split like this, the simultaneous replacements of "missing" members of the same peer set by both root MS's cannot be afforded because such simultaneous replacements would result, when the partition is resolved, in two versions of the same peer set with potentially different data. How this situation is handled is left for the MS to decide. The FPE simply reports the change in a cluster topology to the MS, and the MS decides how to resolve the matter. The key to remember here is that there are two (or more) partitions each with their own root and primary MS instance.

On sensing that a network partition has occurred, the rule engine in the root MS of each partition will take appropriate actions, with the following stipulations: 1) not to perform an irreversible action (e.g., migration or replacement) when the system is in flux, and 2) not to take any action when a large percentage of existing nodes have been lost, unless instructed to do so administratively. In the case of n-way partitions, the protocol engines in each partition continue to operate as described above. The root MS in each partition continues to receive events (many of which will be failure events), continues to evaluate the topology, and continues to update its internal status. It should be appreciated, however, that in its operation under network partition conditions, the root MS is limited so as to allocate new peer sets only in a partition associated with the majority of members. In other words, the root MS should not create new peer sets in a partition with the smaller number of nodes. If this condition is not satisfied, i.e., if each of partitions is allowed to create new peer sets, then peer set id collisions may occur when the partitions re-integrate. The following example of a two-way partition illustrates this principle. Peer set ids have to be unique. However, if the highest number of a peer set id in a partition A with the smaller number of modes is N, and the highest number of a peer set id in a partition B with the greater number of modes is N+M, then, should a new peer set be allocated in the partition A, such new highest number will be N+1. The partition B already has its own peer set having an id number of N+1. Therefore, when the two partitions eventually remerge, the two root node MS instances would each have a peer set numbered N+1, which violates the uniqueness of the peer set id and cannot be allowed. It should be emphasized that the above-stated restriction on the operation of the root MS is a restriction on the allocation of new peer sets. Existing peer sets can still solicit for new members, with some conditions.

Any two-member (degraded) peer set (i.e., a peer set having two functioning members) in any partition can have its missing member replaced regardless of which partition such peer set is associated with and continue to operate in a fully functional state within that partition. However, missing members should be replaced only after an appropriate timeout period elapses, which allows the network partition to be resolved. Missing members of a particular degraded peer set are eventually replaced according to the peer set protocol as described above (which includes the peer set generation being increased by 1, PEER_SET_UPDATED events being sent by the existing members, and a PEER_SET_CONFIRMED event being sent by the new member).

A single-member (faulty) peer set (i.e., a peer set having only one functioning member) operating in a partitioned environment cannot have its missing members replaced. Instead, the peer set protocol will signal the local MS that the peer set has lost two members and the root MS of that partition will place such peer set in a "read-only" state. The lost members could potentially exist as a two-member peer set in a second partition, and if the partition lasts long enough the missing member will likely be replaced. When the network is eventually resolved and the partitions re-integrate, the MS evicts the old "read-only" member and the volume occupied by such member is reclaimed. The generation of the peer set is defined based on the following: If before a (two-way) partition occurred a given peer set had a generation number N, and after the partition the generation numbers of corresponding peer sets in two partitions are M and L, respectively, then re-integration of partitions the generation number assigned to the "restored" peer set is max(M, L)+1. If the network failure time was short and no replacement member had been selected yet, then the single member will rejoin its old peer set, synchronizing its data with the other two members (in case any changes have occurred). The effective operation that is performed by the MS is to evict the member, throwing away its out-of-sync data, and then select the same member as a replacement.

With regard to merging an n-way partitioned cluster, this will happen as a part of normal operation of the federation protocol. When the network problem causing the partition is resolved, the roots of each respective partition will receive the next Merge message sent out by the other root nodes. The roots of the clusters created as a consequence of the network partition will see a Merge message from node with a lower id (the original root node) and will request to join that node. The original root will subsequently resume its status as sole root, with the nodes making up the other partition automatically rejoining the root as part of the other root nodes turning over root status to the original root.

6.2 Peer Set Protocol 2

This section describes an alternative version of the peer set protocol that may be used in certain embodiments of the present invention.

This version of the peer set protocol has four main states, with certain substates that may impact the how the protocol transitions from one state to the next. The main states are INIT_WAIT, PEER_SYNC, CONFIRM_PEERSET, and FD_WAIT. Under normal conditions, the members of a peer set will transition through each of these states when a cluster starts, finally landing in the terminal FD_WAIT state. Once in this state, the peer set members will wait for some external event to trigger a transition to another state. These states are described in detail below.

The INIT_WAIT State

When a node starts for the first time, threads are spawned by the protocol engine to manage each of its disk volumes. Each of these threads represents a potential member in a peer set. These member threads enter the INIT_WAIT state, waiting for the arrival of a Merge message from the root node of the cluster.

A Merge message contains a Federation object, and this object contains the complete membership information of all peer sets in the cluster. When a Merge message arrives, each member thread examines the Merge message to see if it has been assigned to a peer set and if so who its peers are. If the member has not been assigned to a peer set, it simply remains in the INIT_WAIT state, waiting for the next Merge message. It will do this indefinitely.

On the other hand, if a member discovers that it has been assigned to a peer set, it checks whether the nodes where its peers reside have joined the federation. A node's joined state is contained in the same Federation object that is passed to a member thread via the Merge messages. If one or more of its peers have still not joined the federation (for example because a node was late being started up), the member simply stays in the INIT_WAIT state, waiting for the next Merge message. It will stay in this state until the nodes to which its peers belong have all joined the federation.

Once all members have finally joined, they proceed, as a group, to the PEER_SYNC state. This applies to peer sets of any cardinality N, where N is greater than or equal to 2. The case of a singleton peer set (N=1) is covered as well, with the difference being that the member does not have to wait for its peers to join the federation and can proceed directly to the PEER_SYNC state as soon as it has been assigned to a peer set.

The PEER_SYNC State

The purpose of the PEER_SYNC state is for the members of a peer set to exchange information as it pertains to their own view of the world. Upon entering this state, each peer set member asks the local Management System for details regarding the peer set of which it is a member, such as the peer set generation, and the role, color and state of each member. Since each peer resides on a separate node and each node has its own local data describing the properties of the peer sets it hosts, there is a chance that the peers could be out of sync with respect to this data (due to perhaps some kind of system failure). The PEER_SYNC state provides a mechanism for the peer set members to reconcile any differences in their data.

In an exemplary embodiment, the exchange of information between the peer set members is accomplished using UDP packets, although other embodiments may use other protocols. UDP is a convenient mechanism to exchange information across separate systems, but it has one major drawback—there is no guarantee that a packet once sent will actually reach its intended target. As a result, any protocol designed around UDP or similar unreliable protocol should have sufficient redundancy built into it to minimize of risk of packet loss.

The "peer sync" exchange consists of multiple rounds. In the first round, each member constructs a list of PeerSet objects, consisting in this first round of a single object describing its own peer set data. Each member then sends this list to each of its peers via PeerSync packets, which is basically a container for a list of PeerSet objects, and then after a brief wait checks for incoming PeerSync packets from its peers. If no packets have arrived, it sends out another round of PeerSync packets and then waits again before checking for additional incoming packets.

If a member receives a packet from a peer, it adds the PeerSet objects contained in this packet to its peer set list, and sends out another round of PeerSync packets to its peers with this updated list. When a member has received packets from all of its peers (specifically, when the length of its peer set list is equal to the cardinality of the peer set it is a member of) it sets an "is Synchronized" flag in the next PeerSync object it sends to its peers, signaling that it has collected all of the peer set objects for its peers. When a member receives a PeerSync packet with the is Synchronized flag set, it notes this, recording which member sent the packet.

This exchange of information between the members of the peer set continues until all members have received PeerSync packets with the is Synchronized flag set. This guarantees that each peer knows about every other peer. If after some predetermined number of rounds a member still has not received is Synchronized packets from one or more of its peers, the member reverts back to the INIT_WAIT state. If this was to happen, all of the peers of that member should be in the same situation and will also revert back to the INIT_WAIT state.

If the peer sync was successful, then the peers transition to the CONFIRM_PEERSET state. As with the case of the INIT_WAIT state, the peer sync exchanged described here works with peer sets of any cardinality N, where N>=2. The degenerate case of N=1 is handled as well, but no exchange of information is needed, and the member can proceed directly to the CONFIRM_PEERSET state.

The CONFIRM_PEERSET State

Upon arriving in the CONFIRM_PEERSET state, the members of the peer set can begin to process the data that has been exchanged. At this point, each member should have an identical list of peer set objects collected from its peers, where each individual peer set object in this list describes a given peer's view of the peer set. The purpose of this state is to reconcile this data, with the outcome of the processing of these separate peer set objects being a new peer set object on which all of the members agree, including the role and color each member is assigned, the generation of the peer set, and other status information associated with the peer set. There are several cases to consider.

For example, the members could be part of a newly formed peer set, in which case the peers would exchange peer set objects with no properties defined—no role, color, or status, and the peer set's generation would be set to a default value (e.g., −1) to indicate a new peer set. In this scenario, the members of the peer set have to assign a role and color to each member of the peer set. One peer will be assigned the role of Primary, while the others will be Secondaries, and each member will be assigned a unique color, e.g. Red, Green, and Blue in the case of a three member peer set. The selection of the primary in a new peer set is a key step in this process, and this is discussed further below with reference to a Primary Select Protocol.

Another possibility is the members are part of a previously created peer set that is being restarted after a cluster reboot. In this case, the peer synchronization should leave each member with a list of identical peer set objects, assuming each of the nodes is in agreement about the attributes of the peer set to which the members belong. If for some reason the peer set objects do not match, rules are defined to determine whose peer set object is selected as the winner. This selection is usually based on the generation of the peer set, where the peer set with the highest generation wins. If the generations are the same but there are other differences (such as role or color mismatches), additional rules are used to select the winning peer set.

A third possibility is that a new member is being added to a peer set. For example, a two member peer set could have a third member added, so when the peer synchronization is completed, each member will have a list of three peer set objects, with the object for the newly added member having undefined values for its properties. This newly added member will always become a Secondary (because one of the existing members will already be a Primary), and it will be assigned a unique color attribute. With regard to the generation of the peer set, whenever a change in the topology of a peer set occurs, its generation is increased by one.

A fourth possibility is that a peer set has lost a member, for example, a three member peer set could be reduced to a two member peer set. In this situation, the remaining members simply retain the role and color they already have assigned. A special case in this scenario though is where the member that has been lost was previously the Primary member of the peer set. In this case, one of the remaining two members is selected to be the new primary. In an exemplary embodiment, the new primary is selected first based on which node has the fewest number of primaries currently assigned, and if both members are hosted on nodes with the same number of primaries, then the member with the lowest ID is chosen. For example, each node in a cluster has N disk volumes, and a given peer set is made up of volumes from M different nodes. At any given time, some number of volumes belonging to a node will be primaries, some will be secondaries, and some will possibly be unassigned. When a two member peer set has to decide which of its members to make the primary, the member with the fewest number of primaries already assigned to its host node is selected. This information is readily available to the members of the peer set making this decision, since it is one of the additional bits of information that is exchanged during peer synchronization.

The Primary Select Protocol

As mentioned above, one scenario in which a peer set has to select one of its members to be the primary is the case of a new peer set. Because the members exchange the number of primaries already assigned to their host nodes as part of the peer synchronization process, one potential solution to pick the primary in a new peer set is simply to select the member with the lowest number of primaries assigned to its host node. This approach would work fine if a single new peer set was created at some point on a cluster that is already up and running. The problem is that when a cluster is being created for the first time, there are no primaries or anything else assigned. All of the peer sets are coming up at more or less at the same time, and when the peer synchronization exchanges take place, the primary counts for all of the nodes are zero. This would mean the members would have to revert to using the member with the lowest ID to be the primary, but this could lead to a poor distribution of primaries, with some nodes have four primaries assigned and some nodes having none. It is desirable for primaries to be balanced across a cluster, to help improve the performance of the cluster.

The Primary Select Protocol is a substate that the members of a peer set enter to select which member of the peer set is to be the primary. The protocol is designed to try to pick a member that keeps the total number of primaries across the cluster reasonably balanced. Optimal balancing is desirable but not essential.

The protocol works as follows. Each node maintains a count of the number of primaries assigned to that node. When a cluster is coming up for the first time, this count is zero for all nodes. As primaries are selected, this count increases. The protocol works on a first come first served approach. For example, in the case of a three member peer set, unlike the peer synchronization protocol where all members start the protocol at the same time, in the primary select protocol, the members agree on who will start the protocol and who will enter a wait state. In an exemplary embodiment, the selection is based on the modulus of the ID of the peer set by the size of the peer set. So, if the ID of the peer set is say 15 and the peer set size is 3, the modulus of 15 by 3 is 0, so member 0 will start the protocol, assuming the members are ordered by their node IDs. Members 1 and 2 will enter a wait state, waiting for messages to arrive to tell them what to do next.

The member that starts the protocol looks for a very specific condition to decide how to proceed. In an exemplary embodiment, it checks its hosting node to see if no primaries have been assigned to this node. If this is the case, then it increases the primary count of this node to 1 and elects itself to be the primary of the peer set. It then exits the primary select protocol and starts the primary sync protocol (discussed below). The check of the node's primary count and its subsequent increment is implemented as an atomic operation (e.g., through a "test-and-set" or locking mechanism), since in the case of a node A with N disk volumes that can host peer sets, there are potentially N−1 other members of other peer sets also checking the primary count for node A at the same time. By making this an atomic operation, only one member will have a successful zero check. The other members will all see that the primary count is already 1 on this node, and instead of selecting this node to host another primary, the peer set members will "hand the torch" to their immediate peer for it to continue the protocol, and the members handing the torch off enter a wait state.

This hand off is accomplished by a PrimaryCheck packet. This packet includes the primary count that the receiving member is supposed to test against, which in this first pass is zero. On receiving one of these packets, the members exit their wait state and take over as the lead in the protocol. At this point, the protocol proceeds identically for these new members. They each will check if their hosting node has the primary count indicated in the PrimaryCheck packet, and as before only one of the members making this check will get a positive outcome because the test and increment is a single atomic operation. The one member that wins the check elects itself as the primary for its peer set and proceeds to the primary sync step.

The members failing the test perform the same hand off to their immediate peers via another PrimaryCheck packet, and the process repeats itself with these new members. When the last member of a peer set receives a PrimaryCheck and again fails the primary count test, it sends the next PrimaryCheck packet to the original member that started the primary select protocol, which at this point is in a wait state. On receiving the PrimaryCheck packet, it learns that it is being asked to test against a primary count of zero again, which it has already tested. This signals the member to increase the value being tested against by 1, which during this second pass would increase it from 0 to 1. From here, the protocol continues in this fashion, with each successive member testing against the requested primary count and either electing itself as the primary or handing the check off to the next member in the list. Eventually, all peer sets on all nodes will pick a primary, with the results being a reasonably well balanced distribution, possibly even optimum.

The primary select protocol has to potentially deal with UDP packet loss, and in an exemplary embodiment, it does this with built-in timeouts. For example, when a node sends a PrimaryCheck to its peer, it knows that it will either receive a signal that a primary has been selected (by means of a PrimarySync packet, described below) or that it will receive another PrimaryCheck packet as the protocol loops around and back. If no new packets are received within an expected timeout period, it resends the last PrimaryCheck packet it sent out. It has no way of knowing if its last packet was received, or if the reason it has not received a new packet is because a packet that was sent to it was lost. So, it simply sends the same packet again. When the target peer receives this packet, it will know whether this is a duplicate of the last primary check packet or a new one. If the packet is new, it simply proceeds with the protocol as discussed above. If the packet is a duplicate, it in turn resends the last PrimaryCheck that it sent to its peer, and this ensures that the protocol will continue to advance. If after some number of retries the protocol fails to elect a primary, all members eventually revert back to the INIT_WAIT state.

The Primary Sync Protocol

When a member elects itself to be the primary of a peer set as the outcome of the primary select protocol, that member advances to the primary sync protocol. This protocol is designed to make sure all of the members of a peer set know when a member has elected itself as the primary. Initially, only one member advances to this new substate, with the other members remaining in a wait state, waiting for a packet from a peer to tell them how to proceed.

When the elected primary starts the primary sync protocol, it sends PrimarySync packets to each of its peers, indicating that it has assumed the role of the primary. When these waiting members receive this packet, they break out of their wait state and transition to the primary sync substate. In this state, they in turn proceed to send PrimarySync packets to each of their peers, including in this packet the ID of the member who has elected itself as the primary. From here the primary sync protocol proceeds essentially identically to the peer sync protocol, where each member continues to send primary sync packets to its peers and receive in turn packets from its peers. The difference here is instead of exchanging peer set objects, the members simply exchange the ID of the member who they believe has been selected as the primary. This exchange of packets continues until all members have received packets with the "is Synchronized" flag set, signaling that all members have received packets from everyone else.

When this point is reached, each member should have a list of IDs given to it by its peers indicating who they believe has been selected as the primary member. These IDs should all be the same, but if they are not, it indicates the primary select and sync protocols have for some reason failed and all members will revert to the INIT_WAIT state, where they will try the whole process over again when the next Merge packet arrives.

Membership Acknowledgement

All members eventually transition to the Membership Acknowledgement substate. They get here either as the next step after completing the primary sync exchange, or as the next step after completing whatever processing has had to be performed on the peer set objects that were collected during the peer sync step. On entering this substate, all peer set members will be in agreement with regard to the specifics of the peer set object that has to be confirmed, including the role, color, and state of each member and the generation of the peer set.

Before proceeding to the FD_WAIT state, the protocol engine has to get confirmation from the root Management System (MS) that it has acknowledged and approved the peer set object that the members of the peer set have agreed on. To get this approval, the members of the peer set with the smallest ID is selected to send a MembershipAcknowledged message to the root MS. The subsequent acknowledgement comes by way of the normal Merge message broadcast that is sent out by the root MS on a regular interval. The peer set members will wait indefinitely for this acknowledgement to come. When an acknowledgement is finally received, the peer set can either be approved or disapproved. If the peer set is approved, the members will proceed to the FD_WAIT state; if the peer set is disapproved, the members revert to the INIT_WAIT state. There are numerous reasons why a peer set could be disapproved, but from the perspective of the protocol engine, it does not matter why the peer set was disapproved as it simply acts on the data it receives.

The Merge Sync Protocol

As mentioned above, the acknowledgement of the MembershipAcknowledged message is sent from the root MS by way of its Merge message broadcasts. As is always the case, the peer set members have to deal with potential packet loss. If all three members lose the same Merge packet, then they will simply continue to wait and no harm is done. If all members receive a Merge packet, then they can proceed on to their next state in sync. However, there is a chance that one or more members of a peer set may miss a Merge packet, potentially leaving them out of sync with their peers. For that reason, another variation of the peer sync exchange is used when a Merge packet is received while the members are in their membership acknowledged wait state. This merge sync exchange again works very similarly to the peer sync and primary sync exchanges. In this case, the members exchange the sequence number of the latest Merge packet they have received.

For example one member may miss the Merge packet due to packet loss. On receiving this packet, the other members immediately start the merge sync protocol, sending a MergeSync packet to each of their peers. The MergeSync packet contains the sequence number of the most recent merge sync packet that was received. When the member that missed this last merge packet receives this packet, it will break out of its wait state and also start the merge sync protocol. However, because it missed the last merge packet, it will not be able to send the same sequence number that the other members are including in their MergeSync packets. As a result, when the Merge sync completes, the members will see that one of their peers missed the merge packet that the others received and cannot proceed to the next state. As a result, all members simply agree to remain in the membership acknowledge wait state, and will try to sync up again on the next merge cycle. Eventually, all members should receive the same Merge packet and they will all be able to proceed as a group to either the INIT_WAIT or FD_WAIT state.

The FD_WAIT State

On successfully completing the CONFIRM_PEERSET state, the members of a peer set transition to the FD_WAIT state. This is considered a "terminal" state. The members of a peer set will remain in this state indefinitely and will only transition to another state when some event occurs signaling a state change is needed.

There are two main mechanisms that will trigger a state change. While in FD_WAIT, the members periodically monitor their queue for incoming packets. If a merge message is received, they check if anything important has changed with respect to their peer set. For example, a three member peer set could discover that a member has been removed from the peer set, referred to as a topology change. If this happens, the remaining members transition immediately to the PEER_SYNC state to exchange their latest peer set objects and have the new peer set acknowledged by the MS. At the same time, the member that was removed will receive a merge message and will discover that it has been removed from its peer set. In this case, the member sends a MemberEvicted message to the local MS and then transitions to the INIT_WAIT state where it will stay indefinitely until it gets added again to a peer set.

A second mechanism that can trigger a member to transition out of the FD_WAIT state is via a restart request sent by the MS. This is done in cases where the MS knows there is no change to the topology of a peer set that would cause the members to transition to a new state but it needs to force the members of a peer set to revert to the INIT_WAIT state to recover from certain kinds of failure scenarios. In this case, the peer set members simply proceed through each phase of the peer set protocol and will eventually return to FD_WAIT.

V. Exemplary Small File Repository

1. Introduction

The maximum number of I/O operations that can be performed on a disk drive in a given time interval is generally much more limiting than the amount of data that can be transferred or the transfer rate of the drive. The characteristics of modern disk drives are such that in the relevant markets, traditional file systems typically cause the number of I/O operations to reach their maximum when disk drives are far from being full, which can lead to proliferation of disk drives even when additional storage capacity is not needed. This in turn, can cause costs to rise more than expected. The relevant application environments generally require extremely efficient access to small files, by minimizing the number of I/O operations a file server needs to perform. This is typically the case for such things as thumbnails or small pictures. To open one such a file, even discounting the time it takes for traditional network file systems like NFS to lookup the intermediate components of a pathname, it typically would be necessary to look up the file i-node from the directory that references it, to read in the i-node for the file, and finally to read the data block for the file. This typically entails at least 3 I/O operations. In many of the relevant environments, it is expected that most accesses will be to files that have an average size of about 64 Kbytes. Besides, such files are accessed in an extremely random fashion, so that it is likely that no advantage will be obtained by using front-end caches. Therefore, special facilities to minimize the number of I/O operations to access such small files are desirable.

On the other hand, through judicious placement of the blocks in a file, ad hoc file system designs can limit the number of actual I/O operations and guarantee higher disk bandwidth. To achieve this, an exemplary embodiment implements a Small File Repository (referred to hereinafter as "MaxiSFR"). MaxiSFR is designed to reduce the average number of I/O operations for reading such files to one.

2. The Basic Scheme

A way to deploy a subsystem capable of addressing the needs outlined in the previous section is that of storing small files within file system server volumes used as arrays of extents of the same size (the maximum size of a small file). Access to the individual files could then occur by simple indexing into such arrays.

To understand how this could be achieved in practice, assume that a special top level directory in the namespace of MaxiFS is dedicated to this functionality. Assume that this directory does not really exist anywhere, but is interpreted by the client software in such a way that all accesses to names that encode an index under that directory are managed as special accesses to a short file via its index. For example, assume "/sfr" is such a directory and assume that "/MaxiFS_1" is its mount point on the client. Then, opening, say, "/MaxiFS_1/sfr/CD3A" would in fact request access to a small file on an optimized repository that has 0xCD3A as its hexadecimal index. This can be implemented within dedicated volumes that would have to be allocated as each server disk drive is provisioned. Clearly, in an infrastructure like MaxiFS, made of up to thousands of servers, just an index would be adequate to fully identify the location of a file within a repository, although additional information typically would be used to identify the repository of interest.

3. Requirements for this Exemplary Embodiment

This section captures requirements the MaxiSFR facility needs to satisfy for this exemplary embodiment, namely:

R0. The Small File Repository must be global to each MaxiFS infrastructure and the files stored in it must be uniquely identifiable across the entire name space of a MaxiScale system.

R1. Small files need to be accessed in such a way that the entire open( ) read( ) close( ) sequence takes no more than a single I/O operation on the server. Enumerating, creating or writing such files need not be as efficient.

R2. The Small File Repository must enforce limitations on the maximum size of files it stores and that can be accessed according to requirement R1. However, MaxiSFR should allow for any file within such size constraint to be stored within MaxiSFR.

R3. The caller must be able to specify a file suffix for a small file being created (for example, to distinguish the type of a file: JPEG, GIF, MPEG, . . . ). The suffix can be null. A non-null suffix is an integral part of the file name and shall be retrieved when the content of the volume is enumerated.

R4. Clients must be able to create small files either by letting the MaxiFS choose a name or by letting the requesting client specify a name (the latter capability may be particularly useful for the restoration of backups).

R5. It must be possible to enumerate the content of the small file repository and to retrieve attributes associated to small files. The name space for small files should be partitioned in such a way that no more than about 1,000 files per directory would be enumerated.

R6. A block copy facility that allows to remotely replicate a small file repository must be available, to simplify the backup and restore of the repository itself.

R7. The small file repository of a MaxiFS infrastructure must be scalable proportionally to the number of nodes that are members of the infrastructure.

R8. Small files must support all the attributes of other files, such as the identity of the owner, access protection privileges, creation and modification date, etc. Access protection at the file level should be enforced, as for any other file.

R9. A library function that creates a small file, writes to it and retrieves its name must be available for the C language, as well as for the languages most often used for web applications (Java, Python, Perl, PHP, . . . ).

The following describes a more detailed design of the facility and the way the above requirements are met.

4. Theory of Operation

This section provides a detailed view of how the MaxiSFR is expected to be used.

The approach described earlier conveys the general idea, although giving clients direct access to small files via their indexes is impractical for the following reasons:

An index by itself would always provide access to an extent, without regard to whether it is still allocated or has been freed.

It would be difficult to identify which server manages the specific small file repository where the small file of interest is kept.

For this reason, each such file should not be addressed just via an index, but should rather have a globally unique ID within MaxiFS. Such a Unique Small File ID ("USFID") could be structured as the concatenation of four components, as in: USFID=<psid><sid><bn> Each item within angle bracket is a component of the unique ID, as follows:

<psid> This field is the ID of the Peer Set (a Peer Set in MaxiFS is the minimal unit of metadata redundancy; it is a mini-cluster made of three servers, each of which manages one drive dedicated to the peer set, where MaxiFS metadata is replicated) where the small file resides. By embedding the peer set ID in the USFID, the file is permanently tied to the peer set and cannot be freely relocated from a peer set to another one while keeping the USFID unchanged.

<sid> This is the slot ID or, in other words, the index of the logical volume block where the file is stored. By making this piece of information part of a USFID, the file can only reside at a specified logical offset within a volume.

<bn> This is the number of logical blocks that the file uses. By embedding this piece of information into the USFID, the file cannot change the number of logical disk blocks it spans. Note that the actual length of the file in bytes is stored in the file metadata region that precedes the actual user data on disk.

So, assuming <psid> is 0xABCD ("ABCD", 2 bytes), <sid> is 5 ("0000000005", 5 bytes) and <bn> is 16 ("10", 1 byte, which indicates that the file is stored in 17 logical blocks), the USFID for the file, expressed in hexadecimal, would be:

ABCD0000 00000510

The length of the individual fields in the unique ID is purely indicative. It could be reduced, increased or split otherwise among the fields, to satisfy the constraints of the client OS targeted and the maximum values expected for the individual fields. In any case, once chosen, the boundaries among the fields should not change.

This information is expected to be made available to applications through the standard POSIX interface via a MaxiFS-specific fcntl( ) call (see below), although alternative mechanisms may be used. The choices with respect to the length of each of the fields within an USFID are justified as follows:

Devoting two bytes to the Peer Set ID is sufficient. A MaxiFS infrastructure with 64 K possible peer sets, with nodes containing 4 drives each would cover about 50,000 nodes. This should be adequate for a long time.

Devoting 1 byte to the length of a file in blocks is adequate. A logical block amounts to 1 Kbyte. If the number of blocks that appears in the USFID is equal to the total number of logical blocks in the file minus 1, this would cover files up to 256 Kbytes in length, which is the maximum length expected for a file that qualifies as small.

Devoting 5 bytes to address the starting logical block number for a small file implies that $2^{40}$ ($\approx 10^{12}$) 1 Kbyte blocks can be covered. This corresponds to a partition of up to 1 Pbyte per drive, which is three orders of magnitude beyond the currently achievable drive capacity.

Information stored within the file metadata includes the actual file length in bytes (the amount of storage space used for the file can be smaller than the entire extent), ownership data, access permissions, creation time and more. Such metadata would be stored in the first portion of the extent, followed by the actual data.

The POSIX file interface does not have a way to create anonymous files, to later assign names to them. However, MaxiFS allows the same to be accomplished through a sequence of POSIX calls. So the application code would be similar to the following:

1. fd=creat("/MaxiFS_1/sfr/*", 0777);
2. n=write(fd, buff, bytes);
3. . . . .
4. sfn.buffer=name, sfn.length=sizeof(name);
5. fcntl(fd, MAXIFS_GETNAME, &sfn);
6. close(fd);

In statement 1, the name supplied is purely conventional. It is made of a stem that is the mount point of MaxiFS on the client where the creation of the file is requested (in this case: "/MaxiFS_1") and by a pathname relative to the mount point ("sfr /*.jpg"). The latter identifies the MaxiFS-wide virtual small file directory ("sfr") and a conventional file name. Use of the special directory name (the fictitious directory "sfr" is perceived as a real directory above the client component of MaxiFS; it is the directory under which all small files are accessible, has no subdirectories, nor any subdirectory is allowed to be created) informs the client component of MaxiFS that we are dealing with small files and that what follows should be dealt with in a special way. The file name ("*") is not a wild character or a regular expression (Unix system calls do not interpret wild card or regular expressions: any character is interpreted literally because expansion of wild cards or regular expression is performed within libraries or applications before the system is invoked). It is just a conventional way to tell MaxiFS that the system must create a small file and pick the appropriate name for it.

From statement 2, on, the caller writes data to the new small file.

Then, in statement 5 the client invokes a operation specific to MaxiFS ("MAXIFS_GETNAME"). The execution of this fcntl( ) call entails the following:

The client informs MaxiFS that the small file has now been copied completely.

The client requests the USFID the system generated for the file. The name of the file will be returned as a string that is stored in the data structure fcntl( ) takes as an argument ("sfn"). For this reason in statement 4 the caller initializes the fields of the structure, specifying the buffer where the name will be stored and the buffer's length.

The client informs MaxiFS that no more writes to the file will occur after the fcntl( ) invocation and MaxiFS will enforce this. Note that this is important because the USFID will embed the length of the file and its volume offset. Therefore, if the file were allowed to grow at this point, its length and the location where the file is stored might have to change.

Finally (statement 6), the client closes the file. From this point on, the file can be accessed in reading via its name. Assuming that the file had the USFID: "ABCD000000000510", the fcntl( ) invocation would return the pathname: "/MaxiFS_1/sfr /ABCD/000000000510". To fully support this functionality at the application level, it is expected that packages, libraries and so on will be developed for the prevalent programming languages used for Web 2.0 applications (Java, Perl, Python, etc.).

Notice that beneath "sfr", the entire pathname of the file includes a parent directory name ("ABCD"). This name matches the ID of the peer set where the file is stored. The reason for the intermediate directory between "sfr" and the rest of the file name is to simplify the aggregation of such files. This avoids the need to list all the small files in the infrastructure as if all of them had the same parent directory ("sfr").

The pathname in this form appears as a pathname in the traditional sense. However, "sfr" and "ABCD" do not exists as real directories in the MaxiFS name space. Whenever the client component of MaxiFS sees a pathname of this form under the MaxiFS mount point, it transforms the portion under "sfr" in a USFID and sends the request with this USFID to the peer set (in this case 0xABCD) where the file is expected to be stored.

Typically, such files are opened for reading. However, there is an important case when such a file may have to be opened for writing. If the file is to be recreated from a backup, the backup application should be able to create the file through its USFID and write to it. The same is needed in case of remote replication. Note however, that this can only happen if the location in the small file volume and the peer set implied by the USFID are available. If they are in use, the attempt to create such a file would be rejected. Also note that the number of logical blocks needed to store the file is embedded within the USFID, so at the time the file is created MaxiFS can make sure that the extent needed is available.

In any case, after a small file is created, MaxiFS supports read access to it via a single I/O operation. Therefore the USFID-based pathnames can become part of URLs, so that web access to such files, even if extremely random, need not cause the servers to perform lots of I/O operations.

The enumeration of the small files contained in the special namespace directory merely requires identifying the allocated extents and reconstructing their unique IDs. To enumerate all such files across the entire MaxiFS infrastructure one such enumeration should be performed within the small file volume in each of the peer sets in the system.

Deletion of small files is possible through their USFID-based names.

Small files would have to have redundancy. For simplicity, this would be done make sure any such files exists in three copies: one on each of the small file volumes in each member of the peer set the files belong to.

Note that whereas MaxiFS implements logical replication of files, in that the actual layout of files across replicas is totally immaterial, for small files, not only must the files be replicated, but it is also necessary to store each file exactly at the same location in each replica of the small file volume. Were this not the case, the same ID could not apply to different copies of the same file.

The small file volumes are allocated as subpartitions of each drive on every node that is a member of a peer set. These partitions would be created when a server is configured. The difficulty with this is that the partitioning limits the flexibility with which the storage on the drives can be used. Once the partition is allocated, whether it is unused, empty, lightly used or completely full makes no difference with respect to the rest of the storage on the same drive. So even if one area is basically empty and the other is overflowing, there is no way to change things on the fly. This depends on the fact that to guarantee access in a single operation, the access must be to the physical volume rather than to a logical volume that could require additional I/O operations to lookup where a given logical block of the partition really is.

In statement 1, the name supplied is purely conventional. It is made of a stem that is the mount point of MaxiFS on the client where the creation of the file is requested (in this case: "/MaxiFS_1") and by a pathname relative to the mount point ("sfr /*.jpg"). The latter identifies the MaxiFS-wide small file directory ("sfr") and a conventional name made of two sub-components. The stem of the file name ("*") is not a wild character or a regular expression (Unix system calls do not take wild card or regular expressions: any character is interpreted literally because expansion of wild cards or regular expression is performed within libraries or applications before the system is invoked); it is a conventional way to tell MaxiFS that this is not a real file name, but that the system must create a small file and pick the appropriate name for it. The suffix of the name (".jpg") is one possible suffix, any others (including a null suffix) can be chosen. However, the suffix is stored with the file and the file name generated and retrieved with statement 5 will be made of the string representation of the USFID with the suffix selected (in this case, ".jpg"). Use of the directory (the fictitious directory "sfr" is perceived as a real directory above the client component of MaxiFS; it is the directory under which all small files are accessible, has no subdirectories, nor any subdirectory is allowed to be created) informs the client component of MaxiFS that we are dealing with small files and that what follows should be dealt with in a special way. The conventional name informs the client component of MaxiFS that this is a request to create a new small file, whose USFID is unknown at the time. The key points from the above description are the following ones:

1. Each file stored in a small file repository has a pathname under the virtual directory named "sfr", under the mount point of a MaxiScale storage infrastructure. This name refers to a virtual entity that is accessible to MaxiFS clients via an abstraction the MaxiFS client software implements.

2. The above directory has virtual subdirectories: one for each peer set in the infrastructure. Each such subdirectory has a name that is represented by an 4-character long hexadecimal string that corresponds to the numeric ID of a peer set (in the general case, such subdirectories will contain leading zeroes in their name). The enumeration of one such virtual subdirectory yields the list of files stored in the small file repository of the corresponding peer set. Further virtual subdirectories exist, to limit the number of entries in each, as explained ahead.

3. With respect to normal files, small files that adhere to this design have some restrictions that have been briefly mentioned, namely:

a. Their length cannot exceed a system-wide predefined limit.

b. Any rename within MaxiSFR is only possible if the name complies with the USFID-based conventions and implies relocation of the file to the area to which the new name points.

c. They can only be extended to fill the last logical block of the file, if not already full (i.e., so that the number of logical blocks the file uses does not change, although the file's length in bytes may change). Otherwise, the name (that contains the count of blocks used would have to change as well).

d. Existing small files can be overwritten, as long as the number of logical blocks they span is not increased.

e. The creation of a small file by name (used mainly to restore dumps) is generally only possible if the physical storage implied by the name within the small file repository is available. This name will include the name of the virtual directory that identifies the peer set where the file is to be stored 5. Design This section of the document has the purpose of describing the design of the exemplary Small File facility for MaxiFS in more detail.

The MaxiFS small file repository is made of the collection of all the small file repositories each peer set in the system makes available. The aggregation of the individual repositories is called Small File Repository (or SFR, for short) and is global to the name space of a MaxiScale system, as required by R0. Each individual repository stored on a peer set is called Peer Set Repository (or PSR, for short). Each PSR is replicated across all members of a peer set, in the sense that each copy on each member of the set is identical in size and content to those of the other members of the set and they all evolve in lockstep. The individual PSRs are fully independent entities, each associated to a "virtual subdirectory" of the global SFR whose name is the hexadecimal string that represents the peer set ID of the peer set hosting the PSR. When a new peer set members joins a peer set, the new member needs to copy the content of its small file repository from its peers. The copy of the PSR stored within each peer set must be identical to that of the other members of the set. This does not require that the file system volumes used for this purpose need to be identical, but implies that the actual space available will be the smallest available among the members of the set (all have to adhere to the most restrictive constraints) and that existing members cannot be replaced with new members that have file repositories smaller than the highest block number used by a file already allocated within the PSR.

5.1 Layout of the PSRs

Within each individual peer set member, a portion of the disk drive is set aside as a partition to be used as a member of the local PSR. Since the three repositories in each of the members of a peer set are identical and evolve in lockstep, in the following all the discussions relative to PSRs are meant to apply to each of the three members.

If the PSRs had to contain files all of the same length, the management of the each PSR would be very straightforward, in that the entire PSR could be subdivided into slots all of the same length and one would only have to keep track of which slots are full and which are empty. The small file facility for MaxiFS enforces a maximum length for small files (requirement R2). Files exceeding this length cannot be stored making use of the facility and should rely on the general purpose file system.

When variable-length files come into play, a simplistic implementation could allocate space for each file as if all the files had the maximum allowed length, regardless of each file's actual length. However, given that small files go from one to a predefined maximum number of blocks, this would result in a very poor space allocation, with major waste of storage due to internal fragmentation.

Hence, in an exemplary embodiment, space is allocated as a multiple of the "logical block size". This value is set to 1 Kbyte, so that small files can make efficient use of the space available, limiting internal fragmentation. So, the smallest file in a PSR will take 1 Kbyte on the storage repository. The actual storage space used on disk will be a multiple of 1 Kbyte. The initial portion of the storage area for each file contains all the relevant file system metadata, as in any other FreeBSD file. This includes creation time, modification time, user and group ID of the owner, access permission bits, file length in bytes, etc. (requirement R8). In addition to this, the metadata portion of a file also contains other information of relevance for the PSR, such as the string that represent the suffix of the file and a checksum for the file.

Since each of the files stored in the SFR is going to take up a variable number of logical blocks, it is necessary to do some bookkeeping to do this. Namely, the software that manages each PSR must be able to:

1. Find a number of contiguous blocks needed to store a file of given length.

2. Identify the number of blocks that a file spans, without having to read the file's metadata.

There are various ways to manage the empty space for variable length files. However, the most efficient is a bitmap in which each bit is associated to a logical block. When the bit is set to 1, the logical block is in use; otherwise, the logical block is empty. A bitmap is convenient in that it allows to easily find regions of contiguous free space large enough.

In addition to this, each PSR also needs to keep track of the suffixes of the files stored in the PSR. This speeds up the enumeration of files in the repository. Therefore, a table must be associated to the repository, where such suffixes are stored.

Finally, each PSR must contain a header that stores information that is global to the PSR and defines its structure. The following information is stored in this area:

The version of the PSR. Over time, newer layouts may be necessary and this field allows discriminating among them.

The size of a logical block in the PSR. This might differ for different PSRs.

The size of the PSR in blocks.

The index of the block where the free space bitmap for the PSR is stored and the bitmap's length in blocks.

The index of the first available block in the repository where small files can be allocated, along with its length in blocks.

The number of files stored in the PSR.

The PSR is partitioned into three regions:
1. The PSR header that describes the characteristics of the PSR, as explained above.
2. The free space bitmap.
3. The actual file repository.

Since each member of a peer set has a mirror copy of the PSR, the information stored in the three regions must be identical among the peer set members.

5.2 Small File Operations

This section and its subsections describe the operations that can be carried out over the small file repository and the way they are implemented.

5.2.1 Generalities

In the SFR, directories can be neither created, nor deleted, nor renamed, nor can directory attributes (including access permission bits) be changed. In reality, these are "virtual directories" made visible only to ease the enumeration of the files they contain. However, it is desirable to support the ability of clients to change the current directory of a process to any of these virtual directories.

Each PSR corresponds to a virtual subdirectory of the global SFR whose name is the hexadecimal string corresponding to the ID of the peer set that hosts the PSR. As will be seen in the following subsection, these PSR directories have child virtual directories, as well. Keep in mind that the system gives a view of the SFR in terms of such virtual directories, which, however, have no corresponding data structures on disk. They are visualization abstractions, only needed to give a more structured view of the SFR and of the PSRs.

The only pathname operations possible in any of the virtual directories are the enumeration of the content of the directory itself, along with the creation and deletion of files. Note that files are and can only be created and deleted at the lowest level of the PRS directory hierarchy, which is balanced.

As for files, creation (anonymous and with a name) and deletion are supported. Renames within the SFR are allowed only if the new name corresponds to the number of blocks that constitute the file and the range of blocks spanned by the new name is free. Otherwise, the rename operation will be rejected. Clearly, it must be possible to open a small file by name for reading, writing or both.

The ownership of the virtual directories that appear in the SFR name space is attributed to the system. All such directories have standard access rights that allow all users read, write and execute permissions.

The file operations that entail updates to data and metadata are managed in the same fashion as they are for regular files.

5.2.2 Client-Side Interactions with the SFR

The MaxiFS client driver has to behave specially in interacting with the SFR. Whereas for normal files, the client driver uses a system-wide hash table to determine which peer set is responsible for managing a given file or directory, on the basis of the pathname, in the case of the SFR the client needs to identify the fact that the target is a small file from the pathname. This is easy to detect in that the pathname of the object of interest must have the name of the SFR as its first component. Then the client driver has to look at the name of the first level directory under the SFR name expressed as a hexadecimal string and must translate it into the ID of the peer set to which it needs to send its request. The entire pathname must then be sent to the PSR of the appropriate peer set, along with the request to be processed.

In addition to this, the client needs to interact with the SFR in one of two modes. Some interactions are identical in nature to those used for other types of files. These include opens in write-only mode, file creates performed by name, file deletions, directory enumerations, normal reads and writes, etc. These types of interactions hide all the peculiarities of small files on the SFR server side. A special set of interactions is specific to the SFR and implements the special semantics needed to guarantee the 1 I/O operation in reading small files. There are two interactions in this set:

1. The creation of files performed by leaving the choice of the name to the server (on the basis of the location and of the size of the file). The reasons why this interaction is special are essentially captured by the previous example and consist of identifying the peer set whose PSR will contain the new file, of performing a request to create a file whose name is not specified, passing along all the file data and then retrieving the name the SFR server generated for the file.

2. The aggregation of opening a file for read, reading its content and closing it, by reducing it to a single I/O operation on the server. This consists of forwarding an open request that includes the read mode, whose reply (in case of success) contains all the small file data. The latter is cached on the client until a subsequent read from the client fetches the data itself to the requesting application.

Details on the individual operations on the server side are in the following subsections.

5.2.3 PSR Enumeration

Enumerating of all the files in the PSR corresponding to a given virtual subdirectory of the SFR and associated to the peer set ID reduces the number of items to be enumerated with respect to a global enumeration at the SFR level. However, given that 40 bits in an USFID are devoted to identifying files within a PSR, there is still the possibility of having to enumerate up to $2^{40}$ ($\approx 10^{12}$) files, which would create problems to user-level utilities and would be in contrast with requirement R5. Therefore, this 40-bit name space (this corresponds to using 5 bytes in the file's USFID) is further partitioned in such a way that each virtual subdirectory has no more than 210 (1024) entries. This entails that within a PSR there is a virtual hierarchy made of 4 levels of directories and that files only appear on the bottom level of such hierarchy. The consequence is that in a case like the one shown in the previous example, the file corresponding to USFID: "ABCD000000000510" (note that each of the pathname components below the virtual directory associated to the PSR is constrained to spanning the hexadecimal range 0x000-0x3FF, which is not true of the name of the file itself that includes two extra characters that encode the file length), would have the actual pathname: "/MaxiFS_1/sfr /ABCD/ 000/000/000/00510", rather than: "/MaxiFS_1/sfr /ABCD/ 000000000510".

According to this arrangement, all files whose starting block is within the range of a given block range of the entire PSR corresponding to a virtual subdirectory only appears in that virtual directory, although the file might include blocks associated to a subsequent virtual directory. For example, a file starting at block 0x3FE and 3-block long could have a USFID of "ABCD00000003FE03" and would be listed as "ABCD/000/000/000/3FE03" under directory "ABCD/000/ 000/000", despite the fact that the last of its blocks is in the block range that falls under directory "ABCD/000/000/001".

The enumeration of intermediate virtual directories (all the directories in the SFR, including those associated to the PSR and excluding the leaf directories that may contain actual files) is trivial and purely virtual. It simply consists of enumerating the full hexadecimal range available (0x000-0x3FF), excluding the items that would correspond to blocks beyond the size of the volume containing the PSR. So, this is purely computational and requires no disk access.

The enumeration of the leaf directories requires access to the disk. A way of enumerating the files within a given virtual subdirectory of a PSR is that of starting at the location of the PSR bitmap that corresponds to the virtual subdirectory being enumerated, looking at the next bit that is in use, accessing the metadata information in the corresponding block and reconstructing the file name from the offset of the starting block and by the length of the file. However, since the file suffix should be reported (requirement R3) and this is not implicit in the file location, it is necessary to do two things:

If the file has a non-null suffix, this should be retrieved from the file metadata that would store it when the file was created.

The suffix would then be added to the file name built out of its location, length, etc.

Because of the need to traverse the bitmap and to read the metadata for each file, in order to reconstruct its name, enumerating a directory would not be a very fast operation. In order to enumerate files on the basis of a bitmap, the PSR management software must know at which offset the files start in the volume. The simple indication of the fact that a logical block is in use is not sufficient for this. Effectively, a special marker is needed for the blocks that start a file.

Also, the same data structure used to identify the starting block for a file would lend itself to optimizing the enumeration for files with no suffix. This can be done by transforming the PSR bitmap to use a pair of bits for each block instead of a single one. This doubles the size of the bitmap. However, the size would still be contained. In the case of a 1 TByte PSR, the bitmap so extended would take just 256 Kbytes.

The extended bitmap would then mark the various blocks with two bits per block, according to the following signatures:
  00 Free block.
  01 Busy intermediate block. This is a block within the body of a file.
  10 Busy block that starts a file that does not have a suffix.
  11 Busy block that starts a file with a suffix.

The enumeration algorithm should then simply look at the extended bitmap starting from the offset corresponding to the range of blocks belonging to the virtual directory to be enumerated and operate as follows:
  1. Examine the bitmap until as many files as counted in the PSR header are encountered.
  2. Skip free blocks (signature: '00') and busy blocks in the middle of a file (signature: '01').
  3. For busy blocks that start a file and have no suffix (signature: '10'), reconstruct the file USFID from the location of the starting block and from the length of the file (computed from the first free block or the next header block after the current header block) and transform it into a file name string.
  4. For busy blocks that start a file and have a suffix (signature: '11'), reconstruct the file USFID from the location of the starting block and from the length of the file (computed from the first free block or the next header block after the current header block), read the file header to retrieve the file suffix and transform the USFID and the suffix into a file name string.

File operations are dealt with in a slightly different fashion, depending on whether they entail metadata or data updates. If they do not, the requests are carried out in a round-robin fashion by the available members of the peer set. However, if they entail metadata or data updates (as in the case of create, delete, rename, write and fsync), it is the primary member of the set that carries out the requests by coordinating the updates that affect all the copies of the PSR on each of the peer set members and by acknowledging the requesting client only when all the peer set members are in sync.

5.2.4 File Creation

File creation requests are carried out by the primary member of the peer set.

To create a file in the SFR, there are two possibilities: either the file is created by specifying its name (this would be mostly done by restore operations), or the name must be chosen by the system (this is the prevalent mode of operation and the caller is allowed to specify at most the file suffix).

In the first case, the client has chosen a name: the name encodes the number of logical blocks in the file, along with the offset of its starting logical block. Therefore, the system can decode this information from the file name and use it to check that none of the logical blocks between the starting offset and the last logical block of the file to be created is currently in use.

At this point, if the logical blocks are free, they are allocated to the file and the client is allowed to write up to the file length encoded in the file name. In case one or more blocks are in use, the outcome depends on the identity of the client and the permission bits for the affected files. If the effective identity of the client is compatible with the overwriting of all the files in the block range used by the new file, the blocks in use are freed (by automatically deleting the files to which they belong). Otherwise, the request is rejected. The same applies when the new file completely overlaps an existing file.

When the new file is created, in case a close occurs before the file could be written, all the blocks are zeroed out. In case communications with the client are lost or no close is performed within a reasonable time period, the file is deleted and the allocated blocks are freed.

A previous example highlighted the sequence of calls that a client needs to perform to create a new small file by letting the system choose its name. In this case, the file cannot be created right away because the name is tied to its size and the server needs to receive the indication that all the data is available before allocating the necessary space, committing the data to disk and returning the file name. On return from the fcntl( ) invocation (statement 5 in the example), the file name is returned to the client that closes the file and can make its content available.

Note that in allocating space for a file in the SFR, various strategies can be envisioned. One possibility is that the first time since reboot a client invokes the target peer set in a totally random fashion among the available peer sets. In case the peer set cannot grant the request because not enough space is available in its PSR, the client goes to the peer set that has an ID higher by 1 (modulo the number of peer sets) to repeat its request, until a suitable PSR is available. Each client keeps track of the last per set to which it addressed the last creation request (excluding the ones that specify a file name explicitly) so that the following request chooses a target according to the same scheme used to reiterate a failed creation request. This allows the distribution of files in a random fashion.

Another possibility is that of having the client keep track of the PSRs which have larger unused capacity and of addressing the next request to the first in the list, to the following one if the request is rejected, and so on.

5.2.5 File Deletion

File deletion requests are carried out by the primary member of the peer set.

The deletion of a small file is a fairly straightforward process. Assuming that the effective identity of the requesting client is compatible with the access rights of the file to be deleted with regard to the deletion operation (since all the virtual directories offer write access to all users, the only discriminating item is whether the file itself is writable by the caller), the operation is performed and the relevant file blocks are returned to the free pool.

5.2.6 File Rename

File rename operations involving the SFR are not supported. If a file needs to be moved out of the SFR, it can be copied and the original can be deleted. The reverse is also possible, as long as either the approach used in the example is used, or the caller has chosen a file name that corresponds to free areas of the relevant PSR and the file is large enough to contain the amount of data to be copied. However, these operations are not performed by the SFR infrastructures and applications need to perform these steps explicitly.

5.2.7 File Open

A file open is always by name. For the SFR to deliver its intended performance, open and read are performed as a single action. Other open modes relate to the read-write, write, create, truncate and append mode.

The create mode is treated as for a create request (see above). The truncate and the append mode are not supported for small files (the truncation could be supported by keeping the blocks allocated to the file and reducing its length in the file metadata).

For read-only, read-write and write modes, the PSR service behaves as follows. The open is successful if the file name exists and the access permissions are compatible with the read request. However, to reduce the number of I/O operations to 1, the target PSR service (that caches the bitmap for the PSR it manages) proceeds as follows:

1. It verifies from the bitmap that a file corresponding to the name exists, starts at the specified block offset and has the specified length (the suffix is ignored, initially).
2. Then it performs the single I/O operation needed from the disk to read the contiguous file blocks into a buffer of appropriate length.
3. Then it checks the file access bits against the identity of the requestor. If the request is not compatible, the data read in is discarded and the requestor receives a negative acknowledgement.
4. Then it checks that the suffix (if any) corresponds to the one specified in the request. If there is no match, the data read in is discarded and the requestor receives a negative acknowledgement.

At this point the behavior differs depending on the open mode.

1. In case of opens in read-write or write mode, the primary member of the peer set needs to coordinate the request.
2. In case of opens in read-only or read-write mode, if all the above succeeds, the PSR service returns the data to the client with a positive acknowledgement for the request. The client caches the data so that the subsequent read requests on the file can be satisfied from the cached data.
3. If the open is in write-only mode, the data is not returned to the client, but the PSR service keeps it in memory, so that subsequent write requests can be merged with the existing file data before they are written out.
4. If the O_SYNC mode is requested, this has an impact on the behavior of write operations (see below).

5.2.8 File Read

File read operations are possible and are expected to be used when a file is opened in read-write mode. The inclusion of the read mode in the open causes the small file data to be returned to the requesting client with the open acknowledgement. So, theoretically, isolated reads should be of very little use. Nevertheless, the SFR service honors them.

5.2.9 File Write

File write operations are coordinated by the primary set member because it must make sure the other members of the set are in sync before an acknowledgement is returned to the requesting client.

Writes are limited to the length of the file specified in the file name. They can actually exceed the file length at any time as long as they do not go beyond the last block of the file.

If the O_SYNC flag is set in the open request, all writes are committed to disk as they are received and the client is sent back an acknowledgement only when the data is on stable storage. If the above flag is not set, the client request is acknowledged as soon as the peer set members have received the data to be written and the coordinator is aware of this.

5.2.10 File Sync

This primitive must be coordinated by the primary set member. It makes sure all the data cached in the server for a given file is written out and an acknowledgement is sent back only when all the members of the set have the cached data on stable storage.

5.2.11 File Close

File close has no practical effect for files open in read mode. However, in the case of files open in ways that include the write mode, it causes any data cached in the server that pertains to the given file to be scheduled for being flushed out. Acknowledgements to clients are asynchronous with respect to the flushing of the data. However, if the O_SYNC flag is set in the open request, the acknowledgment is synchronous to the close, although because of the flag, the data must have already reached stable storage.

6 SFR Backups and Restores

This section provides some details on how the files stored within the SFR can be backed up and restored to MaxiFS platforms or to other systems.

Performing backups and restores of the SFR is expected not to require special utilities. The purpose is that customers should be able to use whatever utilities they have available without having to adapt to ad hoc programs.

This is possible for the following reasons. The SFR is seen as an integral part of the hierarchical MaxiFS name space. Therefore, whether a backup utility targets the SFR portion of the name space, one of its subdirectories or the entire MaxiFS name space, the ability to traverse the entire name space and to read and write files in the SFR is part of the design.

The names of files stored in the SFR are artificial and cryptic. Nevertheless, the entire SFR hierarchy can be copied to other file systems that are large enough to contain it because the names are compatible with those used in the standard Unix file systems.

The restoration of other types of hierarchies to the SFR is not possible, unless the names the files and directories use are compatible with those used within the SFR and the names map to locations and peer sets that exist in the target SFR name space.

The restoration of backups to an existing SFR is possible if the number of peer sets the target SFR has available is not smaller than that of the SFR (or portion thereof) that was backed up and the size of the drive volumes used in the target SFR is not smaller than that of the source SFR. This is possible because, with appropriate privileges, any utility can overwrite existing files in the SFR. The best practice, however, is that of wiping out the content of an SFR or of a subset being restored before overwriting it with the content of the backup.

7 Peer Set recovery and Remote Replication of an SFR

In the normal case, peer sets have three active members. It is possible that during the normal system operation, some nodes may become unavailable and may have to be replaced by others. For this to work properly, the following is envisioned:

The metadata that implements the normal MaxiFS name space hierarchy must be copied to a new member of the set so that it is completely in sync with the other members. This is a logical operation that does not imply any specific restrictions on the file systems and volumes that implement such metadata hierarchy, as long as the available space in the new peer set member allows this hierarchy to be copied.

Since the members of a peer set have identical copies of their PSRs, it is necessary to make sure that new members brought into the set are updated with respect to their copy of the PSR. As mentioned, a new member cannot have a PSR volume that is not large enough to contain the file that uses the block with the highest number.

Assuming that the size requirement of the new peer set member is met, the fastest way to synchronize the new member of the set is that of providing a volume copy facility integrated with the PSR service. What this entails is the following. When the PSR needs to be updated, the source PSR initiates a volume copy to the target peer set member. As long as at least two members of the peer set are fully operational, update operations in the PSR can progress normally. Read-only operations are only supported by the members that are in sync. Whenever a new update operation coordinated by the peer set primary member is requested, the member being updated should take a look at the disk offset the copy has reached. Any operation that relates to portions of the volume that have been updated already can be updated with the new operation requested. The ones beyond the location being copied need not be updated because they will be updated when that section of the volume is copied.

The volume copy facility can be used to update remote copies of the infrastructure, by copying the individual volumes.

VI. Conclusion

All of the references cited above are hereby incorporated herein by reference in their entireties.

Although certain embodiments of the invention are described above with reference to FIG. 4B, which shows a single client, it should be understood that a storage system may include multiple clients, each having a FS client component that communicates with the FS server components over the network. Each FS client operates independently to service requests received from the filesystem in its respective client device.

In the embodiments described above, the FS client and the FS server components are additional components that are installed respectively into the client and the storage provider. It should be noted, however, that some or all of the FS client functionality may be integrated into the filesystem 414 or other client component (e.g., a client operating system), and some or all of the FS server functionality may be integrated into the storage processor or other storage provider component (e.g., a storage provider operating system). Thus, for example, embodiments of the present invention may include a filesystem with integrated FS client functionality, a storage processor with integrated FS server functionality, and an operating system with integrated FS client and/or FS server functionality.

It should be noted that, because the FS client components and the FS server components communicate with one another, such communications do not need to comply with a standard network file protocol such as NFS or CIFS. In a typical embodiment, such communications utilize a specialized protocol that allows for interchange of storage management information such as, for example, the locations of files within the storage system, movement of files within the storage system, replication of files within the storage system (e.g., for redundancy or load balancing), and tasks to be performed by the various storage providers, to name but a few. The specialized protocol provides for communication between FS client and FS server (e.g., for satisfying application requests) as well as between FS servers (e.g., for managing storage and reporting statistics).

It should also be noted that, because the FS clients and FS servers resolve pathnames based on a hashing scheme, the storage system does not need a separate metadata server for translating pathnames. Furthermore, pathnames are resolved in a single operation.

It should also be noted that, when multiple instantiations of a file are stored in different storage providers (e.g., for load balancing), rather than having the target storage provider return to the client a list of storage providers having copies of the file and allowing each client to select one of the storage providers (e.g., randomly or via a policy-based scheme), the target storage provider may return a different one of the storage providers to different clients so that each of such clients accesses the file through a different storage provider.

It should also be noted that terms such as "client" and "server" are used herein to describe various communication devices that may be used in a communication system, and should not be construed to limit the present invention to any particular communication device type. Thus, a communication device may include, without limitation, a bridge, router, bridge-router (brouter), switch, node, client, server, computer, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, the FS client and the FS server components are implemented in software that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

The embodiments of the invention described above are intended to be merely exemplary; numerous variations and modifications will be apparent to those skilled in the art based on the above teachings. All such variations and modifications are intended to be within the scope of the present invention as defined in any appended claims.

What is claimed is:

1. A storage system comprising:
   a client; and
   a storage provider in communication the client over a communication network, the storage provider including a first set of storage nodes, each storage node of the first set managed by a different storage server, wherein the file operation requests are transmitted to the first set of storages nodes in the storage provider using a multicast address associated with the first set,
   wherein at least a portion of metadata and file data stored on the first set of storage nodes is synchronized across two or more storage nodes of the first set; and
   wherein the storage provider is configured to, in response to a file operation request received from the client: (i) perform initial processing by each storage node of the first set of storage nodes in order to determine which storage node of the first set of storage nodes should be designated to process the file operation request; and (ii) process the file operation request via the designated node.

2. The storage system of claim 1, wherein each storage node of the first set of storage nodes is assigned a different designation.

3. The storage system of claim 1, wherein a first storage node of the first set of storage nodes is designated a primary node, and the remaining storage nodes of the first set of storage nodes are designated as secondary nodes.

4. The storage system of claim 3, wherein the first set of storage nodes is configured such that only the primary node responds to file operation requests from the client directed to the first set of nodes.

5. The storage system of claim 3, wherein the primary node of the first set of storage nodes maintains a lease with a secondary node of the first set of storage nodes.

6. The storage system of claim 1, wherein the first set of storage nodes comprises a designated storage node configured to manage queue operations for the first set.

7. The storage system of claim 1, wherein the initial processing comprises each storage node of the first set of storage nodes hashing at least a portion of the file operation request in order to determine which storage nodes of the first set of storage nodes to designate.

8. The storage system of claim 1, wherein the storage provider is configured to, in response to a determination that a storage node of the first set of storage nodes is unresponsive:
- identify a replacement storage node, wherein the replacement storage node is not a member of the first set;
- designate the replacement storage node as a member of the first set; and
- perform a replication task on the replacement storage node, wherein the replication task comprises replicating data from a responsive storage node of the first set to the replacement storage node.

9. The storage system of claim 8, wherein the replication task comprises identifying data that was stored on the unresponsive storage node, and replicating a copy of the data from the responsive storage node to the replacement storage node.

10. The storage system of claim 8, wherein the storage provider further comprises a second set of storage nodes designated as a supervising set to the first set of storage nodes, wherein the second set of storage nodes is configured to identify the replacement node in response to the determination that a storage node of the first set of storage nodes is unresponsive.

11. A computer-implemented method for processing file operation requests, comprising:
- implementing a first set of storage nodes in a storage environment, wherein each storage node of the first set is managed by a different storage server in the storage environment;
- synchronizing at least a portion of metadata and file data stored on the first set of storage nodes across two or more storage nodes of the first set; and
- transmitting to the first set of storage nodes one or more file operation requests from a client over a communication network, wherein the file operation requests are transmitted using a multicast address associated with the first set, and wherein processing the one or more file operation requests comprises: (i) performing initial processing by each storage node of the first set of storage nodes in order to determine which storage node of the first set of storage nodes should be designated to process each file operation request of the one or more file operation requests; and (ii) processing the one or more file operation requests via their respective designated node.

12. The computer-implemented method of claim 11, further comprising assigning each storage node of the first set of storage nodes a different designation.

13. The computer-implemented method of claim 11, further comprising designating a first storage node of the first set of storage nodes as a primary node, and the remaining storage nodes of the first set of storage nodes as secondary nodes.

14. The computer-implemented method of claim 13, further comprising configuring the first set of storage nodes such that only the primary node responds to file operation requests from the client directed to the first set of nodes.

15. The computer-implemented method of claim 11, further comprising designating a designated storage node of the first set of storage nodes to manage queue operations for the first set.

16. The computer-implemented method of claim 11, wherein performing initial processing comprises each storage node hashing at least a portion of the file operation request in order to determine which storage nodes of the first set of storage nodes to designate.

17. The computer-implemented method of claim 11, further comprising:
- in response to a determination that a storage node of the first set of storage nodes is unresponsive, identifying a replacement storage node, wherein the replacement storage node is not a member of the first set;
- designating the replacement storage node as a member of the first set; and
- performing a replication task on the replacement storage node, wherein the replication task comprises replicating data from a responsive storage node of the first set to the replacement storage node.

18. The computer-implemented method of claim 17, wherein the replication task comprises identifying data that was stored on the unresponsive storage node, and replicating a copy of the data from the responsive storage node to the replacement storage node.

\* \* \* \* \*